(12) United States Patent
Holm et al.

(10) Patent No.: US 12,303,816 B2
(45) Date of Patent: May 20, 2025

(54) AXIAL FLOW CENTRIFUGAL SEPARATOR

(71) Applicant: CUMMINS FILTRATION IP, INC., Columbus, IN (US)

(72) Inventors: Christopher E. Holm, Madison, WI (US); Peter K. Herman, Stoughton, WI (US); Arun P. Janakiraman, Stoughton, WI (US); Gerard Malgorn, Ergue Gaberic (FR); Chirag D. Parikh, Madison, WI (US); Anthony Barreteau, Quimper (FR); Ronan Corvec, Quimper (FR); Ken Tofsland, Stoughton, WI (US)

(73) Assignee: CUMMINS FILTRATION IP, INC., Columbus, IN (US)

(*) Notice: Subject to any disclaimer, the term of this patent is extended or adjusted under 35 U.S.C. 154(b) by 0 days.

(21) Appl. No.: 18/623,960

(22) Filed: Apr. 1, 2024

(65) Prior Publication Data

US 2024/0269592 A1    Aug. 15, 2024

Related U.S. Application Data

(60) Division of application No. 17/888,184, filed on Aug. 15, 2022, now Pat. No. 11,951,431, which is a
(Continued)

(51) Int. Cl.
*B01D 46/00*    (2022.01)
*B01D 39/20*    (2006.01)
(Continued)

(52) U.S. Cl.
CPC ..... *B01D 46/0031* (2013.01); *B01D 39/2068* (2013.01); *B01D 46/0047* (2013.01);
(Continued)

(58) Field of Classification Search
CPC ............ B01D 46/0031; B01D 46/0056; B01D 46/26; B01D 46/0047; B01D 2279/35;
(Continued)

(56) References Cited

U.S. PATENT DOCUMENTS 463,794 A    11/1891    DeLaval
806,346 A    12/1905    Kimball
(Continued)

FOREIGN PATENT DOCUMENTS

DE    20100363 U1    12/2001
DE    10300976 A1    7/2003
(Continued)

OTHER PUBLICATIONS

Alfa Laval "Theory of Separation" Publication Document No. VM 41124E3/9305, no date listed, 22 pages.
(Continued)

*Primary Examiner* — Robert Clemente
(74) *Attorney, Agent, or Firm* — Benesch Friedlander Coplan & Aronoff LLP

(57) ABSTRACT

Rotating coalescer elements that maximize the radial-projected separation surface area in a given (rotating) cylindrical volume, where flow to be cleaned is passing axially upward or downward through a separating media of the rotating coalescer element. Various example package assemblies are provided with various types of rotating configurations including cylindrical coiled media packs, frustum coiled media packs, concentric cylinders, coiled metal or polymer films with and without perforations, and/or alternating layers of different materials. The described rotating coalescers may be driven by hydraulic turbine, electric motor, belt, gear or by mounting on rotating machine components, such as rotating engine shafts or connected components.

15 Claims, 67 Drawing Sheets

Related U.S. Application Data continuation of application No. 16/615,036, filed as application No. PCT/US2018/038354 on Jun. 19, 2018, now Pat. No. 11,446,598.

(60) Provisional application No. 62/522,451, filed on Jun. 20, 2017.

(51) Int. Cl.
  *B01D 46/40* (2006.01)
  *F01M 13/04* (2006.01)

(52) U.S. Cl.
  CPC ....... *B01D 46/0056* (2013.01); *B01D 46/403* (2013.01); *F01M 13/04* (2013.01); *B01D 2275/105* (2013.01); *B01D 2279/35* (2013.01); *F01M 2013/0422* (2013.01); *F01M 2013/0438* (2013.01)

(58) Field of Classification Search
  CPC .......... B01D 39/2068; B01D 2275/105; B01D 46/403; F01M 2013/0422; F01M 2013/0438; F01M 13/04
  See application file for complete search history.

(56) References Cited

U.S. PATENT DOCUMENTS

| | | |
|---|---|---|
| 4,262,841 A | 4/1981 | Berber et al. |
| 5,073,177 A | 12/1991 | Brouwers |
| 5,542,402 A | 8/1996 | Lee et al. |
| 5,575,912 A | 11/1996 | Herman et al. |
| 5,637,217 A | 6/1997 | Herman et al. |
| 5,667,543 A | 9/1997 | Brouwers |
| 5,792,351 A | 8/1998 | Wehrle et al. |
| 5,974,567 A | 10/1999 | Dickson et al. |
| 6,071,300 A | 1/2000 | Brenneman et al. |
| 6,083,147 A | 7/2000 | Ehnstrom et al. |
| 6,095,964 A | 8/2000 | Purvey |
| 6,136,076 A | 10/2000 | Read |
| 6,152,120 A | 11/2000 | Julazadeh |
| 6,183,407 B1 | 2/2001 | Hallgren et al. |
| 6,213,929 B1 | 4/2001 | May |
| 6,224,531 B1 | 5/2001 | Frehland et al. |
| 6,424,067 B1 | 7/2002 | Samways |
| 6,517,475 B1 | 2/2003 | Brown et al. |
| 6,530,872 B2 | 3/2003 | Frehland et al. |
| 6,602,180 B2 | 8/2003 | Herman et al. |
| 6,620,090 B2 | 9/2003 | Fischer et al. |
| 6,709,477 B1 | 3/2004 | Haakansson et al. |
| 6,973,925 B2 | 12/2005 | Sauter et al. |
| 6,974,408 B2 | 12/2005 | Grosse-Wiesmann |
| 7,077,881 B2 | 7/2006 | Franzen et al. |
| 7,081,146 B2 | 7/2006 | Hallgren et al. |
| 7,090,634 B2 | 8/2006 | Mackel et al. |
| 7,182,724 B2 | 2/2007 | South |
| 7,235,177 B2 | 6/2007 | Herman et al. |
| 7,250,066 B2 | 7/2007 | Seipler |
| 7,297,098 B2 | 11/2007 | Fell |
| 7,300,396 B2 | 11/2007 | Pitkamaki et al. |
| 7,338,546 B2 | 3/2008 | Eliasson et al. |
| 7,396,373 B2 | 7/2008 | Lagerstedt et al. |
| 7,445,653 B2 | 11/2008 | Trautmann et al. |
| 7,550,032 B2 | 6/2009 | Brouwers et al. |
| 7,662,220 B2 | 2/2010 | Fukano et al. |
| 7,713,185 B2 | 5/2010 | Baumann et al. |
| 7,799,109 B2 | 9/2010 | Dunsch et al. |
| 7,811,347 B2 | 10/2010 | Carlsson et al. |
| 7,824,458 B2 | 11/2010 | Borgstrom et al. |
| 7,824,459 B2 | 11/2010 | Borgstrom et al. |
| 7,959,547 B2 | 6/2011 | Baumann et al. |
| 8,002,690 B2 | 8/2011 | Wiesmann et al. |
| 8,172,917 B2 | 5/2012 | Kup et al. |
| 8,182,408 B2 | 5/2012 | Isaksson et al. |
| 8,376,924 B2 | 2/2013 | Burford et al. |
| 8,397,920 B2 | 3/2013 | Moy et al. |
| 8,540,613 B2 | 9/2013 | Burford et al. |
| 8,794,222 B2 | 8/2014 | Schwandt et al. |
| 8,840,697 B2 | 9/2014 | Dopper |
| 8,974,567 B2 | 3/2015 | Verdegan et al. |
| 9,186,686 B2 | 11/2015 | Mackel et al. |
| 9,233,325 B2 | 1/2016 | Carlsson et al. |
| 9,422,738 B2 | 8/2016 | Hegi |
| 9,427,747 B2 | 8/2016 | Karlsson |
| 9,474,993 B2 | 10/2016 | Fell et al. |
| 9,636,638 B2 | 5/2017 | Gadgaard et al. |
| 9,714,591 B2 | 7/2017 | Szepessy |
| 11,446,598 B2 | 9/2022 | Holm et al. |
| 2002/0088445 A1 | 7/2002 | Weindorf et al. |
| 2005/0120685 A1 | 6/2005 | Fischer et al. |
| 2007/0056803 A1 | 3/2007 | Szentistvany et al. |
| 2011/0180051 A1 | 7/2011 | Schwandt et al. |
| 2011/0281712 A1 | 11/2011 | Schlamann et al. |
| 2015/0075377 A1 | 3/2015 | Gorbach et al. |
| 2016/0030875 A1 | 2/2016 | Parikh et al. |
| 2017/0001133 A1 | 1/2017 | Ishida et al. |
| 2017/0056803 A1 | 3/2017 | Raether |
| 2017/0106323 A1 | 4/2017 | Payyappilly |
| 2017/0296956 A1 | 10/2017 | Ishida et al. |

FOREIGN PATENT DOCUMENTS

| | | |
|---|---|---|
| DE | 10338770 A1 | 3/2005 |
| DE | 10 2004 030 910 A1 | 1/2006 |
| DE | 10 2007 043 462 B3 | 2/2009 |
| DE | 10 2008 033 638 A1 | 2/2009 |
| DE | 10 2008 030 028 A1 | 12/2009 |
| DE | 10 2009 019 950 A1 | 11/2010 |
| DE | 10 2009 018 000 A1 | 12/2010 |
| DE | 10 2010 048 484 A1 | 4/2012 |
| DE | 10 2009 035 895 B4 | 5/2012 |
| DE | 10 2010 035 217 B4 | 9/2013 |
| EP | 1 273 335 A2 | 1/2003 |
| EP | 1 645 320 A1 | 4/2006 |
| EP | 2 335 798 A1 | 6/2011 |
| WO | WO-94/23823 A1 | 10/1994 |
| WO | WO-97/40908 A1 | 11/1997 |
| WO | WO-97/44117 A1 | 11/1997 |
| WO | WO-2009/050462 A2 | 4/2009 |
| WO | WO-2016/046944 A1 | 3/2016 |
| WO | WO-2016/055266 A1 | 4/2016 |
| WO | WO-2016/159951 A1 | 10/2016 |
| WO | WO-2016/200895 A1 | 12/2016 |
| WO | WO-2016/200928 A1 | 12/2016 |
| WO | WO-2017/040256 A1 | 3/2017 |
| WO | WO-2017/053267 A1 | 3/2017 |
| WO | WO-2018/002244 A1 | 1/2018 |
| WO | WO-2018/107043 A1 | 6/2018 |

OTHER PUBLICATIONS

Citation for published version (APA): Brouwers, J. J. H., et al. "Rotational particle separator: an efficient method to separate micron-sized droplets and particles from fluids," Filtration, 12(1), Jan. 1, 2012 pp. 49-60.

Foreign Action other than Search Report on IN 201940746963 DTD Jan. 29, 2021.

International Search Report and Written Opinion issued for PCT/US2018/038354, issued on Oct. 24, 2018, 11 pages.

Kroes, "Droplet collection in a scaled-up rotating separator," Eindhoven University of Technology, 108 pages (2012).

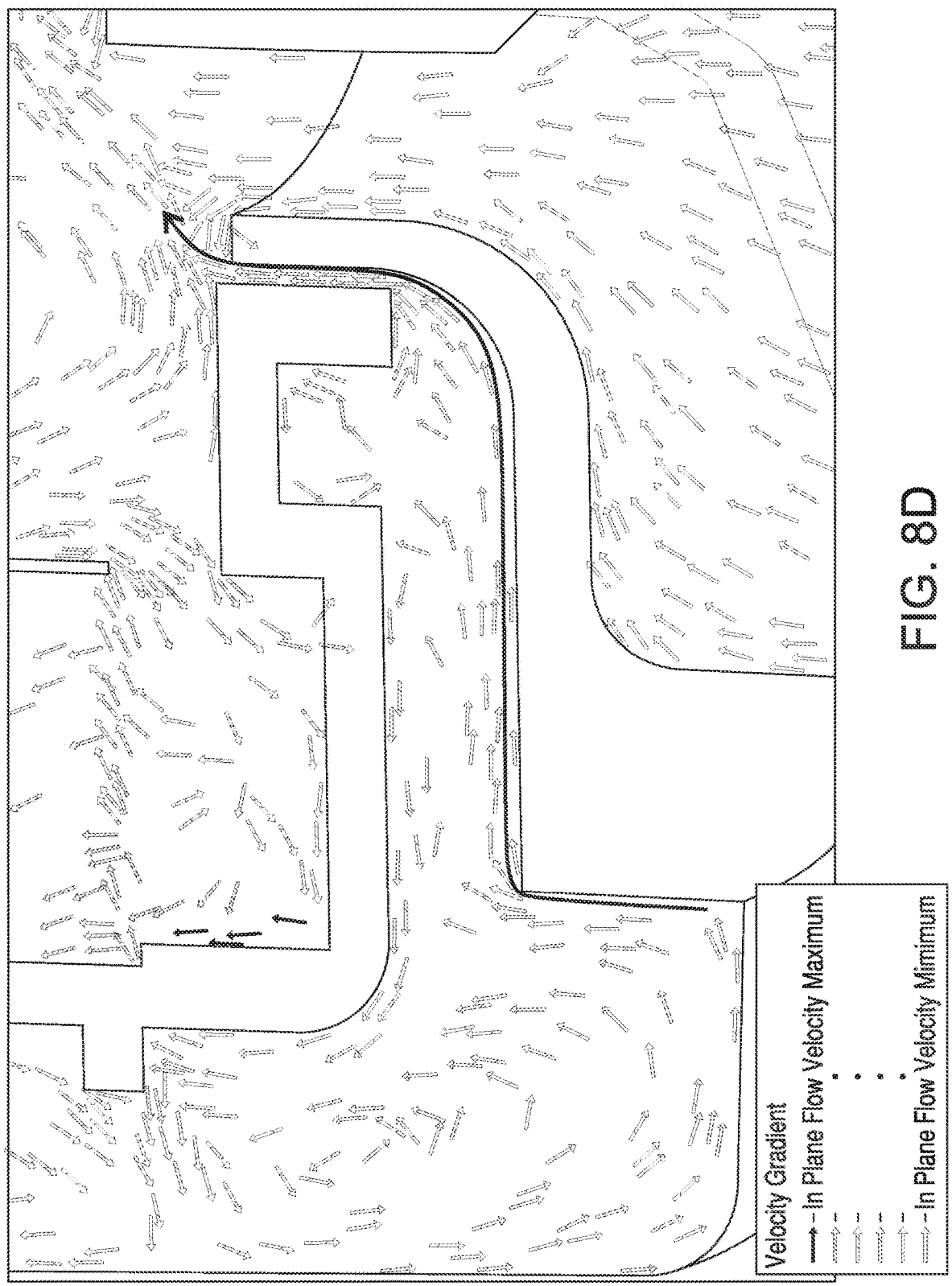

$$d_{lim} = \sqrt{\dfrac{Q \cdot 18 \cdot \eta}{(\rho_2 - \rho_1) \cdot \left(\left(\dfrac{2}{3} \cdot pi \cdot \omega^2 \cdot N \cdot \cot(\alpha) \cdot (R_1^3 - R_2^3)\right)\right)}}$$

Q = flow
N = viscosity
ρ2 = fluid density
ρ1 = particle density
ω = angular velocity
α = cone angle
R1 = Cone OD/2
R2 = Cone ID/2

FIG. 15B

Cone (disc) Benchmark:

$Vc = \frac{\pi}{4} \cdot (OD^2 - ID^2) \cdot (H - h)$     Vc is the volume only in the "cone" region, excluding central area and wasted end triangle sectors For typical (45 deg) style cones, the ratios used are typically:

ID = 0.546OD
  h = 0.227OD     note that h MUST be 0.227OD for ID = 0.546OD relationship with 45 deg angle...

Giving:

$Vc = -0.12513566578255983 9632 \cdot OD^3 + 0.551258404518054 60935 \cdot H \cdot OD^2$ Since:

$Area = \frac{2}{T} \cdot Vc$   where T = normal direction gap + wall thk     Area is the "volume packing" area - envision stacked plates filling a rectangular volume to homogenous uniform solidity, where number of plates = height/T and area of each plate is 2*l* w (both sides of the plate)

$Area = \frac{1.1025 \cdot H \cdot OD^2 - 0.2503 \cdot OD^3}{T}$ $Area\_effective = 0.707 \cdot \frac{1.1025 \cdot H \cdot OD^2 - 0.2503 \cdot OD^3}{T}$     45 degree angle gives 0.707 projected effective area $Area\_effective = \frac{0.7794675 \cdot H \cdot OD^2}{T} - \frac{0.1769621 \cdot OD^3}{T}$ $Vtotal = \frac{\pi \cdot OD^2 \cdot H}{4}$ $\frac{Area\_effective}{Vtotal} = \frac{\left(\frac{0.7794675 \cdot H \cdot OD^2}{T} - \frac{0.1769621 \cdot OD^3}{T}\right)}{\frac{\pi \cdot OD^2 \cdot H}{4}}$ $Packing\_Metric = \frac{Area\_effective}{Vtotal} = \frac{0.992 \cdot H - .225 \cdot OD}{H \cdot T}$     Area that can be packed per unit volume with fixed OD, H, and T - note:
When H = 0.227·OD     Packing metric goes to zero since all space is "wasted"

FIG. 16A

AXIAL FLOW CENTRIFUGAL SEPARATOR

CROSS-REFERENCE TO RELATED PATENT APPLICATION

The present application is a divisional of U.S. patent application Ser. No. 17/888,184, filed Aug. 15, 2022, which is a continuation of U.S. patent application Ser. No. 16/615,036, filed Nov. 19, 2019, now U.S. Pat. No. 11,446,598, which is a national stage of PCT Application No. PCT/US2018/038354, filed Jun. 19, 2018, which claims the benefit of, and priority to, U.S. Provisional Patent Application No. 62/522,451, filed Jun. 20, 2017. The contents of these applications are incorporated herein by reference in their entirety.

TECHNICAL FIELD

The present application relates to centrifugal separators.

BACKGROUND

During operation of an internal combustion engine, a fraction of combustion gases can flow out of the combustion cylinder and into the crankcase of the engine. These gases are often called "blowby" gases. The blowby gases include a mixture of aerosols, oils, and air. If vented directly to the ambient, the blowby gases can harm the environment. Accordingly, the blowby gases are typically routed out of the crankcase via a crankcase ventilation system. The crankcase ventilation system may pass the blowby gases through a coalescer (i.e., a coalescing filter element) to remove a majority of the aerosols and oils contained in the blowby gases. The filtered blowby gases ("clean" gases) are then either vented to the ambient (in open crankcase ventilation systems) or routed back to the air intake for the internal combustion engine for further combustion (in closed crankcase ventilation systems).

Some crankcase ventilation systems utilize rotating coalescer elements that increase the filter efficiency of the crankcase ventilation systems by rotating the coalescer element during filtering. In rotating coalescer elements, the contaminants (e.g., oil droplets suspended and transported by blowby gases) are separated at least in part by centrifugal separation techniques. Additionally, the rotation of the coalescer element can create a pumping effect, which reduces the pressure drop through the crankcase ventilation system.

Some rotating coalescer elements include a separating element that can include filter media, separating cones, or a combination thereof. However, filter media (e.g., fibrous filter media) may be plugged by insoluble particles or semi-solids that gradually collect and block the small-sized pore spaces within the filter media. This gradual pore blockage leads to slowly declining filter media permeability, slowly rising pressure loss across the crankcase ventilation system, and eventually the occurrence of flow bypass via dynamic seal in the crankcase ventilation systems, which results reduced separation efficiency. Thus, the rotating element requires periodic replacement as the pores clog. As another example, existing stacks of separating plates (or cones), which have larger flow passages than filter media separators, may not be as prone to clogging but are less efficient at removing aerosols and oils from the crankcase blowby gases. Additionally, the stacks of separating plates and cones have a low packing density, which either requires the crankcase ventilation systems to increase in size or have a reduced separating efficiency.

SUMMARY

Various example embodiments relate to crankcase ventilation systems, rotating coalescer elements, filter media packs, and filter media. One such example embodiment relates to a filter element. The filter element comprises a first sheet of media, the first sheet of media coiled so as to form a media pack having an inlet face and an outlet face. The first sheet of media comprising spacers configured to maintain a gap between successive layers of the first sheet of media. The gap forms an axial flow channel extending between the inlet face and the outlet face.

Another example embodiment relates to a crankcase ventilation system. The system includes a housing forming a central compartment and having an inlet and an outlet. The inlet is configured to provide blowby gases from a crankcase of an internal combustion engine into the central compartment. The system further includes a rotating coalescer element installed in the central compartment. The rotating coalescer element comprises a first sheet of media, the first sheet of media coiled so as to form a media pack having an inlet face and an outlet face. The first sheet of media comprising spacers configured to maintain a gap between successive layers of the first sheet of media. The gap forms an axial flow channel extending between the inlet face and the outlet face.

Another example embodiment relates to a rotating coalescer element. The rotating coalescer element includes a top endcap, a bottom endcap, and filter media. The top endcap includes an outer circumferential wall. The bottom endcap includes a lower wall and a plurality of apertures. The lower wall is in confronting relation with the outer circumferential wall. The lower wall and outer circumferential wall define an opening therebetween. The filter media is contained within a space defined by the top endcap and the bottom endcap. The filter media interfaces with at least one of the top endcap or the bottom endcap such that rotation of the at least one of the top endcap or the bottom endcap is transmitted to the filter media. The filter media includes a plurality of axial flow channels configured to receive blowby gas from the plurality of apertures and to provide separated gas to the top endcap.

Another example embodiment relates to a rotating coalescer element. The rotating coalescer element includes a top endcap, a bottom endcap, and an extruded filter media. The top endcap includes a top endcap hub. The bottom endcap includes a bottom endcap hub. The extruded filter media is contained within a space defined by the top endcap and the bottom endcap. The extruded filter media interfaces with at least one of the top endcap or the bottom endcap such that rotation of the at least one of the top endcap or the bottom endcap is transmitted to the extruded filter media. The extruded filter media includes a plurality of axial flow channels configured to receive blowby gas from the bottom endcap and to provide separated gas to the top endcap.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIGS. 8A, 8B, 8C, 8D, 8E, 9A, 9B, and 9C, various cross-sectional views of a crankcase coalescer system according to a further example embodiment. FIG. 8A shows a cross-sectional view of the crankcase coalescer system of FIG. 8A. FIG. 8B shows a detailed cross-sectional view of a top-discharge side of the crankcase coalescer system of FIG. 8A. FIG. 8C shows a detailed cross-sectional view of a dynamic seal of the crankcase coalescer system of FIG. 8A. FIG. 8D shows a flow velocity vector plot showing the recirculation flow of the crankcase coalescer system of FIG. 8A. FIG. 8E shows a detailed cross-sectional view of a dynamic seal of a crankcase coalesce system, such as the crankcase coalescer system of FIG. 8A. FIGS. 9A, 9B, and 9C each show a different axial cross-sectional view at a different height of the crankcase coalescer system of FIG. 8A.

FIG. 15A and FIG. 15B show a graph of required cone area and effective cone area vs. angle for equal performance ($d_{lim}$).

FIGS. 16A and 16B show the mathematics for calculating effective surface area of an axial flow separator.

DETAILED DESCRIPTION

Referring to the figures generally, various rotating coalescer elements are described. The described rotating coalescer elements maximize the radial-projected separation surface area in a given (rotating) cylindrical volume, where flow to be cleaned is passing axially upward or downward through a separating media of the rotating coalescer element. Various example package assemblies' examples are shown below with various types of rotating configurations including cylindrical coiled media packs, frustum (e.g., frustoconical, etc.) coiled media packs, concentric cylinders, coiled metal or polymer films with and without perforations, and/or alternating layers of different materials. The described rotating coalescers may be driven by hydraulic turbine, electric motor, belt, gear or by mounting on rotating machine components, such as rotating engine shafts or connected components.

Figure 1:
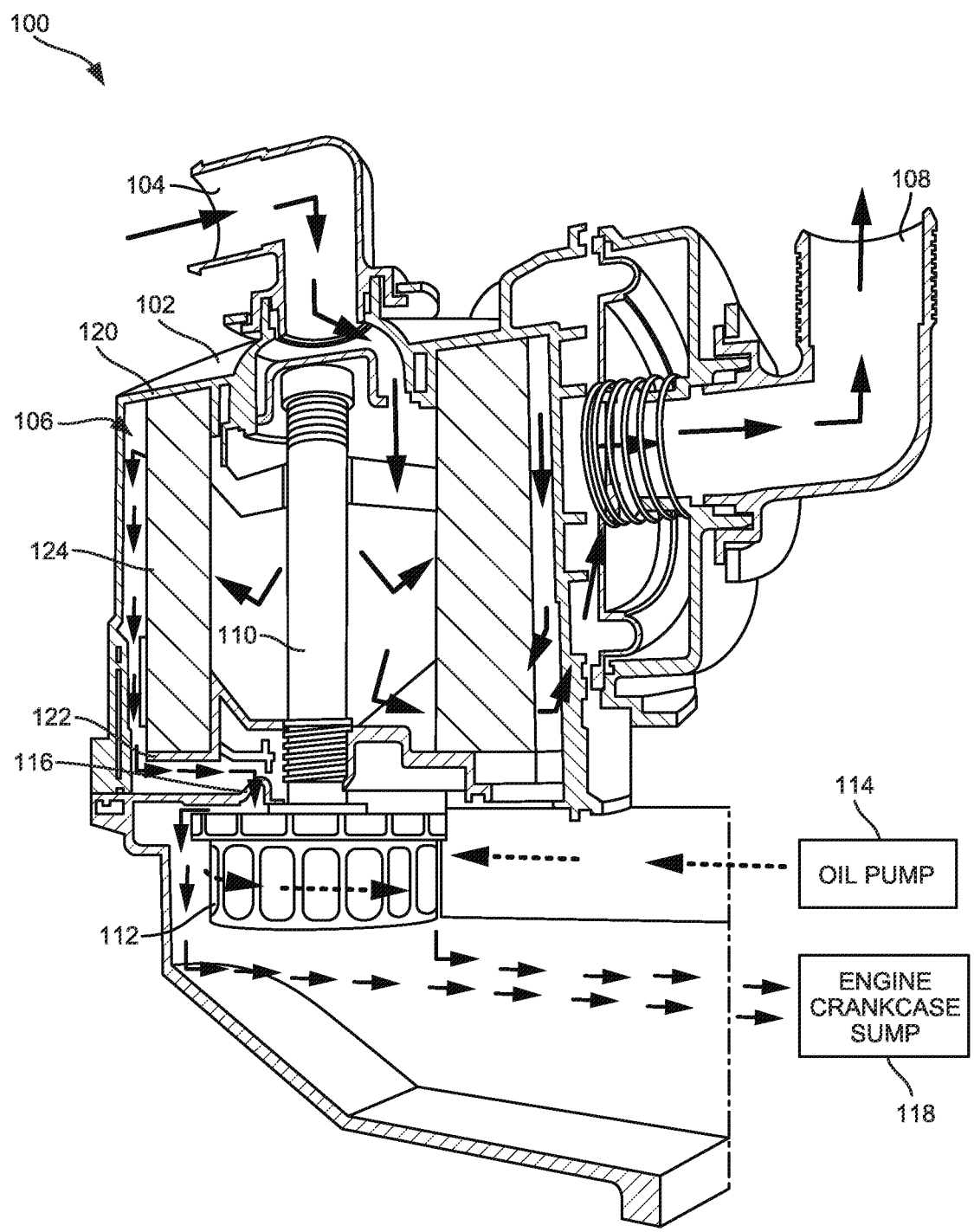
FIG. 1 shows a cross-sectional view of a crankcase ventilation system according to an example embodiment.

Referring to FIG. 1, a cross-sectional view of a crankcase ventilation system 100 is shown according to an example embodiment. The crankcase ventilation system 100 generally processes blowby gases received from an internal combustion engine crankcase to remove aerosols, oils, and other particulate contained in the crankcase blowby gases. The crankcase ventilation system 100 generally includes a housing 102 having an inlet 104 that receives crankcase blowby gases to be filtered, a central compartment having a rotating coalescer element 106 installed therein, and an outlet 108 that provides filtered blowby gases to the internal combustion engine (in a closed crankcase ventilation system) or to the ambient (in an open crankcase ventilation system).

During operation of the crankcase ventilation system 100, blowby gases enter the housing 102 through the inlet 104. The blowby gases are directed to the central compartment where the blowby gases flow through the rotating coalescer element 106 in an inside-out manner. In an alternate arrangement, the crankcase ventilation system 100 can be configured to have an outside-in flow arrangement. The rotating coalescer element 106 is coupled to a central shaft 110 that transfers rotation to the rotating coalescer element 106. In FIG. 1, the central shaft 110 is rotationally driven by a turbine 112 (i.e., a Pelton wheel, a bucket wheel, etc.) that is rotated by a jet of oil generated by an oil pump 114. In alternate arrangements, the central shaft 110 is rotated by an electric motor, a mechanical coupling with the internal combustion engine, or the like. The rotating coalescer element 106 separates oil, aerosols, and other contaminants contained in the blowby gases. The separated contaminants drain from the housing through a drain 116 and return to the engine crankcase sump 118. The rotating coalescer element 106 generally includes a first endcap 120, a second endcap 122, and a separating device 124. Various arrangements of the separating device 124—including modifications to the crankcase ventilation system 100 as a whole—are described in further detail with respect to FIGS. 2-11.

Figure 2:
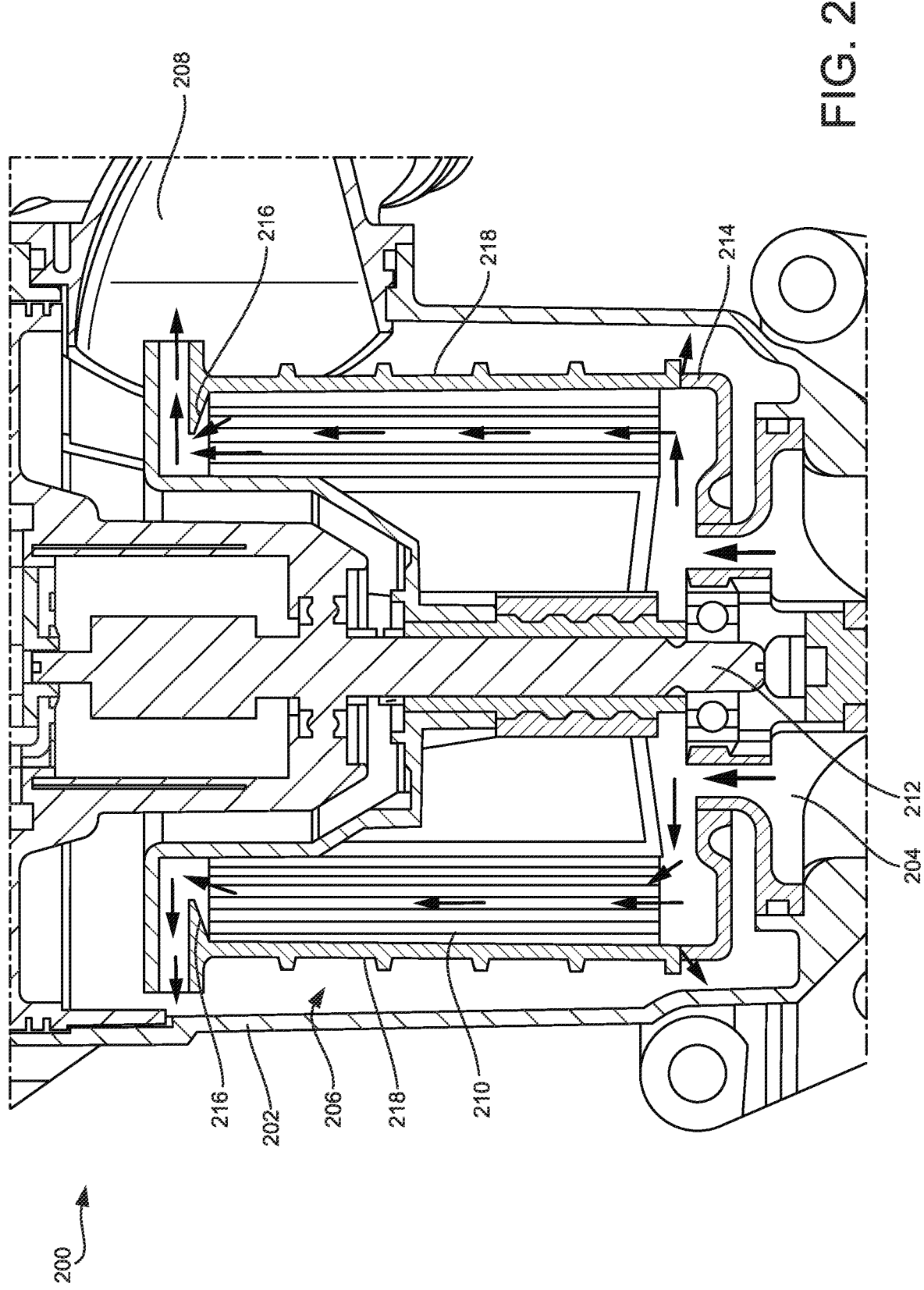
FIG. 2 shows a cross-sectional view of a crankcase coalescer system according to an example embodiment.

Referring to FIG. 2, a cross-sectional view of a crankcase coalescer system 200 is shown according to an example embodiment. The crankcase coalescer system 200 is similar to the crankcase ventilation system 100. The crankcase coalescer system 200 generally processes blowby gases received from an internal combustion engine crankcase to remove aerosols, oils, and other particulate contained in the crankcase blowby gases. The crankcase coalescer system 200 generally includes a housing 202 having an inlet 204 that receives crankcase blowby gases to be filtered, a central compartment having a rotating coalescer element 206 installed therein, and an outlet 208 that provides filtered blowby gases to the internal combustion engine (in a closed crankcase ventilation system) or to the ambient (in an open crankcase ventilation system).

The rotating coalescer element 206 includes filter media 210 having axial flow channels arranged in a direction generally parallel to an axis defined by the drive shaft 212 of the crankcase coalescer system 200. Accordingly, the rotating coalescer element 206 is an axial flow coalescing element. In some arrangements, the filter media 210 is a wound filter media. The filter media 210 may be frustoconical in overall shape such that the axial flow channels are not arranged in a direction that is generally parallel to an axis defined by the drive shaft 212 of the crankcase coalescer system 200. As shown in FIG. 2 (designated by the flow arrows), crankcase gas flows from the inlet 204, entering the filter media 210 from a first, bottom end of the filter media 210, through the filter media 210 in an axial direction, out a second, top end of the filter media 210, and out the outlet 208. Coalesced liquid (e.g., oil and aerosols separated from the crankcase blowby gas) passes through the layers of filter media 210 and drains to a bottom region of the rotating coalescer element 206, exiting through openings 214 at the largest local radius from a center axis of the rotating coalescer element 206 (e.g., the axis defined by the drive shaft 212). In some arrangements, the rotating coalescer element 206 is positioned in a manner such that gravity assists the draining of the separated liquid from the housing 202.

The rotating coalescer element 206 includes a drain lip 216. The drain lip 216 is defined by a diameter less than a diameter of an outer circumferential wall 218 of the rotating coalescer element 206. The drain lip 2012 is contiguous with, and extends inwardly from, the outer circumferential wall 218. The inward and upward extension of the drain lip 216 mitigates outflow of coalesced liquid from the filter media 210 because the filter media 210 is retained below the drain lip 216 and because the coalesced liquid is biased radially outward (e.g., towards the outer circumferential wall 218, etc.) and therefore underneath the drain lip 216 towards the outer circumferential wall 218.

Figure 3:
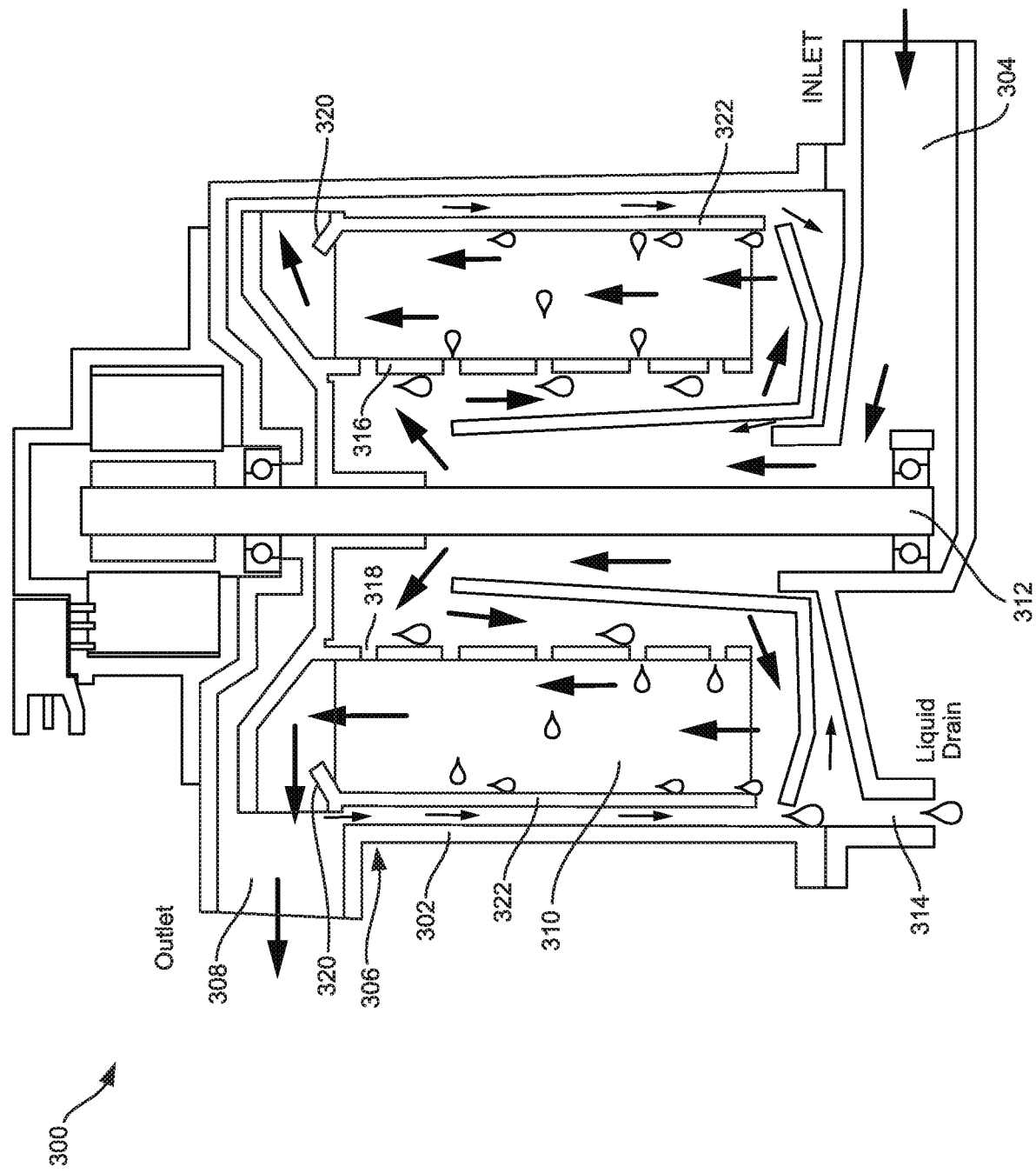
FIG. 3 shows a cross-sectional view of a crankcase coalescer system according to another example embodiment.

Referring to FIG. 3, a cross-sectional view of a crankcase coalescer system 300 is shown according to an example embodiment. The crankcase coalescer system 300 is similar to the crankcase coalescer system 200. The crankcase coalescer system 300 generally processes blowby gases received from an internal combustion engine crankcase to remove aerosols, oils, and other particulate contained in the crankcase blowby gases. The crankcase coalescer system 300 generally includes a housing 302 having an inlet 304 that receives crankcase blowby gases to be filtered, a central compartment having a rotating coalescer element 306 installed therein, and an outlet 308 that provides filtered blowby gases to the internal combustion engine (in a closed crankcase ventilation system) or to the ambient (in an open crankcase ventilation system).

The rotating coalescer element 306 includes filter media 310 having axial flow channels arranged in a direction generally parallel to an axis defined by the drive shaft 312 of the crankcase coalescer system 300 (e.g., in the same manner described above with respect to the rotating coalescer element 206). Accordingly, the rotating coalescer element 306 is an axial flow coalescing element. The filter media 310 may be frustoconical in overall shape such that the axial flow channels are not arranged in a direction that is generally parallel to an axis defined by the drive shaft 312 of the crankcase coalescer system 300. In some arrangements, the filter media 310 is a wound filter media. As shown in FIG. 3 (designated by the flow arrows), crankcase gas flows from the inlet 304, entering the filter media 310 from a first, bottom end of the filter media 310, through the filter media 310 in an axial direction, out a second, top end of the filter media 310, and out the outlet 308. Coalesced liquid (e.g., oil and aerosols separated from the crankcase blowby gas) passes through the layers of filter media 310 and drains to a bottom region of the rotating coalescer element 306, exiting through a drain 314 at a bottom region of the housing 302. In some arrangements, the rotating coalescer element 306 is positioned in a manner such that gravity assists the draining of the separated liquid from the housing 302. The filter media 310 is supported by a support tube 316. In some arrangements, the filter media 310 is wound around the support tube 316. The support tube 316 includes a plurality of perforations 318. The perforations 318 maximize the amount of liquid (e.g., oil and aerosols contained in the blowby gases) passing through the filter media 310. In some arrangements, a seal of the rotating coalescer element 306 against the housing 302 adjacent to the inlet 304 allows for positive recirculation of already-filtered crankcase blowby gas, which increases the efficiency of the crankcase coalescer system 300. Such positive recirculation is described in further detail, for example, in PCT Patent Application No. PCT/US2016/036432, entitled "SYSTEMS AND METHODS FOR ROTATING COALESCERS MAINTAINING POSITIVE RECIRCULATION THROUGH A DYNAMIC SEAL," which is published as PCT Publication No. WO 2016/200928, and PCT Patent Application No. PCT/US2016/036384, entitled "SYSTEMS AND METHODS FOR UTILIZING A LOW-FRICTION ROTATING COALESCER CONTACT SEAL," which is published as PCT Publication No. WO 2016/200895, both of which are incorporated by reference in their entireties and for all purposes.

The rotating coalescer element 306 includes a drain lip 320. The drain lip 320 is defined by a diameter less than a diameter of an outer circumferential wall 322 of the rotating coalescer element 306. The drain lip 320 is contiguous with, and extends inwardly from, the outer circumferential wall 322. The inward and upward extension of the drain lip 320 mitigates outflow of coalesced liquid from the filter media 310 because the filter media 310 is retained below the drain lip 320 and because the coalesced liquid is biased radially outward (e.g., towards the outer circumferential wall 322, etc.) and therefore underneath the drain lip 320 towards the outer circumferential wall 322.

Figure 4:
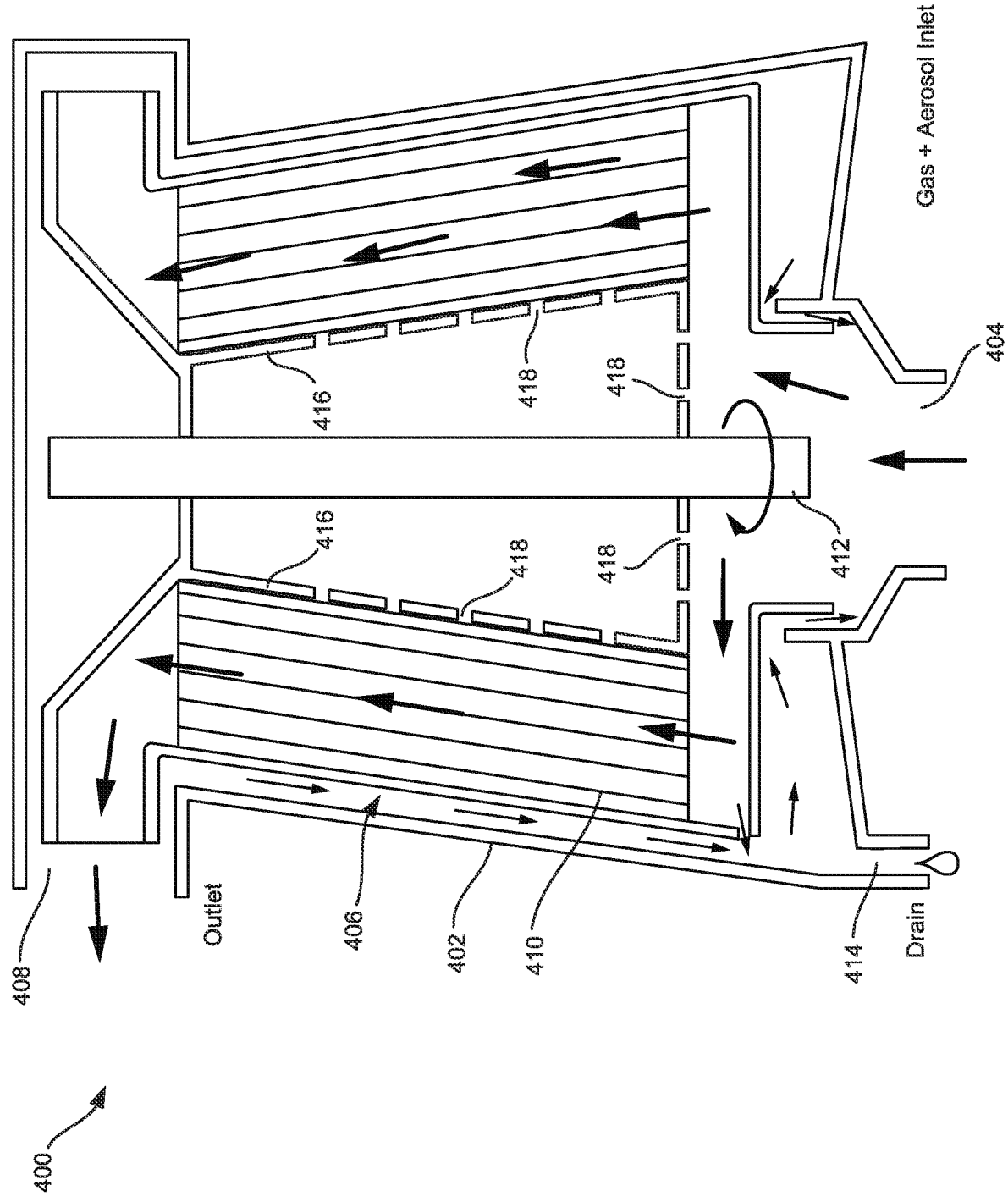
FIG. 4 shows a cross-sectional view of a crankcase coalescer system according to a further example embodiment.

Referring to FIG. 4, a cross-sectional view of a crankcase coalescer system 400 is shown according to an example embodiment. The crankcase coalescer system 400 is similar to the crankcase coalescer system 200. The primary difference between the crankcase coalescer system 400 and the crankcase coalescer system 200 is that the rotating coalescer element 406 includes filter media 410 positioned in a frustum (e.g., frustoconical, etc.) shape. The crankcase coalescer system 400 generally processes blowby gases received from an internal combustion engine crankcase to remove aerosols, oils, and other particulate contained in the crankcase blowby gases. The crankcase coalescer system 400 generally includes a housing 402 having an inlet 404 that receives crankcase blowby gases to be filtered, a central compartment having a rotating coalescer element 406 installed therein, and an outlet 408 that provides filtered blowby gases to the internal combustion engine (in a closed crankcase ventilation system) or to the ambient (in an open crankcase ventilation system).

The rotating coalescer element 406 includes filter media 410 having linear flow channels arranged to at an angle with respect to an axis defined by the drive shaft 412 of the crankcase coalescer system 400. Accordingly, the radius of the rotating coalescer element 406 is wider at a first, bottom end than at a second, top end. In some arrangements, the filter media 410 is a wound filter media. As shown in FIG. 4 (designated by the flow arrows), crankcase gas flows from the inlet 404, entering the filter media 410 from a first, bottom end of the filter media 410, through the filter media 410 in an axial direction, out a second, top end of the filter media 410, and out the outlet 408. Coalesced liquid (e.g., oil and aerosols separated from the crankcase blowby gas)

passes through the layers of filter media 410 and drains to a bottom region of the rotating coalescer element 406, exiting through a drain 414 at a bottom region of the housing 402. In some arrangements, the rotating coalescer element 406 is positioned in a manner such that gravity assists the draining of the separated liquid from the housing 402. The filter media 410 is supported by a support tube 416. In some arrangements, the filter media 410 is wound around the support tube 416. The support tube 416 includes a plurality of perforations 418. The perforations 418 maximize the amount of liquid (e.g., oil and aerosols contained in the blowby gases) passing through the filter media 410. In some arrangements, a seal of the rotating coalescer element 406 against the housing 402 adjacent to the inlet 404 allows for positive recirculation of already-filtered crankcase blowby gas, which increases the efficiency of the crankcase coalescer system 400.

Figure 5:
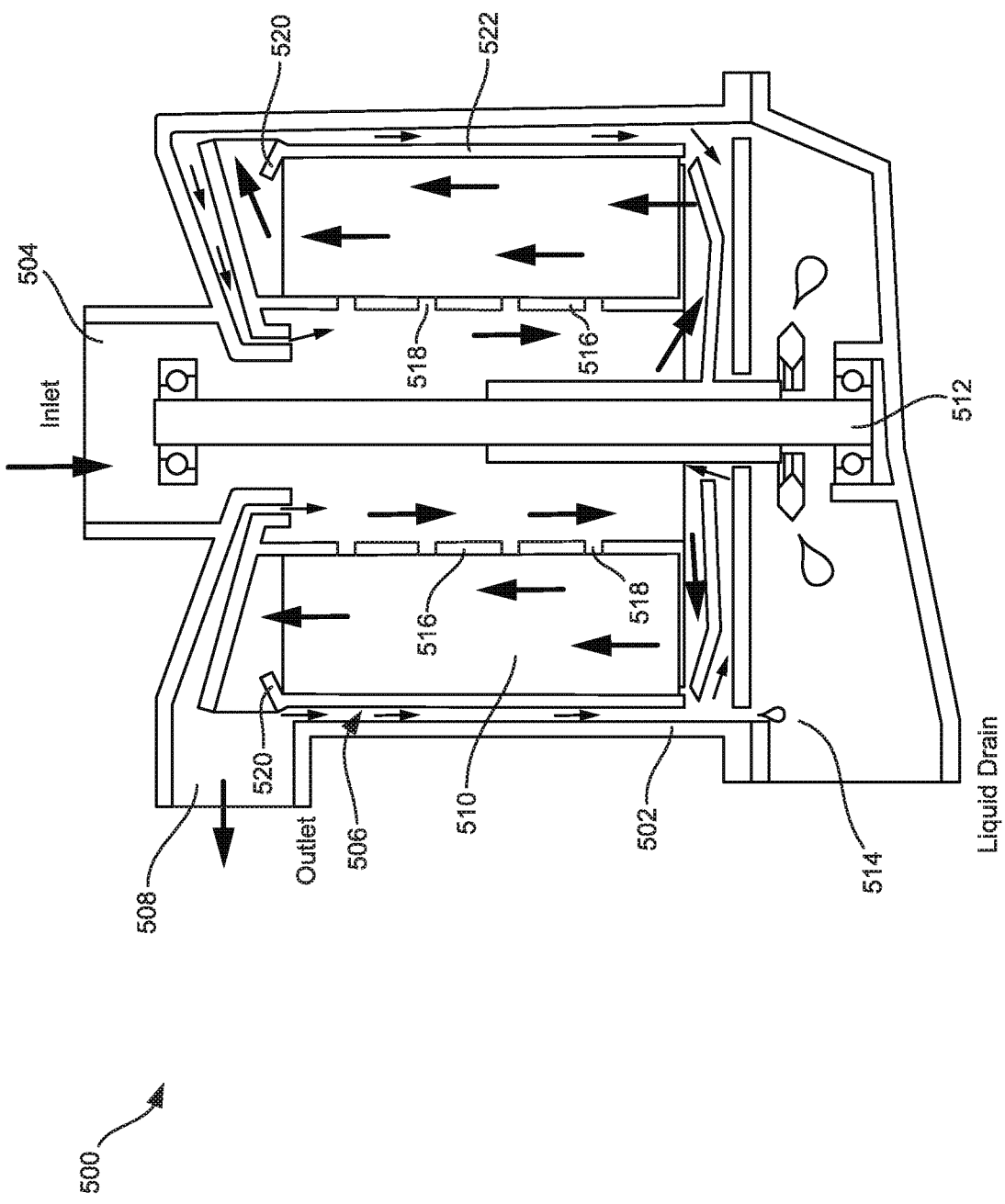
FIG. 5 shows a cross-sectional view of a crankcase coalescer system according to another example embodiment.

Referring to FIG. 5, a cross-sectional view of a crankcase coalescer system 500 is shown according to an example embodiment. The crankcase coalescer system 500 is similar to the crankcase coalescer system 200. The primary difference between the crankcase coalescer system 500 and the crankcase coalescer system 200 is that the crankcase coalescer system 500 allows for positive recirculation of filtered blowby gas for repeat filtering through the rotating coalescer element 506. The crankcase coalescer system 500 generally processes blowby gases received from an internal combustion engine crankcase to remove aerosols, oils, and other particulate contained in the crankcase blowby gases. The crankcase coalescer system 500 generally includes a housing 502 having an inlet 504 that receives crankcase blowby gases to be filtered, a central compartment having a rotating coalescer element 506 installed therein, and an outlet 508 that provides filtered blowby gases to the internal combustion engine (in a closed crankcase ventilation system) or to the ambient (in an open crankcase ventilation system).

The rotating coalescer element 506 includes filter media 510 having linear flow channels arranged in a direction generally parallel to an axis defined by the drive shaft 512 of the crankcase coalescer system 500 (e.g., in the same manner described above with respect to the rotating coalescer element 206). Accordingly, the rotating coalescer element 306 is an axial flow coalescing element. The filter media 510 may be frustoconical in overall shape such that the linear flow channels are not arranged in a direction that is generally parallel to an axis defined by the drive shaft 512 of the crankcase coalescer system 500. In some arrangements, the filter media 510 is a wound filter media. As shown in FIG. 5 (designated by the flow arrows), crankcase gas flows from the inlet 504, entering the filter media 510 from a first, bottom end of the filter media 510, through the filter media 510 in an axial direction, out a second, top end of the filter media 510, and out the outlet 508. Coalesced liquid (e.g., oil and aerosols separated from the crankcase blowby gas) passes through the layers of filter media 510 and drains to a bottom region of the rotating coalescer element 506, exiting through a drain 514 at a bottom region of the housing 502. In some arrangements, the rotating coalescer element 506 is positioned in a manner such that gravity assists the draining of the separated liquid from the housing 502. The filter media 510 is supported by a support tube 516. In some arrangements, the filter media 510 is wound around the support tube 516. The support tube 516 includes a plurality of perforations 518. The perforations 518 maximize the amount of liquid (e.g., oil and aerosols contained in the blowby gases) passing through the filter media 510. The crankcase coalescer system 500 allows for positive recirculation of the already filtered crankcase blowby gas through open seals (e.g., a fluid seal, an opening, etc.) between the rotating coalescer element 506 and the inlet 504 and the drive shaft 512, which increases the efficiency of the crankcase coalescer system 500.

The rotating coalescer element 506 includes a drain lip 520. The drain lip 520 is defined by a diameter less than a diameter of an outer circumferential wall 522 of the rotating coalescer element 506. The drain lip 520 is contiguous with, and extends inwardly from, the outer circumferential wall 522. The inward and upward extension of the drain lip 520 mitigates outflow of coalesced liquid from the filter media 510 because the filter media 510 is retained below the drain lip 520 and because the coalesced liquid is biased radially outward (e.g., towards the outer circumferential wall 522, etc.) and therefore underneath the drain lip 520 towards the outer circumferential wall 522.

Figure 6:
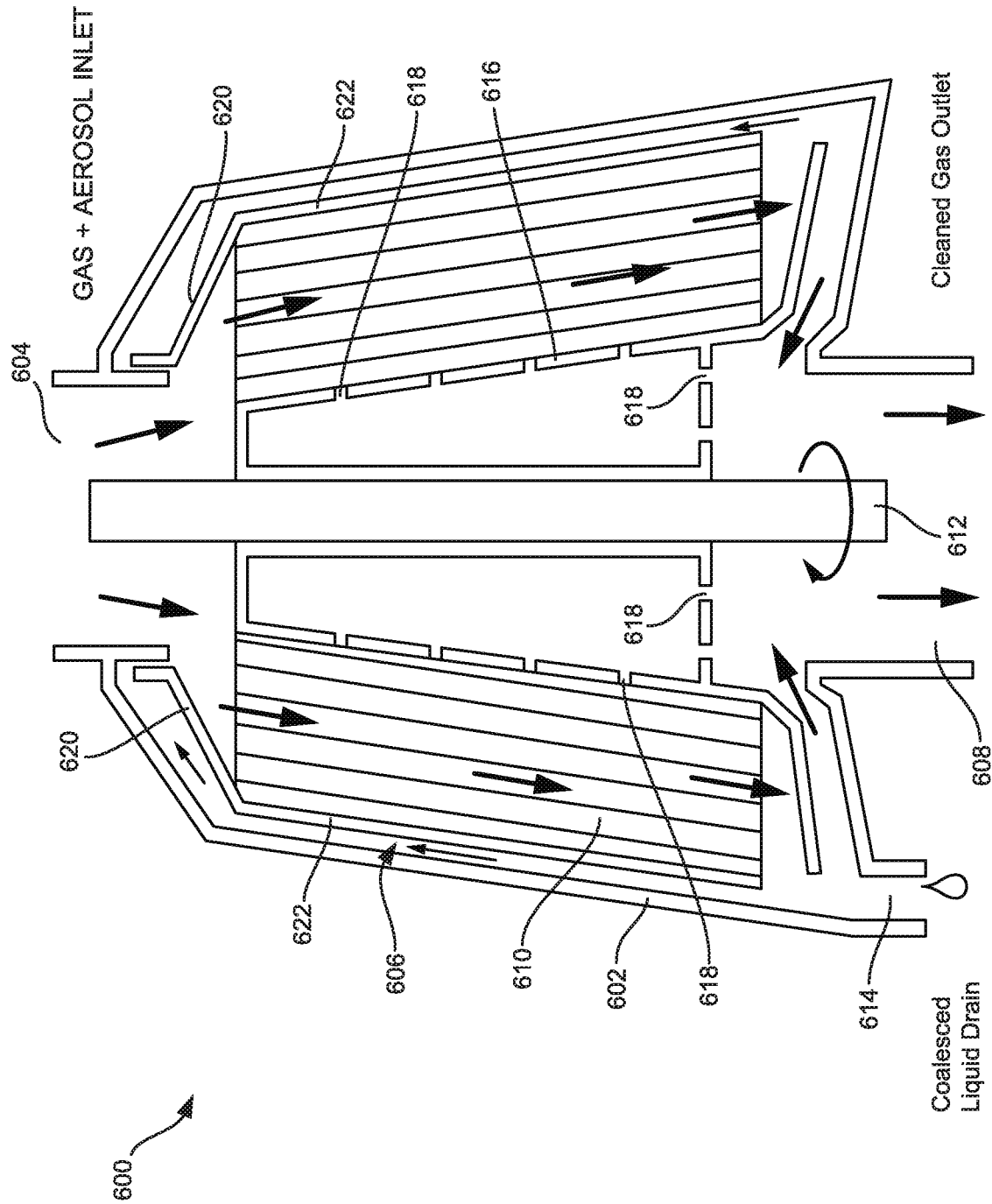
FIG. 6 shows a cross-sectional view of a crankcase coalescer system according to an additional example embodiment.

Referring to FIG. 6, a cross-sectional view of a crankcase coalescer system 600 is shown according to an example embodiment. The crankcase coalescer system 600 is similar to the crankcase coalescer system 400. The primary difference between the crankcase coalescer system 600 and the crankcase coalescer system 400 is that the crankcase coalescer system 600 has a top inlet 604 instead of a bottom inlet as in the crankcase coalescer system 400. The crankcase coalescer system 600 generally processes blowby gases received from an internal combustion engine crankcase to remove aerosols, oils, and other particulate contained in the crankcase blowby gases. The crankcase coalescer system 600 generally includes a housing 602 having an inlet 604 that receives crankcase blowby gases to be filtered, a central compartment having a rotating coalescer element 606 installed therein, and an outlet 608 that provides filtered blowby gases to the internal combustion engine (in a closed crankcase ventilation system) or to the ambient (in an open crankcase ventilation system).

The rotating coalescer element 606 includes filter media 610 having linear flow channels arranged to at an angle with respect to an axis defined by the drive shaft 612 of the crankcase coalescer system 600. Accordingly, the radius of the rotating coalescer element 606 is wider at a first, bottom end than at a second, top end. In some arrangements, the filter media 610 is a wound filter media. As shown in FIG. 6 (designated by the flow arrows), crankcase gas flows from the inlet 604, entering the filter media 610 from a first, bottom end of the filter media 610, through the filter media 610 in an axial direction, out a second, top end of the filter media 610, and out the outlet 608. Coalesced liquid (e.g., oil and aerosols separated from the crankcase blowby gas) passes through the layers of filter media 610 and drains to a bottom region of the rotating coalescer element 606, exiting through a drain 614 at a bottom region of the housing 602. In some arrangements, the rotating coalescer element 606 is positioned in a manner such that gravity assists the draining of the separated liquid from the housing 602. The filter media 610 is supported by a support tube 616. In some arrangements, the filter media 610 is wound around the support tube 616. The support tube 616 includes a plurality of perforations 618. The perforations 618 maximize the amount of liquid (e.g., oil and aerosols contained in the blowby gases) passing through the filter media 610. The crankcase coalescer system 400 allows for positive recirculation of the already filtered crankcase blowby gas through open seals (e.g., a fluid seal, an opening, etc.) between the rotating coalescer element 606 and the inlet 604 and the drive shaft 612, which increases the efficiency of the crankcase coalescer system 600.

The rotating coalescer element 606 includes a drain lip 620. The drain lip 620 is defined by a diameter less than a diameter of an outer circumferential wall 622 of the rotating coalescer element 606. The drain lip 620 is contiguous with, and extends inwardly from, the outer circumferential wall 622. The inward and upward extension of the drain lip 620 mitigates outflow of coalesced liquid from the filter media 610 because the filter media 610 is retained below the drain lip 620 and because the coalesced liquid is biased radially outward (e.g., towards the outer circumferential wall 622, etc.) and therefore underneath the drain lip 620 towards the outer circumferential wall 622.

Figure 7:
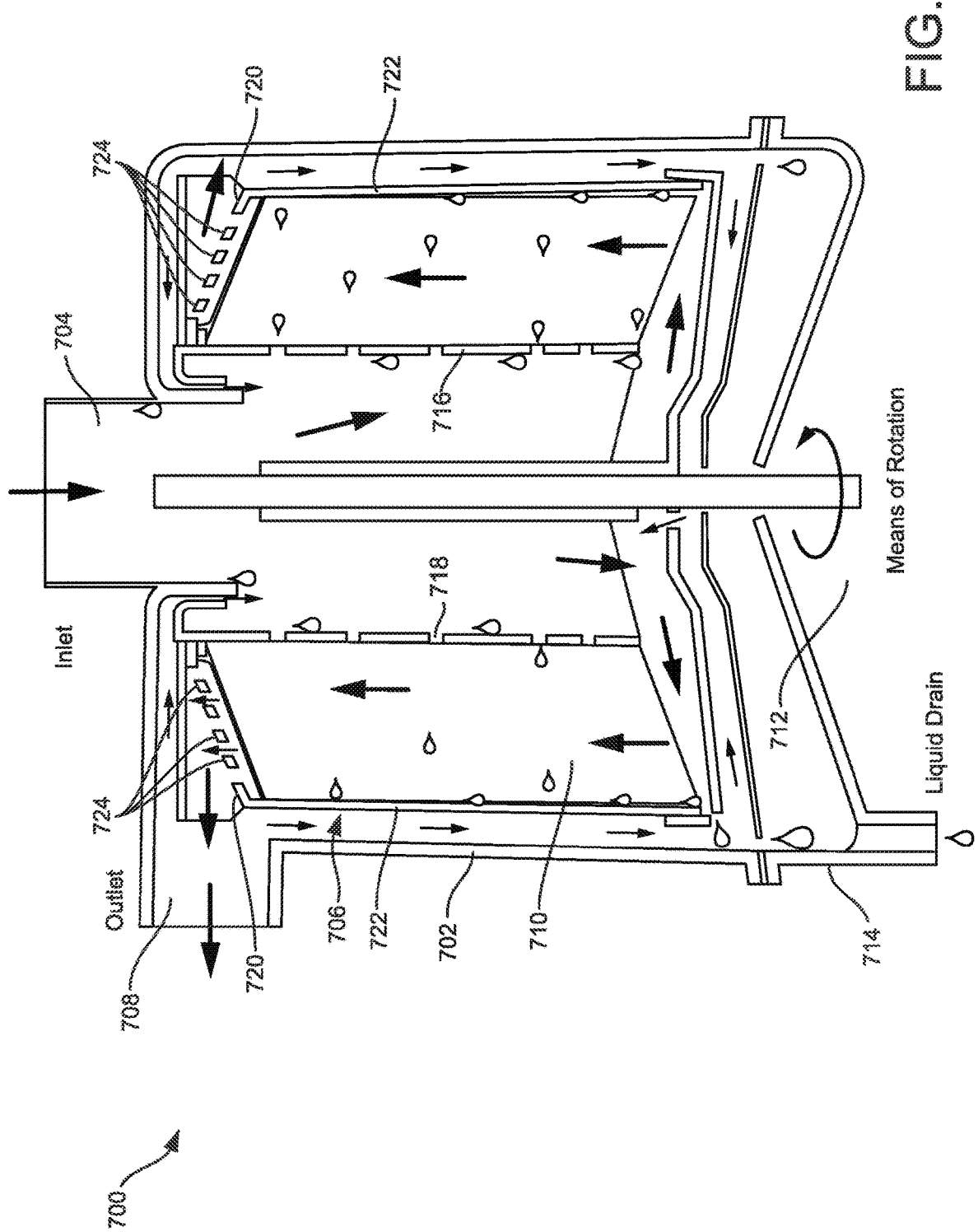
FIG. 7 shows a cross-sectional view of a crankcase coalescer system according to another example embodiment.

Referring to FIG. 7, a cross-sectional view of a crankcase coalescer system 700 is shown according to an example embodiment. The crankcase coalescer system 700 is similar to the crankcase coalescer system 300. The crankcase coalescer system 700 has a different shaped rotating coalescer element 706 than the rotating coalescer element 306. The crankcase coalescer system 700 generally processes blowby gases received from an internal combustion engine crankcase to remove aerosols, oils, and other particulate contained in the crankcase blowby gases. The crankcase coalescer system 700 generally includes a housing 702 having an inlet 704 that receives crankcase blowby gases to be filtered, a central compartment having a rotating coalescer element 706 installed therein, and an outlet 708 that provides filtered blowby gases to the internal combustion engine (in a closed crankcase ventilation system) or to the ambient (in an open crankcase ventilation system).

The rotating coalescer element 706 includes filter media 710 having axial flow channels arranged in a direction generally parallel to an axis defined by the drive shaft 712 of the crankcase coalescer system 700 (e.g., in the same manner described above with respect to the rotating coalescer element 206). Accordingly, the rotating coalescer element 706 is an axial flow coalescing element. The filter media 710 may be frustoconical in overall shape such that the axial flow channels are not arranged in a direction that is generally parallel to an axis defined by the drive shaft 712 of the crankcase coalescer system 700. In some arrangements, the filter media 710 is a wound filter media. The filter media 710 is arranged such that the outer layers of the filter media 710 are telescoped downward axially with respect to the inner layers of the filter media 710. As shown in FIG. 7 (designated by the flow arrows), crankcase gas flows from the inlet 704, entering the filter media 710 from a first, bottom end of the filter media 710, through the filter media 710 in an axial direction, out a second, top end of the filter media 710, and out the outlet 708. Coalesced liquid (e.g., oil and aerosols separated from the crankcase blowby gas) passes through the layers of filter media 710 and drains to a bottom region of the rotating coalescer element 706, exiting through a drain 714 at a bottom region of the housing 702. In some arrangements, the rotating coalescer element 706 is positioned in a manner such that gravity assists the draining of the separated liquid from the housing 702. The filter media 710 is supported by a support tube 716. In some arrangements, the filter media 710 is wound around the support tube 716. In some arrangements, the support tube 716 includes a plurality of perforations 718. In such arrangements, the perforations 718 maximize the amount of liquid (e.g., oil and aerosols contained in the blowby gases) passing through the filter media 710. In other arrangements, the support tube 716 does not include the circumferential perforations 718 as shown in FIG. 7. In some arrangements, a seal of the rotating coalescer element 706 against the housing 702 adjacent to the inlet 704 allows for positive recirculation of already-filtered crankcase blowby gas, which increases the efficiency of the crankcase coalescer system 700.

The rotating coalescer element 706 includes a drain lip 720. The drain lip 720 is defined by a diameter less than a diameter of an outer circumferential wall 722 of the rotating coalescer element 706. The drain lip 720 is contiguous with, and extends inwardly from, the outer circumferential wall 722. The inward and upward extension of the drain lip 720 mitigates outflow of coalesced liquid from the filter media 710 because the filter media 710 is retained below the drain lip 720 and because the coalesced liquid is biased radially outward (e.g., towards the outer circumferential wall 722, etc.) and therefore underneath the drain lip 720 towards the outer circumferential wall 722. In FIG. 7, the drain lip 720 extend from the outer circumferential wall 722 to the support tube 716 and contain a plurality of perforations 724 facilitating the flow of gas therethrough.

Figure 8A:
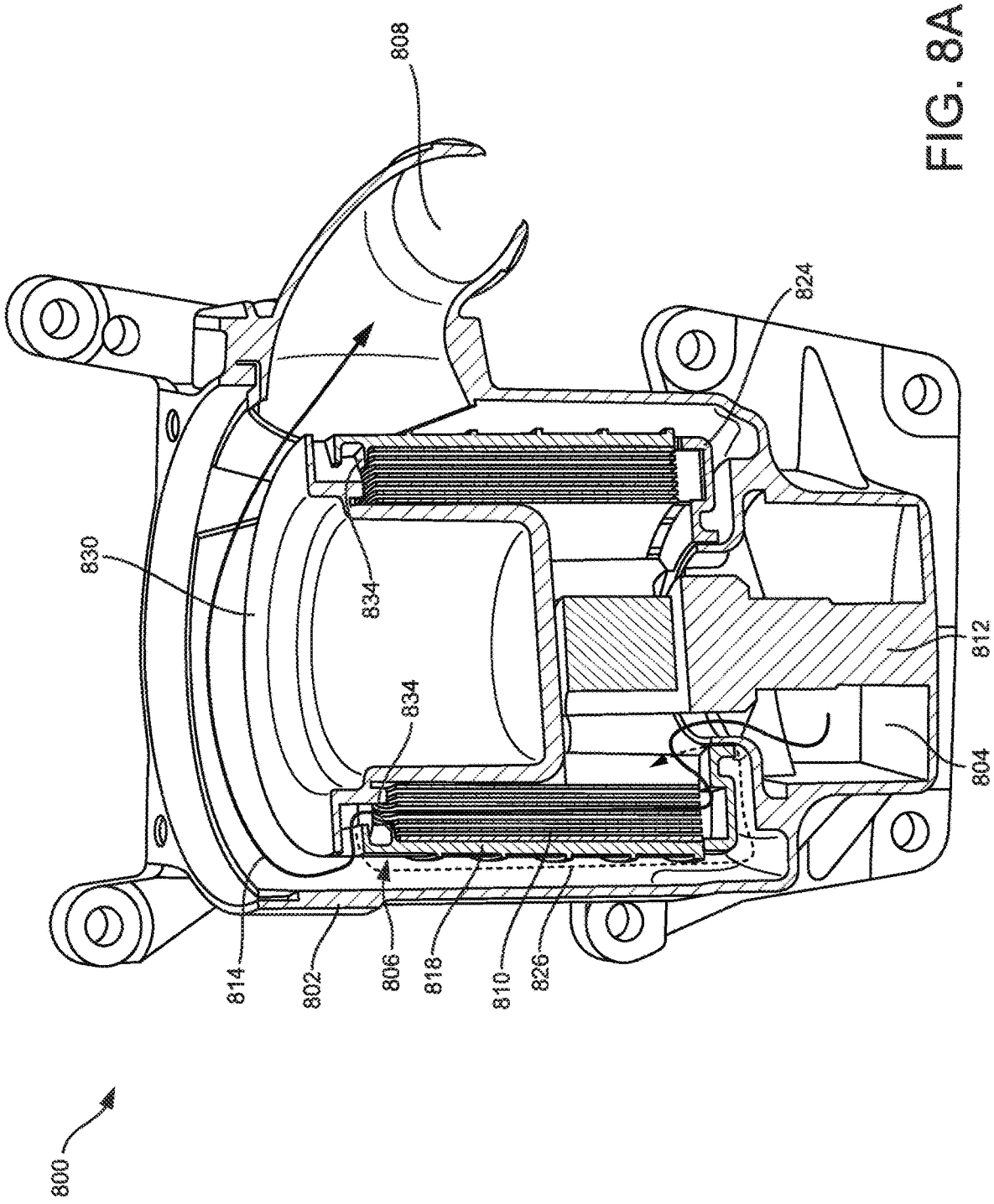
Figure 8B:
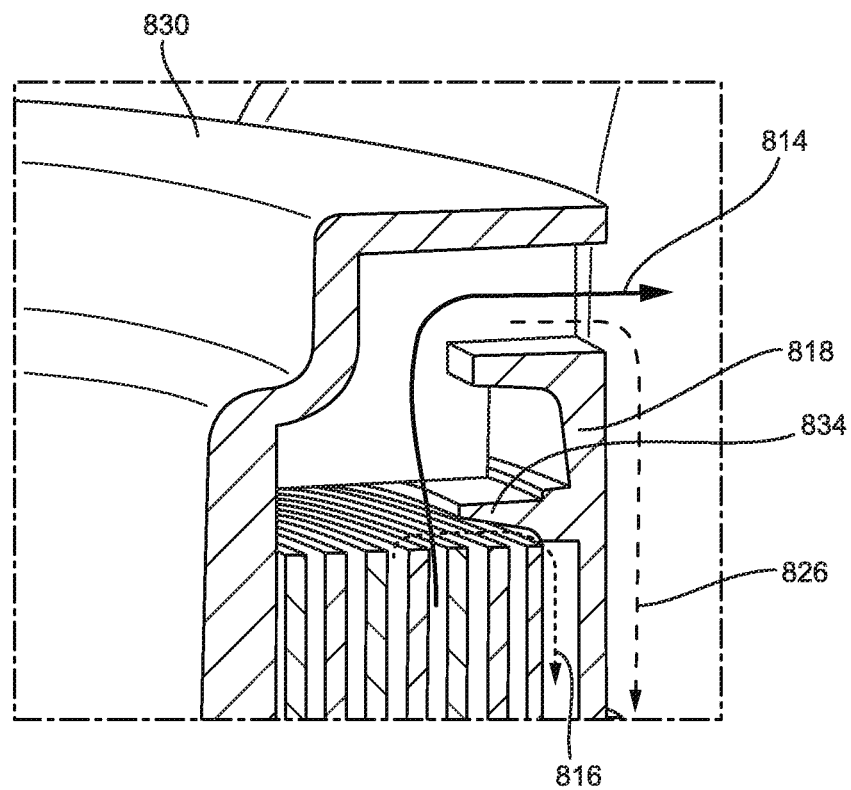
Figure 8C:
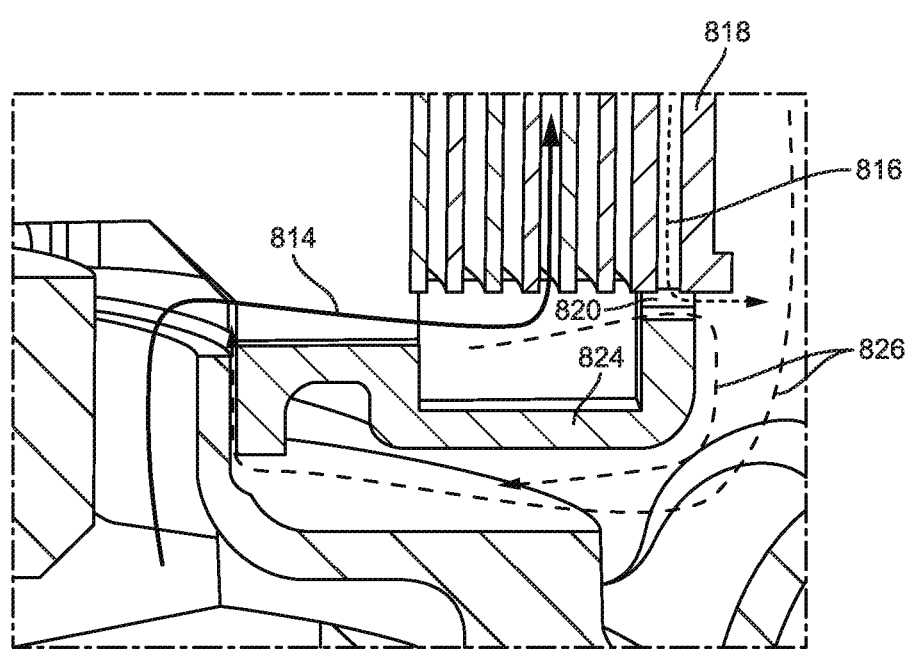
Figure 9A:
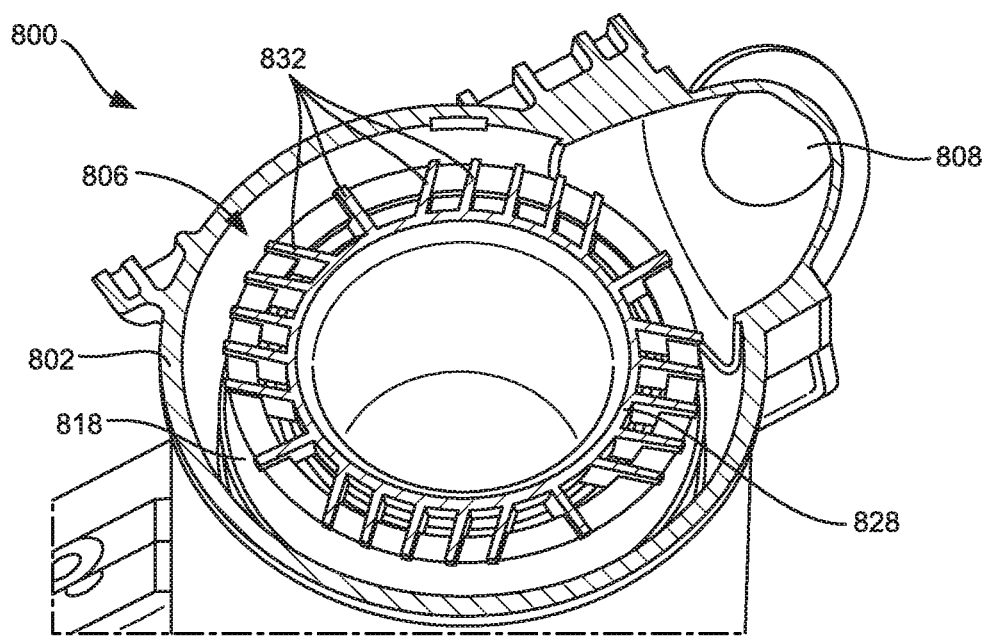
Figure 9B:
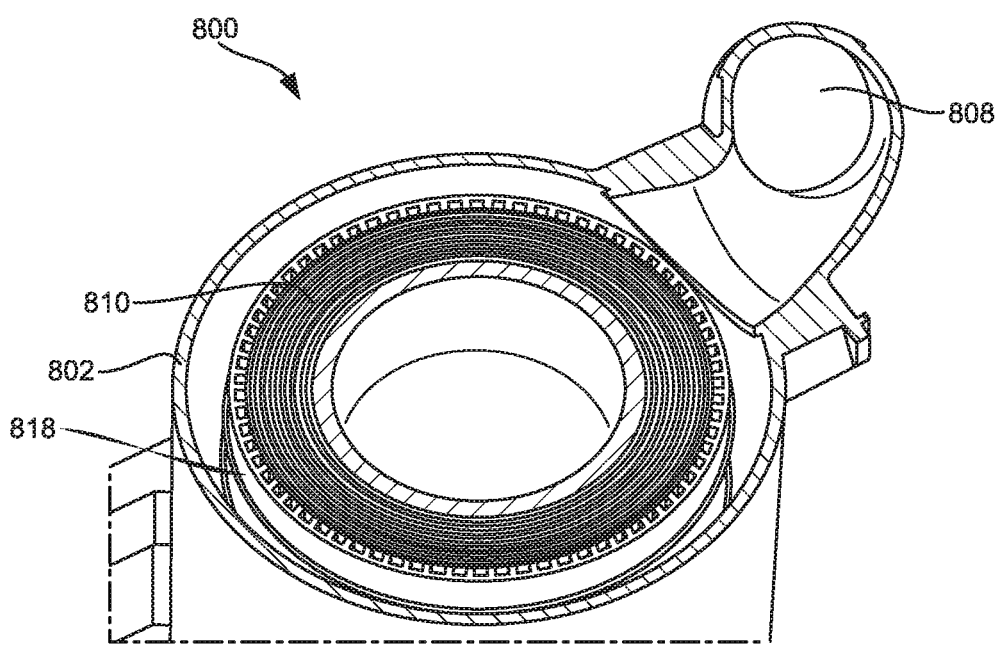
Figure 9C:
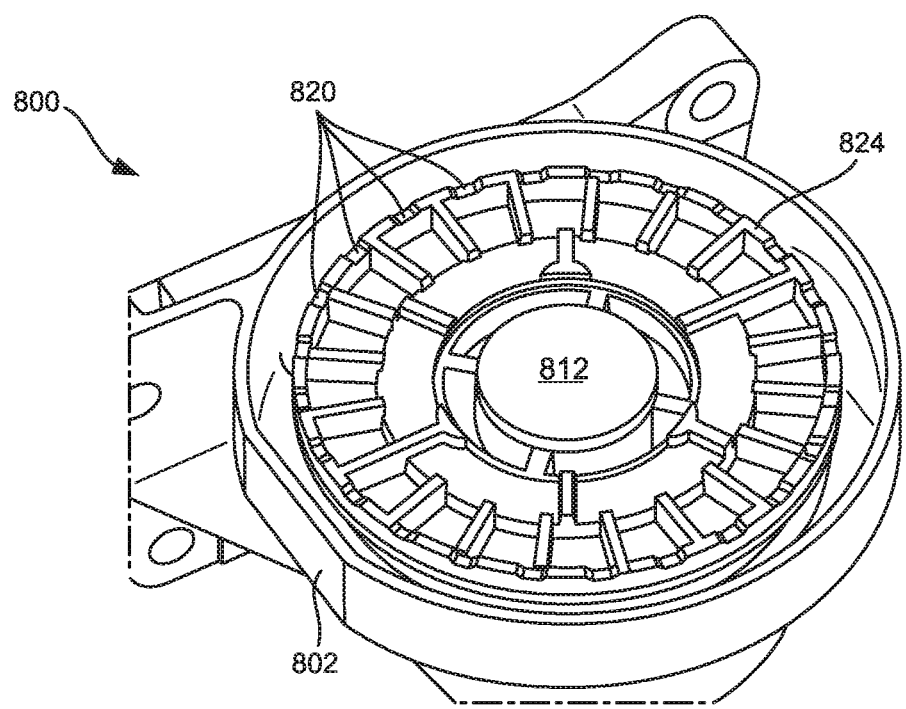

Referring to FIGS. 8A, 8B, 8C, 9A, 9B, and 9C, various cross-sectional views of a crankcase coalescer system 800 are shown according to an example embodiment. FIG. 8A shows a cross-sectional view of the crankcase coalescer system 800. FIG. 8B shows a detailed cross-sectional view of a top-discharge side of the crankcase coalescer system 800. FIG. 8C shows a detailed cross-sectional view of a dynamic seal of the crankcase coalescer system 800. FIGS. 9A, 9B, and 9C each show a different axial cross-sectional view at a different height of the crankcase coalescer system 800. The crankcase coalescer system 800 is similar to the crankcase coalescer system 200. The crankcase coalescer system 800 generally processes blowby gases received from an internal combustion engine crankcase to remove aerosols, oils, and other particulate contained in the crankcase blowby gases. The crankcase coalescer system 800 generally includes a housing 802 having an inlet 804 that receives crankcase blowby gases to be filtered, a central compartment having a rotating coalescer element 806 installed therein, and an outlet 808 that provides filtered blowby gases to the internal combustion engine (in a closed crankcase ventilation system) or to the ambient (in an open crankcase ventilation system).

The rotating coalescer element 806 includes filter media 810 having axial flow channels arranged in a direction generally parallel to an axis defined by the drive shaft 812 of the crankcase coalescer system 800. Accordingly, the rotating coalescer element 806 is an axial flow coalescing element. The filter media 810 may be frustoconical in overall shape such that the axial flow channels are not arranged in a direction that is generally parallel to an axis defined by the drive shaft 812 of the crankcase coalescer system 800. In some arrangements, the filter media 810 is a wound filter media. As shown in FIGS. 8A-8C (designated by the solid flow arrows 814 representing the primary flow through the crankcase coalescer system), crankcase gas flows from the inlet 804, entering the filter media 810 from a first, bottom end of the filter media 810, through the filter media 810 in an axial direction, out a second, top end of the filter media 810, and out the outlet 808. Flow through the filter media 810 is uniformly distributed on an axial plane adjacent to the inlet side of the filter media 810.

As shown best in FIGS. 8B and 8C, coalesced liquid (e.g., oil and aerosols separated from the crankcase blowby gas)—designated by the small dashed flow arrows 816—passes through the layers of filter media 810 in a radially outward direction and drains to a bottom region of the rotating coalescer element 806 along a circumferential wall 818 of the rotating coalescer element 806, exiting through openings 820 at the largest local radius from a center axis of the rotating coalescer element 806 (e.g., the axis defined by the drive shaft 812). The openings 820 may be crescent-shaped openings in cross-section. In some arrangements, the rotating coalescer element 806 is positioned in a manner such that gravity assists the draining of the separated liquid from the housing 802.

The crankcase coalescer system 800 also provides for recirculation of already filtered crankcase blowby gas and crankcase blowby gas that bypasses the filter media through the openings 820. A dynamic seal is formed between the housing 802 and a bottom endcap 824 of the rotating coalescer element 806. The dynamic seal prevents crankcase blowby gases from flowing between a gap formed between the bottom endcap 824 and the housing 802 when a pressure differential across the coalescer element 806 is below a threshold. However, when the pressure differential is above a threshold (e.g., when the pressure on the clean side of the coalescer element 806 is higher than the pressure on the dirty side of the coalescer element 806), the dynamic seal can be broken to allow for crankcase blowby gas on the clean side of the coalescer element 806 to flow through the gap between the bottom endcap 824 and the housing 802 and back to the dirty side of the rotating coalescer element 806. In some arrangements, the dynamic seal may be formed by any combination of a flexible rubber seal element, a fluid, wax, or the like. This recirculation of crankcase blowby gases is designated by the flow arrows 826. In some arrangements, the recirculation flow 826 assists separated liquid 816 in flowing to the bottom of the crankcase coalescer system 800 (e.g., and out a drain in the housing 802). A plane flow velocity vector plot showing the recirculation flow 826 is shown in FIG. 8D.

Figure 8E:
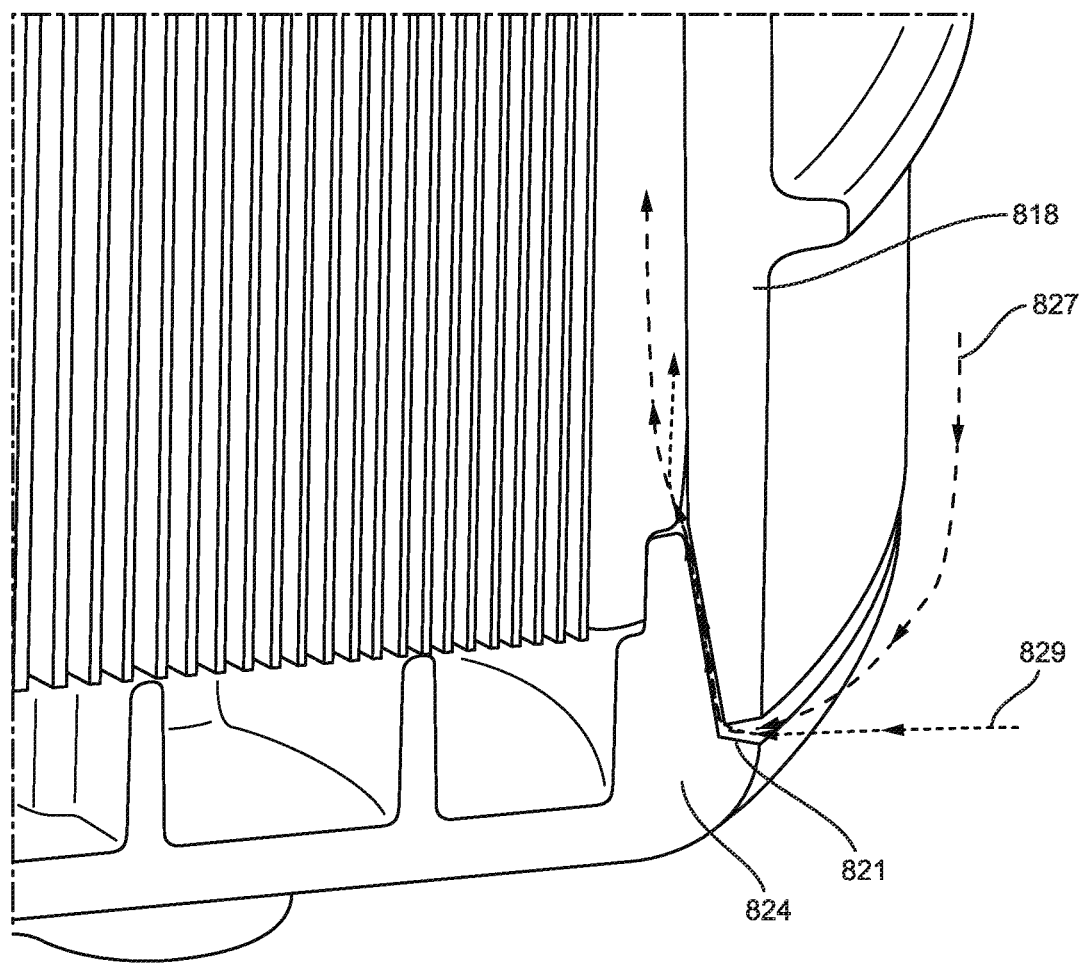

As shown in FIG. 8E, coalesced liquid—designated by the small dashed flow arrows 819—passes through the layers of filter media 810 vertically, from bottom to top in FIG. 8E, along with a gas flow. The gas exits once at the top of the filter media 810. However, the liquid drains from the top of the filter media 810 to a bottom region of the rotating coalescer element 806 along the circumferential wall 818 of the rotating coalescer element 806, exiting through a channel 821 between the bottom endcap 824 and the circumferential wall 818. Numerous, discontinuous (e.g., intermittent, etc.) channels 821 may be circumferentially disposed between the bottom endcap 824 and the circumferential wall 818. Gas that previously exited the separator tends to recirculate back into the separator—designated by the flow arrows 827—in the opposite direction of the liquid draining—designated by the small dashed flow arrows 819.

As noted above, the recirculation flow 826 is made possible through the dynamic seal by the higher pressure on the clean side of the rotating coalescer element 206 relative to the pressure on the dirty side of the rotating coalescer element 206. The pressure differential may be created at least in part based on a pumping force created by the rotation of the rotating coalescer element 806. The pumping force is magnified through the use of a fan 828 (shown in FIG. 9A) coupled to a top of the rotating coalescer element 806. In some arrangements, the fan 828 is integrated with a top endcap 830 of the coalescing filter element 806. The fan 828 includes a plurality of fins 832 that increase the pressure of the blowby gases on the clean side of the coalescing filter element 806 when the coalescing filter element 806 is rotating.

The coalescing filter element 806 includes a drain lip 834. The drain lip 834 is defined by a diameter less than a diameter of the circumferential wall 818. The drain lip 834 is contiguous with, and extends inwardly from, the circumferential wall 818. The drain lip 834 intercepts any separated liquid droplets exiting from the channels of the filter media 810 to guide the separated liquid towards the openings 820. The inward and upward extension of the drain lip 834 mitigates outflow of coalesced liquid from the filter media 810 because the filter media 810 is retained below the drain lip 834 and because the coalesced liquid is biased radially outward (e.g., towards the circumferential wall 818, etc.) and therefore underneath the drain lip 834 towards the circumferential wall 818. The drain lip 834 may also be called a radially inwardly projecting oil diversion ring.

Figure 10A:
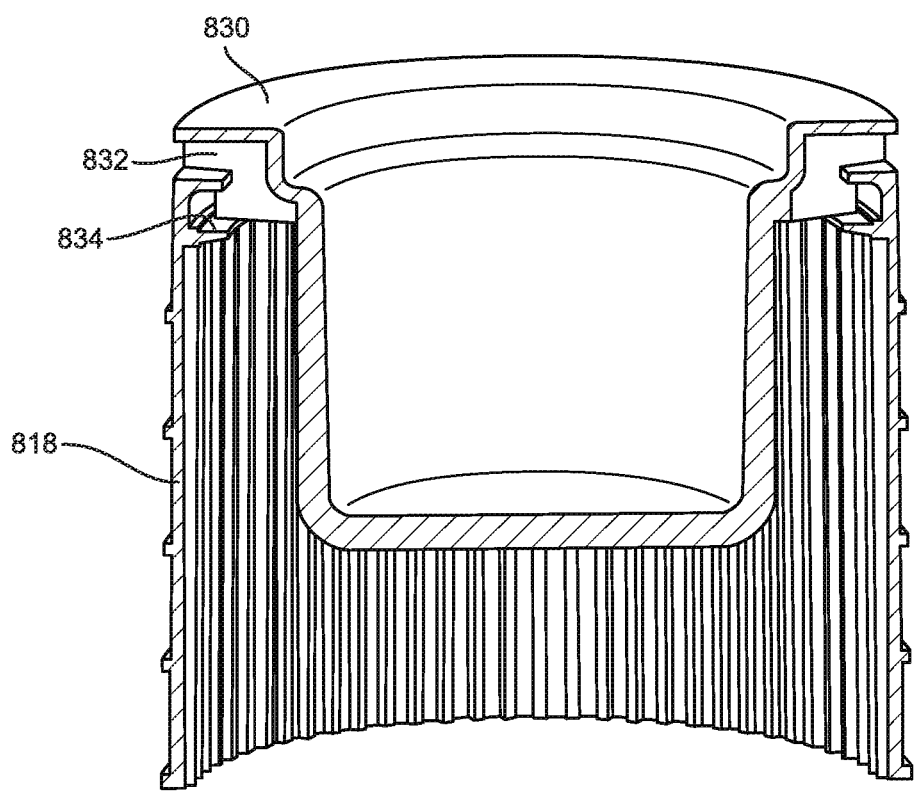
FIG. 10A shows a cross sectional view of the top endcap and the circumferential wall of the rotating coalescer element of the crankcase coalescer system of FIG. 8A.
Figure 10B:
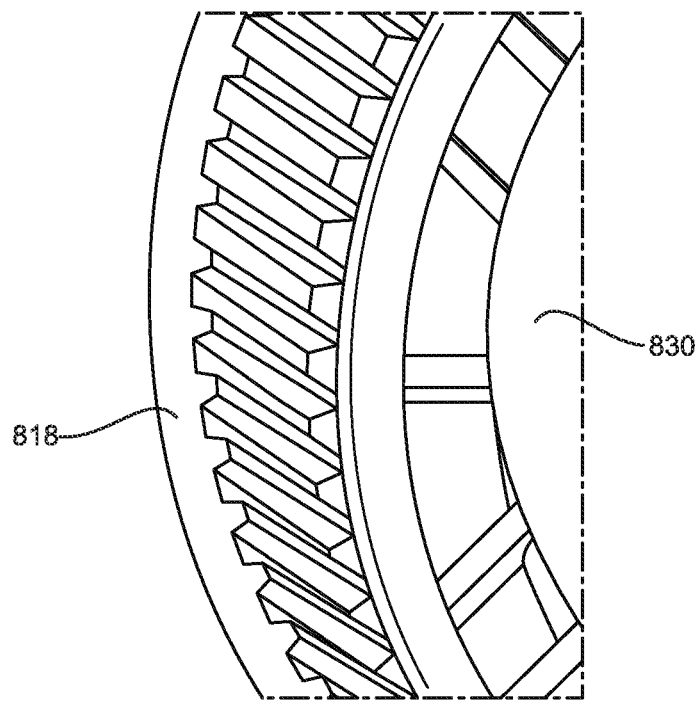
FIG. 10B shows a partial bottom view of the top endcap and the circumferential wall of the rotating coalescer element of the crankcase coalescer system of FIG. 8A.

Referring to FIGS. 10A and 10B, views of the top endcap 830 and circumferential wall 818 of the rotating coalescer element 806 are shown. FIG. 10A shows a cross sectional view of the top endcap 830 and the circumferential wall 818 of the rotating coalescer element 806. FIG. 10B shows a partial bottom view of the top endcap 830 and the circumferential wall 818 of the rotating coalescer element 806. As shown in FIGS. 10A and 10B, the filter media 810 is removed. The circumferential wall 818 and the top endcap 830 form a rotor shell of the rotating coalescer element 806. The circumferential wall 818 includes a plurality of axial ribs 1002 on an inner surface of the circumferential wall 818. The axial ribs 1002 run parallel to the axis defined by the drive shaft 812 of the crankcase coalescer system 800. The axial ribs 1002 form grooves 1004 that allow separated liquid percolating radially through the outer layer of the filter media 810 to be expelled downward towards the openings 820. The liquid carried in the grooves 1004 may be driven by gravity, by the high g-force generated by rotation of the rotating coalescer element 806, or a combination thereof. In some arrangements, the circumferential wall 818 and/or the grooves 1004 include a slight draft angle that helps expel the liquid towards the openings 820 when the rotating coalescer element 806 is rotated.

Figure 11:
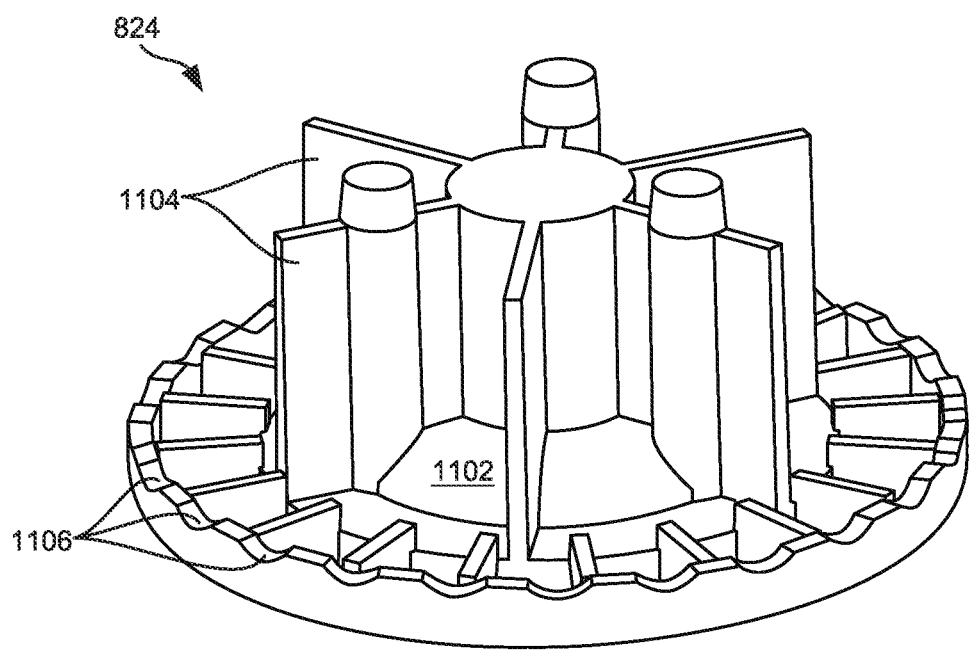
FIG. 11 shows a perspective view of the bottom endcap of the rotating coalescer element of the crankcase coalescer system of FIG. 8A.

Referring to FIG. 11, a perspective view of the bottom endcap 824 is shown. The bottom endcap 824 connects to the circumferential wall 818 and the top endcap 830. The bottom endcap 824 includes a central inlet port 1102 that receives crankcase blowby gas to be filtered through the filter media 810. The bottom endcap 824 includes a plurality of radial ribs 1104 downstream of the central inlet port 1102. The radial ribs 1104 accelerate the incoming flow of crankcase blowby gas through the filter media 810. Although shown as being planar in shape, the radial ribs 1104 may be spiral in shape to further improve the flow acceleration caused by the radial ribs 1104 during rotation of the rotating coalescer element 806.

As described above, each of the above-described rotating coalescer elements can utilize a wound filter media. FIGS. 12A through 12D and FIGS. 13A through 13D show two different variations of wound filter media that may be used in any of the above-described rotating coalescer elements.

Figure 12A:
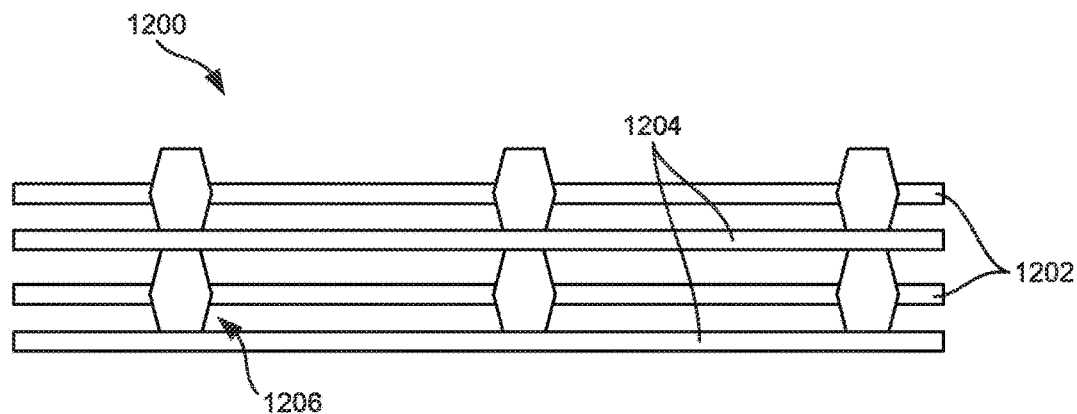
FIG. 12A shows an axial cross-sectional view of filter media according to an example embodiment.
Figure 12B:
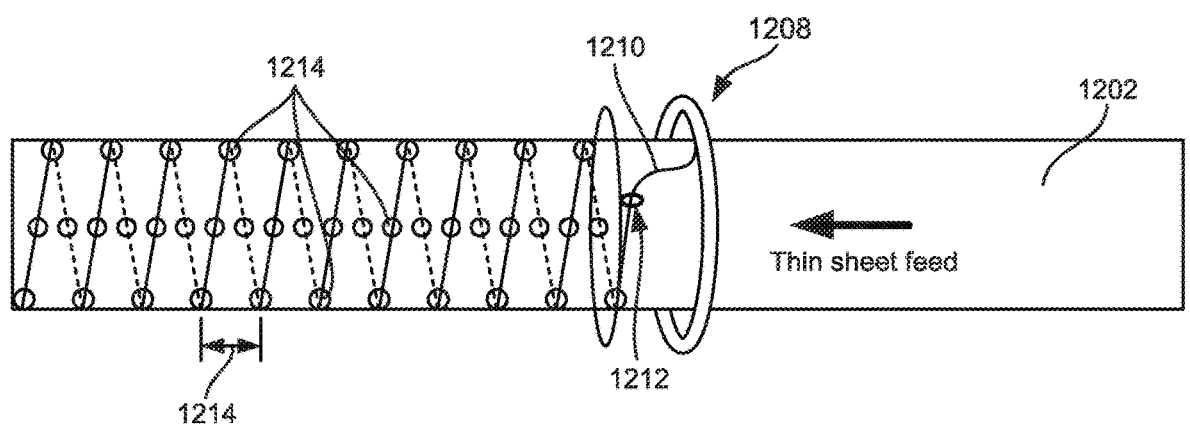
FIG. 12B shows a manufacturing arrangement for making the filter media of FIG. 12A.
Figure 12C:
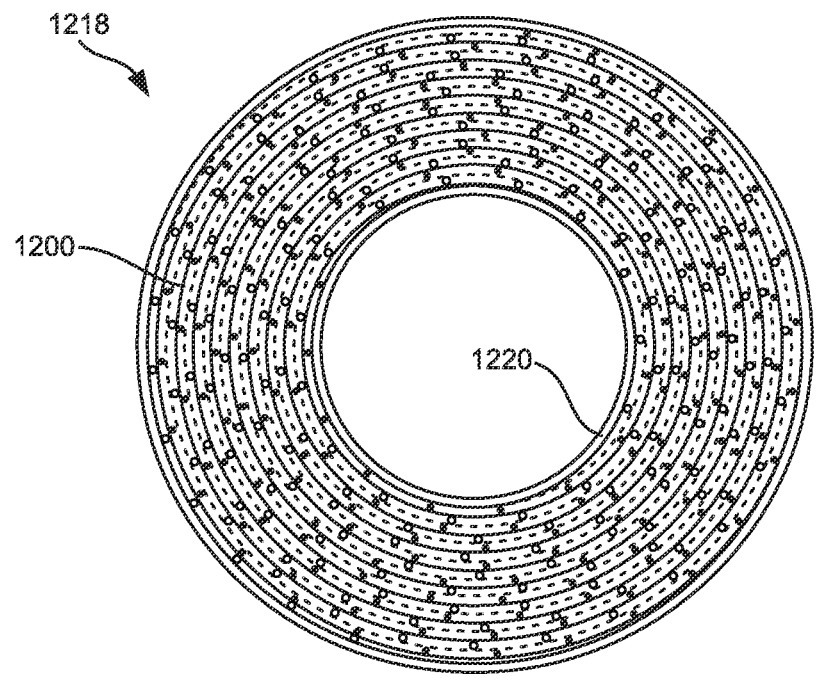
FIG. 12C shows an end view of a filter element made of the filter media of FIG. 12A.

Referring to FIGS. 12A through 12C, views of a wound filter media 1200 and a manufacturing system for making the wound filter media 1200 are shown. FIG. 12A shows an axial cross-sectional view of the filter media 1200. FIG. 12B shows a manufacturing arrangement for making the wound filter media 1200. FIG. 12C shows an end view of a filter element made of the filter media 1200. As shown best in FIG. 12A, the filter media 1200 includes a spacer filter media sheet 1202 and a flat filter media sheet 1204. The spacer filter media sheet 1202 and the flat filter media sheet 1204 are wound in a manner such that a flat filter media sheet 1204 is sandwiched between two adjacent layers of a spacer filter media sheet 1202. Both the flat filter media sheet 1204 and the spacer filter media sheet 1202 may be non-woven polymer fiber filter media. In some arrangements, the spacer filter media sheet 1202 is replaced with a solid thin film. The spacer filter media sheet 1202 includes spacers 1206, such as embossments or corrugations. The spacers 1206 form spacers that extend on both sides of the spacer filter media sheet 1202. In some arrangements, the spacers 1206 are molded bumps or glue spaces formed within the spacer filter media sheet 1202. In an alternative arrangement, the spacers 1206 are formed by a monofilament that is ultrasonically or heat bonded to the spacer filter media sheet 1202. The spacers 1206 maintain the spacing between adjacent sheets of filter media.

As shown in FIG. 12B, the filter media 1200 may be formed by passing the spacer filter media sheet 1204 (before having the spacers 1206 applied) through a coil 1208 of monofilament 1210. The monofilament 1210 can be, for example, constructed from various polymers such as polyamide (e.g., nylon, etc.), polyester (e.g., polyethylene terephthalate, polybutylene terephthalate, etc.), polyphenylene sulfide, and other similar polymers. The monofilament 1210 is wrapped around the spacer filter media sheet 1204 by a winding eye loop mechanism 1212. The winding eye loop mechanism 1212 winds the monofilament 1210 around the spacer filter media sheet 1204 at a pitch distance 1214. As the monofilament 1210 is wound around the spacer filter media sheet 1204, the monofilament 1210 is secured in place through ultrasonic or heat bonding points 1216. In some arrangements, the bonding points 1216 are raised to form the spacers 1206. In other arrangements, the monofilament 1210 forms the spacing element (e.g., as described above).

Referring to FIG. 12C, an axial view of a filter element 1218 is shown according to an example embodiment. The filter element 1218 uses the filter media 1200. The filter media 1200 is coiled around a central support tube 1220. As shown in FIG. 12C, the spacers 1206 (or the monofilament 1210) maintain the spacing between successive layers of the filter media 1200. The spacing between successive layers of the filter media 1200 can be altered by altering the height of the spacers 1206 or the size of the monofilament 1210. Increasing the spacing between successive layers of the filter media 1200 can reduce the flow restriction through the filter media 1200, and at the same time, reduce the efficiency of the filter element 1218.

According to other embodiments, the filter media may comprise a variety of types of pleated media, corrugated media, tetrahedral media, or variations thereof. U.S. Pat. No. 8,397,920, entitled "PLEATED FILTER ELEMENT WITH TAPERING BEND LINES," by Moy et al., filed on Oct. 14, 2011, and issued on Mar. 19, 2013, assigned to Cummins Filtration IP Inc., which is incorporated by reference in its entirety and for all purposes, describes a tetrahedral filter media. Some configurations of tetrahedral filter media include a plurality of inlet tetrahedron flow channels and a plurality of outlet tetrahedron flow channels. The inlet tetrahedron flow channels merge in a central portion of the filter material, thereby allowing axial cross-flow of air between the inlet tetrahedron flow channels prior to the air passing through the filter media. Such an arrangement provides for additional loading on the upstream side of the media, which increases filter capacity. Specific arrangements of such tetrahedral filter media are further described in U.S. Pat. No. 8,397,920.

Figure 13A:
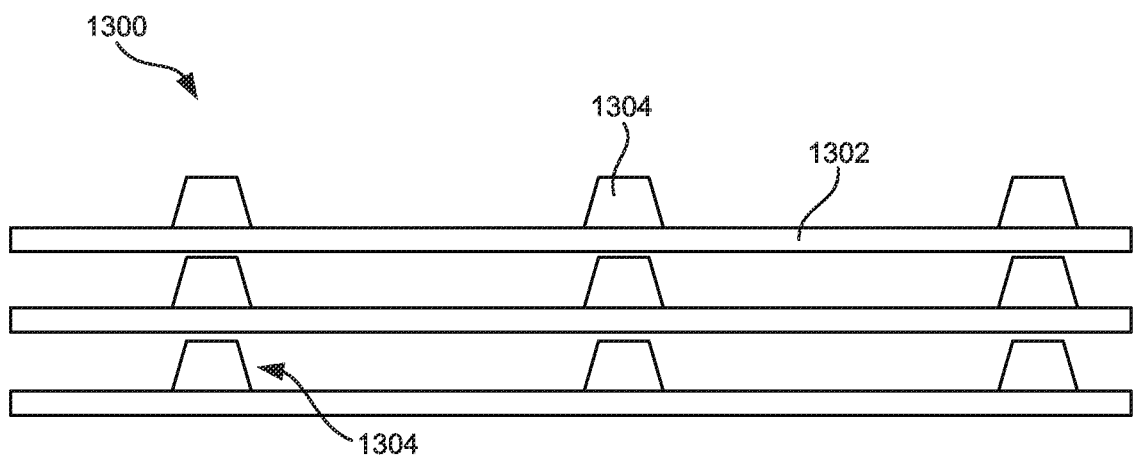
FIG. 13A shows an axial cross-sectional view of filter media according to another example embodiment.
Figure 13B:
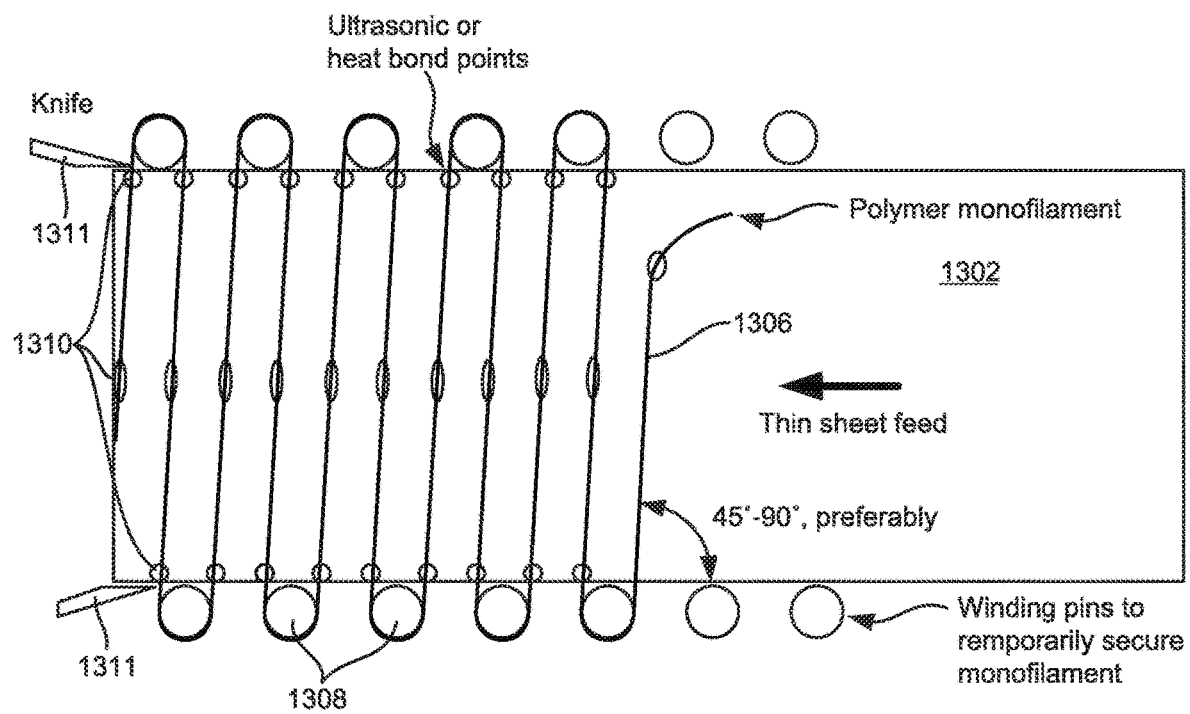
FIG. 13B shows a manufacturing arrangement for making the wound filter media of FIG. 13A.
Figure 13C:
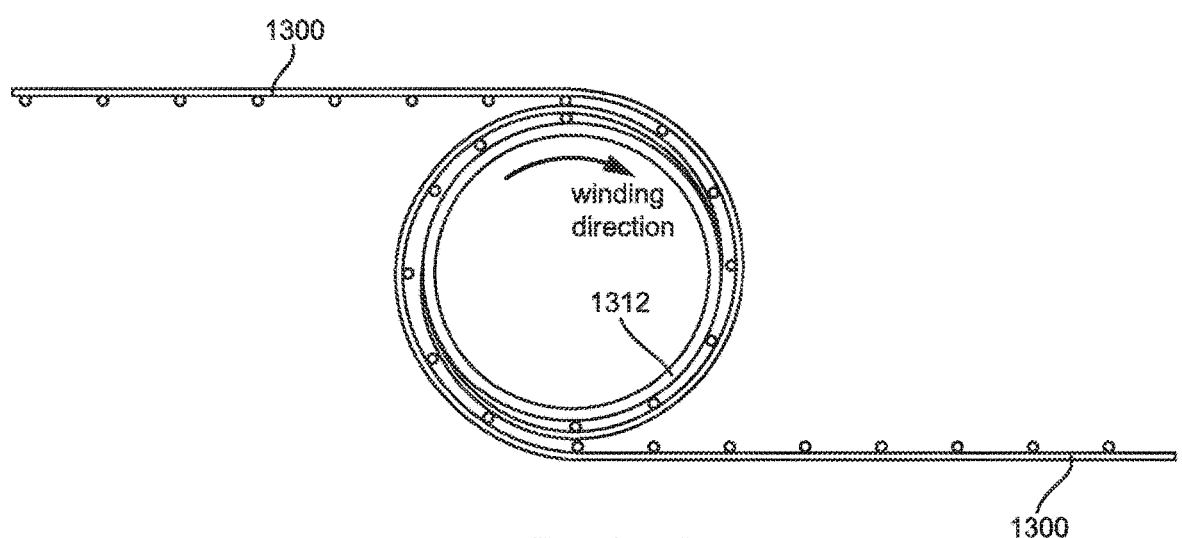
FIG. 13C shows the winding arrangement to form a filter element of the wound filter media of FIG. 13A.
Figure 13D:
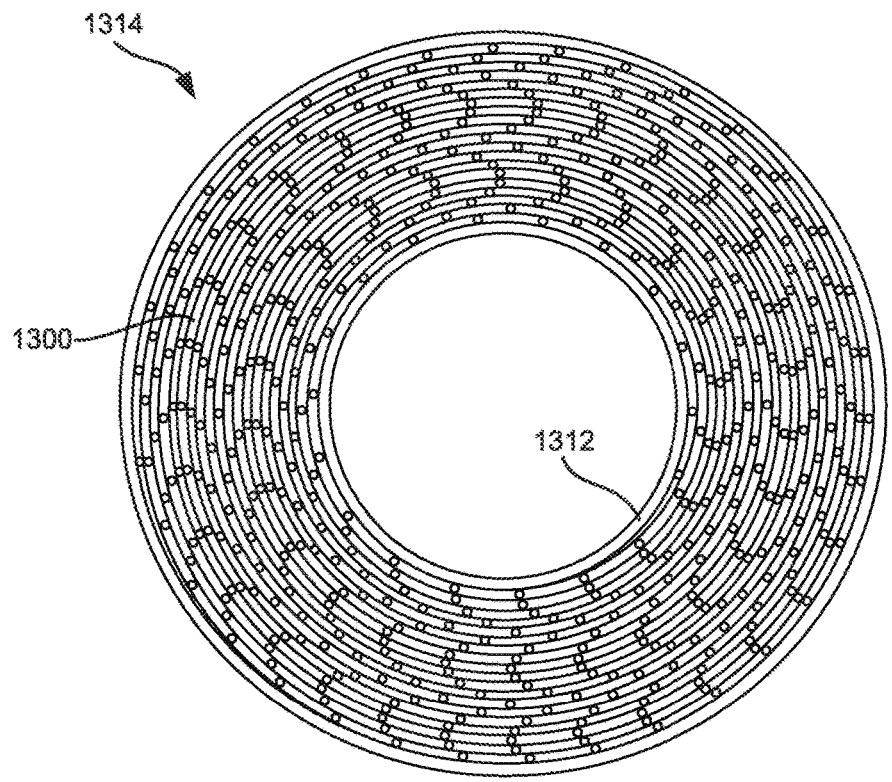
FIG. 13D shows an end view of a filter element made of the filter media of FIG. 13A.

Referring to FIGS. 13A through 13D, views of a wound filter media 1300 and a manufacturing system for making the wound filter media 1300 are shown. FIG. 13A shows an axial cross-sectional view of the filter media 1300. FIG. 13B shows a manufacturing arrangement for making the wound filter media 1300. FIG. 13C shows the winding arrangement to form a filter element of the wound filter media 1300. FIG. 13D shows an end view of a filter element made of the filter media 1300. As shown best in FIG. 13A, the filter media 1300 includes a spacer filter media sheet 1302. The spacer filter media sheet 1302 includes spacers 1304. The spacers 1304 maintain the spacing between adjacent sheets of the wound spacer filter media sheet 1302. The spacers 1304 are positioned on a single side of the spacer filter media sheet 1302. In some arrangements, the spacers 1304 are molded bumps or glue spaces formed within the spacer filter media sheet 1302. In an alternative arrangement, the spacers 1304 are formed by a monofilament that is ultrasonically or heat bonded to the spacer filter media sheet 1302.

As shown in FIG. 13B, the filter media 1300 may be formed by winding a monofilament 1306 in a serpentine pattern of parallel and partially angled (with respect to perpendicular to the edge of the filter media sheet 1302) manner over the filter media sheet 1302. The serpentine pattern may be angled between forty-five and ninety degrees with respect to the edge of the filter media sheet 1302. The monofilament 1306 may be wound around winding pins 1308 to temporarily secure the monofilament 1306 in place. After the monofilament 1306 is in place, the monofilament 1306 is secured in place through ultrasonic or heat bonding points 1310. In some arrangements, the bonding points 1316 are raised to form the spacers 1304. In other arrangements, the monofilament 1306 forms the spacers 1304 (e.g., as described above). After the monofilament 1306 is secured to the filter media sheet 1302, a pair of knives 1311 trims the excess monofilament 1306 from the filter media 1300.

FIG. 13D shows a view of two sheets of the filter media 1300 being wound around a central support tube 1312 to form a filter element 1314. An axial view of the filter element 1314 is shown in FIG. 13D. The filter element 1314 uses the filter media 1300. The filter media 1300 is coiled around a central support tube 1312 as described above with respect to FIG. 13D. The spacers 1304 (or the monofilament 1306) maintain the spacing between successive layers of the filter media 1300. The spacing between successive layers of the filter media 1300 can be altered by altering the height of the spacers 1304 or the size of the monofilament 1306. Increasing the spacing between successive layers of the filter media 1300 can reduce the flow restriction through the filter media 1300, and at the same time, reduce the efficiency of the filter element 1314.

Each of the above-described filter elements and filter media utilize structure(s) that create generally helical or axial flow channels (i.e. average gas flow direction within the rotating media structure is less than 20% radial vector component). The flow channel surfaces created by such a structure have a substantially non-zero angle with an axis-perpendicular radial vector, such angle being relatively close to $\frac{1}{2}\pi$. Each are capable of providing increased effective separation area (ESA) packing density (effective area per unit volume) due to reduced end-loss (wasted space above/below/inside the separator elements). The arrangement can be constructed from significantly thinner conventional materials than are typically used for conventional forty-five degree injection molded cone surfaces or stamped steel cone separators (i.e., separators that use a separator disc-stack instead of filter media).

As used herein, ESA is defined by us as the "radial-normal" projected total surface area of the separation surface, towards which particles or droplets migrate and deposit upon. Axial-perpendicular ("flat") surfaces contribute nothing to effective area—only angled surfaces are beneficial, as is known in the art for disc-stack separators. In addition, axial parallel surfaces are beneficial, as disclosed in this invention. For example, a simple cylindrical surface would have an area of $\pi \cdot D \cdot H$, whereas a straight radial vane would have an area of zero (since it is a purely radial surface). Mathematically, this effective area can be described as the projected area that is perpendicular to the local centrifugal force (radial) vector direction, and can be calculated using the following surface integral. ESA is defined below in Equation (1).

$$\int \int_s \vec{f} \cdot \vec{n} dA \qquad (1)$$

Where $\vec{f}$ is the unit centrifugal force vector and $\vec{n} dA$ is the differential area element normal vector on the surface of the vanes. The relative separation performance of a separator is strongly dependent upon this ESA, along with flowrate, rotational speed, outer diameter (OD) and inner diameter (ID) of plates, fluid viscosity, particle density, fluid density, as known in the art.

Figure 14:
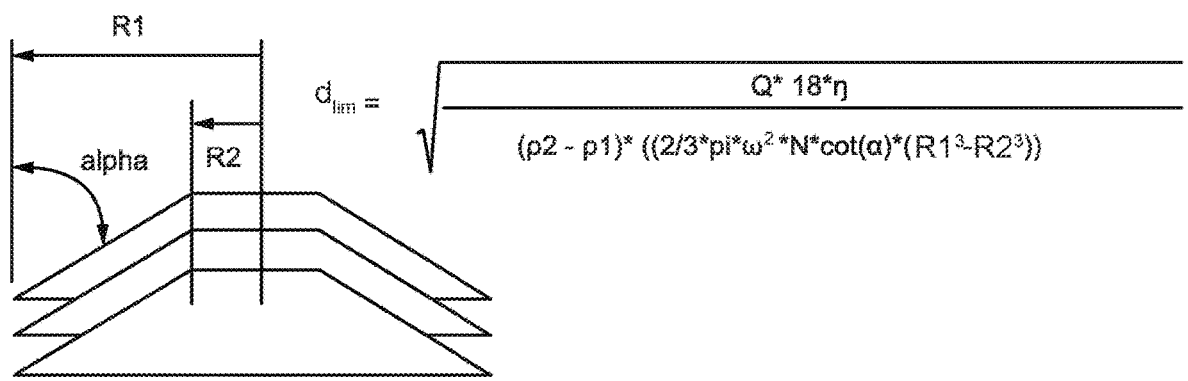
FIG. 14 details the mathematics for calculating effective surface area.
Figure 15A:
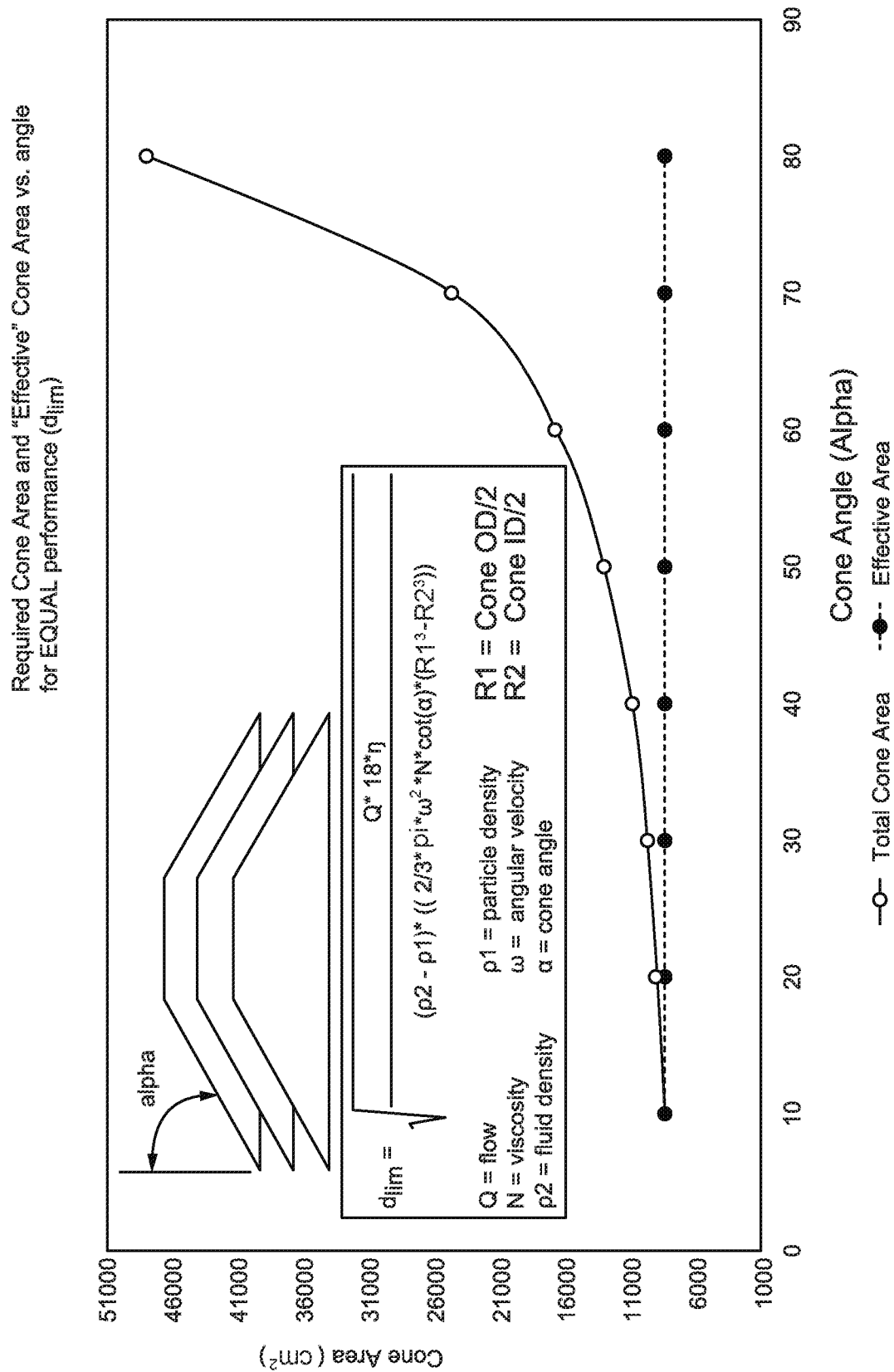

For example, conventional disc-stack separators have a "limiting" particle size (above which, efficiency is 100%) ($d_{lim}$) that has been derived theoretically based upon particle migration trajectory towards cone surface in a uniform flow field assumption as shown in FIG. 14. FIG. 14 shows a derivation for $d_{lim}$ separated by a cone disc-stack separator. This derivation is $$d_{lim} = \sqrt{\frac{Q \cdot 18 \cdot \eta}{(\rho 2 - \rho 1) \cdot \left(\frac{2}{3} pi \cdot \omega^2 \cdot N \cdot \cot(\alpha) \cdot (R1^3 - R2^3)\right)}} \qquad (2)$$

where Q is flow (e.g., a flow rate, etc.), N is viscosity, $\rho 2$ is the density of the fluid, $\rho 1$ is the density of the particle, $\omega$ is angular velocity, a is cone angle, R1 is the outer radius of the cone (e.g., the outer diameter of the cone divided by two, etc.), and R2 is the inner radius of the cone (e.g., the inner diameter of the cone divided by two, etc.). The relationship shown in FIG. 14 supports the hypothesis that for a given ESA (per the above-noted surface integral definition of equation (1)), and at similar product physical diameter and speed, the separation performance ($d_{lim}$) should be equal, even if structure surfaces are non-conical geometries. As an example, using the cone stack $d_{lim}$ equation, the ESA required for a given $d_{lim}$ remains constant across wide range of cone angles (despite very large change in actual cone area) with all other parameters remaining fixed. This relationship is shown in the graph of FIGS. 15A and 15B. FIG. 15A and FIG. 15B show a graph of required cone area and effective cone area vs. angle for equal performance ($d_{lim}$). FIG. 15A and FIG. 15B demonstrate the above-discussed ESA hypothesis, from the cone-stack $d_{lim}$ equation (showing "flat line" for ESA with cone angle, despite greatly increasing total cone area required as cone angle and resulting surfaces become more "radial" (i.e. alpha approaches ninety degrees).

Another useful metric for demonstrating the usefulness of the described separators and filter media is ESA volumetric packing density (ESAVPD), defined as ESA/occupied package volume, with units 1/length. Designs with higher ESAVPD are preferred, since a required degree of performance (e.g., aerosol removal efficiency from the blowby gases) can be delivered in the minimum possible package space and/or at the lowest possible rotational speed (lower power consumption). The surface area "packing density" is a function of package volume and plate thickness, and for a given packaging solidity (volume of plates/total volume), the surface area—not ESA—approaches the relationship of Area=2·Volume/stacking pitch. For example, for a simple cube with 1 m dimension having 1 mm thick plates with 1 mm spacers (plates having an area of 2 m², for a plate with two sides) were stacked up in the cube, 500 plates (at 2 mm pitch) would fit in the cube, providing a total area of 1000 m² (i.e., A=2·1/0.002=1000). This ESA and ESAVPD concept is used below to compare and evaluate various geometry configurations of separators with the filter media (as described-above with respect to FIGS. 1-13D) to conventional cone disc-stack centrifuge separator elements.

Figure 16B:
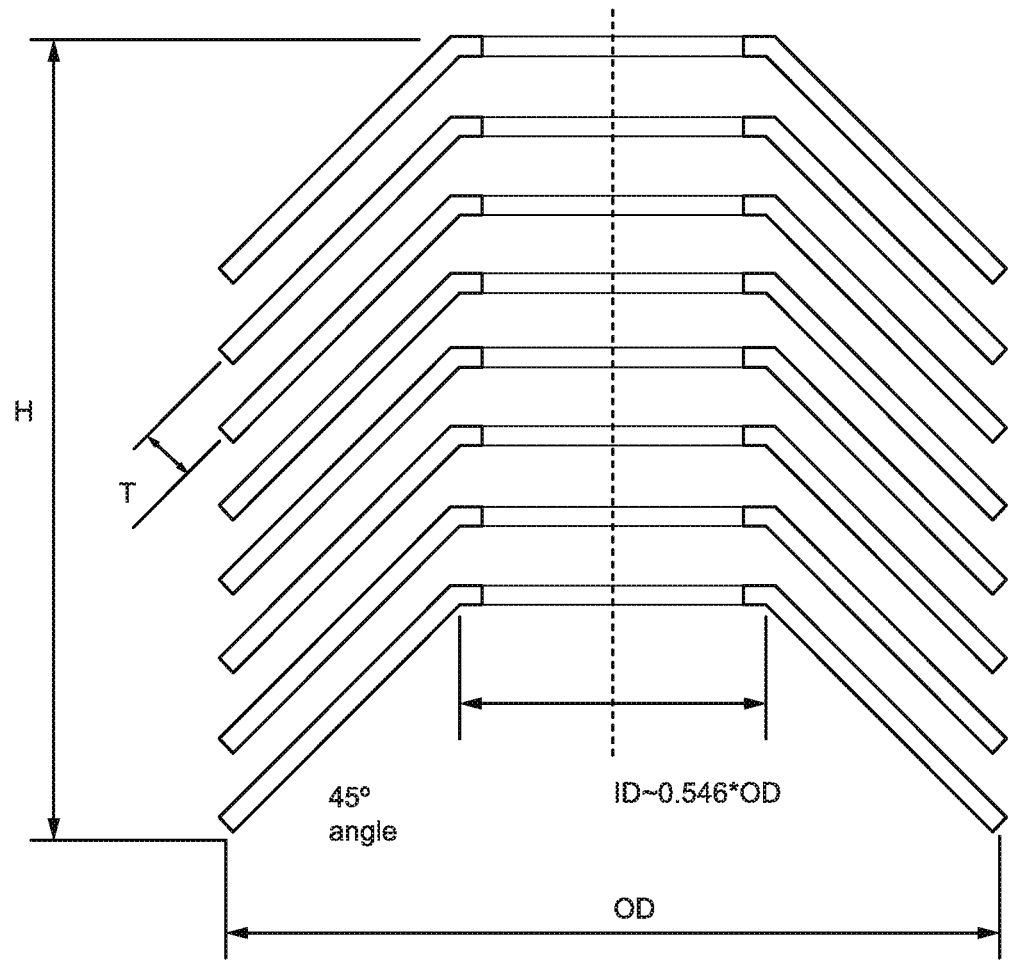

The ratio of this ESAVPD metric can be calculated to compare the "relative advantage" of coiled axial flow separators. The ESA of axial flow separators is shown in FIG. 16A and FIG. 16B. As shown in the calculations of 16A and FIG. 16B, the "axis facing" surface area of an axial flow separator made from coiling a long sheet of material at a prescribed spacing per coil is simply the height of the coil times the length of the length of the arithmetic or involute spiral. This concept is set forth below in Equation (3)

$$SA = H \frac{1}{2} T \left[ \theta \sqrt{1+\theta^2} + \left( \theta + \sqrt{1+\theta^2} \right) \right] \qquad (3)$$

In Equation (3), SA is the surface area, H is the height, T is the radial pitch spacing of successive turns of the coil and $\theta$ is the number of coil turns, in radians. For coiled forms with ID>0, the surface area can be calculated by taking the difference in area with respect to the OD and ID. Or, $SA=SA(\theta_{OD})-SA(\theta_{ID})$.

For small coil spacing of the coiled filter media (for the above-described separators utilizing the coiled filter medias described herein), relative to the OD of the coil pack, this value is very close to that of concentric cylinders with the same pitch spacing. For concentric cylinders, the SA is described by Equation (4).

$$SA = ESA = \pi \cdot H \cdot N(OD + T(N-1)) \qquad (4)$$

In Equation (4), N is the number of concentric cylinders. For simplicity, N may be approximated by (OD-ID)/(2 T).

For a typical space configurations of a coiled filter media separator, the ESA of axial flow separators approaches 1.45 times that of a cone stack separator, for the same material pitch spacing, T, OD, ID, and H of the rotating element. Coiled or wound filter media separators offer economic benefits compared to cone stack separators. For example, cone stack separators are often constructed from numerous discs that each need to be produced via a high pressure injection molding process or via a stamping process, thereby resulting in a relatively expensive manufacturing process compared to coiled or wound filter media separators that are constructed from readily available, lower cost materials (e.g., nonwoven calendared spunbond webs, metal foils, aluminum foil, etc.). Additionally, coiled or wound filter media separators are capable of offering greater performance and of being smaller in size when compared to cone stack separators. For example, typical cone stack separators include between forty and ninety disks, each being around 0.30 mm thick and separated by gaps of around 0.30 mm. In contrast, coiled or would filter media separators may utilize nonwoven calendared spunbond webs with a thickness of 0.12 mm or less, flat or corrugated metal foil, such as aluminum foil, with a thickness of between 0.016 mm and 0.024 mm, and various combinations thereof (e.g., a corrugated metal foil and a flat metal foil wrapped about a hub, etc.). Pitch spacing of 0.45 mm (vs. 0.6 mm) is readily feasible using calendared nonwoven material coiled around a hub, in which case the typical ESA of axial flow separators can be considered as 1.45*0.6/0.45=1.93 times cone stack separators having injection molded cones.

In addition to better ESA within rotating elements of equivalent convex hull volume, axial flow separator media packs can be made to have larger OD than a cone stack element when enclosed in the same sized generally cylindrical housing. This is due to the axial flow separator avoiding simultaneous liquid and gas discharge radially, along the entire height of the cone stack or spiral separator OD. In cone stack separators, a certain minimum annular space between the rotor and the housing walls must be provided, so that aerodynamic flow drag forces do not carry liquid film on the housing's ID wall to it flow outlet port. In the axial flow separator, the gas flow is generally directed toward one end of the rotating element, and discharged away from the deposited liquid on the walls of the separator housing. Furthermore, the net direction of gas flow in the vicinity of the housing oil film can easily be made to be downward with dynamic seal recirculation flow, thereby assisting gravity forces in the drainage of oil out of the separator housing.

An example of the ESA benefit due to a larger rotating element OD can be found in engine crankcase ventilation applications, in which maximum flow rates are often about 450 liters/min, housing diameters are about 120 mm diameter, and cone stack rotor OD is about $\frac{2}{3}^{rd}$ of housing ID. Typical cone stack element-to-housing gaps are about 15-20 mm for applications in engines of 12-16 liters of displacement. In contrast, axial flow rotating elements have a very small practical limit for gap between element OD and housing ID. Less than 5 mm is feasible. This enables separator designs with significantly more compact packaging for a given application, or significantly higher submicron aerosol separation efficiency, or both. Consider a housing of 120 mm ID, and cone stack of 80 mm OD. Instead, an axial flow separator of 100 mm OD with a lower dynamic clearance seal and gas inlet and upper gas outlet could be contained in a 110 mm ID housing, with minimal risk of liquid oil carryover from housing wall film, compared to the example cone stack separator.

For example, consider the ESA of the same 100 mm OD axial flow separator, with 0.30 mm flow gap, 0.45 mm coil pitch, 58 mm ID and the same 100 mm overall height as a corresponding 80 mm OD cone stack with the same 0.30 mm flow gap, but with 0.60 mm "flow normal" cone surface spacing, and 44 mm ID. The ESA of the axial flow separator is approximately four times that of the similarly sized cone stack separator. Moreover, a number of factors which contribute to high aerosol separation efficiency, some of which are independent of ESA, are also improved in the axial flow separator. For example, the residence time of gas within the geometry of the separating medium is significantly greater for axial flow coiled media separators than in cone stack separators. Additionally, the average centripetal acceleration of an aerosol particle within the axial flow separator medium is greater by 27%, for the same rotating speed, than in cone stack separators due to larger OD. Further, average distance an aerosol particle must settle before reaching a surface onto which it could become captured is about 30% less for axial flow coiled media separators than in cone stack separators. Still further, by using a fibrous non-woven material for separating surface area, instead of smooth injection molded cones, the total surface area exposed for capturing high mobility aerosol particles (i.e., particles under 400 nanometers in diameter) is potentially many times higher in the described axial flow coiled media separators than in cone stack, leading to higher capture and separation efficiency.

In various embodiments, the volume only in the "cone" region, excluding central area and wasted end triangle sections, Vc is determined by $$Vc = \frac{\pi}{4} \cdot (OD^2 - ID^2) \cdot (H - h) \quad (5)$$

For typical (45 degree) style cones, the ratios used are typically:

$$ID = 0.546 OD \quad (6)$$

$$h = 0.227 OD \quad (7)$$

such that h must be 0.227OD for ID of 0.546OD for a relationship with 45 degree angle. Using these ratios, the volume only in the cone region is $$Vc = \quad (8)$$
$$-0.12513565782559839632 \cdot OD^3 + 0.55125840451805460935 \cdot H \cdot OD^2$$

since $$Area = \frac{2}{T} \cdot Vc = \frac{1.1025 \cdot H \cdot OD^2 - 0.2503 \cdot OD^3}{T} \quad (9)$$

where T is equal to the sum of the normal direction gap and the wall thickness and where area is the "volume packing area." The volume packing area may be envisioned as stacked plates filling a rectangular volume to homogenous uniform solidity, where number of plates is equal to the height divided by T and the area of each plate is twice the product of the length and width of each plate. When at a 45 degree angle, an effective area is utilized in place of the area where $$Area\_effective = 0.707 \cdot \frac{1.1025 \cdot H \cdot OD^2 - 0.2503 \cdot OD^3}{T} = \quad (10)$$
$$\frac{0.7794675 \cdot H \cdot OD^2}{T} - \frac{0.1769621 \cdot OD^3}{T}$$

Furthermore, a packing metric can be determined by $$\text{Packing\_Metric} = \frac{\text{Area\_effective}}{V\text{total}} = \frac{\left(\frac{07794675 \cdot H \cdot OD^2}{T} - \frac{0.1769621 \cdot OD^3}{T}\right)}{\frac{\pi \cdot OD^2 \cdot H}{4}} = \frac{0992 \cdot H - 0.225 \cdot OD}{H \cdot T} \quad (11)$$

where OD, H, and T are fixed. The packing metric is equal to zero when $$H = 0.2277 OD \quad (12)$$

Figure 17:
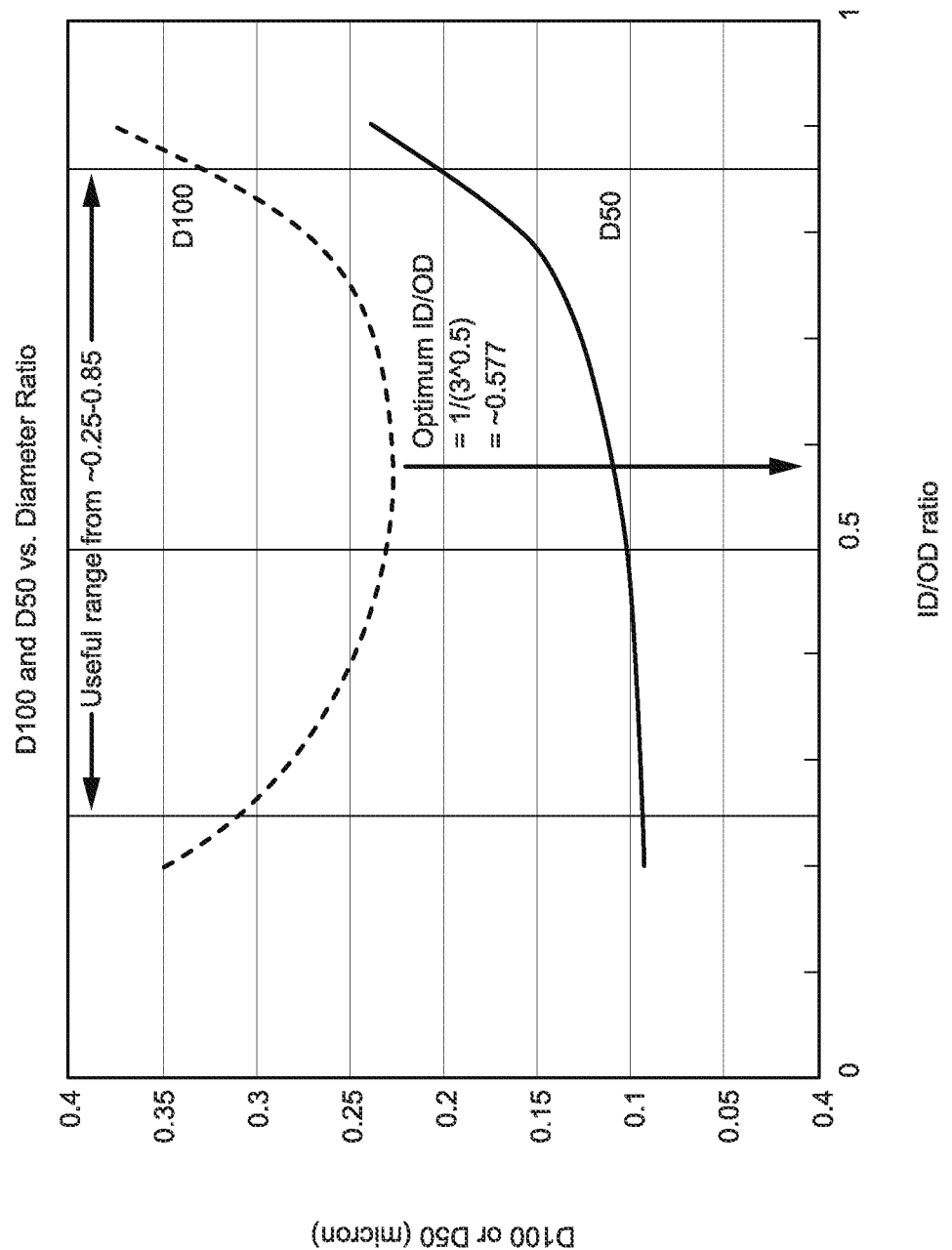
FIG. 17 shows a graph of particle size separation efficiency vs. ID/OD ratio for separators.
Figure 18A:
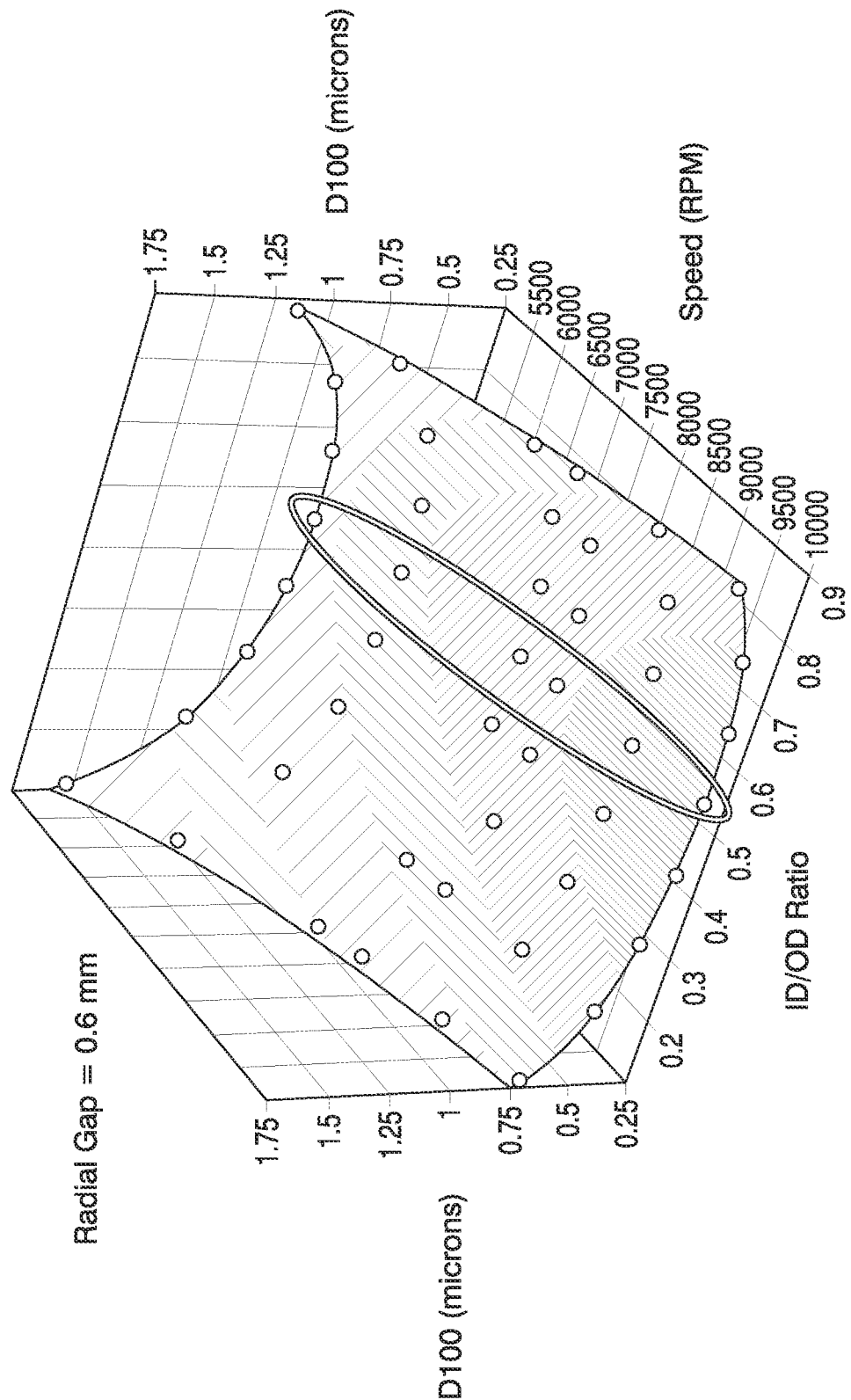
FIG. 18A-FIG. 18D show four different plots are shown that demonstrate the optimal ratio for OD/ID.
Figure 18B:
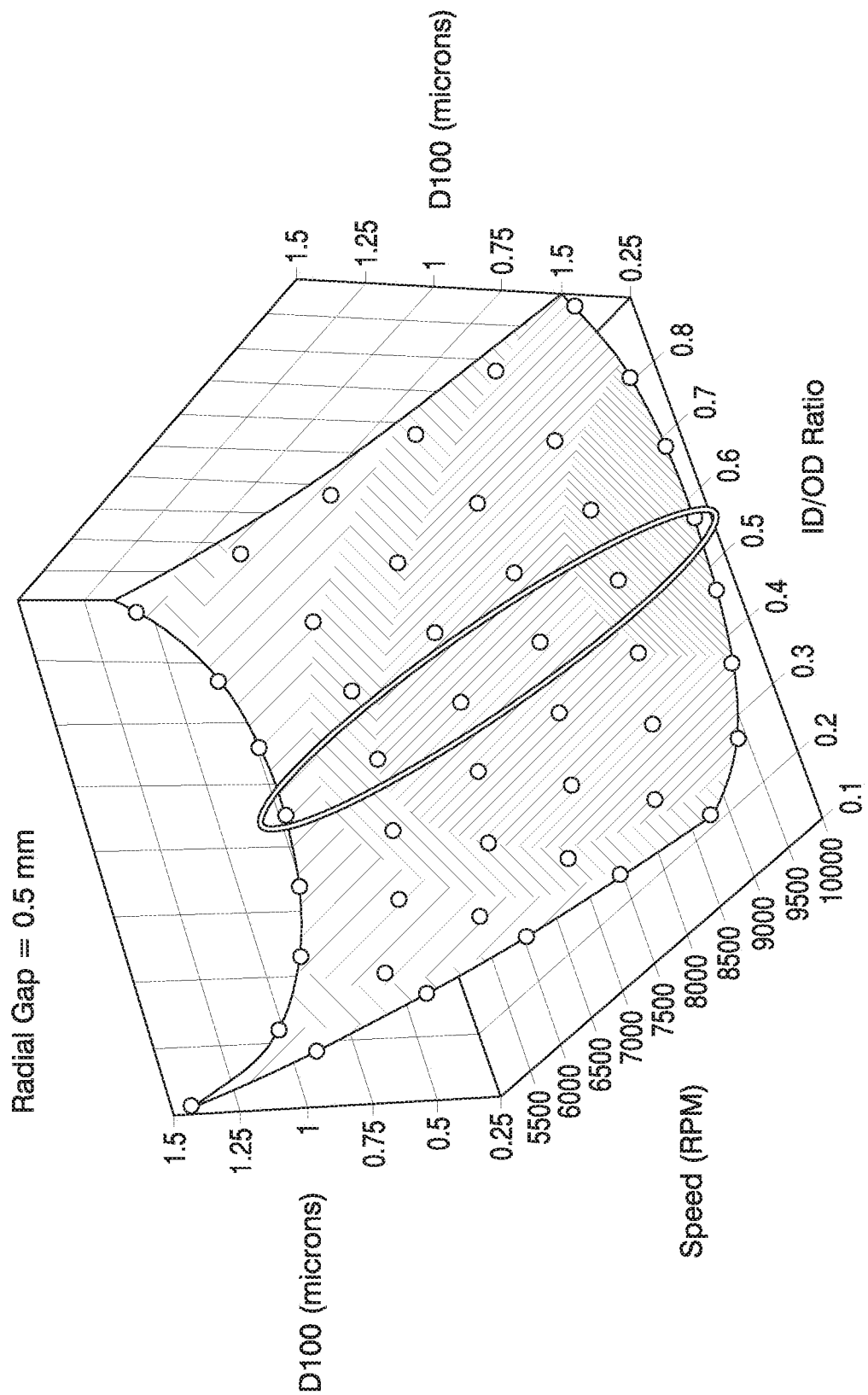
Figure 18C:
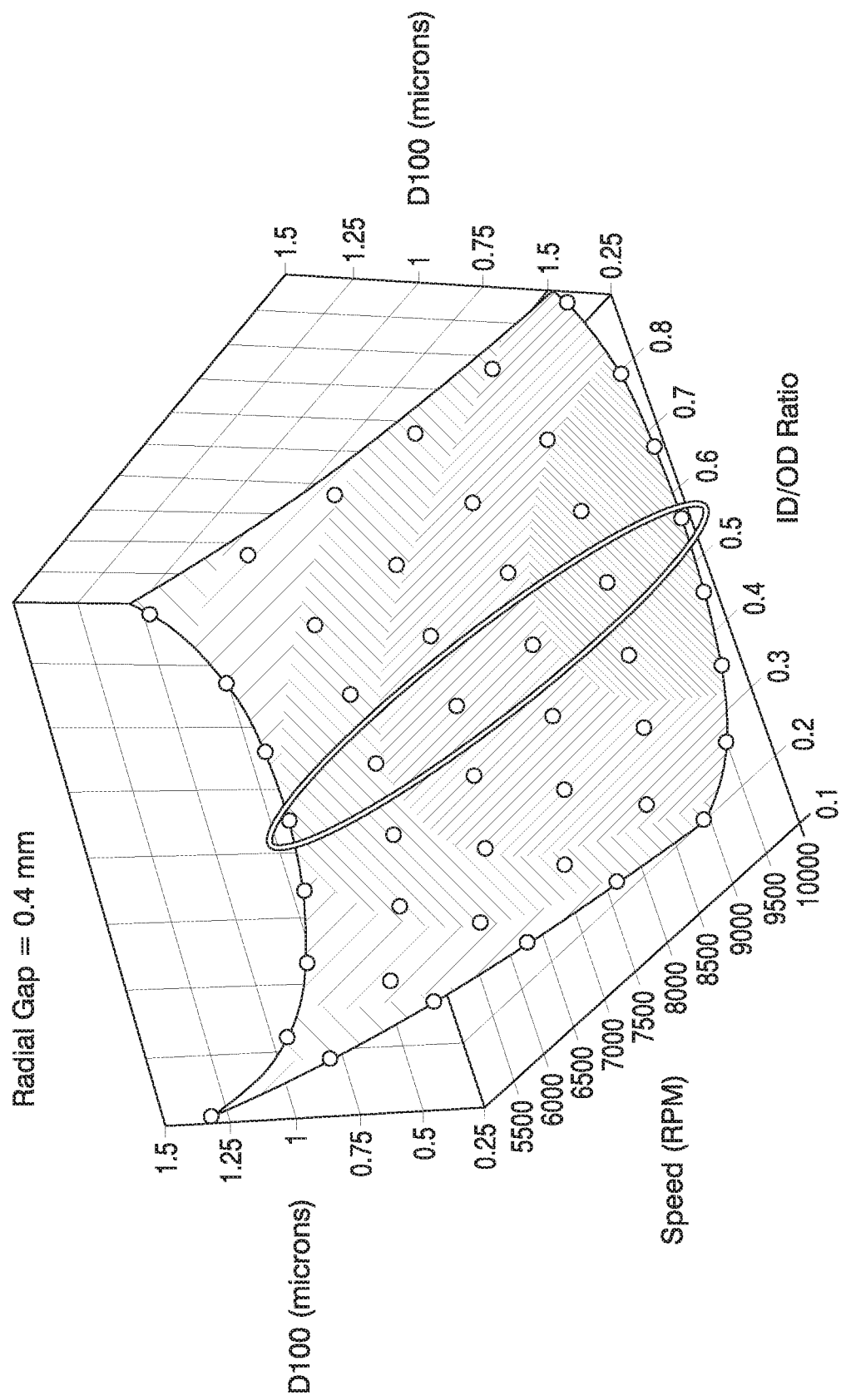
Figure 18D:
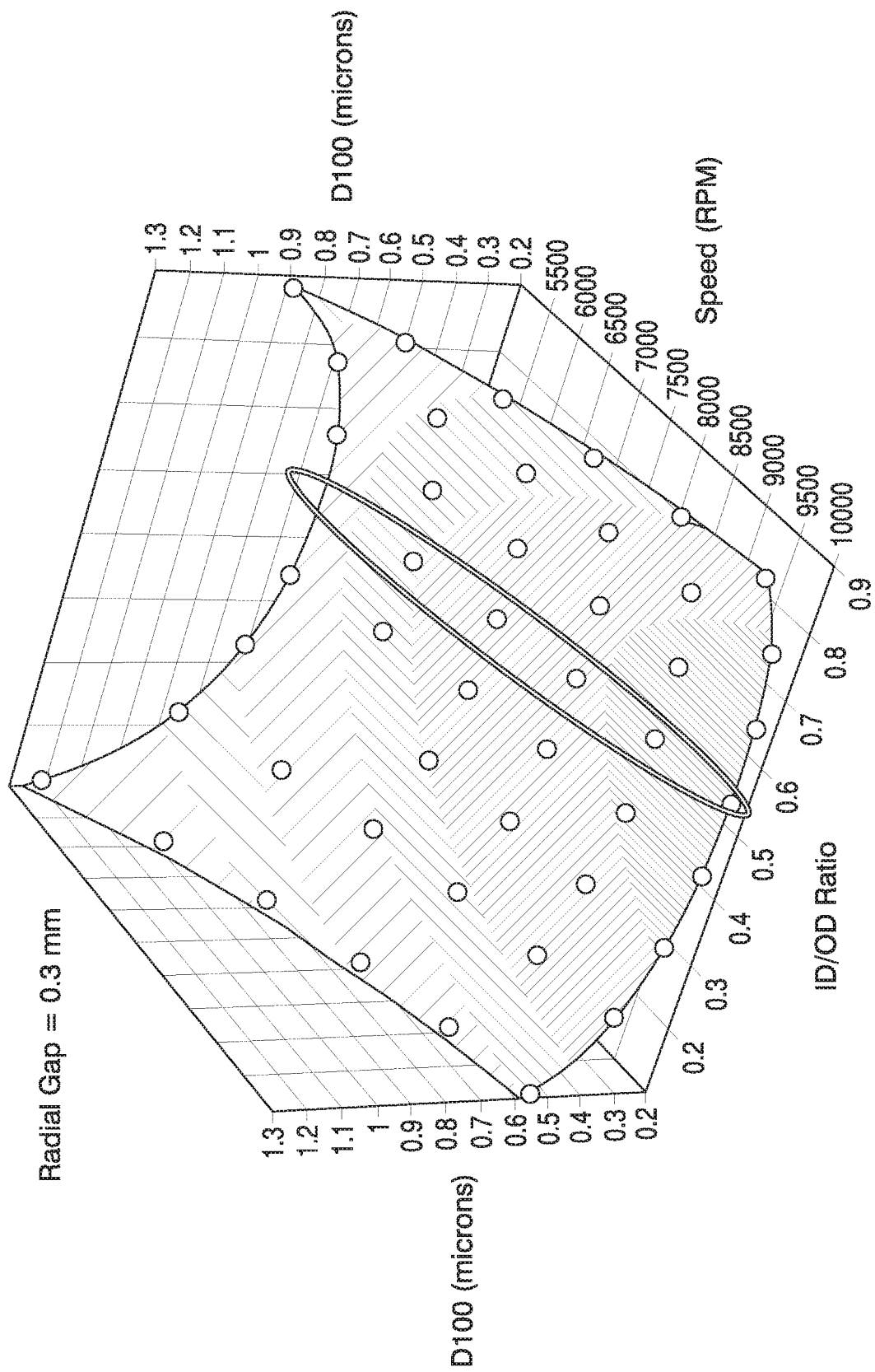

Referring to FIG. 17, a graph of particle size separation efficiency vs. ID/OD ratio for separators is shown. The graph is made through various computational fluid dynamics (CFD) and other particle trajectory modeling simulations. According to the graph of FIG. 17, there is a, optimum inner/outer diameter ratio giving maximum efficiency or minimum particle size separated at 100% efficiency (D100). This is due at least in part to the competing effects of decreasing centrifugal force with the channels at smaller rotation radius (i.e., negatively impacts), but increased dwell time (i.e., positively impacts efficiency) as inner radius is decreased. The optimal ID/OD ratio for maximum performance is ID/OD=1/(3^0.5)=0.577. However, useful range for ID/OD ratio extends between 0.25 and 0.85. The D50 (particle size at 50% efficiency) continues to asymptotically improve ID/OD ratio decreases towards 0 (a separator with no central hub or opening), but at the expense of D100, and D100 is generally more important consideration for CV aerosol and other critical filtration applications.

Referring to FIG. 18A-FIG. 18D, four different plots are shown that demonstrate the optimal ratio for OD/ID=(3)^0.5=1.732 (or ID/OD~0.577 in circled valley area) is universal, holding true across wide range of speed conditions as well as radial gap (wrap) spacings (at an arbitrary air flowrate and rotor size+length).

Each of the above-described rotating separator elements utilizes a coiled filter media pack made of porous or thin impervious material having spacing features which create defined gap for gas flow between radial plies of material, with gas and particles entering one end of the media and substantially particle free gas flow exiting the other end of a media pack, facilitating separation of coalesced liquid from the cleaned gas. In some arrangements, permeable material is used for construction of spiral or concentric surfaces such that under high g-forces during rotation, liquid drains radially through successive layers of material until the liquid reaches the rotating OD wall where it drains out of the rotating element at openings near the greatedst OD of the liquid containing space. The rotating separator element may include, a filtering element comprised of a coiled media pack around a central support tube with holes distributed over a portion of its length and circumference, with coiled permeable layers of thin material and defined space between layers for conducting gas flow. In such arrangements, liquid entering a rotating element is conducted to the inside of the tube allowing a significant proportion of the liquid entering the element to pass radially through the permeable layers, helping to wash collected solid or semi-solid contaminants through the pack and out. The coiled filter media pack may be in the form of a right cylinder or annulus or in the form of a "telescoping" right cylinder or annulus.

Figure 19:
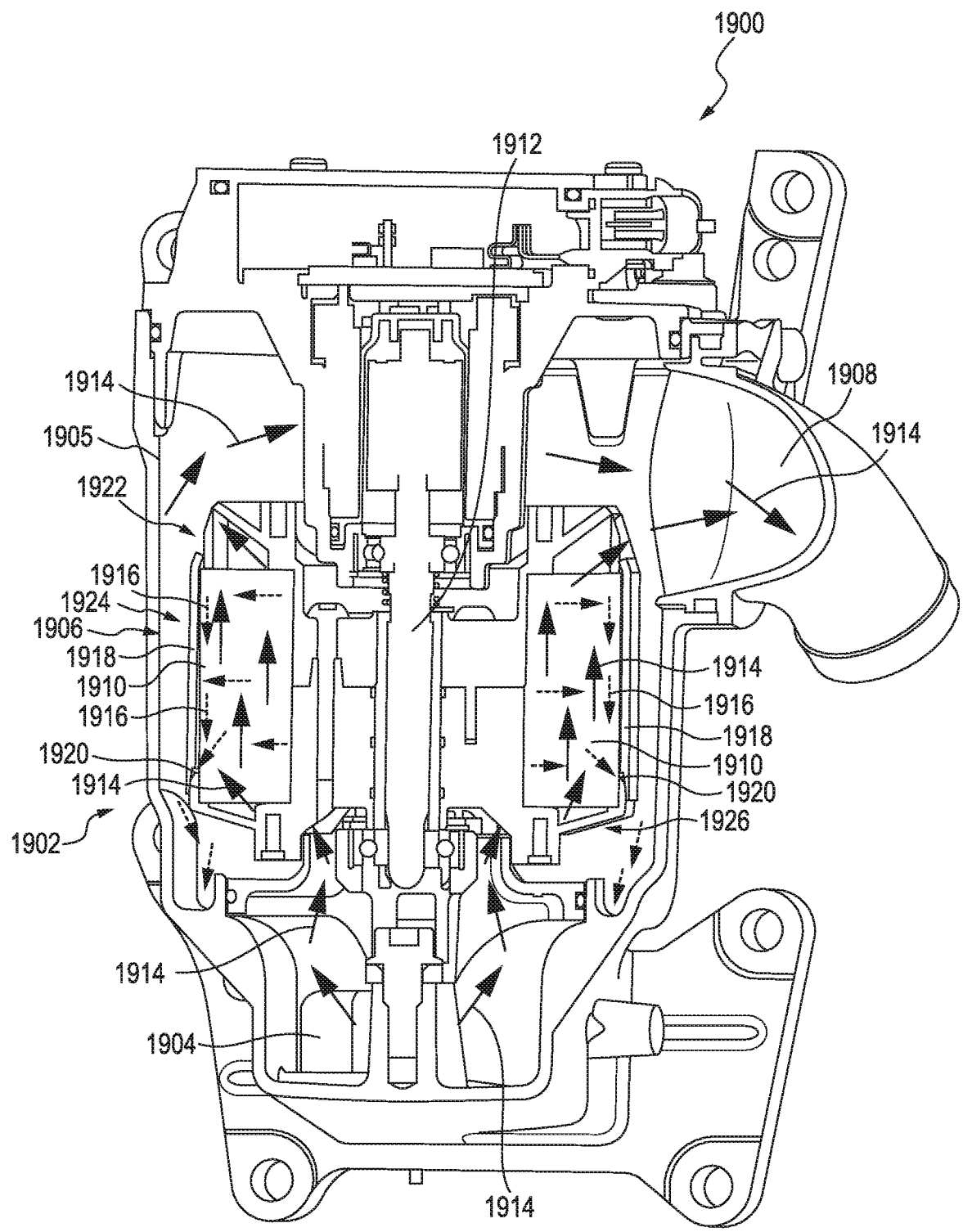
FIG. 19 shows a cross-sectional view of a crankcase coalescer system according to another example embodiment.

Referring to FIG. 19, a cross-sectional view of a crankcase coalescer system 1900 is shown according to another example embodiment. The crankcase coalescer system 1900 is similar to the crankcase coalescer system 200. The crankcase coalescer system 1900 generally processes blowby gases received from an internal combustion engine crankcase to remove aerosols, oils, and other particulate contained in the crankcase blowby gases. The crankcase coalescer system 1900 generally includes a housing 1902 having an inlet 1904 that receives crankcase blowby gases to be filtered, a central compartment 1905 having a rotating coalescer element 1906 installed therein, and an outlet 1908 that provides filtered blowby gases to the internal combustion engine (in a closed crankcase ventilation system) or to the ambient (in an open crankcase ventilation system).

The rotating coalescer element 1906 includes filter media 1910 having axial flow channels arranged in a direction generally parallel to an axis defined by a drive shaft 1912 of the crankcase coalescer system 1900. Accordingly, the rotating coalescer element 1906 is an axial flow coalescing element. The filter media 1910 may be frustoconical in overall shape such that the axial flow channels are not arranged in a direction that is generally parallel to an axis defined by the drive shaft 1912 of the crankcase coalescer system 1900. In some arrangements, the filter media 1910 is a wound filter media. Movement of example blowby gases through the crankcase coalescer system 1900 is shown in solid flow arrows 1914. Crankcase gas flows from the inlet 1904, through a bottom part of the rotating coalescer element 1906, entering the filter media 1910 from a first, bottom end of the filter media 1910, through the filter media 1910 in an axial direction, out a second, top end of the filter media 1910, through a top part of the rotating coalescer element 1906, and out the outlet 1908. Flow through the filter media 1910 is uniformly distributed on an axial plane adjacent to the inlet side of the filter media 1910.

Coalesced liquid (e.g., oil and aerosols separated from the crankcase blowby gas)—designated by the small dashed flow arrows 1916—passes through the layers of filter media 1910 in a radially outward direction (e.g., due to the centrifugal force impacted on the coalesced liquid by rotation of the rotating coalescer element 1906, etc.) and drains to a bottom region of the rotating coalescer element 1906 along an outer circumferential wall 1918 of the rotating coalescer element 1906, exiting through openings 1920 at the largest local radius from a center axis of the rotating coalescer element 1906 (e.g., the axis defined by the drive shaft 1912). The outer circumferential wall 1918 is impermeable such that the coalesced liquid may only exit the rotating coalescer element 1906 via the openings 1920. The openings 1920 may be crescent-shaped openings in cross-section. In some arrangements, the rotating coalescer element 1906 is positioned in a manner such that gravity assists the draining of the separated liquid from the housing 1902.

The top side of the rotating coalescer element 1906, opposite the bottom side of the rotating coalescer element 1906 where the openings 1920 are positioned, may be referred to as a 'clean side.' After the coalesced liquid has drained from the rotating coalescer element 1906 (e.g., via the openings 1920, etc.), the coalesced liquid may be recirculated to a fluid system. For example, if the coalesced liquid is oil, the oil may be drained from the rotating coalescer element 1906 and recirculated to an oil system of an internal combustion engine system producing the blowby gas which is processed by the crankcase coalescer system 1900.

The rotating coalescer element 1906 is of a three-piece construction and includes a top endcap 1922, a core 1924, and a bottom endcap 1926. The core 1924 is coupled to each of the top endcap 1922 and the bottom endcap 1926 to form the rotating coalescer element 1906. The core 1924 includes the filter media 1910 and is configured to receive and be coupled to the drive shaft 1912. The top endcap 1922 and the bottom endcap 1926 cooperate with the core 1924 to retain the filter media 1910 relative to the drive shaft 1912. In this way, the top endcap 1922, the core 1924, and the bottom endcap 1926 are configured to facilitate rotation of the filter media 1910 by the drive shaft 1912 and drainage of coalesced liquid from the rotating coalescer element 1906.

Figure 20:
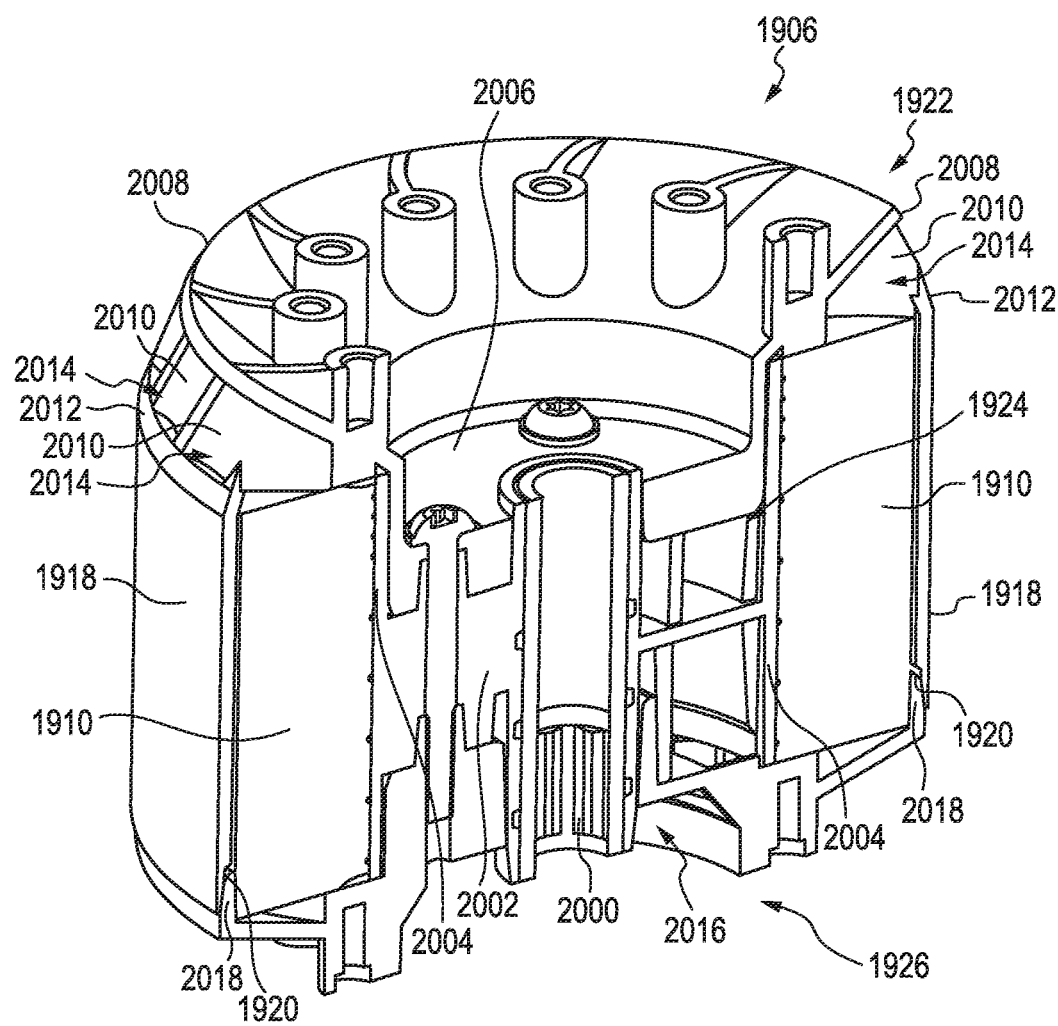
FIG. 20 shows a cross-sectional view of a coalescer element for the crankcase coalescer system of FIG. 19.
Figure 21:
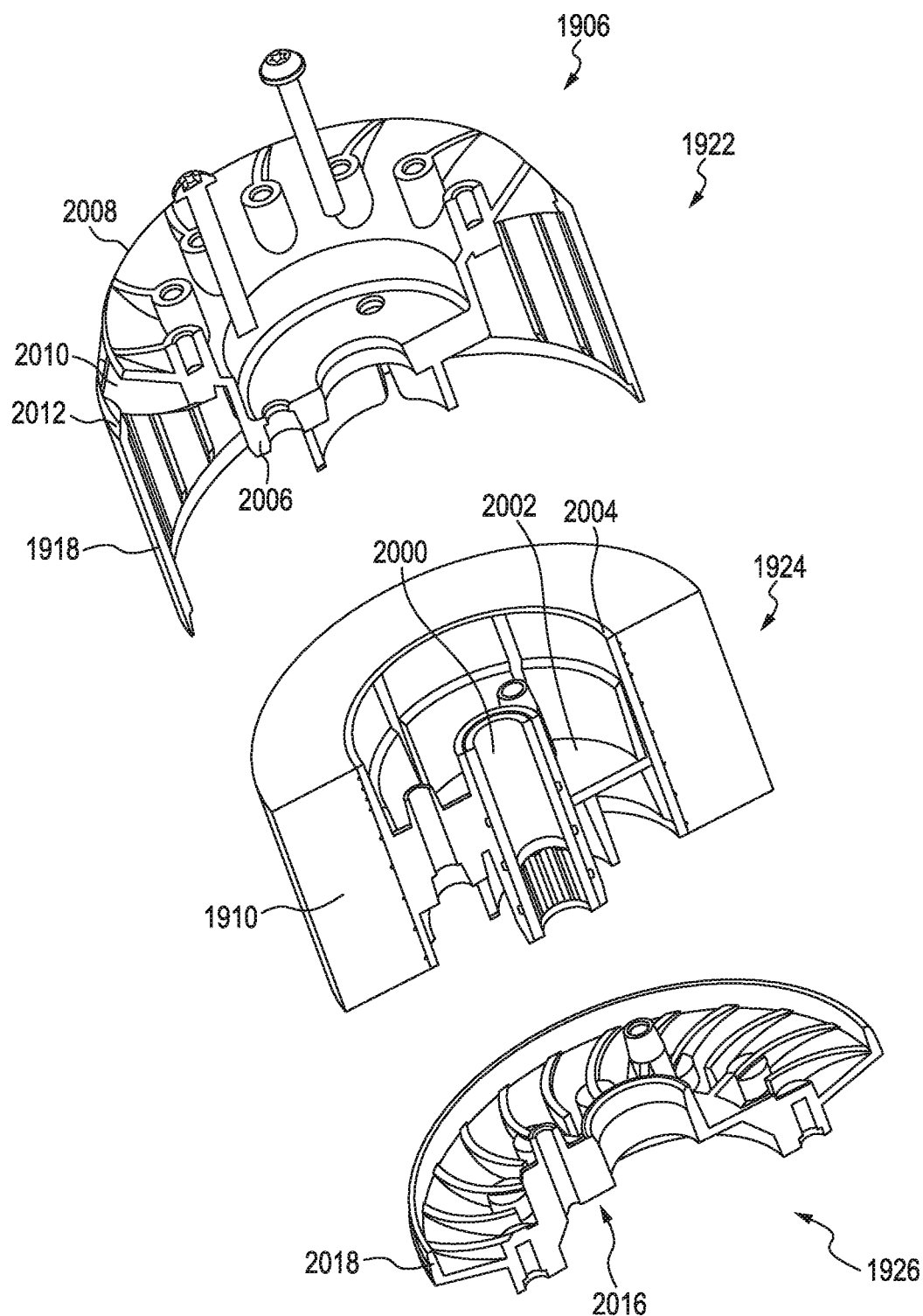
FIG. 21 shows an exploded cross-sectional view of a coalescer element for the crankcase coalescer system of FIG. 19.

FIGS. 20 and 21 illustrate the rotating coalescer element 1906 in greater detail. The core 1924 includes a sleeve 2000. In various embodiments, the sleeve 2000 comprises an overmolded bushing. For example, the sleeve 2000 may comprise a busing around which the core 1924 is molded (e.g., in an injection molding process, in a blow molding process, in a vacuum molding process, etc.). The sleeve 2000 is configured to receive and be coupled to the drive shaft 1912. In some embodiments, the drive shaft 1912 is press fit into the sleeve 2000. In other embodiments, the drive shaft 1912 is adhesively bonded to the sleeve 2000. The sleeve 2000 may have a textured portion configured to bite into the drive shaft 1912 upon a sufficiently forceful insertion of the drive shaft 1912 into the sleeve 2000. The sleeve 2000 defines a center axis of the rotating coalescer element 1906. In various embodiments, the rotating coalescer element 1906 is rotationally symmetric about the center axis of the sleeve 2000 at regular intervals (e.g., every 30.41°, etc.).

The core 1924 includes a hub 2002 coupled to the sleeve 2000. The sleeve 2000 may be integrated within the hub 2002 or may be inserted into an aperture of the hub 2002. The hub 2002 defines an inner circumferential wall 2004. The inner circumferential wall 2004 is configured to interface with the filter media 1910 such that the filter media 1910 is positioned between (e.g., sandwiched between, etc.) the inner circumferential wall 2004 and the outer circumferential wall 1918.

The top endcap 1922 includes a top coupler 2006. The top coupler 2006 has a diameter substantially matching a diameter of the hub 2002 such that the top coupler 2006 is capable of being received within the inner circumferential wall 2004. The top coupler 2006 also facilitates coupling of the top endcap 1922 to the core 1924. In various embodiments, fasteners (e.g., screws, bolts, etc.) are positioned through the top coupler 2006 and the hub 2002 such that the top endcap 1922 is coupled to the core 1924 through the fasteners.

The top endcap 1922 also includes a top lip 2008, a plurality of vanes 2010 (e.g., ribs, flow guides, etc.), and a drain lip 2012. The top lip 2008 extends circumferentially about the top coupler 2006. The top lip 2008 is defined by a diameter less than a diameter of the outer circumferential wall 1918. The drain lip 2012 also extends circumferentially about the top coupler 2006. The drain lip 2012 is defined by a diameter less than a diameter of the outer circumferential wall 1918. The drain lip 2012 is contiguous with, and extends inwardly from, the outer circumferential wall 1918.

Each of the plurality of vanes 2010 is coupled to or integrated with the top lip 2008 and the drain lip 2012 and extends therebetween. Each of the plurality of vanes 2010 cooperates with the top lip 2008 and the drain lip 2012 to form a plurality of channels 2014 in the top endcap 1922. Each of the plurality of channels 2014 is configured to facilitate the flow of blowby gas from a top end of the filter media 1910 through the top endcap 1922. According to an example embodiment, each of the plurality of vanes 2010 is shaped (e.g., curved, rounded, slanted, angled, etc.) to facilitate swirling of the blowby gas flowing from the plurality of channels 2014.

The inward and upward extension of the drain lip 2012 mitigates outflow of coalesced liquid from the filter media 1910. The top endcap 1922 and the core 1924 maintain the filter media 1910 below the drain lip 2012. The inward and upward extension of the drain lip 2012 mitigates outflow of coalesced liquid from the filter media 1910 because the filter media 1910 is retained below the drain lip 2012 and because the coalesced liquid is biased radially outward (e.g., towards the outer circumferential wall 1918, etc.) and therefore underneath the drain lip 2012 towards the outer circumferential wall 1918.

The bottom endcap 1926 includes a bottom coupler 2016. The bottom coupler 2016 has a diameter substantially matching a diameter of the hub 2002 such that the bottom coupler 2016 is capable of being received within the inner circumferential wall 2004. The bottom coupler 2016 also facilitates coupling of the bottom endcap 1926 to the core 1924. In various embodiments, fasteners are positioned through the bottom coupler 2016 and the hub 2002 such that the bottom endcap 1926 is coupled to the core 1924 through the fasteners.

The bottom endcap 1926 also includes a lower wall 2018. The lower wall 2018 extends circumferentially about the bottom coupler 2016 and interfaces with the filter media 1910 on one side and is positioned in confronting relation with the outer circumferential wall 1918 on the other side. The openings 1920 are defined between the outer circumferential wall 1918 and the lower wall 2018.

Figure 22:
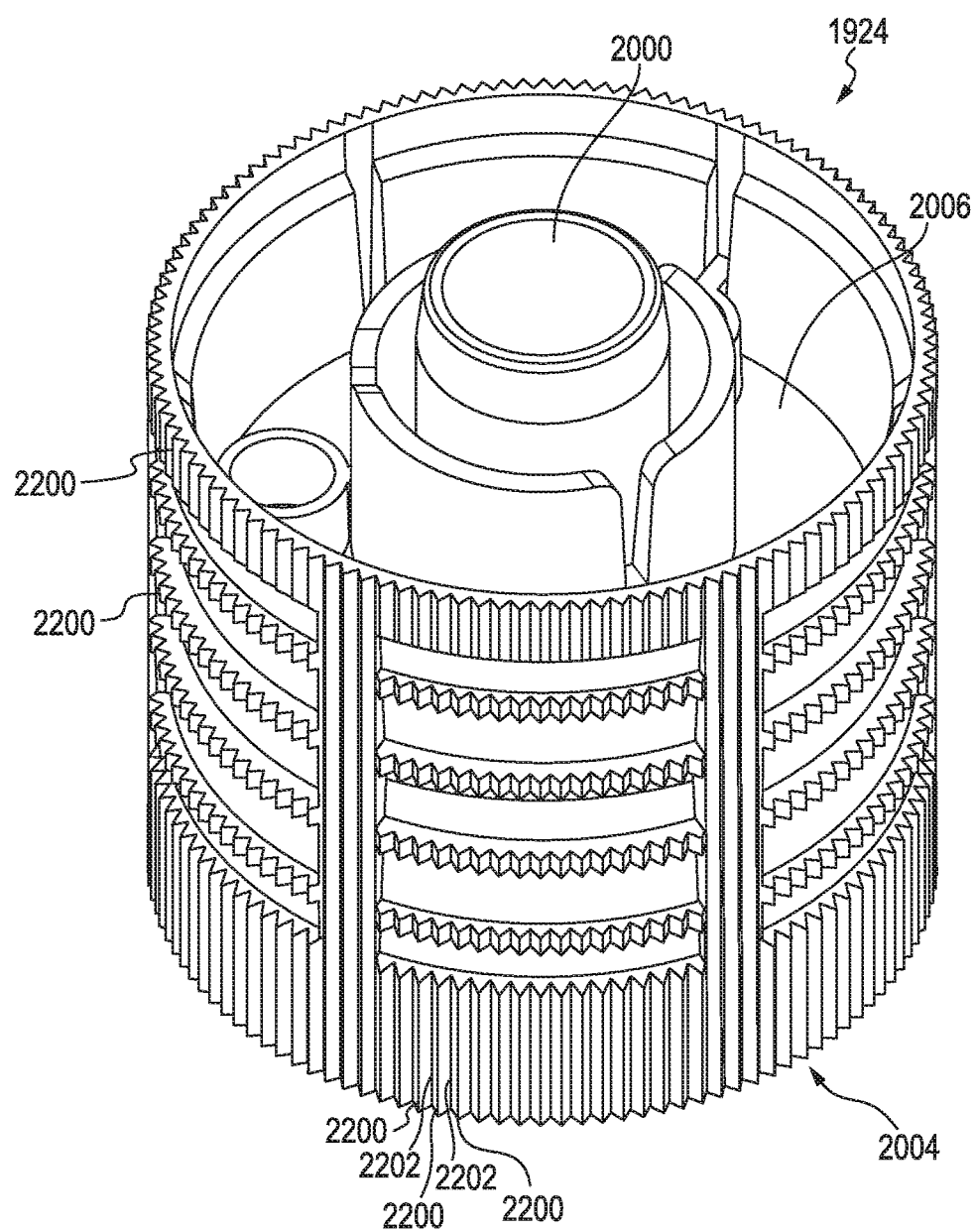
FIG. 22 shows a perspective view of a core for the crankcase coalescer system of FIG. 19.
Figure 23:
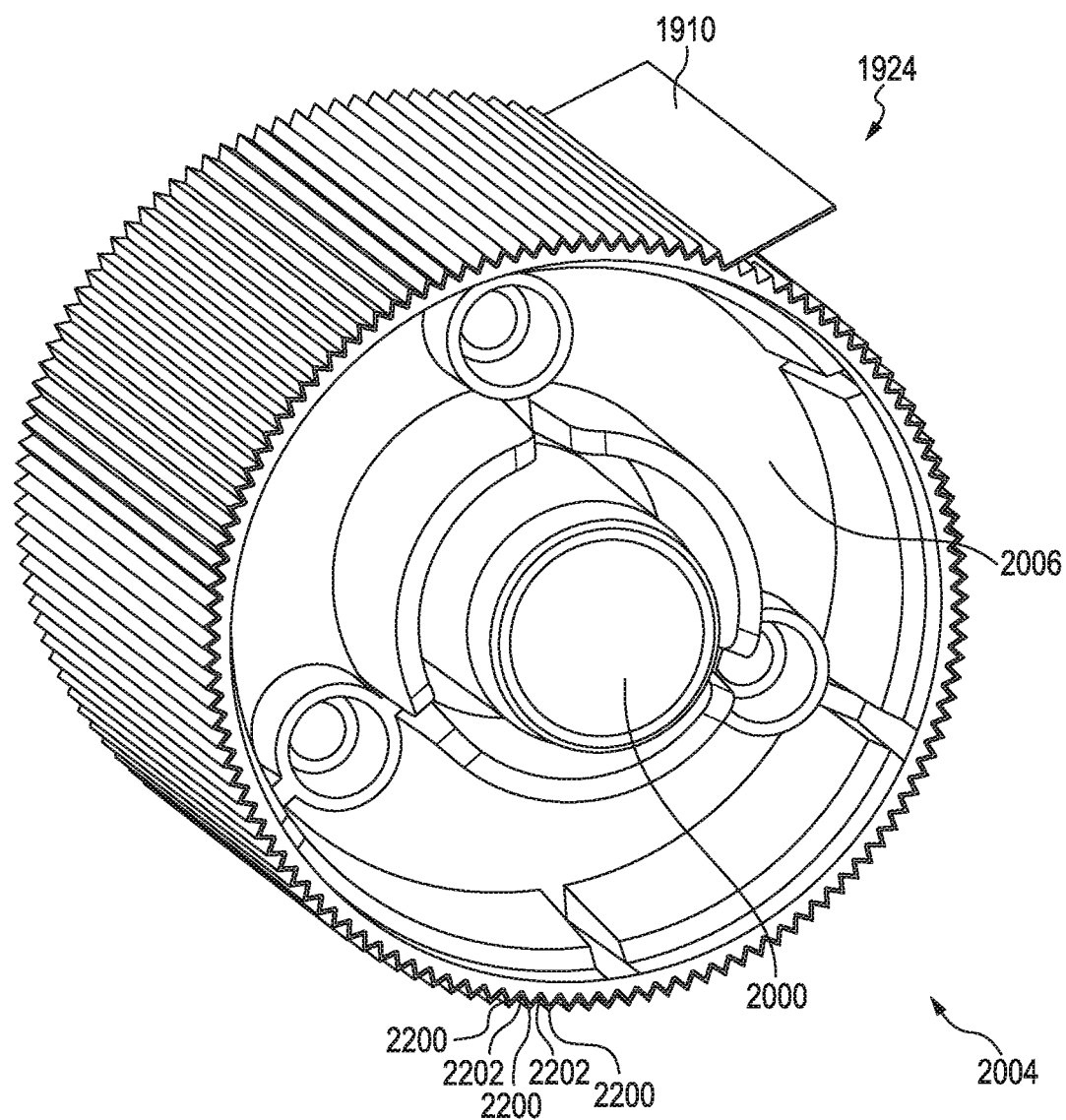
FIG. 23 shows a perspective view of a core for the crankcase coalescer system of FIG. 19.

FIGS. 22 and 23 illustrate the core 1924 in greater detail according to one example embodiment. In this embodiment, the inner circumferential wall 2004 includes a plurality of ridges 2200. The ridges 2200 define a plurality of valleys 2202 therebetween. In this embodiment, the filter media 1910 is coupled to the core 1924 by a continuous sheet of the filter media 1910 being wrapped around the core 1924. The ridges 2200 and valleys 2202 cause a first layer of the filter media 1910 to become corrugated to facilitate coupling of further layer of the filter media 1910 to the core 1924. FIG. 23 illustrates the core 1924 with a single layer of the 1910 being wound around the core 1924.

Figure 24:
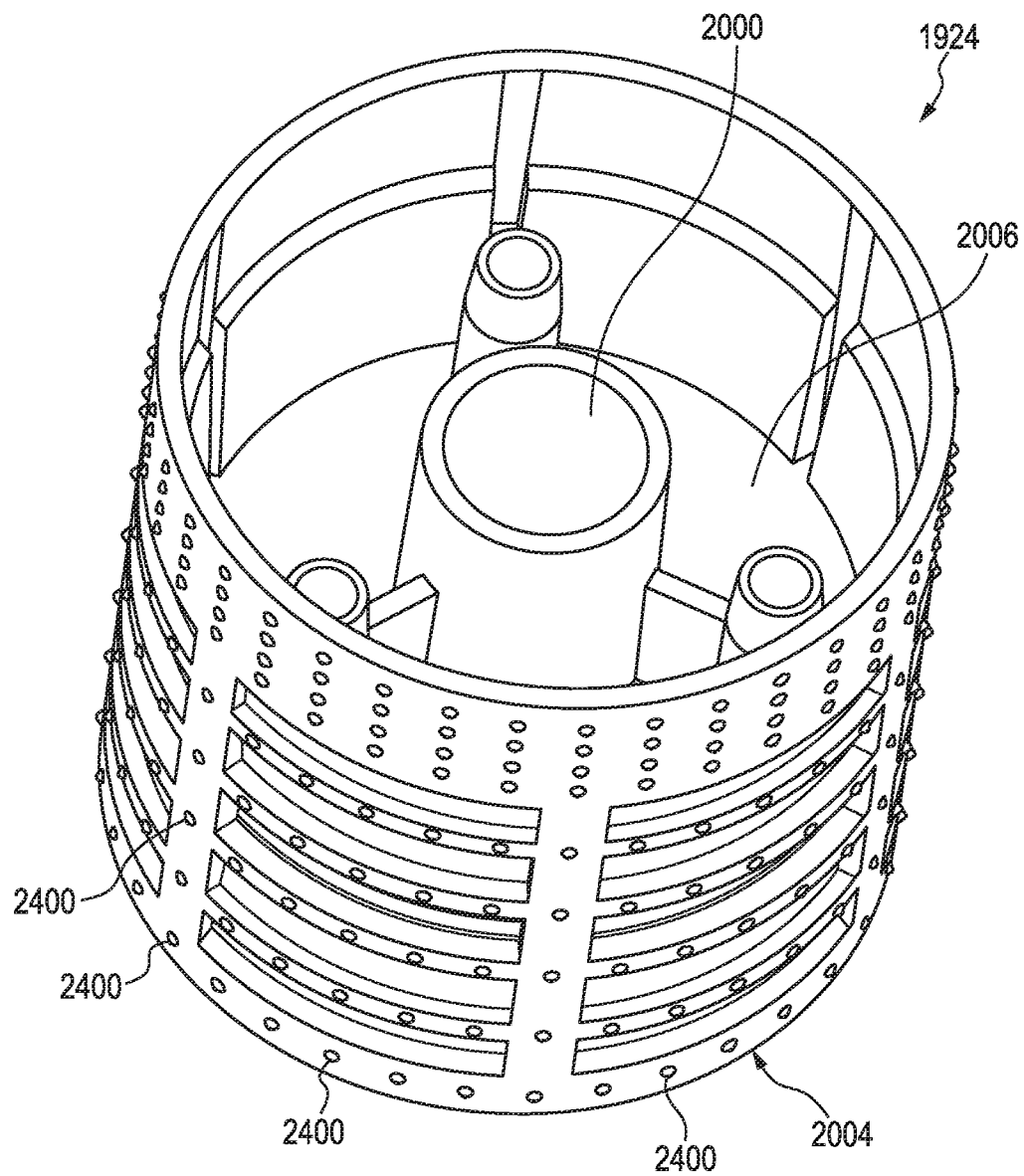
FIG. 24 shows a perspective view of a core for the crankcase coalescer system of FIG. 19.
Figure 25:
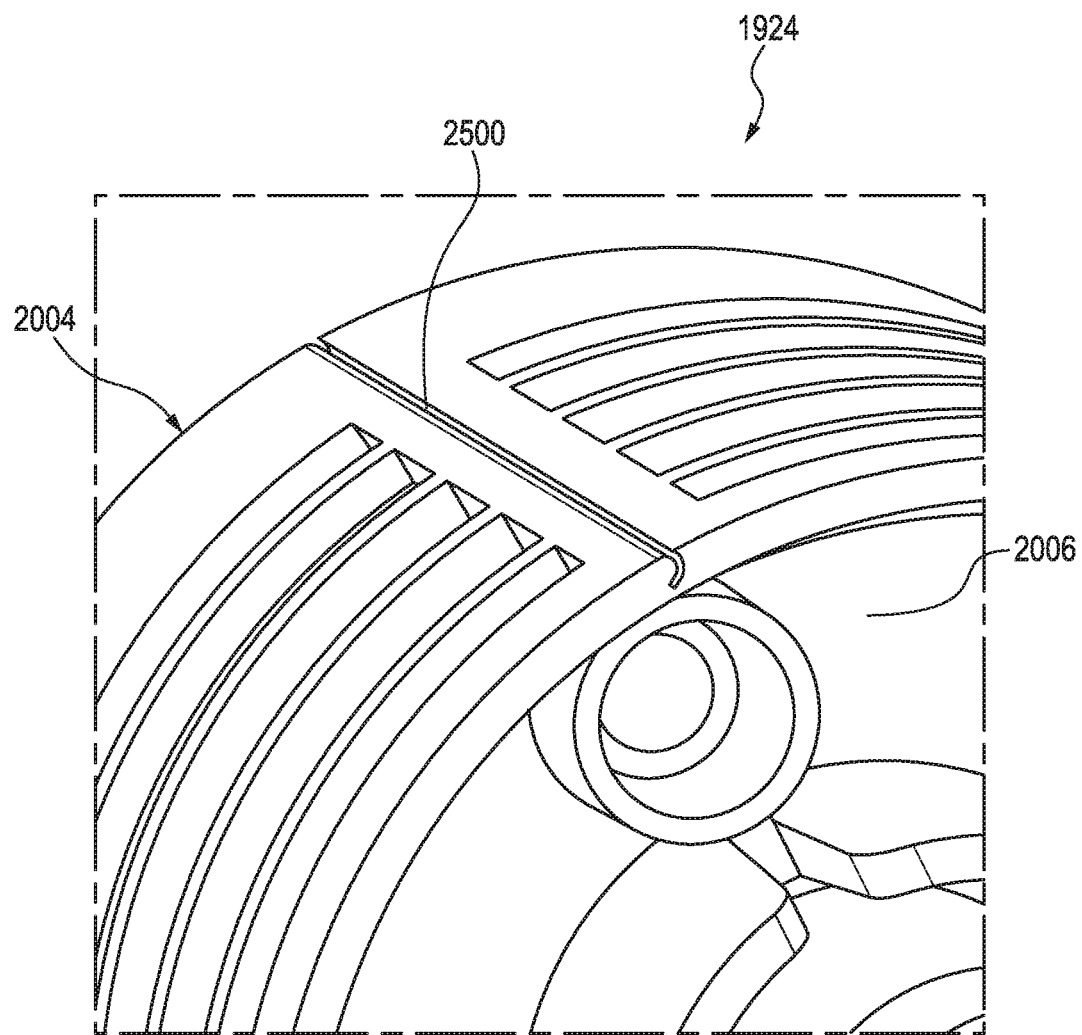
FIG. 25 shows a perspective view of portion of a core for the crankcase coalescer system of FIG. 19.

FIGS. 24 and 25 illustrate the core 1924 in greater detail according to another example embodiment. In this embodiment, the inner circumferential wall 2004 includes a plurality of protuberances 2400 (e.g., protrusions, spikes, bites, projections, etc.). It is understood that the plurality of protuberances could similarly be a plurality of recesses (e.g., indentations, etc.). In this embodiment, the filter media 1910 is coupled to the core 1924 by a continuous sheet of the filter media 1910 being wrapped around the core 1924. The protuberances 2400 facilitate coupling of the filter media 1910 to the core 1924. Specifically, the filter media 1910 deforms around the protuberances 2400 and is held against the protuberances 2400 by additional layers of the filter media 1910 such that movement of the filter media 1910 along the inner circumferential wall 2004 is resisted. FIG. 25 illustrates the inner circumferential wall 2004 as including a vertical slot 2500. The vertical slot 2500 may be included in the embodiment of the core 1924 shown in FIGS. 22 and 23. The vertical slot 2500 extends along the inner circumferential wall 2004 from a top edge of the inner circumferential wall 2004 to a bottom edge of the inner circumferential wall 2004. The vertical slot 2500 extends into the inner circumferential wall 2004 and is configured to receive a layer of the filter media 1910 such that the layer of filter media 1910 is retained (e.g., anchored, etc.) relative to the vertical slot 2500. In various embodiments, the vertical slot 2500 is a C-shaped slot.

Figure 26:
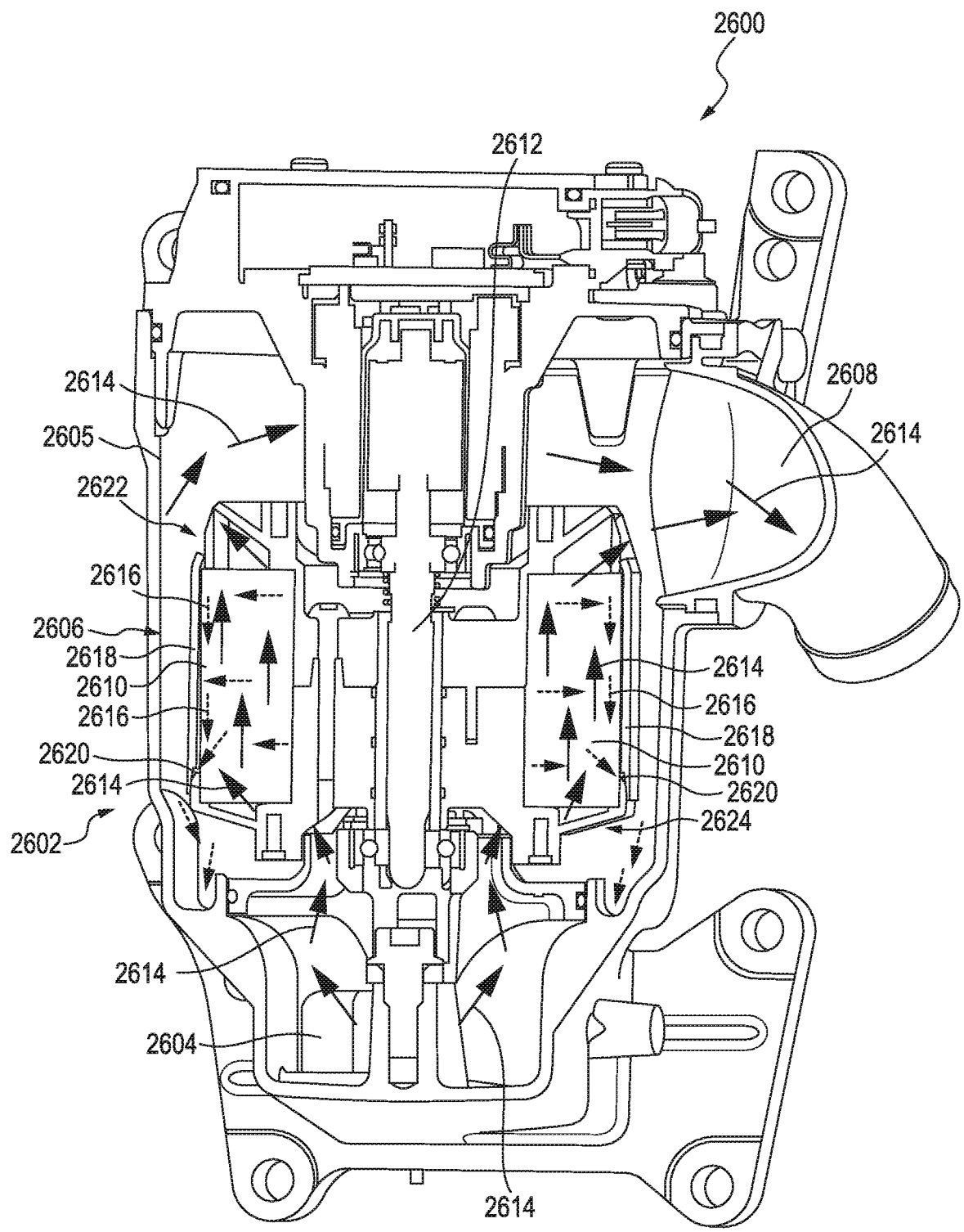
FIG. 26 shows a cross-sectional view of a crankcase coalescer system according to another example embodiment.

Referring to FIG. 26 a cross-sectional view of a crankcase coalescer system 2600 is shown according to an example embodiment. The crankcase coalescer system 2600 is similar to the crankcase coalescer system 1900. The crankcase coalescer system 2600 generally processes blowby gases received from an internal combustion engine crankcase to remove aerosols, oils, and other particulate contained in the crankcase blowby gases. The crankcase coalescer system 2600 generally includes a housing 2602 having an inlet 2604 that receives crankcase blowby gases to be filtered, a central compartment 2605 having a rotating coalescer element 2606 installed therein, and an outlet 2608 that provides filtered blowby gases to the internal combustion engine (in a closed crankcase ventilation system) or to the ambient (in an open crankcase ventilation system).

The rotating coalescer element 2606 includes filter media 2610 having axial flow channels arranged in a direction generally parallel to an axis defined by a drive shaft 2612 of the crankcase coalescer system 2600. Accordingly, the rotating coalescer element 2606 is an axial flow coalescing element. The filter media 2610 may be frustoconical in overall shape such that the axial flow channels are not arranged in a direction that is generally parallel to an axis defined by the drive shaft 2612 of the crankcase coalescer system 2600. In some arrangements, the filter media 2610 is a wound filter media. Movement of example blowby gases through the crankcase coalescer system 2600 is shown in solid flow arrows 2614. Crankcase gas flows from the inlet 2604, through a bottom part of the rotating coalescer element 2606, entering the filter media 2610 from a first, bottom end of the filter media 2610, through the filter media 2610 in an axial direction, out a second, top end of the filter media 2610, through a top part of the rotating coalescer element 2606, and out the outlet 2608. Flow through the filter media 2610 is uniformly distributed on an axial plane adjacent to the inlet side of the filter media 2610.

Coalesced liquid (e.g., oil and aerosols separated from the crankcase blowby gas)—designated by the small dashed flow arrows 2616—passes through the layers of filter media 2610 in a radially outward direction (e.g., due to the centrifugal force impacted on the coalesced liquid by rotation of the rotating coalescer element 2606, etc.) and drains to a bottom region of the rotating coalescer element 2606 along an outer circumferential wall 2618 of the rotating coalescer element 2606, exiting through openings 2620 at the largest local radius from a center axis of the rotating coalescer element 2606 (e.g., the axis defined by the drive shaft 2612). The outer circumferential wall 2618 is impermeable such that the coalesced liquid may only exit the rotating coalescer element 2606 via the openings 2620. The openings 2620 may be crescent-shaped openings in cross-section. In some arrangements, the rotating coalescer element 2606 is positioned in a manner such that gravity assists the draining of the separated liquid from the housing 2602.

The top side of the rotating coalescer element 2606, opposite the bottom side of the rotating coalescer element 2606 where the openings 2620 are positioned, may be referred to as a 'clean side.' After the coalesced liquid has drained from the rotating coalescer element 2606 (e.g., via the openings 2620, etc.), the coalesced liquid may be recirculated to a fluid system. For example, if the coalesced liquid is oil, the oil may be drained from the rotating coalescer element 2606 and recirculated to an oil system of an internal combustion engine system producing the blowby gas which is processed by the crankcase coalescer system 2600.

The rotating coalescer element 2606 is of a two-piece construction and includes a top endcap 2622 and a bottom endcap 2624. The top endcap 2622 is coupled to the bottom endcap 2624 to form the rotating coalescer element 2606. The bottom endcap 2624 is configured to receive and be coupled to the drive shaft 2612. The top endcap 2622 and the bottom endcap 2624 cooperate to retain the filter media 2610 relative to the drive shaft 2612. In this way, the top endcap 2622 and the bottom endcap 2624 are configured to facilitate rotation of the filter media 2610 by the drive shaft 2612 and drainage of coalesced liquid from the rotating coalescer element 2606.

Figure 27:
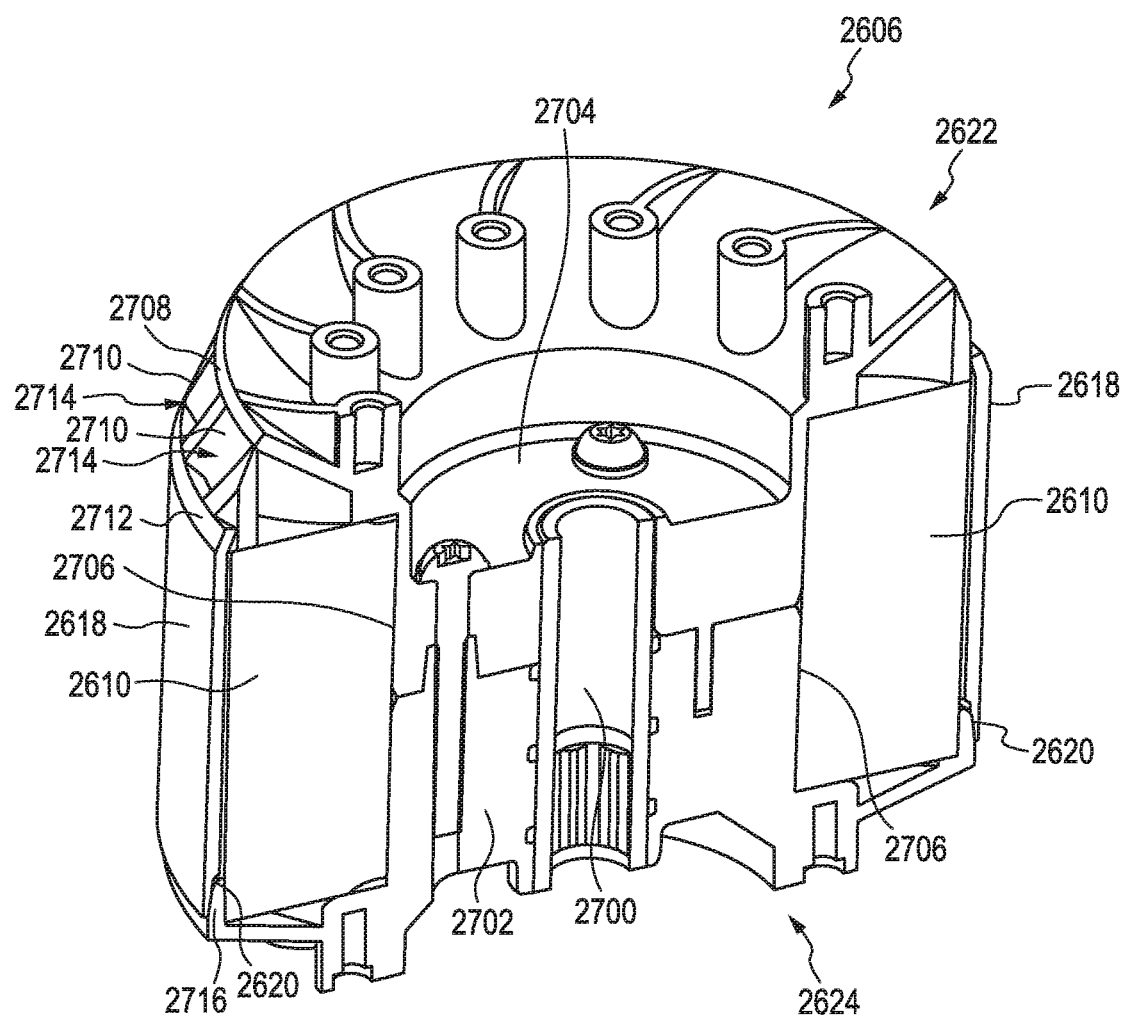
FIG. 27 shows a cross-sectional view of a coalescer element for the crankcase coalescer system of FIG. 26.
Figure 28:
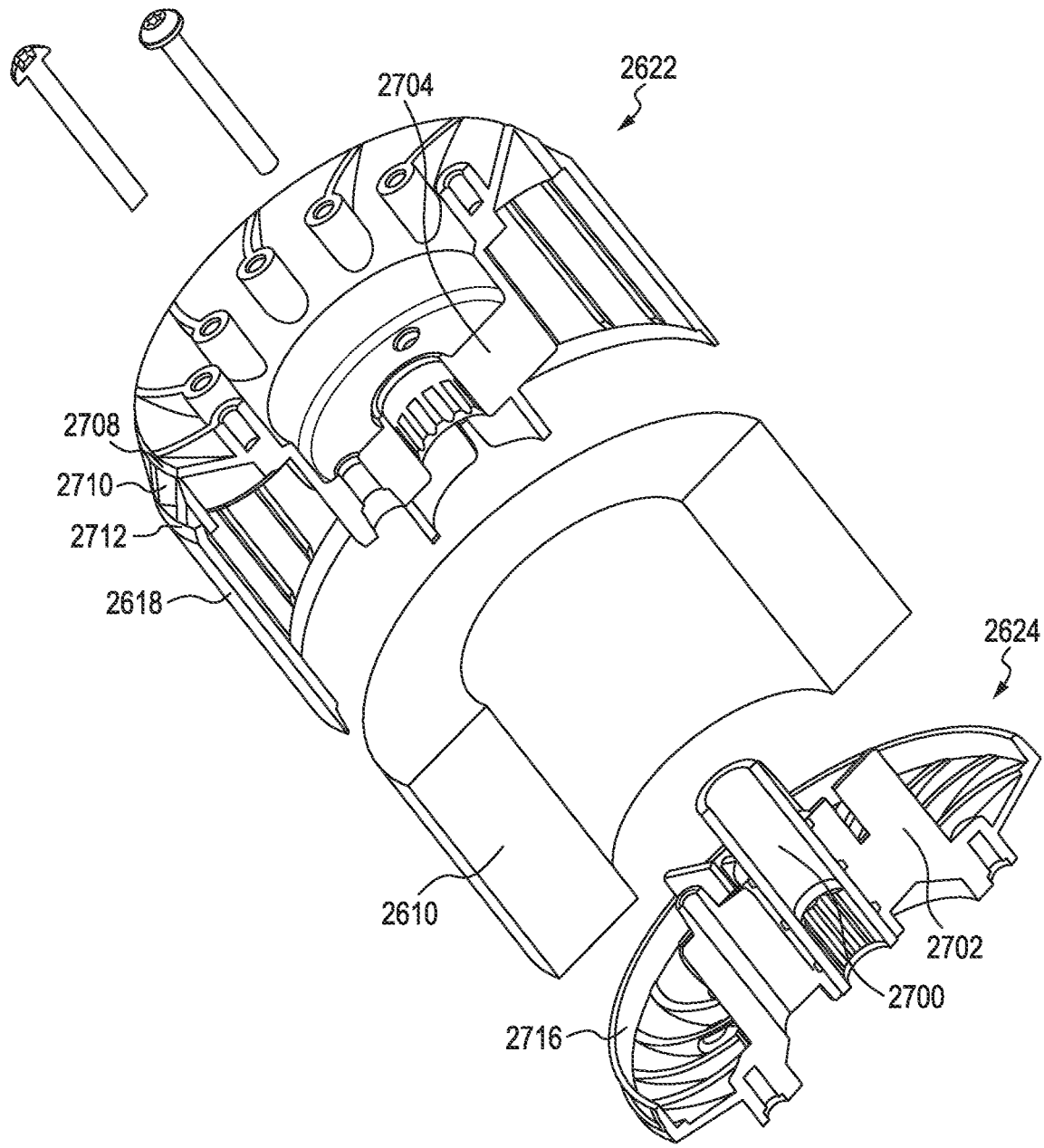
FIG. 28 shows an exploded cross-sectional view of a coalescer element for the crankcase coalescer system of FIG. 26.

FIGS. 27 and 28 illustrate the rotating coalescer element 2606 in greater detail. The bottom endcap 2624 includes a sleeve 2700. In various embodiments, the sleeve 2700 is an overmolded bushing. For example, the sleeve 2700 may comprise a bushing around which the bottom endcap 2624 is molded (e.g., in an injection molding process, in a blow molding process, in a vacuum molding process, etc.). The sleeve 2700 is configured to receive and be coupled to the drive shaft 2612. In some embodiments, the drive shaft 2612 is press fit into the sleeve 2700. In other embodiments, the drive shaft 2612 is adhesively bonded to the sleeve 2700. The sleeve 2700 may have a textured portion configured to bite into the drive shaft 2612 upon a sufficiently forceful insertion of the drive shaft 2612 into the sleeve 2700. The sleeve 2700 defines a center axis of the rotating coalescer element 2606. In various embodiments, the rotating coalescer element 2606 is rotationally symmetric about the center axis of the sleeve 2700 at regular intervals (e.g., every 30.41°, etc.).

The bottom endcap 2624 includes a bottom hub portion 2702 coupled to the sleeve 2700. The sleeve 2700 may be integrated within the bottom hub portion 2702 or may be inserted into an aperture of the bottom hub portion 2702. The top endcap 2622 includes a top hub portion 2704. The top hub portion 2704 and the bottom hub portion 2702 are configured to be coupled together to a form a hub similar to the hub 2002. A part of the top hub portion 2704 is configured to be inserted in a part of the bottom hub portion 2702 and another part of the top hub portion 2704 is configured to receive another part of the bottom hub portion 2702. Similarly, a part of the bottom hub portion 2702 is configured to be inserted in a part of the top hub portion 2704 and another part of the bottom hub portion 2702 is configured to receive another part of the top hub portion 2704. In various embodiments, are positioned through the top hub portion 2704 and the bottom hub portion 2702 such that the top endcap 2622 is coupled to the bottom endcap 2624 through the fasteners.

A part of the top hub portion 2704 has a diameter substantially matching a part of the bottom hub portion 2702 such that the bottom hub portion 2702 and the top hub portion 2704 collectively define an inner circumferential wall 2706. The inner circumferential wall 2706 is configured to interface with the filter media 2610 such that the filter media 2610 is positioned between (e.g., sandwiched between, etc.) the inner circumferential wall 2706 and the outer circumferential wall 2618.

The top endcap 2622 also includes a top lip 2708, a plurality of vanes 2710 (e.g., ribs, flow guides, etc.), and a drain lip 2712. The top lip 2708 extends circumferentially about the top hub portion 2704. The top lip 2708 is defined by a diameter less than a diameter of the outer circumferential wall 2618. The drain lip 2712 also extends circumferentially about the top hub portion 2704. The drain lip 2712 is defined by a diameter less than a diameter of the outer circumferential wall 2618. The drain lip 2712 is contiguous with, and extends inwardly from, the outer circumferential wall 2618.

Each of the plurality of vanes 2710 is coupled to or integrated with the top lip 2708 and the drain lip 2712 and extends therebetween. Each of the plurality of vanes 2710 cooperates with the top lip 2708 and the drain lip 2712 to form a plurality of channels 2714 in the top endcap 2622. Each of the plurality of channels 2714 is configured to facilitate the flow of blowby gas from a top end of the filter media 2610 through the top endcap 2622. According to an example embodiment, each of the plurality of vanes 2710 is shaped (e.g., curved, rounded, slanted, angled, etc.) to facilitate swirling of the blowby gas flowing from the plurality of channels 2714.

The inward and upward extension of the drain lip 2712 mitigates outflow of coalesced liquid from the filter media 2610. The top endcap 2622 and the bottom endcap 2624 maintain the filter media 2610 below the drain lip 2712. The inward and upward extension of the drain lip 2712 mitigates outflow of coalesced liquid from the filter media 2610 because the filter media 2610 is retained below the drain lip 2712 and because the coalesced liquid is biased radially outward (e.g., towards the outer circumferential wall 2618, etc.) and therefore underneath the drain lip 2712 towards the outer circumferential wall 2618.

The bottom endcap 2624 also includes a lower wall 2716. The lower wall 2716 extends circumferentially about the bottom hub portion 2702 and interfaces with the filter media 2610 on one side and is positioned in confronting relation with the outer circumferential wall 2618 on the other side. The openings 2620 are defined between the outer circumferential wall 2618 and the lower wall 2716.

The filter media 2610 may be wound in successive layers about the hub defined by the bottom hub portion 2702 and the top hub portion 2704. A first layer of the filter media 2610 may be secured to the inner circumferential wall 2706 through a vertical slot, protuberances, or recesses formed within the inner circumferential wall 2706.

Figure 29:
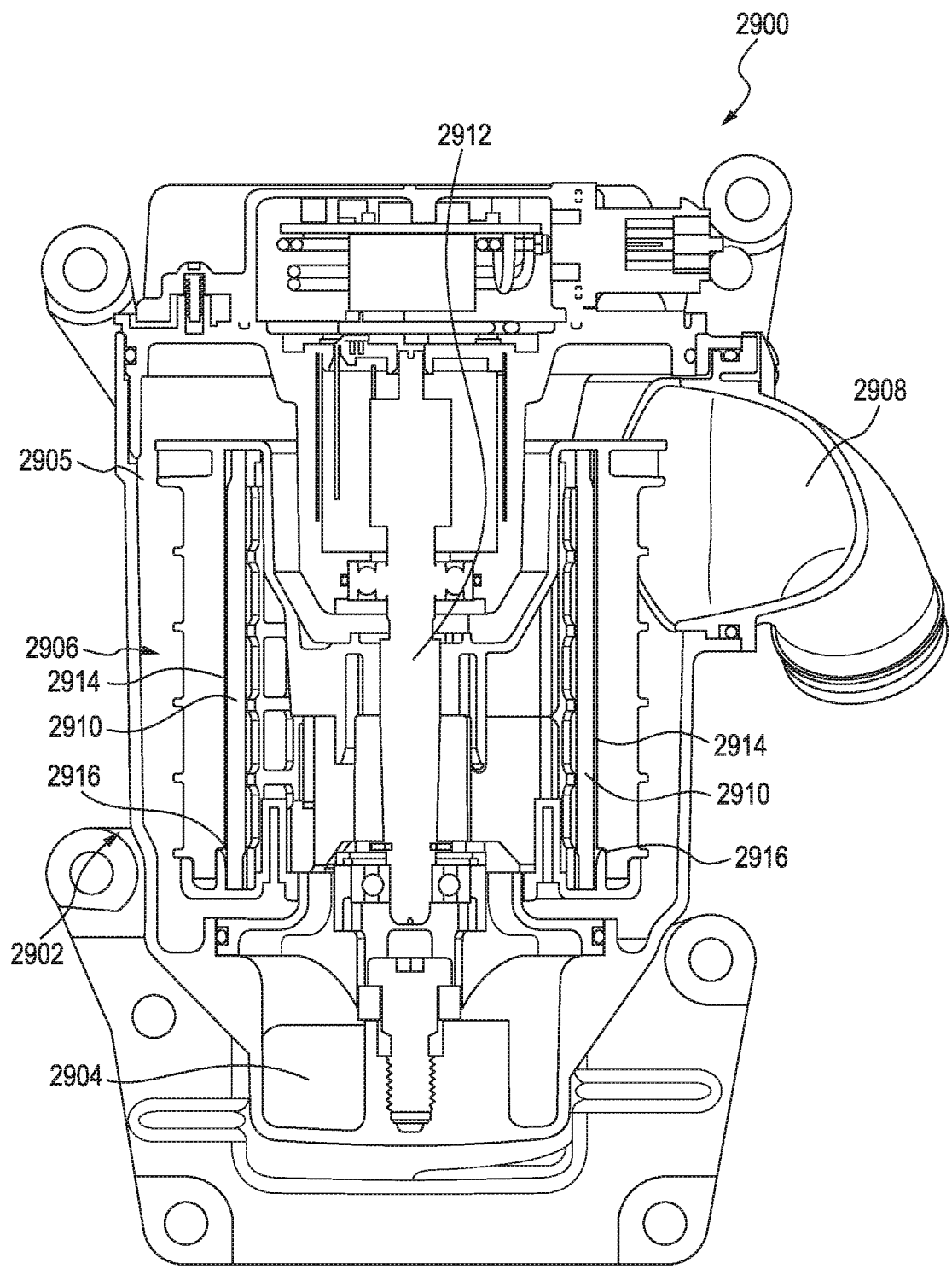
FIG. 29 shows a cross-sectional view of a crankcase coalescer system according to another example embodiment.

Referring to FIG. 29, a cross-sectional view of a crankcase coalescer system 2900 is shown according to an example embodiment. The crankcase coalescer system 2900 is similar to the crankcase coalescer system 1900. The crankcase coalescer system 2900 generally processes blowby gases received from an internal combustion engine crankcase to remove aerosols, oils, and other particulate contained in the crankcase blowby gases. The crankcase coalescer system 2900 generally includes a housing 2902 having an inlet 2904 that receives crankcase blowby gases to be filtered, a central compartment 2905 having a rotating coalescer element 2906 installed therein, and an outlet 2908 that provides filtered blowby gases to the internal combustion engine (in a closed crankcase ventilation system) or to the ambient (in an open crankcase ventilation system).

The rotating coalescer element 2906 includes filter media 2910 having axial flow channels arranged in a direction generally parallel to an axis defined by a drive shaft 2912 of the crankcase coalescer system 2900. Accordingly, the rotating coalescer element 2906 is an axial flow coalescing element. The filter media 2910 may be frustoconical in overall shape such that the axial flow channels are not arranged in a direction that is generally parallel to an axis defined by the drive shaft 2912 of the crankcase coalescer system 2900. In some arrangements, the filter media 2910 is a wound filter media. Crankcase gas flows from the inlet 2904, through a bottom part of the rotating coalescer element 2906, entering the filter media 2910 from a first, bottom end of the filter media 2910, through the filter media 2910 in an axial direction, out a second, top end of the filter media 2910, through a top part of the rotating coalescer element 2906, and out the outlet 2908. Flow through the filter media 2910 is uniformly distributed on an axial plane adjacent to the inlet side of the filter media 2910.

Coalesced liquid (e.g., oil and aerosols separated from the crankcase blowby gas) passes through the layers of filter media 2910 in a radially outward direction (e.g., due to the centrifugal force impacted on the coalesced liquid by rotation of the rotating coalescer element 2906, etc.) and drains to a bottom region of the rotating coalescer element 2906 along an outer circumferential wall 2914 of the rotating coalescer element 2906, exiting through openings 2916 at the largest local radius from a center axis of the rotating coalescer element 2906 (e.g., the axis defined by the drive shaft 2912). The outer circumferential wall 2914 is impermeable such that the coalesced liquid may only exit the rotating coalescer element 2906 via the openings 2916. The openings 2916 may be crescent-shaped openings in cross-section. In some arrangements, the rotating coalescer element 2906 is positioned in a manner such that gravity assists the draining of the separated liquid from the housing 2902.

The top side of the rotating coalescer element 2906, opposite the bottom side of the rotating coalescer element 2906 where the openings 2916 are positioned, may be referred to as a 'clean side.' After the coalesced liquid has drained from the rotating coalescer element 2906 (e.g., via the openings 2916, etc.), the coalesced liquid may be recirculated to a fluid system. For example, if the coalesced liquid is oil, the oil may be drained from the rotating coalescer element 2906 and recirculated to an oil system of an internal combustion engine system producing the blowby gas which is processed by the crankcase coalescer system 2900.

Figure 30:
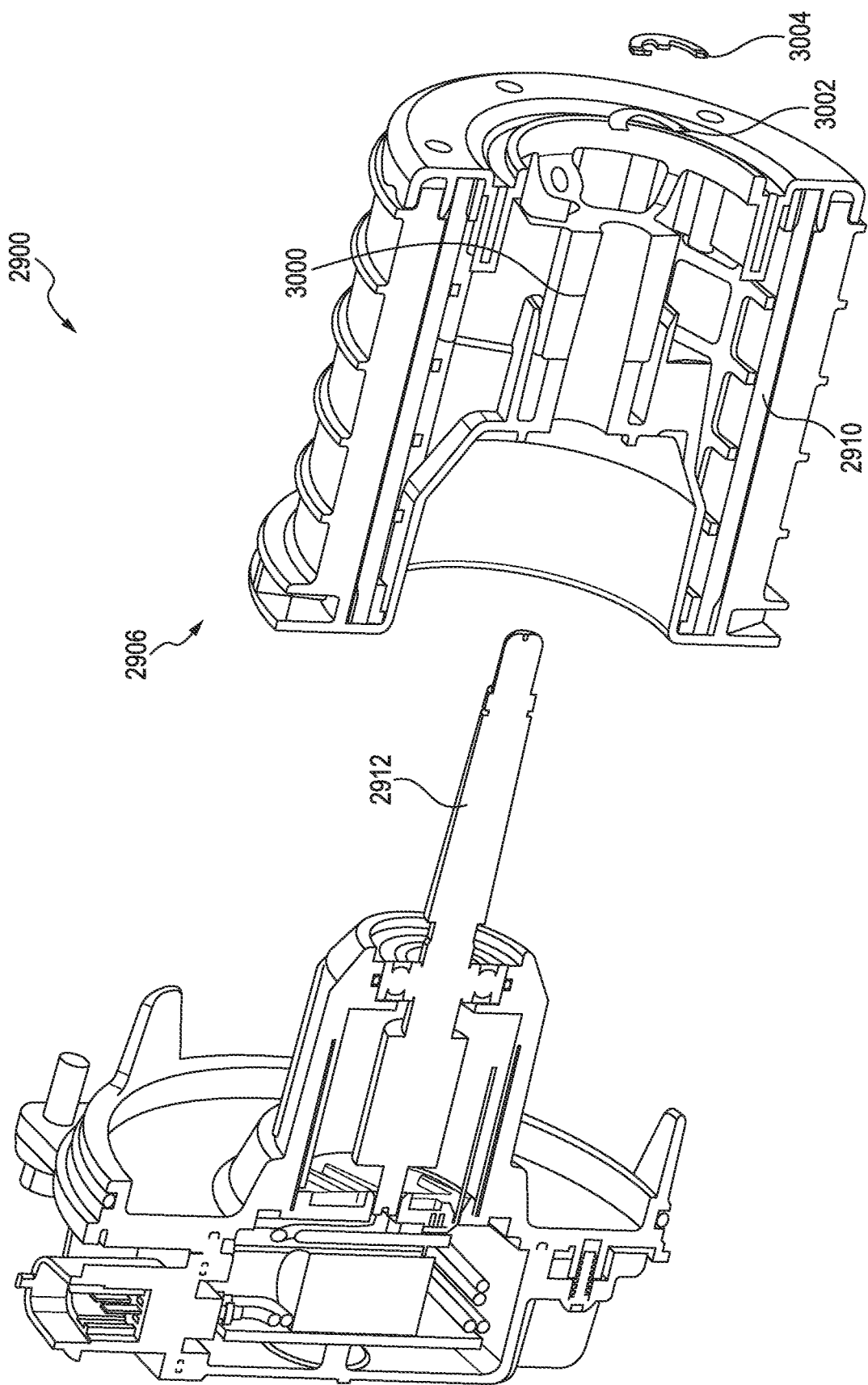
FIG. 30 shows an exploded cross-sectional view of a portion of the crankcase coalescer system of FIG. 29.

FIG. 30 illustrates an exploded view of a portion of the crankcase coalescer system 2900. The drive shaft 2912 is tapered from a larger diameter farthest from the openings 2916 to a smaller diameter closest to the openings 2916. In various embodiments, the drive shaft 2912 has a two degree taper. The rotating coalescer element 2906 includes a sleeve 3000. In various embodiments, the sleeve 3000 is an overmolded bushing. For example, the sleeve 3000 may comprise a busing around which a portion of the rotating coalescer element 2906 is molded (e.g., in an injection molding process, in a blow molding process, in a vacuum molding process, etc.). The sleeve 3000 is configured to receive and be coupled to the drive shaft 2912. Accordingly, the sleeve 3000 has a taper matching the taper of the drive shaft 2912 and is tapered from a larger diameter farthest from the openings 2916 to a smaller diameter closest to the openings 2916. In various embodiments, the sleeve 3000 has a two degree taper. In some embodiments, the drive shaft 2912 is press fit into the sleeve 3000. In other embodiments, the drive shaft 2912 is adhesively bonded to the sleeve 3000. The sleeve 3000 may have a textured portion configured to bite into the drive shaft 2912 upon a sufficiently forceful insertion of the drive shaft 2912 into the sleeve 3000. The sleeve 3000 defines a center axis of the rotating coalescer element 2906. In various embodiments, the rotating coalescer element 2906 is rotationally symmetric about the center axis of the sleeve 3000 at regular intervals (e.g., every 30.41°, etc.).

The rotating coalescer element 2906 also includes a spring 3002 and a ring 3004. The drive shaft 2912 is configured to receive the spring 3002 and the ring 3004. Specifically, after the drive shaft 2912 has been pressed into the sleeve 3000, an end of the drive shaft 2912 protrudes from the rotating coalescer element 2906. The spring 3002 is placed over the end of the drive shaft 2912 and the ring 3004 is subsequently placed over the end of the drive shaft 2912 such that the spring 3002 separates the rotating coalescer element 2906 from the ring 3004. The ring 3004 is configured to limit movement of the drive shaft 2912 in the axial direction (e.g., along the center axis of the drive shaft 2912, etc.) relative to the rotating coalescer element 2906. The spring 3002 is configured to facilitate a target amount of movement of the drive shaft 2912 in the axial direction relative to the rotating coalescer element 2906, where the target amount is less than a threshold amount of movement at which the ring 3004 prevents further movement of the drive shaft 2912 in the axial direction relative to the rotating coalescer element 2906. In various embodiments, the spring 3002 is a wave spring.

Figure 31:
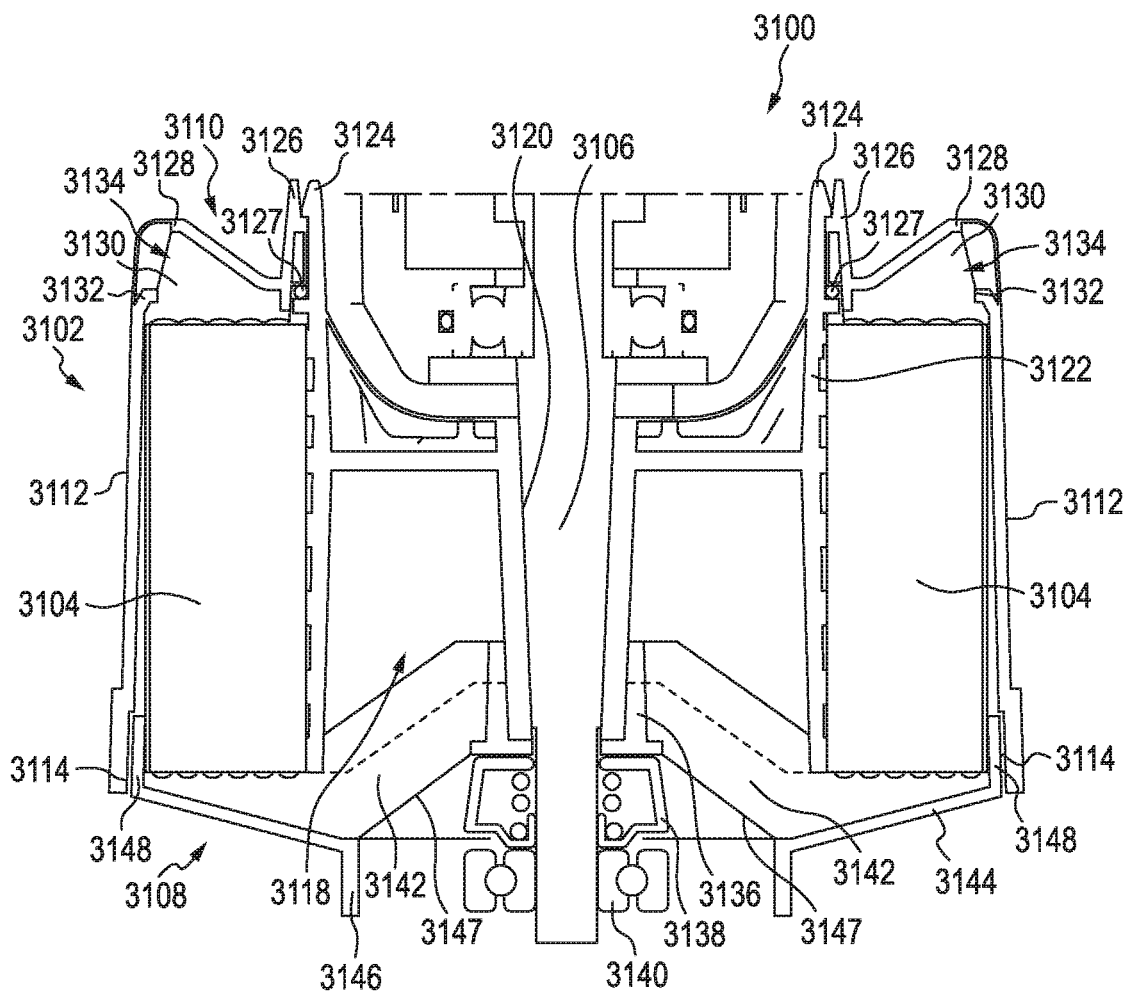
FIG. 31 shows a cross-sectional view of a coalescer element for a crankcase coalescer system according to another example embodiment.

Referring to FIG. 31, a cross-sectional view of a portion of a crankcase coalescer system 3100 is shown according to an example embodiment. The crankcase coalescer system 3100 is similar to the crankcase coalescer system 1900. The crankcase coalescer system 3100 generally processes blowby gases received from an internal combustion engine crankcase to remove aerosols, oils, and other particulate contained in the crankcase blowby gases. The crankcase coalescer system 3100 generally includes a housing having an inlet that receives crankcase blowby gases to be filtered, a central compartment having a rotating coalescer element 3102 installed therein, and an outlet that provides filtered blowby gases to the internal combustion engine (in a closed crankcase ventilation system) or to the ambient (in an open crankcase ventilation system).

The rotating coalescer element 3102 includes filter media 3104 having axial flow channels arranged in a direction generally parallel to an axis defined by a drive shaft 3106 of the crankcase coalescer system 3100. Accordingly, the rotating coalescer element 3102 is an axial flow coalescing element. The filter media 3104 may be frustoconical in overall shape such that the axial flow channels are not arranged in a direction that is generally parallel to an axis defined by the drive shaft 3106 of the crankcase coalescer system 3100. In some arrangements, the filter media 3104 is a wound filter media. Crankcase gas flows from the inlet, through a bottom endcap 3108 of the rotating coalescer element 3102, entering the filter media 3104 from a first, bottom end of the filter media 3104, through the filter media 3104 in an axial direction, out a second, top end of the filter media 3104, through a top endcap 3110 of the rotating coalescer element 3102, and out the outlet. Flow through the filter media 3104 is uniformly distributed on an axial plane adjacent to the inlet side of the filter media 3104.

Coalesced liquid (e.g., oil and aerosols separated from the crankcase blowby gas) passes through the layers of filter media 3104 in a radially outward direction (e.g., due to the centrifugal force impacted on the coalesced liquid by rotation of the rotating coalescer element 3102, etc.) and drains to a bottom region of the rotating coalescer element 3102 along an outer circumferential wall 3112 of the rotating coalescer element 3102, exiting through openings 3114 at the largest local radius from a center axis of the rotating coalescer element 3102 (e.g., the axis defined by the drive shaft 3106). The outer circumferential wall 3112 is impermeable such that the coalesced liquid may only exit the rotating coalescer element 3102 via the openings 3114. The openings 3114 may be crescent-shaped openings in cross-section. In some arrangements, the rotating coalescer element 3102 is positioned in a manner such that gravity assists the draining of the separated liquid from the housing.

The top side of the rotating coalescer element 3102, opposite the bottom side of the rotating coalescer element 3102 where the openings 3114 are positioned, may be referred to as a 'clean side.' After the coalesced liquid has drained from the rotating coalescer element 3102 (e.g., via the openings 3114, etc.), the coalesced liquid may be recirculated to a fluid system. For example, if the coalesced liquid is oil, the oil may be drained from the rotating coalescer element 3102 and recirculated to an oil system of an internal combustion engine system producing the blowby gas which is processed by the crankcase coalescer system 3100.

The rotating coalescer element 3102 includes a core 3118. The core 3118 includes a sleeve 3120 which is configured to receive and couple to the drive shaft 3106. In various embodiments, the sleeve 3120 is an overmolded bushing. For example, the sleeve 3120 may comprise a busing around which a portion of the rotating coalescer element 3102 is molded (e.g., in an injection molding process, in a blow molding process, in a vacuum molding process, etc.). The sleeve 3120 defines a center axis of the rotating coalescer element 3102. In various embodiments, the rotating coalescer element 3102 is rotationally symmetric about the center axis of the sleeve 3120 at regular intervals (e.g., every 30.41°, etc.).

In various embodiments, the drive shaft 3106 is tapered from a larger diameter farthest from the openings 3114 to a smaller diameter closest to the openings 3114. In various embodiments, the drive shaft 3106 has a two degree taper. In these embodiments, the sleeve 3120 has a taper matching the taper of the drive shaft 3106 and is tapered from a larger diameter farthest from the openings 3114 to a smaller diameter closest to the openings 3114. In various embodiments, the sleeve 3120 has a two degree taper. The taper of the drive shaft 3106 and the sleeve 3120 may be advantageous for transmitting torque from the drive shaft 3106 to the sleeve 3120, and thereby to the core 3118.

The core 3118 includes a hub 3122. The hub 3122 may be integral with, or coupled to, the sleeve 3120. The filter media 3104 is coupled to (e.g., secured directly to, etc.) the hub 3122. The hub 3122 may include protuberances, vertical slots, and/or recesses configured to facilitate coupling of the filter media 3104 to the hub 3122. The hub 3122 includes a first connector 3124. The first connector 3124 extends at least partially circumferentially about the sleeve 3120. The first connector 3124 is configured to facilitate coupling of the core 3118 to the top endcap 3110.

The top endcap 3110 includes a second connector 3126. The second connector 3126 extends at least partially circumferentially about the sleeve 3120. The second connector 3126 is configured to facilitate coupling of the top endcap 3110 to the core 3118. For example, the first connector 3124 and the second connector 3126 may each be snap rings such that the top endcap 3110 may be coupled to the core 3118 by (i) placing the top endcap 3110 over the core 3118 and (ii) subsequently pressing the top endcap 3110 such that the second connector 3126 contacts the first connector 3124 thereby causing the first connector 3124 to be biased radially inward and/or the second connector 3126 to be biased radially outward and finally causing the first connector 3124 to be biased radially outward and/or the second connector 3126 to be biased radially inward. The top endcap 3110 can be removed (e.g., uncoupled, separated, etc.) from the core 3118 by biasing the second connector 3126 radially outward and subsequently lifting the top endcap 3110 from the core 3118.

The crankcase coalescer system 3100 includes an O-ring 3127 (e.g., seal, gasket, etc.). The O-ring 3127 is located between hub 3122 and the top endcap 3110 and functions as a seal to prevent gas from passing between the hub 3122 and the top endcap 3110 and as an axial spring to bias the second connector 3126 against the first connector 3124 and ensure that the top endcap 3110 remains coupled to the core 3118 during operation of the crankcase coalescer system 3100.

The top endcap 3110 also includes a top lip 3128, a plurality of vanes 3130 (e.g., ribs, flow guides, etc.), and a drain lip 3132. The top lip 3128 extends circumferentially about the top endcap 3110. The top lip 3128 is defined by a diameter less than a diameter of the outer circumferential wall 3112. The drain lip 3132 also extends circumferentially about the top endcap 3110. The drain lip 3132 is defined by a diameter less than a diameter of the outer circumferential wall 3112. The drain lip 3132 is contiguous with, and extends inwardly from, the outer circumferential wall 3112.

Each of the plurality of vanes 3130 is coupled to or integrated with the top lip 3128 and the drain lip 3132 and extends therebetween. Each of the plurality of vanes 3130 cooperates with the top lip 3128 and the drain lip 3132 to form a plurality of channels 3134 in the top endcap 3110. Each of the plurality of channels 3134 is configured to facilitate the flow of blowby gas from a top end of the filter media 3104 through the top endcap 3110. According to an example embodiment, each of the plurality of vanes 3130 is shaped (e.g., curved, rounded, slanted, angled, etc.) to facilitate swirling of the blowby gas flowing from the plurality of channels 3134. The plurality of vanes 3130 may be radially interspaced about the top lip 3128 at regular angular intervals (e.g., every 12°, every 15°, every 30°, etc.). According to various embodiments, at least one of the plurality of vanes 3130 is configured to extend downwards past the drain lip 3132 such that the at least one (e.g., one, three, four, etc.) of the plurality of vanes 3130 protrudes into the filter media 3104. An interaction between one of the plurality of vanes 3130 and the filter media 3104 functions to rotationally retain at least one of the top endcap 3110 and the filter media 3104 relative to the hub 3122, and therefore relative to the drive shaft 3106.

The bottom endcap 3108 includes a guide 3136. The guide 3136 is configured to receive the sleeve 3120 and the drive shaft 3106. In some embodiments, the drive shaft 1912 and/or the sleeve 3120 is press fit into the guide 3136. In other embodiments, the drive shaft 1912 and/or the sleeve 3120 is adhesively bonded to the guide 3136. In an example embodiment, the guide 3136 may be ultrasonically welded to the sleeve 3120.

The rotating coalescer element 3102 includes a bearing 3138 and a fastening ring 3140. The bearing 3138 is positioned between the guide 3136 and the fastening ring 3140. The fastening ring 3140 is configured to hold the bearing 3138 against the guide 3136 and the guide 3136 against the sleeve 3120. The fastening ring 3140 may include, for example, a spring (e.g., spring ring, etc.) and washers.

The bottom endcap 3108 includes a plurality of ribs 3142 (e.g., spokes, vanes, etc.). The plurality of ribs 3142 are each coupled to the guide 3136 and a bottom coupler 3144. The bottom coupler 3144 includes a coalescer inlet 3146 configured to receive the blowby gases and a lower wall 3148. The lower wall 3148 extends circumferentially about the bottom coupler 3144 and interfaces with the filter media 3104 on one side and is positioned in confronting relation with the outer circumferential wall 3112 on the other side. The openings 3114 are defined between the outer circumferential wall 3112 and the lower wall 3148.

An aperture 3147 is defined between each adjacent pair of the plurality of ribs 3142. The blowby gases flow from the coalescer inlet 3146 through the at least one aperture 3147 and into the filter media 3104. Each of the ribs 3142 functions as a fan blade (e.g., turbine blade, etc.) during rotation of the rotating coalescer element 3102. In this way, the ribs 3142 cause blowby gases to enter the coalescer inlet 3146 (e.g., by creating suction, etc.) and mitigate accumulation of dust on the bearing 3138. For example, the ribs 3142 may draw air between races and individual bearings (e.g., ball bearings, etc.) of the bearing 3138.

In various embodiments, the filter media 3104 is constructed from stainless steel foil that is approximately 0.025 mm thick and approximately 50 mm wide (e.g., for a filter media having a height of approximately 50 mm as measured along a center axis of the drive shaft 3106, etc.). When the filter media 3104 is constructed from a sheet of material, such as a sheet of foil, the sheet of material is wrapped about the hub 3122 in successive layers from a first layer, which interfaces directly with the hub 3122, and with any protuberances, recesses, or vertical slots on the hub 3122, to a final layer, which is adhered or welded to another layer of the filter media 3104.

Figure 32:
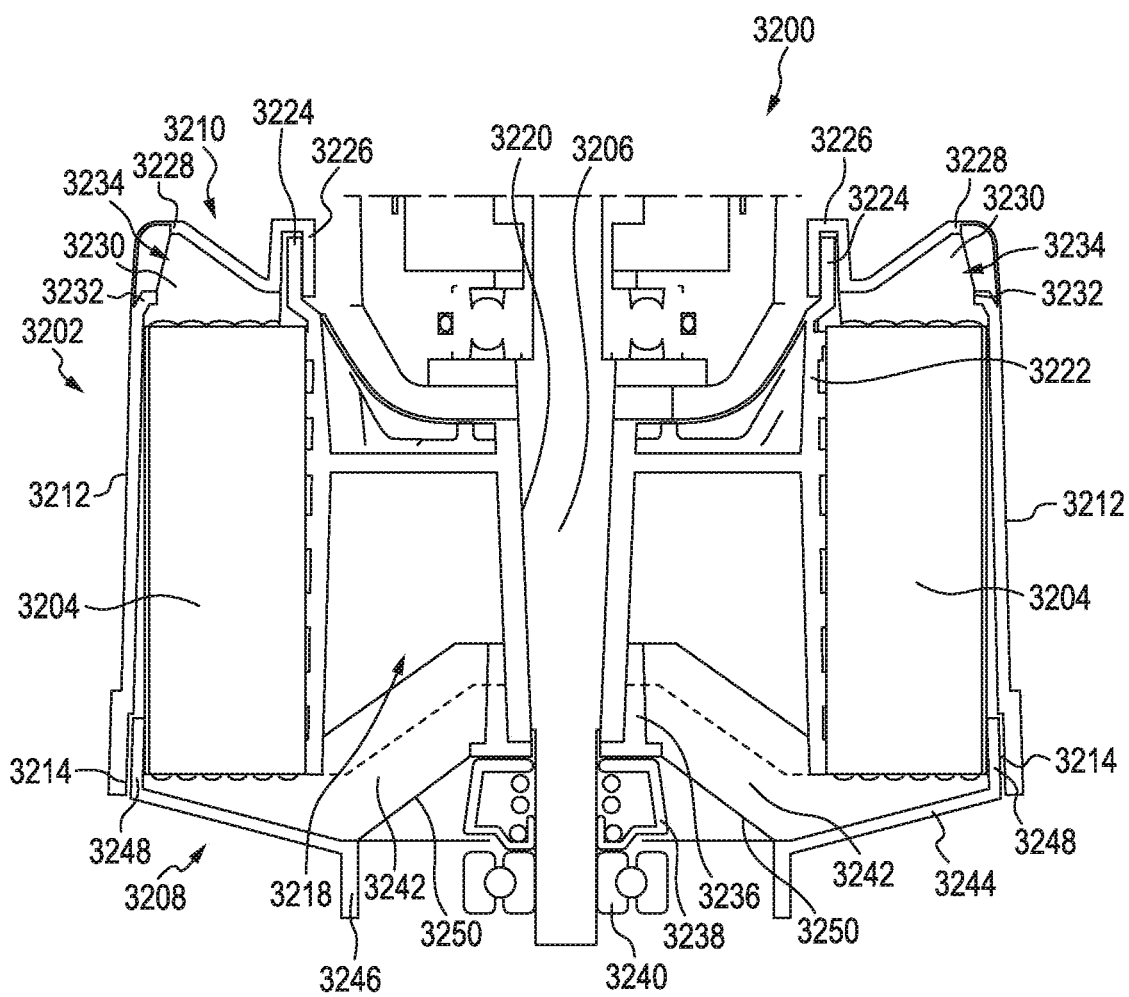
FIG. 32 shows a cross-sectional view of a coalescer element for a crankcase coalescer system according to another example embodiment.

Referring to FIG. 32, a cross-sectional view of a portion of a crankcase coalescer system 3200 is shown according to an example embodiment. The crankcase coalescer system 3200 is similar to the crankcase coalescer system 1900. The crankcase coalescer system 3200 generally processes blowby gases received from an internal combustion engine crankcase to remove aerosols, oils, and other particulate contained in the crankcase blowby gases. The crankcase coalescer system 3200 generally includes a housing having an inlet that receives crankcase blowby gases to be filtered, a central compartment having a rotating coalescer element 3202 installed therein, and an outlet that provides filtered blowby gases to the internal combustion engine (in a closed crankcase ventilation system) or to the ambient (in an open crankcase ventilation system).

The rotating coalescer element 3202 includes filter media 3204 having axial flow channels arranged in a direction generally parallel to an axis defined by a drive shaft 3206 of the crankcase coalescer system 3200. Accordingly, the rotating coalescer element 3202 is an axial flow coalescing element. The filter media 3204 may be frustoconical in overall shape such that the axial flow channels are not arranged in a direction that is generally parallel to an axis defined by the drive shaft 3206 of the crankcase coalescer system 3200. In some arrangements, the filter media 3204 is a wound filter media. Crankcase gas flows from the inlet, through a bottom endcap 3208 of the rotating coalescer element 3202, entering the filter media 3204 from a first, bottom end of the filter media 3204, through the filter media 3204 in an axial direction, out a second, top end of the filter media 3204, through a top endcap 3210 of the rotating coalescer element 3202, and out the outlet. Flow through the filter media 3204 is uniformly distributed on an axial plane adjacent to the inlet side of the filter media 3204.

Coalesced liquid (e.g., oil and aerosols separated from the crankcase blowby gas) passes through the layers of filter media 3204 in a radially outward direction (e.g., due to the centrifugal force impacted on the coalesced liquid by rotation of the rotating coalescer element 3202, etc.) and drains to a bottom region of the rotating coalescer element 3202 along an outer circumferential wall 3212 of the rotating coalescer element 3202, exiting through openings 3214 at the largest local radius from a center axis of the rotating coalescer element 3202 (e.g., the axis defined by the drive shaft 3206). The outer circumferential wall 3212 is impermeable such that the coalesced liquid may only exit the rotating coalescer element 3202 via the openings 3214. The openings 3214 may be crescent-shaped openings in cross-section. In some arrangements, the rotating coalescer element 3202 is positioned in a manner such that gravity assists the draining of the separated liquid from the housing.

The top side of the rotating coalescer element 3202, opposite the bottom side of the rotating coalescer element 3202 where the openings 3214 are positioned, may be referred to as a 'clean side.' After the coalesced liquid has drained from the rotating coalescer element 3202 (e.g., via the openings 3214, etc.), the coalesced liquid may be recirculated to a fluid system. For example, if the coalesced liquid is oil, the oil may be drained from the rotating coalescer element 3202 and recirculated to an oil system of an internal combustion engine system producing the blowby gas which is processed by the crankcase coalescer system 3200.

The rotating coalescer element 3202 includes a core 3218. The core 3218 includes a sleeve 3220 which is configured to receive and couple to the drive shaft 3206. In various embodiments, the sleeve 3220 is an overmolded bushing. For example, the sleeve 3220 may comprise a busing around which a portion of the rotating coalescer element 3202 is molded (e.g., in an injection molding process, in a blow molding process, in a vacuum molding process, etc.). The sleeve 3220 defines a center axis of the rotating coalescer element 3202. In various embodiments, the rotating coalescer element 3202 is rotationally symmetric about the center axis of the sleeve 3220 at regular intervals (e.g., every 30.41°, etc.).

In various embodiments, the drive shaft 3206 is tapered from a larger diameter farthest from the openings 3214 to a smaller diameter closest to the openings 3214. In various embodiments, the drive shaft 3206 has a two degree taper. In these embodiments, the sleeve 3220 has a taper matching the taper of the drive shaft 3206 and is tapered from a larger diameter farthest from the openings 3214 to a smaller diameter closest to the openings 3214. In various embodiments, the sleeve 3220 has a two degree taper. The taper of the drive shaft 3206 and the sleeve 3220 may be advantageous for transmitting torque from the drive shaft 3206 to the sleeve 3220, and thereby to the core 3218.

The core 3218 includes a hub 3222. The hub 3222 may be integral with, or coupled to, the sleeve 3220. The filter media 3204 is coupled to (e.g., secured directly to, etc.) the hub 3222. The hub 3222 may include protuberances, vertical slots, and/or recesses configured to facilitate coupling of the filter media 3204 to the hub 3222. The hub 3222 includes a flange 3224. The flange 3224 extends radially from the hub 3222 away from the openings 3214 and extends at least partially circumferentially about the sleeve 3220. The flange 3224 is configured to facilitate coupling of the core 3218 to the top endcap 3210.

The top endcap 3210 includes a receiving channel 3226. The receiving channel 3226 extends at least partially circumferentially about the sleeve 3220. The receiving channel 3226 is configured to facilitate coupling of the top endcap 3210 to the core 3218 by receiving the flange 3224. In one example, the top endcap 3210 may be coupled to the core 3218 by (i) placing the top endcap 3210 over the core 3218 and (ii) subsequently pressing the top endcap 3210 such that the flange 3224 is received within the receiving channel 3226. In an example embodiment, the receiving channel 3226 is laser welded to the flange 3224. In other embodiments, a fastener (e.g., clip, clamp, bolt, screw, band, etc.) maintains the receiving channel 3226 relative to the flange 3224. In such applications, the top endcap 3210 can be removed (e.g., uncoupled, separated, etc.) from the core 3218 by disengaging the fastener and subsequently lifting the top endcap 3210 from the core 3218.

The top endcap 3210 also includes a top lip 3228, a plurality of vanes 3230 (e.g., ribs, flow guides, etc.), and a drain lip 3232. The top lip 3228 extends circumferentially about the top endcap 3210. The top lip 3228 is defined by a diameter less than a diameter of the outer circumferential wall 3212. The drain lip 3232 also extends circumferentially about the top endcap 3210. The drain lip 3232 is defined by a diameter less than a diameter of the outer circumferential wall 3212. The drain lip 3232 is contiguous with, and extends inwardly from, the outer circumferential wall 3212.

Each of the plurality of vanes 3230 is coupled to or integrated with the top lip 3228 and the drain lip 3232 and extends therebetween. Each of the plurality of vanes 3230 cooperates with the top lip 3228 and the drain lip 3232 to form a plurality of channels 3234 in the top endcap 3210. Each of the plurality of channels 3234 is configured to facilitate the flow of blowby gas from a top end of the filter media 3204 through the top endcap 3210. According to an example embodiment, each of the plurality of vanes 3230 is shaped (e.g., curved, rounded, slanted, angled, etc.) to facilitate swirling of the blowby gas flowing from the plurality of channels 3234. The plurality of vanes 3230 may be radially interspaced about the top lip 3228 at regular angular intervals (e.g., every 12°, every 15°, every 30°, etc.). According to various embodiments, at least one of the plurality of vanes 3230 is configured to extend downwards past the drain lip 3232 such that the at least one (e.g., one, three, four, etc.) of the plurality of vanes 3230 protrudes into the filter media 3204. An interaction between one of the plurality of vanes 3230 and the filter media 3204 functions to rotationally retain at least one of the top endcap 3210 and the filter media 3204 relative to the hub 3222, and therefore relative to the drive shaft 3206.

The bottom endcap 3208 includes a guide 3236. The guide 3236 is configured to receive the sleeve 3220 and the drive shaft 3206. In some embodiments, the drive shaft 1912 and/or the sleeve 3220 is press fit into the guide 3236. In other embodiments, the drive shaft 1912 and/or the sleeve 3220 is adhesively bonded to the guide 3236. In an example embodiment, the guide 3236 may be ultrasonically welded to the sleeve 3220.

The rotating coalescer element 3202 includes a bearing 3238 and a fastening ring 3240. The bearing 3238 is positioned between the guide 3236 and the fastening ring 3240. The fastening ring 3240 is configured to hold the bearing 3238 against the guide 3236 and the guide 3236 against the sleeve 3220. The fastening ring 3240 may include, for example, a spring (e.g., spring ring, etc.) and washers.

The bottom endcap 3208 includes a plurality of ribs 3242 (e.g., spokes, vanes, etc.). The plurality of ribs 3242 are each coupled to the guide 3236 and a bottom coupler 3244. The bottom coupler 3244 includes a coalescer inlet 3246 configured to receive the blowby gases and a lower wall 3248. The lower wall 3248 extends circumferentially about the bottom coupler 3244 and interfaces with the filter media 3204 on one side and is positioned in confronting relation with the outer circumferential wall 3212 on the other side. The openings 3214 are defined between the outer circumferential wall 3212 and the lower wall 3248.

An aperture 3250 is defined between each adjacent pair of the plurality of ribs 3242. The blowby gases flow from the coalescer inlet 3246 through the at least one aperture 3250 and into the filter media 3204. Each of the ribs 3242 functions as a fan blade (e.g., turbine blade, etc.) during rotation of the rotating coalescer element 3202. In this way, the ribs 3242 cause blowby gases to enter the coalescer inlet 3246 (e.g., by creating suction, etc.) and mitigate accumulation of dust on the bearing 3238. For example, the ribs 3242 may draw air between races and individual bearings (e.g., ball bearings, etc.) of the bearing 3238.

In various embodiments, the filter media 3204 is constructed from stainless steel foil that is approximately 0.025 mm thick and approximately 50 mm wide (e.g., for a filter media having a height of approximately 50 mm as measured along a center axis of the drive shaft 3206, etc.). When the filter media 3204 is constructed from a sheet of material, such as a sheet of foil, the sheet of material is wrapped about the hub 3222 in successive layers from a first layer, which interfaces directly with the hub 3222, and with any protuberances, recesses, or vertical slots on the hub 3222, to a final layer, which is adhered or welded to another layer of the filter media 3204.

Figure 33:
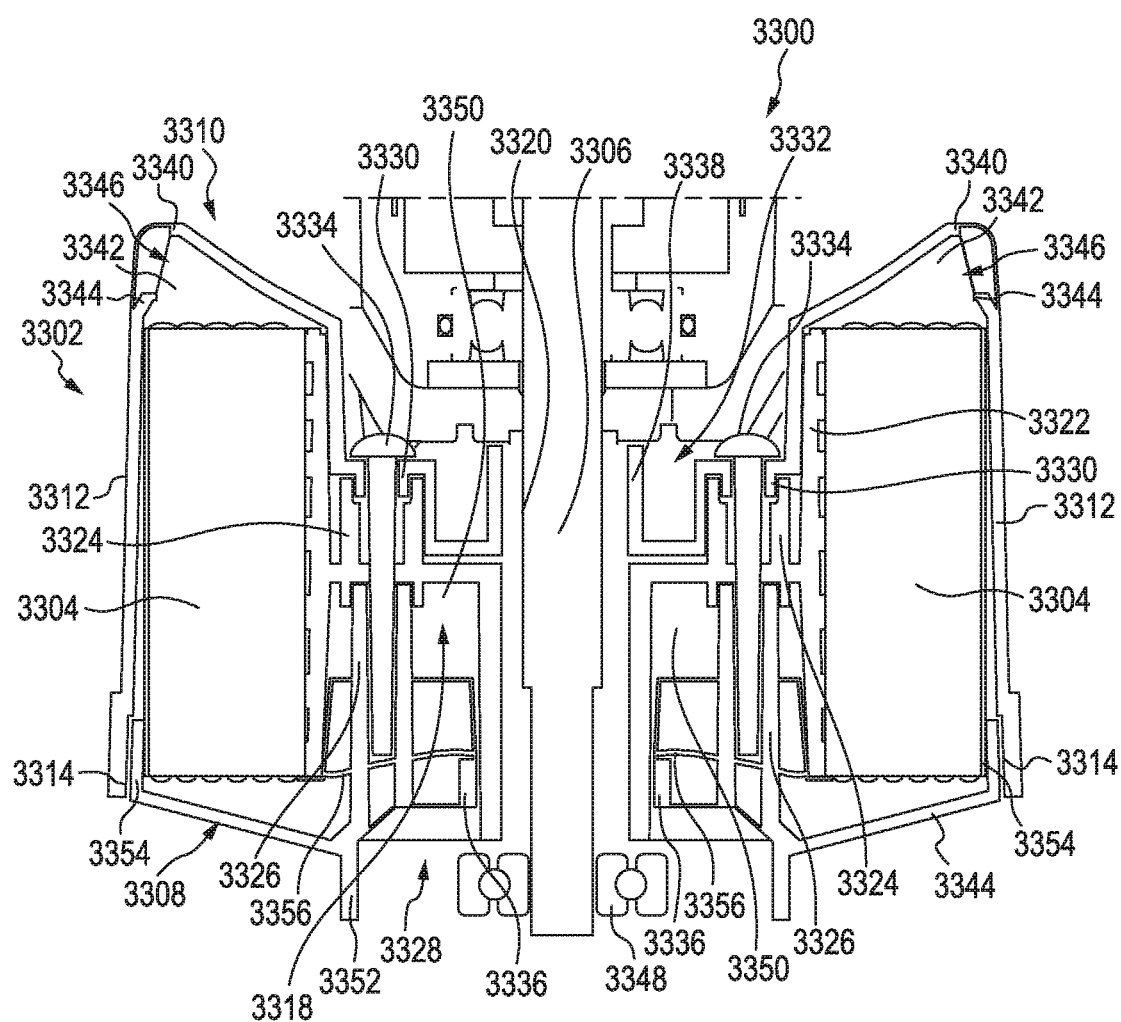
FIG. 33 shows a cross-sectional view of a coalescer element for a crankcase coalescer system according to another example embodiment.

Referring to FIG. 33, a cross-sectional view of a portion of a crankcase coalescer system 3300 is shown according to an example embodiment. The crankcase coalescer system 3300 is similar to the crankcase coalescer system 1900. The crankcase coalescer system 3300 generally processes blowby gases received from an internal combustion engine crankcase to remove aerosols, oils, and other particulate contained in the crankcase blowby gases. The crankcase coalescer system 3300 generally includes a housing having an inlet that receives crankcase blowby gases to be filtered, a central compartment having a rotating coalescer element 3302 installed therein, and an outlet that provides filtered blowby gases to the internal combustion engine (in a closed crankcase ventilation system) or to the ambient (in an open crankcase ventilation system).

The rotating coalescer element 3302 includes filter media 3304 having axial flow channels arranged in a direction generally parallel to an axis defined by a drive shaft 3306 of the crankcase coalescer system 3300. Accordingly, the rotating coalescer element 3302 is an axial flow coalescing element. The filter media 3304 may be frustoconical in overall shape such that the axial flow channels are not arranged in a direction that is generally parallel to an axis defined by the drive shaft 3306 of the crankcase coalescer system 3300. In some arrangements, the filter media 3304 is a wound filter media. Crankcase gas flows from the inlet, through a bottom endcap 3308 of the rotating coalescer element 3302, entering the filter media 3304 from a first, bottom end of the filter media 3304, through the filter media 3304 in an axial direction, out a second, top end of the filter media 3304, through a top endcap 3310 of the rotating coalescer element 3302, and out the outlet. Flow through the filter media 3304 is uniformly distributed on an axial plane adjacent to the inlet side of the filter media 3304.

Coalesced liquid (e.g., oil and aerosols separated from the crankcase blowby gas) passes through the layers of filter media 3304 in a radially outward direction (e.g., due to the centrifugal force impacted on the coalesced liquid by rotation of the rotating coalescer element 3302, etc.) and drains to a bottom region of the rotating coalescer element 3302 along an outer circumferential wall 3312 of the rotating coalescer element 3302, exiting through openings 3314 at the largest local radius from a center axis of the rotating coalescer element 3302 (e.g., the axis defined by the drive shaft 3306). The outer circumferential wall 3312 is impermeable such that the coalesced liquid may only exit the rotating coalescer element 3302 via the openings 3314. The openings 3314 may be crescent-shaped openings in cross-section. In some arrangements, the rotating coalescer element 3302 is positioned in a manner such that gravity assists the draining of the separated liquid from the housing.

The top side of the rotating coalescer element 3302, opposite the bottom side of the rotating coalescer element 3302 where the openings 3314 are positioned, may be referred to as a 'clean side.' After the coalesced liquid has drained from the rotating coalescer element 3302 (e.g., via the openings 3314, etc.), the coalesced liquid may be recirculated to a fluid system. For example, if the coalesced liquid is oil, the oil may be drained from the rotating coalescer element 3302 and recirculated to an oil system of an internal combustion engine system producing the blowby gas which is processed by the crankcase coalescer system 3300.

The rotating coalescer element 3302 includes a core 3318. The core 3318 is coupled to the bottom endcap 3308 and the top endcap 3310. The core 3318 includes a hub sleeve 3320 which is configured to receive and couple to the drive shaft 3306. In various embodiments, the hub sleeve 3320 is an overmolded bushing. For example, the hub sleeve 3320 may comprise a busing around which a portion of the rotating coalescer element 3302 is molded (e.g., in an injection molding process, in a blow molding process, in a vacuum molding process, etc.). The hub sleeve 3320 defines a center axis of the rotating coalescer element 3302. In various embodiments, the rotating coalescer element 3302 is rotationally symmetric about the center axis of the hub sleeve 3320 at regular intervals (e.g., every 30.41°, etc.).

The drive shaft 3306 may be tapered from a larger diameter farthest from the openings 3314 to a smaller diameter closest to the openings 3314. In various embodiments, the drive shaft 3306 has a two degree taper. In such applications, the hub sleeve 3320 has a taper matching the taper of the drive shaft 3306 and is tapered from a larger diameter farthest from the openings 3314 to a smaller diameter closest to the openings 3314. For example, the hub sleeve 3320 may have a two degree taper. The taper of the drive shaft 3306 and the hub sleeve 3320 may be advantageous for transmitting torque from the drive shaft 3306 to the hub sleeve 3320, and thereby to the core 3318.

The core 3318 includes a hub 3322. The hub 3322 may be integral with, or coupled to, the hub sleeve 3320. The filter media 3304 is coupled to (e.g., secured directly to, etc.) the hub 3322. The hub 3322 may include protuberances, vertical slots, and/or recesses configured to facilitate coupling of the filter media 3304 to the hub 3322. The hub 3322 includes a plurality of hub axial conduits 3324. Each of the hub axial conduits 3324 is configured to interface on one end with a bottom endcap axial conduit 3326 of a bottom coupler 3328 of the bottom endcap 3308 and on the other end with a top endcap axial conduit 3330 of a top coupler 3332 of the top endcap 3310 such that a fastener 3334 (e.g., screw, rivet, bolt, etc.) can be inserted through the top endcap axial conduit 3330, through the hub axial conduit 3324, and through the bottom endcap axial conduit 3326 to couple the bottom endcap 3308, the core 3318, and the top endcap 3310 together.

The drive shaft 3306 protrudes through each of the top coupler 3332, the hub sleeve 3320, and the bottom coupler 3328. The bottom coupler 3328 includes a bottom coupler sleeve 3336. The bottom coupler sleeve 3336 is centered on the center axis of the hub sleeve 3320 (e.g., the center axis of the bottom coupler sleeve 3336 is coincident with the center axis of the hub sleeve 3320, etc.). The top coupler 3332 includes a top coupler sleeve 3338. The top coupler sleeve 3338 is centered on the center axis of the hub sleeve 3320 (e.g., the center axis of the top coupler sleeve 3338 is coincident with the center axis of the hub sleeve 3320, etc.). When the bottom endcap 3308 and the top endcap 3310 are each coupled to the core 3318, the hub sleeve 3320 is received within the bottom coupler sleeve 3336 and the drive shaft 3306 is received within the top coupler sleeve 3338 and the hub sleeve 3320. In some embodiments, the drive shaft 3306 is press fit into the hub sleeve 3320 and/or the top coupler sleeve 3338. In other embodiments, the drive shaft 3306 is adhesively bonded to the hub sleeve 3320 and/or the top coupler sleeve 3338. In an example embodiment, the drive shaft 3306 may be ultrasonically welded to the hub sleeve 3320 and/or the top coupler sleeve 3338.

Each of the hub sleeve 3320, the bottom coupler sleeve 3336, and the top coupler sleeve 3338 are defined by an inner diameter and an outer diameter. In various embodiments, the inner diameter of the hub sleeve 3320 is approximately equal to the inner diameter of the top coupler sleeve 3338 and the inner diameter of the bottom coupler sleeve 3336 is equal to the sum of a clearance amount (e.g., 1% of the inner diameter of the bottom coupler sleeve 3336, 0.5% of the inner diameter of the bottom coupler sleeve 3336, etc.) and the outer diameter of the hub sleeve 3320.

The top endcap 3310 also includes a top lip 3340, a plurality of vanes 3342 (e.g., ribs, flow guides, etc.), and a drain lip 3344. The top lip 3340 extends circumferentially about the top endcap 3310. The top lip 3340 is defined by a diameter less than a diameter of the outer circumferential wall 3312. The drain lip 3344 also extends circumferentially about the top endcap 3310. The drain lip 3344 is defined by a diameter less than a diameter of the outer circumferential wall 3312. The drain lip 3344 is contiguous with, and extends inwardly from, the outer circumferential wall 3312.

Each of the plurality of vanes 3342 is coupled to or integrated with the top lip 3340 and the drain lip 3344 and extends therebetween. Each of the plurality of vanes 3342 cooperates with the top lip 3340 and the drain lip 3344 to form a plurality of channels 3346 in the top endcap 3310. Each of the plurality of channels 3346 is configured to facilitate the flow of blowby gas from a top end of the filter media 3304 through the top endcap 3310. According to an example embodiment, each of the plurality of vanes 3342 is shaped (e.g., curved, rounded, slanted, angled, etc.) to facilitate swirling of the blowby gas flowing from the plurality of channels 3346. The plurality of vanes 3342 may be radially interspaced about the top lip 3340 at regular angular intervals (e.g., every 12°, every 15°, every 30°, etc.). According to various embodiments, at least one of the plurality of vanes 3342 is configured to extend downwards past the drain lip 3344 such that the at least one (e.g., one, three, four, etc.) of the plurality of vanes 3342 protrudes into the filter media 3304. An interaction between one of the plurality of vanes 3342 and the filter media 3304 functions to rotationally retain at least one of the top endcap 3310 and the filter media 3304 relative to the hub 3322, and therefore relative to the drive shaft 3306.

The rotating coalescer element 3302 includes a fastening ring 3348. The fastening ring 3348 is configured to retain the hub sleeve 3320 relative to the drive shaft 3306. In this way, the fastening ring 3348 is configured to retain the top endcap 3310, the core 3318, and the bottom endcap 3308 relative to the drive shaft 3306. The fastening ring 3348 may include, for example, a spring (e.g., spring ring, etc.) and washers.

The bottom endcap 3308 includes a plurality of ribs 3350 (e.g., spokes, vanes, etc.). The plurality of ribs 3350 are each coupled to or integrated with the bottom coupler 3328. The bottom coupler 3328 includes a coalescer inlet 3352 configured to receive the blowby gases and a lower wall 3354. The lower wall 3354 extends circumferentially about the bottom coupler 3328 and interfaces with the filter media 3304 on one side and is positioned in confronting relation with the outer circumferential wall 3312 on the other side. The openings 3314 are defined between the outer circumferential wall 3312 and the lower wall 3354.

An aperture 3356 is defined between each adjacent pair of the plurality of ribs 3350. The blowby gases flow from the coalescer inlet 3352 through the at least one aperture 3356 and into the filter media 3304. Each of the ribs 3350 functions as a fan blade (e.g., turbine blade, etc.) during rotation of the rotating coalescer element 3302. In this way, the ribs 3350 cause blowby gases to enter the coalescer inlet 3146 (e.g., by creating suction, etc.).

In various embodiments, the filter media 3304 is constructed from stainless steel foil that is approximately 0.025 mm thick and approximately 50 mm wide (e.g., for a filter media having a height of approximately 50 mm as measured along a center axis of the drive shaft 3306, etc.). When the filter media 3304 is constructed from a sheet of material, such as a sheet of foil, the sheet of material is wrapped about the hub 3322 in successive layers from a first layer, which interfaces directly with the hub 3322, and with any protuberances, recesses, or vertical slots on the hub 3322, to a final layer, which is adhered or welded to another layer of the filter media 3304.

Figure 34:
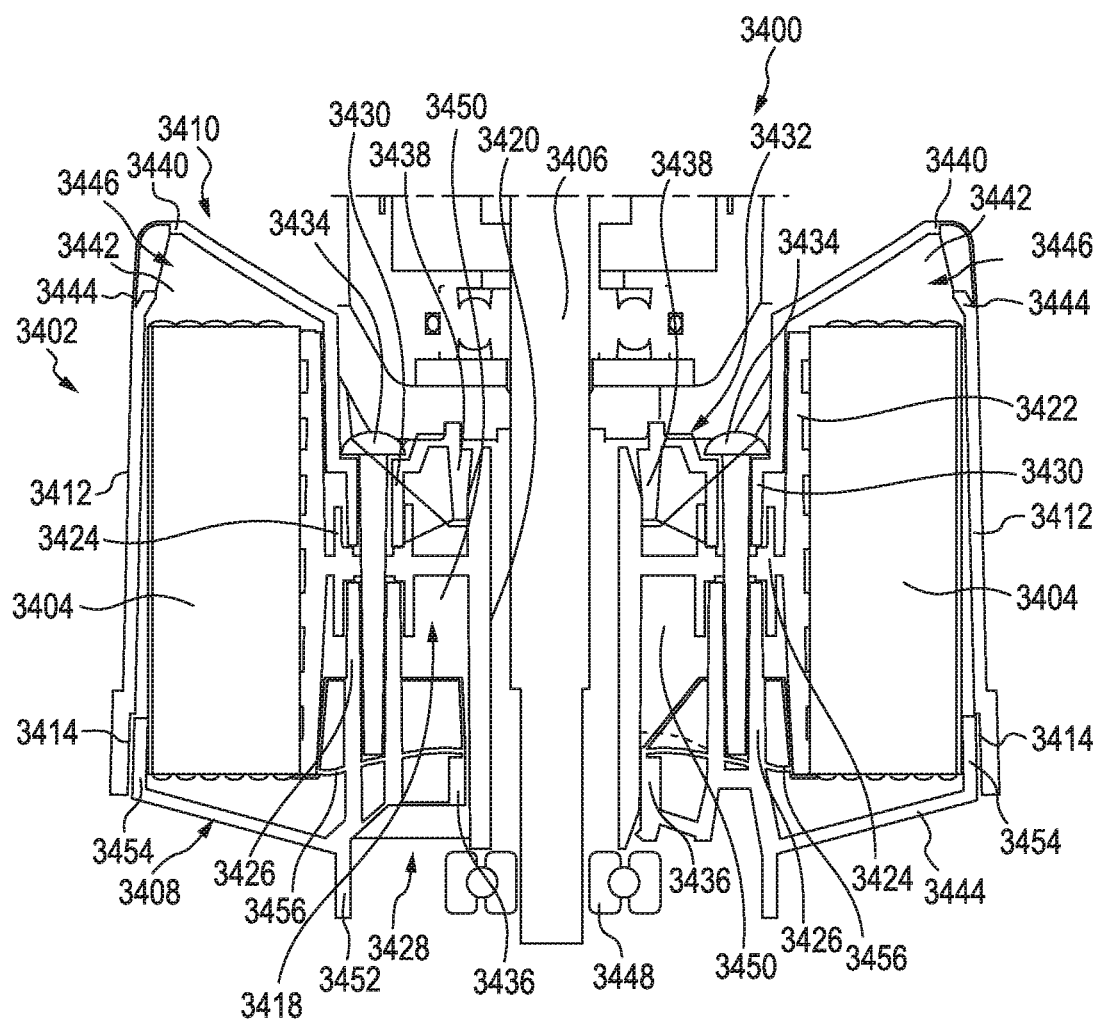
FIG. 34 shows a cross-sectional view of a coalescer element for a crankcase coalescer system according to another example embodiment.

Referring to FIG. 34, a cross-sectional view of a portion of a crankcase coalescer system 3400 is shown according to an example embodiment. The crankcase coalescer system 3400 is similar to the crankcase coalescer system 1900. The crankcase coalescer system 3400 generally processes blowby gases received from an internal combustion engine crankcase to remove aerosols, oils, and other particulate contained in the crankcase blowby gases. The crankcase coalescer system 3400 generally includes a housing having an inlet that receives crankcase blowby gases to be filtered, a central compartment having a rotating coalescer element 3402 installed therein, and an outlet that provides filtered blowby gases to the internal combustion engine (in a closed crankcase ventilation system) or to the ambient (in an open crankcase ventilation system).

The rotating coalescer element 3402 includes filter media 3404 having axial flow channels arranged in a direction generally parallel to an axis defined by a drive shaft 3406 of the crankcase coalescer system 3400. Accordingly, the rotating coalescer element 3402 is an axial flow coalescing element. The filter media 3404 may be frustoconical in overall shape such that the axial flow channels are not arranged in a direction that is generally parallel to an axis defined by the drive shaft 3406 of the crankcase coalescer system 3400. In some arrangements, the filter media 3404 is a wound filter media. Crankcase gas flows from the inlet, through a bottom endcap 3408 of the rotating coalescer element 3402, entering the filter media 3404 from a first, bottom end of the filter media 3404, through the filter media 3404 in an axial direction, out a second, top end of the filter media 3404, through a top endcap 3410 of the rotating coalescer element 3402, and out the outlet. Flow through the filter media 3404 is uniformly distributed on an axial plane adjacent to the inlet side of the filter media 3404.

Coalesced liquid (e.g., oil and aerosols separated from the crankcase blowby gas) passes through the layers of filter media 3404 in a radially outward direction (e.g., due to the centrifugal force impacted on the coalesced liquid by rotation of the rotating coalescer element 3402, etc.) and drains to a bottom region of the rotating coalescer element 3402 along an outer circumferential wall 3412 of the rotating coalescer element 3402, exiting through openings 3414 at the largest local radius from a center axis of the rotating coalescer element 3402 (e.g., the axis defined by the drive shaft 3406). The outer circumferential wall 3412 is impermeable such that the coalesced liquid may only exit the rotating coalescer element 3402 via the openings 3414. The openings 3414 may be crescent-shaped openings in cross-section. In some arrangements, the rotating coalescer element 3402 is positioned in a manner such that gravity assists the draining of the separated liquid from the housing.

The top side of the rotating coalescer element 3402, opposite the bottom side of the rotating coalescer element 3402 where the openings 3414 are positioned, may be referred to as a 'clean side.' After the coalesced liquid has drained from the rotating coalescer element 3402 (e.g., via the openings 3414, etc.), the coalesced liquid may be recirculated to a fluid system. For example, if the coalesced liquid is oil, the oil may be drained from the rotating coalescer element 3402 and recirculated to an oil system of an internal combustion engine system producing the blowby gas which is processed by the crankcase coalescer system 3400.

The rotating coalescer element 3402 includes a core 3418. The core 3418 is coupled to the bottom endcap 3408 and the top endcap 3410. The core 3418 includes a hub sleeve 3420 which is configured to receive and couple to the drive shaft 3406. In various embodiments, the hub sleeve 3420 is an overmolded bushing. For example, the hub sleeve 3420 may comprise a busing around which a portion of the rotating coalescer element 3402 is molded (e.g., in an injection molding process, in a blow molding process, in a vacuum molding process, etc.). The hub sleeve 3420 defines a center axis of the rotating coalescer element 3402. In various embodiments, the rotating coalescer element 3402 is rotationally symmetric about the center axis of the hub sleeve 3420 at regular intervals (e.g., every 30.41°, etc.).

The drive shaft 3406 may be tapered from a larger diameter farthest from the openings 3414 to a smaller diameter closest to the openings 3414. In various embodiments, the drive shaft 3406 has a two degree taper. In such applications, the hub sleeve 3420 has a taper matching the taper of the drive shaft 3406 and is tapered from a larger diameter farthest from the openings 3414 to a smaller diameter closest to the openings 3414. For example, the hub sleeve 3420 may have a two degree taper. The taper of the drive shaft 3406 and the hub sleeve 3420 may be advantageous for transmitting torque from the drive shaft 3406 to the hub sleeve 3420, and thereby to the core 3418.

The core 3418 includes a hub 3422. The hub 3422 may be integral with, or coupled to, the hub sleeve 3420. The filter media 3404 is coupled to (e.g., secured directly to, etc.) the hub 3422. The hub 3422 may include protuberances, vertical slots, and/or recesses configured to facilitate coupling of the filter media 3404 to the hub 3422. The hub 3422 includes a plurality of hub axial conduits 3424. Each of the hub axial conduits 3424 is configured to interface on one end with a bottom endcap axial conduit 3426 of a bottom coupler 3428 of the bottom endcap 3408 and on the other end with a top endcap axial conduit 3430 of a top coupler 3432 of the top endcap 3410 such that a fastener 3434 (e.g., screw, rivet, bolt, etc.) can be inserted through the top endcap axial conduit 3430, through the hub axial conduit 3424, and through the bottom endcap axial conduit 3426 to couple the bottom endcap 3408, the core 3418, and the top endcap 3410 together.

The drive shaft 3406 protrudes through each of the top coupler 3432, the hub sleeve 3420, and the bottom coupler 3428. The bottom coupler 3428 includes a bottom coupler sleeve 3436. The bottom coupler sleeve 3436 is centered on the center axis of the hub sleeve 3420 (e.g., the center axis of the bottom coupler sleeve 3436 is coincident with the center axis of the hub sleeve 3420, etc.). The top coupler 3432 includes a top coupler sleeve 3438. The top coupler sleeve 3438 is centered on the center axis of the hub sleeve 3420 (e.g., the center axis of the top coupler sleeve 3438 is coincident with the center axis of the hub sleeve 3420, etc.). When the bottom endcap 3408 and the top endcap 3410 are each coupled to the core 3418, the hub sleeve 3420 is received within each of the bottom coupler sleeve 3436 and the top coupler sleeve 3438. In some embodiments, the drive shaft 3406 is press fit into the hub sleeve 3420. In other embodiments, the drive shaft 3406 is adhesively bonded to the hub sleeve 3420. In an example embodiment, the drive shaft 3406 may be ultrasonically welded to the hub sleeve 3420.

Each of the hub sleeve 3420, the bottom coupler sleeve 3436, and the top coupler sleeve 3438 are defined by an inner diameter and an outer diameter. In various embodiments, the outer diameter of the hub sleeve 3420 is approximately equal to each of the inner diameter of the top coupler sleeve 3438 and the inner diameter of the bottom coupler sleeve 3436.

The top endcap 3410 also includes a top lip 3440, a plurality of vanes 3442 (e.g., ribs, flow guides, etc.), and a drain lip 3444. The top lip 3440 extends circumferentially about the top endcap 3410. The top lip 3440 is defined by a diameter less than a diameter of the outer circumferential wall 3412. The drain lip 3444 also extends circumferentially about the top endcap 3410. The drain lip 3444 is defined by a diameter less than a diameter of the outer circumferential wall 3412. The drain lip 3444 is contiguous with, and extends inwardly from, the outer circumferential wall 3412.

Each of the plurality of vanes 3442 is coupled to or integrated with the top lip 3440 and the drain lip 3444 and extends therebetween. Each of the plurality of vanes 3442 cooperates with the top lip 3440 and the drain lip 3444 to form a plurality of channels 3446 in the top endcap 3410. Each of the plurality of channels 3446 is configured to facilitate the flow of blowby gas from a top end of the filter media 3404 through the top endcap 3410. According to an example embodiment, each of the plurality of vanes 3442 is shaped (e.g., curved, rounded, slanted, angled, etc.) to facilitate swirling of the blowby gas flowing from the plurality of channels 3446. The plurality of vanes 3442 may be radially interspaced about the top lip 3440 at regular angular intervals (e.g., every 12°, every 15°, every 30°, etc.). According to various embodiments, at least one of the plurality of vanes 3442 is configured to extend downwards past the drain lip 3444 such that the at least one (e.g., one, three, four, etc.) of the plurality of vanes 3442 protrudes into the filter media 3404. An interaction between one of the plurality of vanes 3442 and the filter media 3404 functions to rotationally retain at least one of the top endcap 3410 and the filter media 3404 relative to the hub 3422, and therefore relative to the drive shaft 3406.

The rotating coalescer element 3402 includes a fastening ring 3448. The fastening ring 3448 is configured to retain the hub sleeve 3420 relative to the drive shaft 3406. In this way, the fastening ring 3448 is configured to retain the top endcap 3410, the core 3418, and the bottom endcap 3408 relative to the drive shaft 3406. The fastening ring 3448 may include, for example, a spring (e.g., spring ring, etc.) and washers.

The bottom endcap 3408 includes a plurality of ribs 3450 (e.g., spokes, vanes, etc.). The plurality of ribs 3450 are each coupled to or integrated with the bottom coupler 3428. The bottom coupler 3428 includes a coalescer inlet 3452 configured to receive the blowby gases and a lower wall 3454. The lower wall 3454 extends circumferentially about the bottom coupler 3428 and interfaces with the filter media 3404 on one side and is positioned in confronting relation with the outer circumferential wall 3412 on the other side. The openings 3414 are defined between the outer circumferential wall 3412 and the lower wall 3454.

An aperture 3456 is defined between each adjacent pair of the plurality of ribs 3450. The blowby gases flow from the coalescer inlet 3452 through the at least one aperture 3456 and into the filter media 3404. Each of the ribs 3450 functions as a fan blade (e.g., turbine blade, etc.) during rotation of the rotating coalescer element 3402. In this way, the ribs 3450 cause blowby gases to enter the coalescer inlet 3452 (e.g., by creating suction, etc.).

In various embodiments, the filter media 3404 is constructed from stainless steel foil that is approximately 0.03 mm thick and approximately 50 mm wide (e.g., for a filter media having a height of approximately 50 mm as measured along a center axis of the drive shaft 3406, etc.). In other embodiments, the filter media 3404 is constructed from stainless steel foil that is approximately 0.03 mm thick and approximately 70 mm wide (e.g., for a filter media having a height of approximately 70 mm as measured along a center axis of the drive shaft 3406, etc.). When the filter media 3404 is constructed from a sheet of material, such as a sheet of foil, the sheet of material is wrapped about the hub 3422 in successive layers from a first layer, which interfaces directly with the hub 3422, and with any protuberances, recesses, or vertical slots on the hub 3422, to a final layer, which is adhered or welded to another layer of the filter media 3404.

Figure 35:
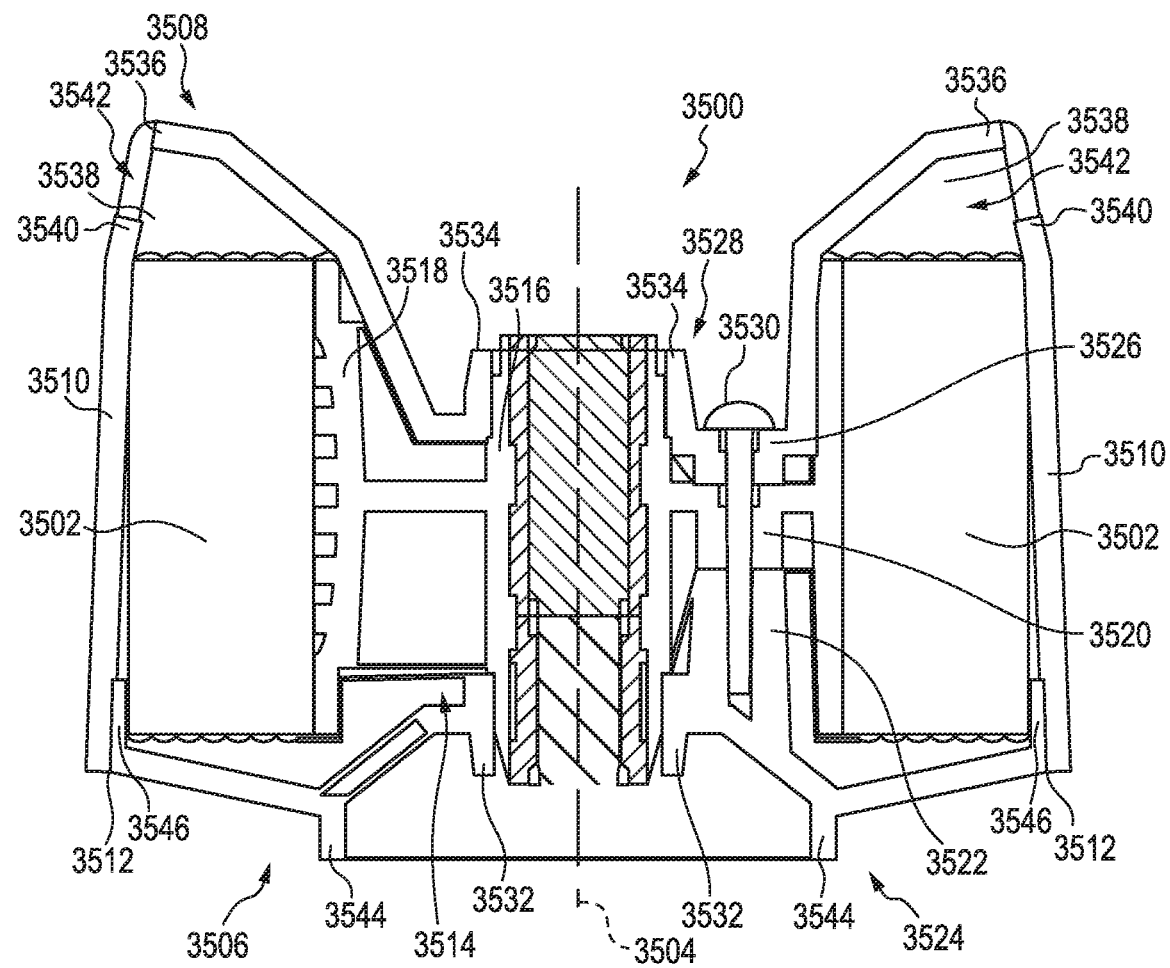
FIG. 35 shows a cross-sectional view of a coalescer element for a crankcase coalescer system according to another example embodiment.

Referring to FIG. 35, a rotating coalescer element 3500 for use in a crankcase coalescer system similar to the crankcase coalescer system 1900 in shown according to an example embodiment. The rotating coalescer element 3500 is generally installed in a central compartment of a crankcase coalescer system.

The rotating coalescer element 3500 includes filter media 3502 having axial flow channels arranged in a direction generally parallel to a center axis 3504 of the rotating coalescer element 3500. When the rotating coalescer element 3500 is positioned within a crankcase coalescer system, the center axis 3504 is coincident with a center axis of a drive shaft coupled to the rotating coalescer element 3500. Accordingly, the rotating coalescer element 3500 is an axial flow coalescing element. The filter media 3502 may be frustoconical in overall shape such that the axial flow channels are not arranged in a direction that is generally parallel to the center axis 3504. In some arrangements, the filter media 3502 is a wound filter media. Crankcase gas flows from the inlet, through a bottom endcap 3506 of the rotating coalescer element 3500, entering the filter media 3502 from a first, bottom end of the filter media 3502, through the filter media 3502 in an axial direction, out a second, top end of the filter media 3502, through a top endcap 3508 of the rotating coalescer element 3500, and out the outlet. Flow through the filter media 3502 is uniformly distributed on an axial plane adjacent to the inlet side of the filter media 3502.

Coalesced liquid (e.g., oil and aerosols separated from the crankcase blowby gas) passes through the layers of filter media 3502 in a radially outward direction (e.g., due to the centrifugal force impacted on the coalesced liquid by rotation of the rotating coalescer element 3500, etc.) and drains to a bottom region of the rotating coalescer element 3500 along an outer circumferential wall 3510 of the rotating coalescer element 3500, exiting through openings 3512 at the largest local radius from the center axis 3504. The outer circumferential wall 3510 is impermeable such that the coalesced liquid may only exit the rotating coalescer element 3500 via the openings 3512. The openings 3512 may be crescent-shaped openings in cross-section. In some arrangements, the rotating coalescer element 3500 is positioned in a manner such that gravity assists the draining of the separated liquid from the housing.

The top side of the rotating coalescer element 3500, opposite the bottom side of the rotating coalescer element 3500 where the openings 3512 are positioned, may be referred to as a 'clean side.' After the coalesced liquid has drained from the rotating coalescer element 3500 (e.g., via the openings 3512, etc.), the coalesced liquid may be recirculated to a fluid system. For example, if the coalesced liquid is oil, the oil may be drained from the rotating coalescer element 3500 and recirculated to an oil system of an internal combustion engine system producing the blowby gas which is processed by the crankcase coalescer system within which the rotating coalescer element 3500 is positioned.

The rotating coalescer element 3500 includes a core 3514. The core 3514 is coupled to the bottom endcap 3506 and the top endcap 3508. The core 3514 includes a hub sleeve 3516 which is configured to receive and couple to a drive shaft. In various embodiments, the hub sleeve 3516 is an overmolded bushing. For example, the hub sleeve 3516 may comprise a busing around which a portion of the rotating coalescer element 3500 is molded (e.g., in an injection molding process, in a blow molding process, in a vacuum molding process, etc.). The hub sleeve 3516 is centered on the center axis 3504 and defines a center axis of the rotating coalescer element 3500. In various embodiments, the rotating coalescer element 3500 is rotationally symmetric about the center axis of the hub sleeve 3516 at regular intervals (e.g., every 30.41°, etc.).

The hub sleeve 3516 may have a taper matching the taper of a drive shaft and is tapered from a larger diameter farthest from the openings 3512 to a smaller diameter closest to the openings 3512. For example, the hub sleeve 3516 may have a two degree taper. The taper of the hub sleeve 3516 may be advantageous for transmitting torque from a drive shaft to the hub sleeve 3516, and thereby to the core 3514.

The core 3514 includes a hub 3518. The hub 3518 may be integral with, or coupled to, the hub sleeve 3516. The filter media 3502 is coupled to (e.g., secured directly to, etc.) the hub 3518. The hub 3518 may include protuberances, vertical slots, and/or recesses configured to facilitate coupling of the filter media 3502 to the hub 3518. The hub 3518 includes a plurality of hub axial conduits 3520. Each of the hub axial conduits 3520 is configured to interface on one end with a bottom endcap axial conduit 3522 of a bottom coupler 3524 of the bottom endcap 3506 and on the other end with a top endcap axial conduit 3526 of a top coupler 3528 of the top endcap 3508 such that a fastener 3530 (e.g., screw, rivet, bolt, etc.) can be inserted through the top endcap axial conduit 3526, through the hub axial conduit 3520, and through the bottom endcap axial conduit 3522 to couple the bottom endcap 3506, the core 3514, and the top endcap 3508 together.

The bottom coupler 3524 includes a bottom coupler sleeve 3532. The bottom coupler sleeve 3532 is centered on the center axis 3504. The top coupler 3528 includes a top coupler sleeve 3534. The top coupler sleeve 3534 is centered on the center axis 3504. When the bottom endcap 3506 and the top endcap 3508 are each coupled to the core 3514, the hub sleeve 3516 is received within each of the bottom coupler sleeve 3532 and the top coupler sleeve 3534. The hub sleeve 3516 is configured to receive a drive shaft and to be coupled to a drive shaft (e.g., via press fit, via adhesive bonding, via ultrasonic welding, etc.).

Each of the hub sleeve 3516, the bottom coupler sleeve 3532, and the top coupler sleeve 3534 are defined by an inner diameter and an outer diameter. In various embodiments, the outer diameter of the hub sleeve 3516 is approximately equal to each of the inner diameter of the top coupler sleeve 3534 and the inner diameter of the bottom coupler sleeve 3532.

The top endcap 3508 also includes a top lip 3536, a plurality of vanes 3538 (e.g., ribs, flow guides, etc.), and a drain lip 3540. The top lip 3536 extends circumferentially about the top endcap 3508. The top lip 3536 is defined by a diameter less than a diameter of the outer circumferential wall 3510. The drain lip 3540 also extends circumferentially about the top endcap 3508. The drain lip 3540 is defined by a diameter less than a diameter of the outer circumferential wall 3510. The drain lip 3540 is contiguous with, and extends inwardly from, the outer circumferential wall 3510.

Each of the plurality of vanes 3538 is coupled to or integrated with the top lip 3536 and the drain lip 3540 and extends therebetween. Each of the plurality of vanes 3538 cooperates with the top lip 3536 and the drain lip 3540 to form a plurality of channels 3542 in the top endcap 3508. Each of the plurality of channels 3542 is configured to facilitate the flow of blowby gas from a top end of the filter media 3502 through the top endcap 3508. According to an example embodiment, each of the plurality of vanes 3538 is shaped (e.g., curved, rounded, slanted, angled, etc.) to facilitate swirling of the blowby gas flowing from the plurality of channels 3542. The plurality of vanes 3538 may be radially interspaced about the top lip 3536 at regular angular intervals (e.g., every 12°, every 15°, every 30°, etc.). According to various embodiments, at least one of the plurality of vanes 3538 is configured to extend downwards past the drain lip 3540 such that the at least one (e.g., one, three, four, etc.) of the plurality of vanes 3538 protrudes into the filter media 3502. An interaction between one of the plurality of vanes 3538 and the filter media 3502 functions to rotationally retain at least one of the top endcap 3508 and the filter media 3502 relative to the hub 3518, and therefore relative to the center axis 3504.

The bottom coupler 3524 includes a coalescer inlet 3544 configured to receive the blowby gases and a lower wall 3546. The lower wall 3546 extends circumferentially about the bottom coupler 3524 and interfaces with the filter media 3502 on one side and is positioned in confronting relation with the outer circumferential wall 3510 on the other side. The openings 3512 are defined between the outer circumferential wall 3510 and the lower wall 3546.

In various embodiments, the filter media 3502 is constructed from stainless steel foil that is approximately 0.03 mm thick and approximately 50 mm wide (e.g., for a filter media having a height of approximately 50 mm as measured along the center axis 3504, etc.). In other embodiments, the filter media 3502 is constructed from stainless steel foil that is approximately 0.03 mm thick and approximately 70 mm wide (e.g., for a filter media having a height of approximately 70 mm as measured along the center axis 3504, etc.). When the filter media 3502 is constructed from a sheet of material, such as a sheet of foil, the sheet of material is wrapped about the hub 3518 in successive layers from a first layer, which interfaces directly with the hub 3518, and with any protuberances, recesses, or vertical slots on the hub 3518, to a final layer, which is adhered or welded to another layer of the filter media 3502.

The rotating coalescer element 3500 is intentionally configured to be assembled in only one of a discrete (e.g., specified, pre-set, etc.) number of ways. As a result, the rotating coalescer element 3500 may be assembled more often without mistakes or errors (e.g., in a poke-yoke fashion, etc.). This allows a manufacturer of the rotating coalescer element 3500 to be very lean, thereby causing the rotating coalescer element 3500 to be more desirable than other filters. Additionally, the core 3514 is relatively stiff compared to other filters and therefore less prone to warping than other filters. Furthermore, the rotating coalescer element 3500 minimizes or substantially eliminates overhang of the filter media 3502, thereby providing for structural stability of the filter media 3502 which is not present in other filters. Still further, the rotating coalescer element 3500 may be capable of providing more flow area, and therefore additional gas-liquid separating capabilities, than other filters because the rotating coalescer element 3500 is capable of utilizing a filter media 3502 with an inner diameter of around 53 mm, thereby allowing for substantially more layers of the filter media 3502 to be included in a rotating coalescer element 3500 of a space claim (e.g., of a size, of a standardized size, etc.) compared to other filters having the same space claim.

Figure 36:
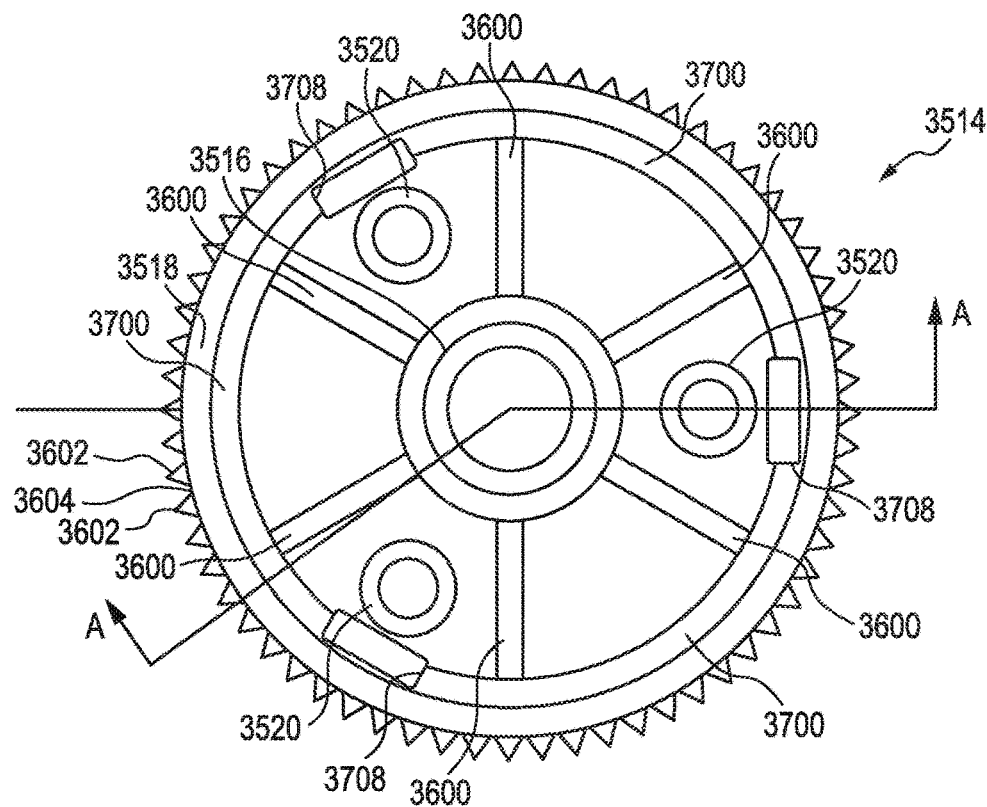
FIG. 36 shows a top view of a hub for the coalescer element of FIG. 35.
Figure 37:
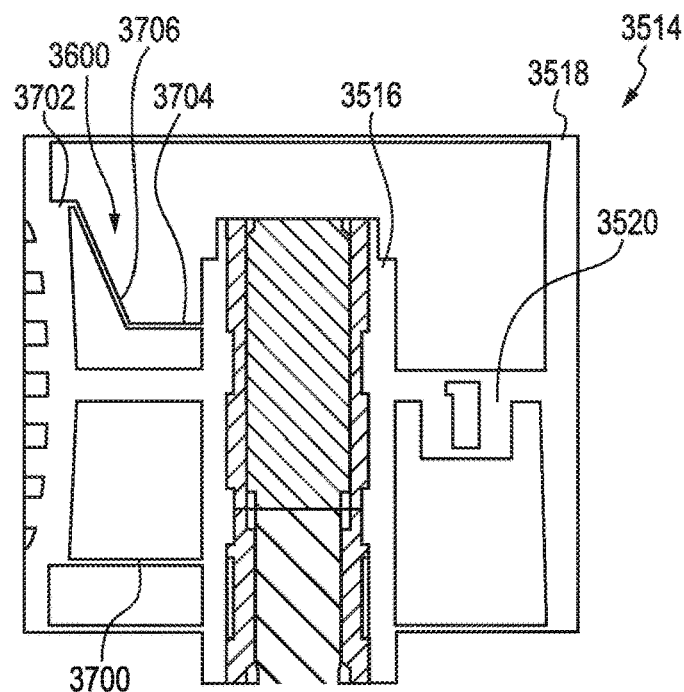
FIG. 37 shows a cross-sectional view of the hub of FIG. 36.

To assemble the rotating coalescer element 3500, the core 3514 is first produced. FIGS. 36 and 37 illustrate the core 3514 in greater detail. Specifically, FIG. 36 shows a bottom view of the core 3514 and FIG. 37 shows a cross-section of the core 3514 taken about line A-A in FIG. 36. The core 3514 includes three of the hub axial conduits 3520, each being angularly spaced from an adjacent hub axial conduit 3520 by an equal angular distance. As shown in FIG. 36, each of the hub axial conduit 3520 is separated by an angle of approximately 60°.

The core 3514 also includes a plurality of interfacing ribs 3600. According to an exemplary embodiment, each adjacent pair of hub axial conduits 3520 is interspaced by two interfacing ribs 3600 such that the core 3514 includes twice as many interfacing ribs 3600 as hub axial conduits 3520. Rather than each interfacing rib 3600 being separated from an adjacent interfacing rib 3600 by an equal angular distance like the hub axial conduits 3520, pairs of interfacing ribs 3600 which are interspaced by a hub axial conduit 3520 are separated from that hub axial conduit 3520 by an equal angular distance.

When the rotating coalescer element 3500 is assembled, the filter media 3502 is first coupled to the hub 3518. The hub 3518 includes a plurality of ridges 3602. The ridges 3602 define a plurality of valleys 3604 therebetween. The filter media 3502 is coupled to the core 3514 by a continuous sheet of the filter media 3502 being wrapped around the core 3514. The ridges 3602 and valleys 3604 cause a first layer of the filter media 3502 to become corrugated to facilitate coupling of further layer of the filter media 3502 to the core 3514.

Each interfacing rib 3600 has a bottom interfacing surface 3700, a top interfacing surface 3702, a middle interfacing surface 3704, and an adjoining interfacing surface 3706. The bottom interfacing surface 3700 is generally parallel to the top interfacing surface 3702 and the middle interfacing surface 3704. As will be explained in more detail herein, the bottom interfacing surface 3700, the top interfacing surface 3702, the middle interfacing surface 3704, and the adjoining interfacing surface 3706 are configured to interface with the bottom endcap 3506 and/or the top endcap 3508 to ensure proper assembly of the rotating coalescer element 3500. As shown in FIG. 36, the bottom interfacing surface 3700 for each of the interfacing ribs 3600 is separated by a receiving gap 3708 from an adjacent bottom interfacing surface 3700.

When the rotating coalescer element 3500 is assembled, after the filter media 3502 has been coupled to the core 3514, the bottom endcap 3506 is inserted into the core 3514. Depending on the alignment of the bottom endcap 3506 and the core 3514, the interfacing rib 3600 may prevent the bottom endcap 3506 from being inserted into the core 3514.

Figure 38:
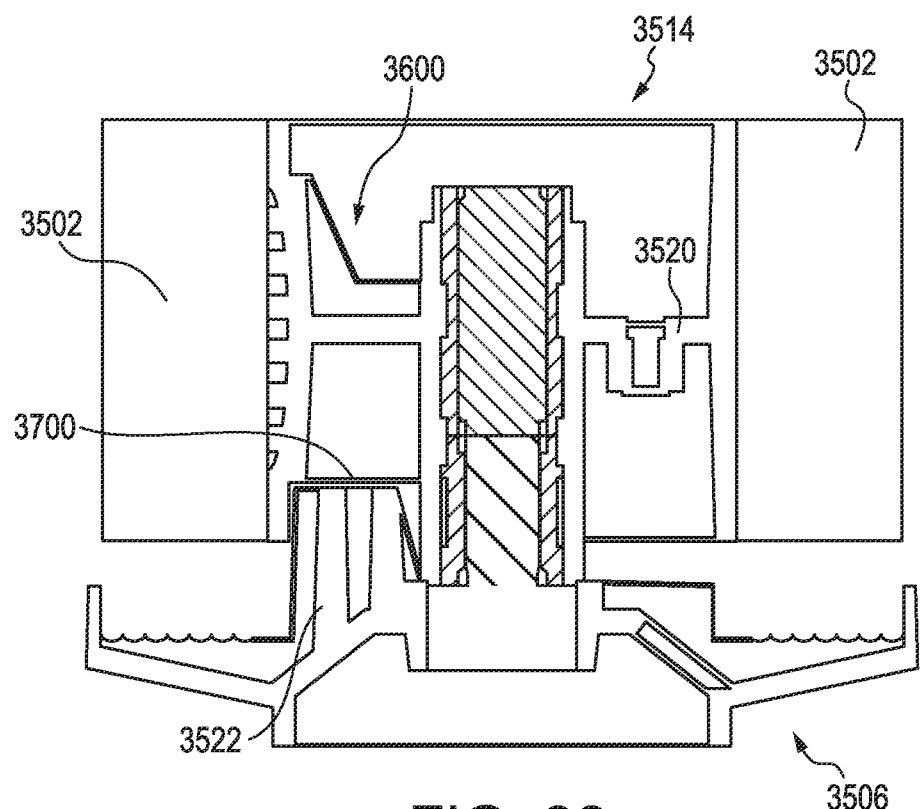
FIG. 38 shows a cross-sectional view of a portion of coalescer element for a crankcase coalescer system according to another example embodiment.

FIG. 38 illustrates a situation where the bottom endcap 3506 and the core 3514 are misaligned. As shown, the bottom endcap axial conduit 3522 is positioned proximate the bottom interfacing surface 3700. If an attempt were made to insert the bottom endcap 3506 into the core 3514, the bottom endcap axial conduit 3522 would contact the bottom interfacing surface 3700 and further insertion of the bottom endcap 3506 into the core 3514 would be prohibited.

Figure 39:
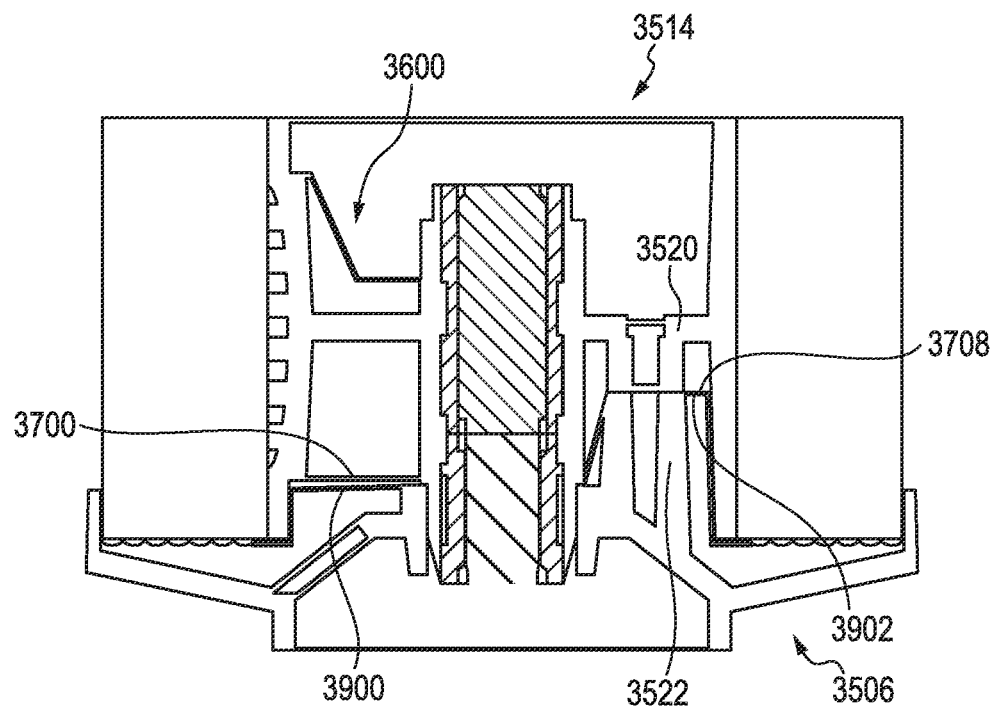
FIG. 39 shows a cross-sectional view of a portion of coalescer element for a crankcase coalescer system according to another example embodiment.

FIG. 39 illustrates a situation where the bottom endcap 3506 and the core 3514 are properly aligned. As shown, the bottom endcap axial conduit 3522 is positioned proximate the hub axial conduit 3520. Additionally, a bottom endcap insert rib 3902 of the bottom endcap axial conduit 3522 has been received within the receiving gap 3708.

Accordingly, the bottom endcap 3506 may be inserted into the core 3514 until the bottom endcap axial conduit 3522 contacts the hub axial conduit 3520. Simultaneously, the bottom interfacing surface 3700 contacts a stop surface 3900 of the bottom endcap 3506. Contact between the bottom interfacing surface 3700 and the stop surface 3900 cooperates with contact between the bottom endcap axial conduit 3522 and the hub axial conduit 3520 to prevent further insertion of the bottom endcap 3506 into the core 3514.

Figure 40:
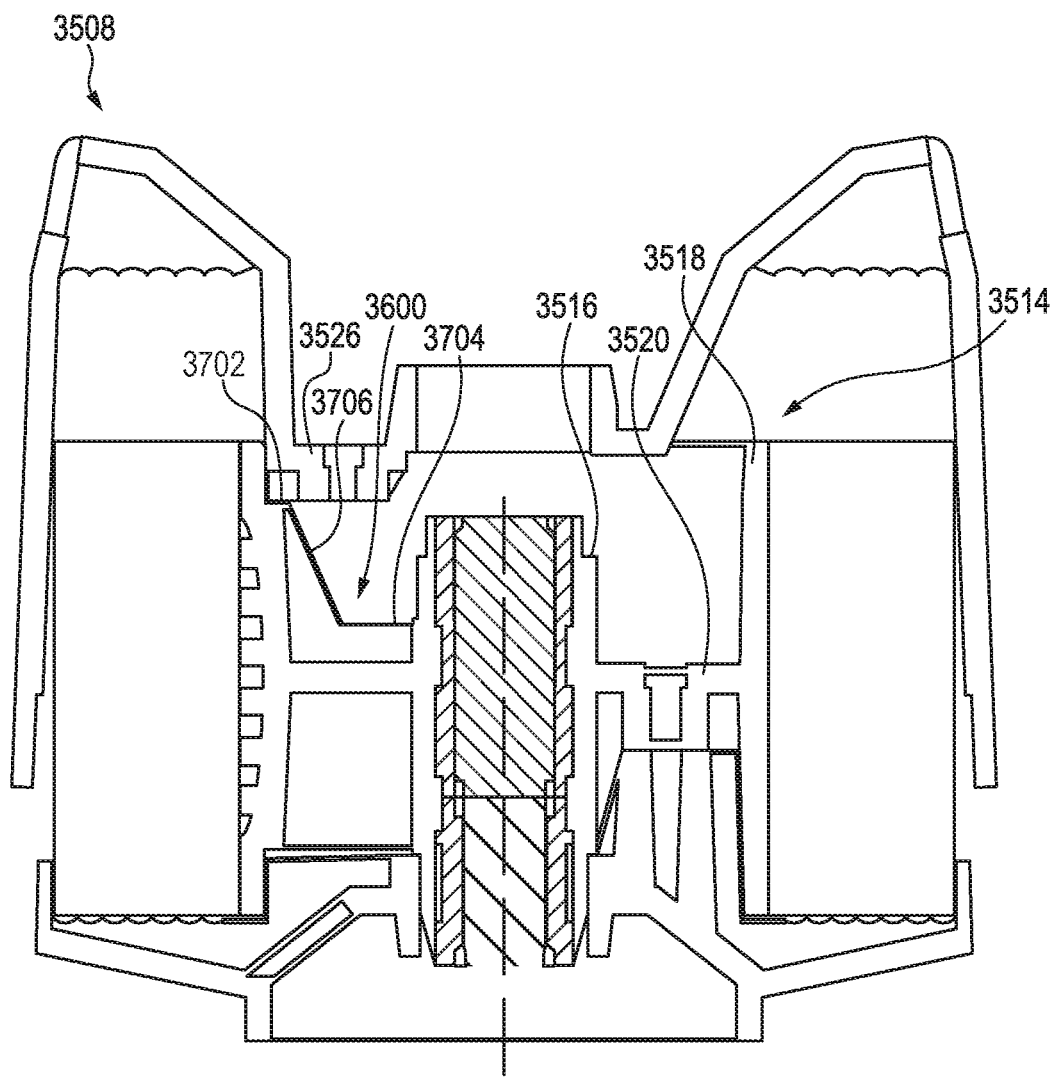
FIG. 40 shows a cross-sectional view of a portion of coalescer element for a crankcase coalescer system according to another example embodiment.

After the bottom endcap 3506 has been inserted into the core 3514, the top endcap 3508 is inserted into the core 3514 such that the fastener 3530 can be used to couple the bottom endcap 3506, the core 3514, and the top endcap 3508. FIG. 40 illustrates a situation where the top endcap 3508 and the core 3514 are misaligned. As shown, the top endcap axial conduit 3526 is positioned proximate the top interfacing surface 3702 and the adjoining interfacing surface 3706. If an attempt were made to insert the top endcap 3508 into the core 3514, the top endcap axial conduit 3526 would contact the top interfacing surface 3702 and/or the adjoining interfacing surface 3706 and further insertion of the top endcap 3508 into the core 3514 would be prohibited.

Figure 41:
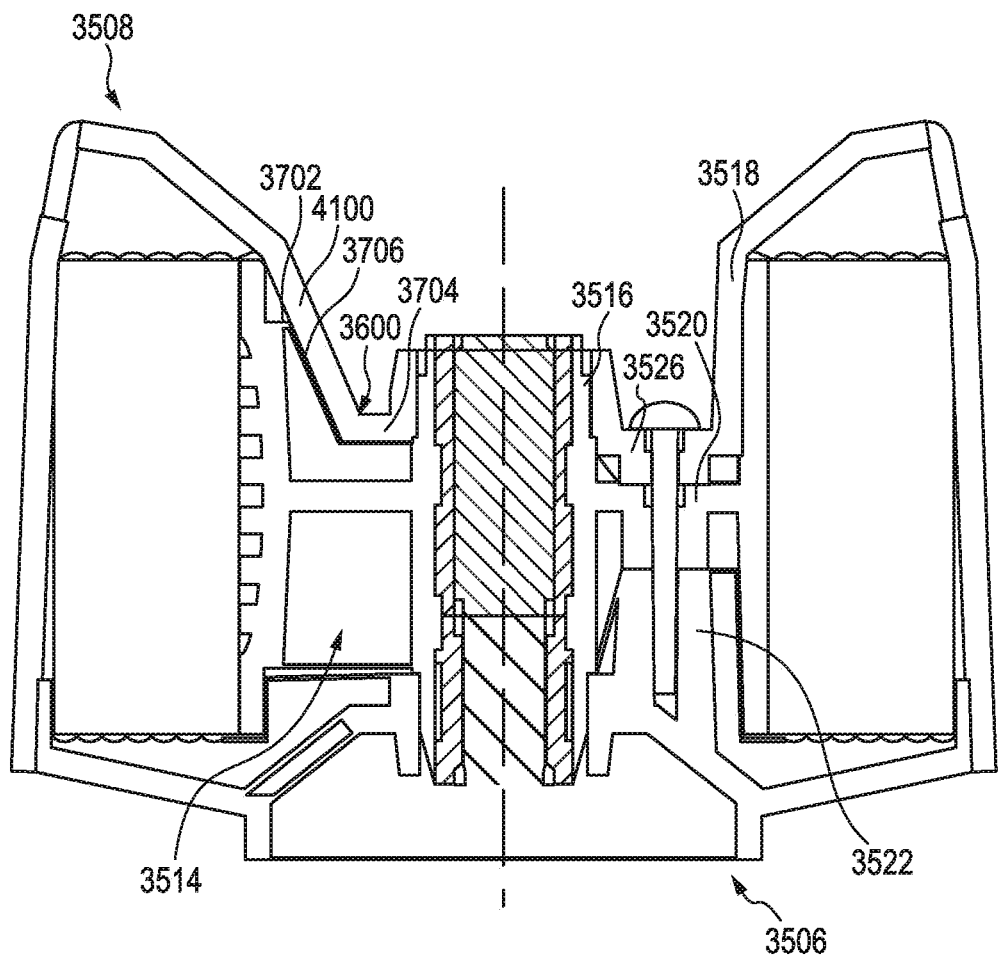
FIG. 41 shows a cross-sectional view of a portion of coalescer element for a crankcase coalescer system according to another example embodiment.

FIG. 41 illustrates a situation where the top endcap 3508 and the core 3514 are properly aligned. As shown, the top endcap axial conduit 3526 is positioned proximate the hub axial conduit 3520.

Accordingly, the top endcap 3508 may be inserted into the core 3514 until the top endcap axial conduit 3526 contacts the hub axial conduit 3520. Simultaneously, the top interfacing surface 3702, the adjoining interfacing surface 3706, and the middle interfacing surface 3704 contact a stop projection 4100 of the top endcap 3508. Contact between the top interfacing surface 3702, the adjoining interfacing surface 3706, and the middle interfacing surface 3704 and the stop projection 4100 cooperates with contact between the top endcap axial conduit 3526 and the hub axial conduit 3520 to prevent further insertion of the top endcap 3508 into the core 3514. The fastener 3530 can then be used to couple the bottom endcap 3506, the core 3514, and the top endcap 3508.

While this process has only be shown with respect to one of the hub axial conduits 3520, it is understood that the other hub axial conduits 3520 are simultaneously aligned with the bottom endcap axial conduit 3522 and the top endcap axial conduit 3526 due to the rotational symmetry of each of the bottom endcap 3506, the top endcap 3508, and the core 3514.

In various embodiments, the filter media 3502 has an inner diameter of 53 mm and an outer diameter of between 92 mm and 94 mm, inclusive.

Figure 42:
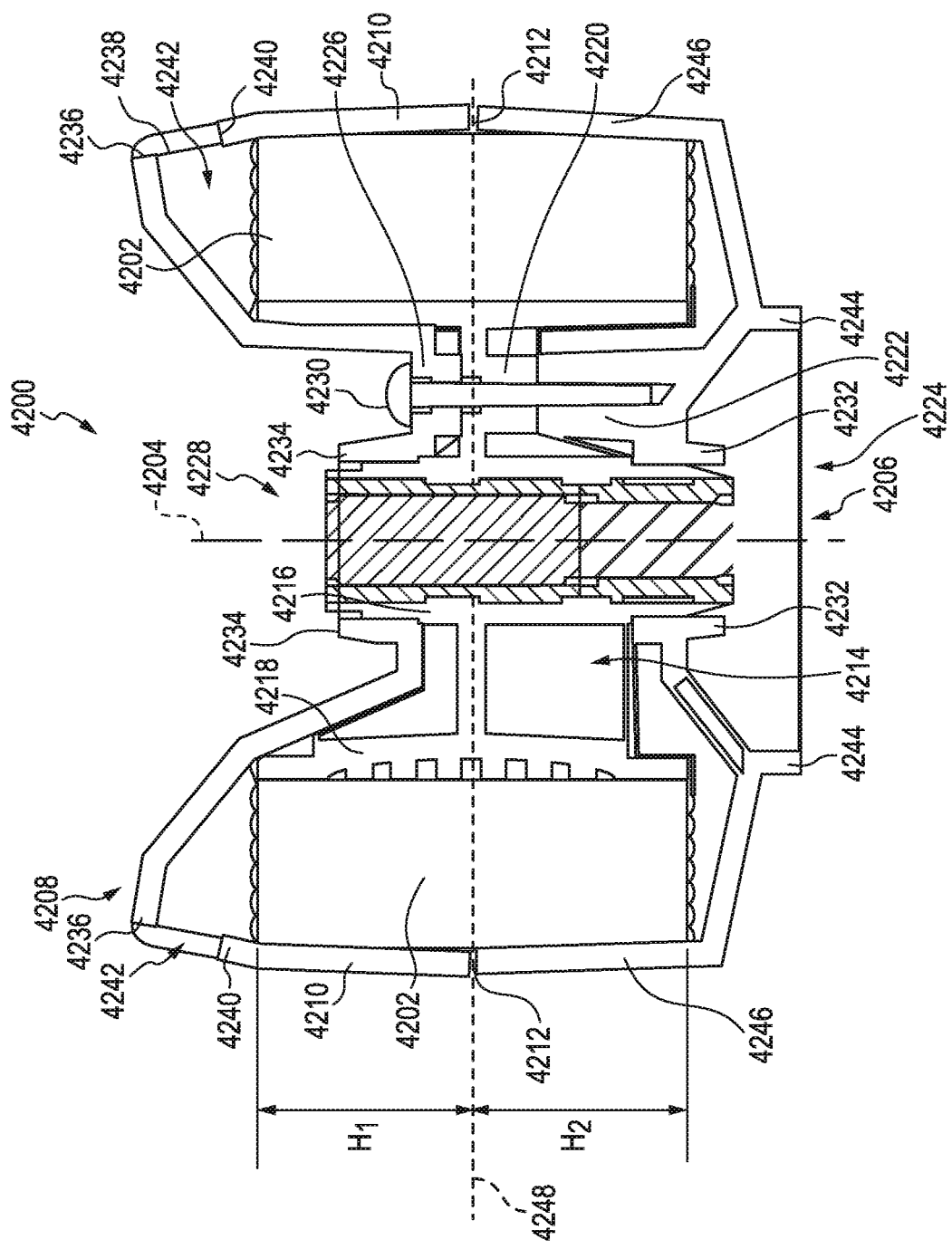
FIG. 42 shows a cross-sectional view of a coalescer element for a crankcase coalescer system according to another example embodiment.

Referring to FIG. 42, a rotating coalescer element 4200 for use in a crankcase coalescer system similar to the crankcase coalescer system 1900 in shown according to an example embodiment. The rotating coalescer element 4200 is generally installed in a central compartment of a crankcase coalescer system.

The rotating coalescer element 4200 includes filter media 4202 having axial flow channels arranged in a direction generally parallel to a center axis 4204 of the rotating coalescer element 4200. When the rotating coalescer element 4200 is positioned within a crankcase coalescer system, the center axis 4204 is coincident with a center axis of a drive shaft coupled to the rotating coalescer element 4200. Accordingly, the rotating coalescer element 4200 is an axial flow coalescing element. The filter media 4202 may be frustoconical in overall shape such that the axial flow channels are not arranged in a direction that is generally parallel to the center axis 4204. In some arrangements, the filter media 4202 is a wound filter media. Crankcase gas flows from the inlet, through a bottom endcap 4206 of the rotating coalescer element 4200, entering the filter media 4202 from a first, bottom end of the filter media 4202, through the filter media 4202 in an axial direction, out a second, top end of the filter media 4202, through a top endcap 4208 of the rotating coalescer element 4200, and out the outlet. Flow through the filter media 4202 is uniformly distributed on an axial plane adjacent to the inlet side of the filter media 4202.

Coalesced liquid (e.g., oil and aerosols separated from the crankcase blowby gas) passes through the layers of filter media 4202 in a radially outward direction (e.g., due to the centrifugal force impacted on the coalesced liquid by rotation of the rotating coalescer element 4200, etc.) and drains to a bottom region of the rotating coalescer element 4200 along an upper wall 4210 of the rotating coalescer element 4200, exiting through openings 4212 at the largest local radius from the center axis 4204. The upper wall 4210 is impermeable such that the coalesced liquid may only exit the rotating coalescer element 4200 via the openings 4212. The openings 4212 may be crescent-shaped openings in cross-section. In some arrangements, the rotating coalescer element 4200 is positioned in a manner such that gravity assists the draining of the separated liquid from the housing.

The top side of the rotating coalescer element 4200, opposite the bottom side of the rotating coalescer element 4200 where the openings 4212 are positioned, may be referred to as a 'clean side.' After the coalesced liquid has drained from the rotating coalescer element 4200 (e.g., via the openings 4212, etc.), the coalesced liquid may be recirculated to a fluid system. For example, if the coalesced liquid is oil, the oil may be drained from the rotating coalescer element 4200 and recirculated to an oil system of an internal combustion engine system producing the blowby gas which is processed by the crankcase coalescer system within which the rotating coalescer element 4200 is positioned.

The rotating coalescer element 4200 includes a core 4214. The core 4214 is coupled to the bottom endcap 4206 and the top endcap 4208. The core 4214 includes a hub sleeve 4216 which is configured to receive and couple to a drive shaft. In various embodiments, the hub sleeve 4216 is an overmolded bushing. For example, the hub sleeve 4216 may comprise a busing around which a portion of the rotating coalescer element 4200 is molded (e.g., in an injection molding process, in a blow molding process, in a vacuum molding process, etc.). The hub sleeve 4216 is centered on the center axis 4204 and defines a center axis of the rotating coalescer element 4200. In various embodiments, the rotating coalescer element 4200 is rotationally symmetric about the center axis of the hub sleeve 4216 at regular intervals (e.g., every 30.41°, etc.).

The hub sleeve 4216 may have a taper matching the taper of a drive shaft and is tapered from a larger diameter farthest from the openings 4212 to a smaller diameter closest to the openings 4212. For example, the hub sleeve 4216 may have a two degree taper. The taper of the hub sleeve 4216 may be advantageous for transmitting torque from a drive shaft to the hub sleeve 4216, and thereby to the core 4214.

The core 4214 includes a hub 4218. The hub 4218 may be integral with, or coupled to, the hub sleeve 4216. The filter media 4202 is coupled to (e.g., secured directly to, etc.) the hub 4218. The hub 4218 may include protuberances, vertical slots, and/or recesses configured to facilitate coupling of the filter media 4202 to the hub 4218. The hub 4218 includes a plurality of hub axial conduits 4220. Each of the hub axial conduits 4220 is configured to interface on one end with a bottom endcap axial conduit 4222 of a bottom coupler 4224 of the bottom endcap 4206 and on the other end with a top endcap axial conduit 4226 of a top coupler 4228 of the top endcap 4208 such that a fastener 4230 (e.g., screw, rivet, bolt, etc.) can be inserted through the top endcap axial conduit 4226, through the hub axial conduit 4220, and through the bottom endcap axial conduit 4222 to couple the bottom endcap 4206, the core 4214, and the top endcap 4208 together.

The bottom coupler 4224 includes a bottom coupler sleeve 4232. The bottom coupler sleeve 4232 is centered on the center axis 4204. The top coupler 4228 includes a top coupler sleeve 4234. The top coupler sleeve 4234 is centered on the center axis 4204. When the bottom endcap 4206 and the top endcap 4208 are each coupled to the core 4214, the hub sleeve 4216 is received within each of the bottom coupler sleeve 4232 and the top coupler sleeve 4234. The hub sleeve 4216 is configured to receive a drive shaft and to be coupled to a drive shaft (e.g., via press fit, via adhesive bonding, via ultrasonic welding, etc.).

Each of the hub sleeve 4216, the bottom coupler sleeve 4232, and the top coupler sleeve 4234 are defined by an inner diameter and an outer diameter. In various embodiments, the outer diameter of the hub sleeve 4216 is approximately equal to each of the inner diameter of the top coupler sleeve 4234 and the inner diameter of the bottom coupler sleeve 4232.

The top endcap 4208 also includes a top lip 4236, a plurality of vanes 4238 (e.g., ribs, flow guides, etc.), and a drain lip 4240. The top lip 4236 extends circumferentially about the top endcap 4208. The top lip 4236 is defined by a diameter less than a diameter of the upper wall 4210. The drain lip 4240 also extends circumferentially about the top endcap 4208. The drain lip 4240 is defined by a diameter less than a diameter of the upper wall 4210. The drain lip 4240 is contiguous with, and extends inwardly from, the upper wall 4210.

Each of the plurality of vanes 4238 is coupled to or integrated with the top lip 4236 and the drain lip 4240 and extends therebetween. Each of the plurality of vanes 4238 cooperates with the top lip 4236 and the drain lip 4240 to form a plurality of channels 4242 in the top endcap 4208. Each of the plurality of channels 4242 is configured to facilitate the flow of blowby gas from a top end of the filter media 4202 through the top endcap 4208. According to an example embodiment, each of the plurality of vanes 4238 is shaped (e.g., curved, rounded, slanted, angled, etc.) to facilitate swirling of the blowby gas flowing from the plurality of channels 4242. The plurality of vanes 4238 may be radially interspaced about the top lip 4236 at regular angular intervals (e.g., every 12°, every 15°, every 30°, etc.). According to various embodiments, at least one of the plurality of vanes 4238 is configured to extend downwards past the drain lip 4240 such that the at least one (e.g., one, three, four, etc.) of the plurality of vanes 4238 protrudes into the filter media 4202. An interaction between one of the plurality of vanes 4238 and the filter media 4202 functions to rotationally retain at least one of the top endcap 4208 and the filter media 4202 relative to the hub 4218, and therefore relative to the center axis 4204.

The bottom coupler 4224 includes a coalescer inlet 4244 configured to receive the blowby gases and a lower wall 4246. The lower wall 4246 extends circumferentially about the bottom coupler 4224 and interfaces with the filter media 4202 on one side and is positioned in confronting relation with the upper wall 4210 on the other side. The openings 4212 are defined between the upper wall 4210 and the lower wall 4246.

In various embodiments, the filter media 4202 is constructed from stainless steel foil that is approximately 0.03 mm thick and approximately 50 mm wide (e.g., for a filter media having a height of approximately 50 mm as measured along the center axis 4204, etc.). In other embodiments, the filter media 4202 is constructed from stainless steel foil that is approximately 0.03 mm thick and approximately 70 mm wide (e.g., for a filter media having a height of approximately 70 mm as measured along the center axis 4204, etc.). When the filter media 4202 is constructed from a sheet of material, such as a sheet of foil, the sheet of material is wrapped about the hub 4218 in successive layers from a first layer, which interfaces directly with the hub 4218, and with any protuberances, recesses, or vertical slots on the hub 4218, to a final layer, which is adhered or welded to another layer of the filter media 4202.

The upper wall 4210 has a first height $H_1$ relative to a horizontal axis 4248, which is orthogonal to the center axis 4204, and such that the lower wall 4246 has a second height $H_2$ relative to the horizontal axis 4248. In various embodiments, the rotating coalescer element 4200 is configured such that the first height $H_1$ is substantially equal to the second height $H_2$.

Figure 43:
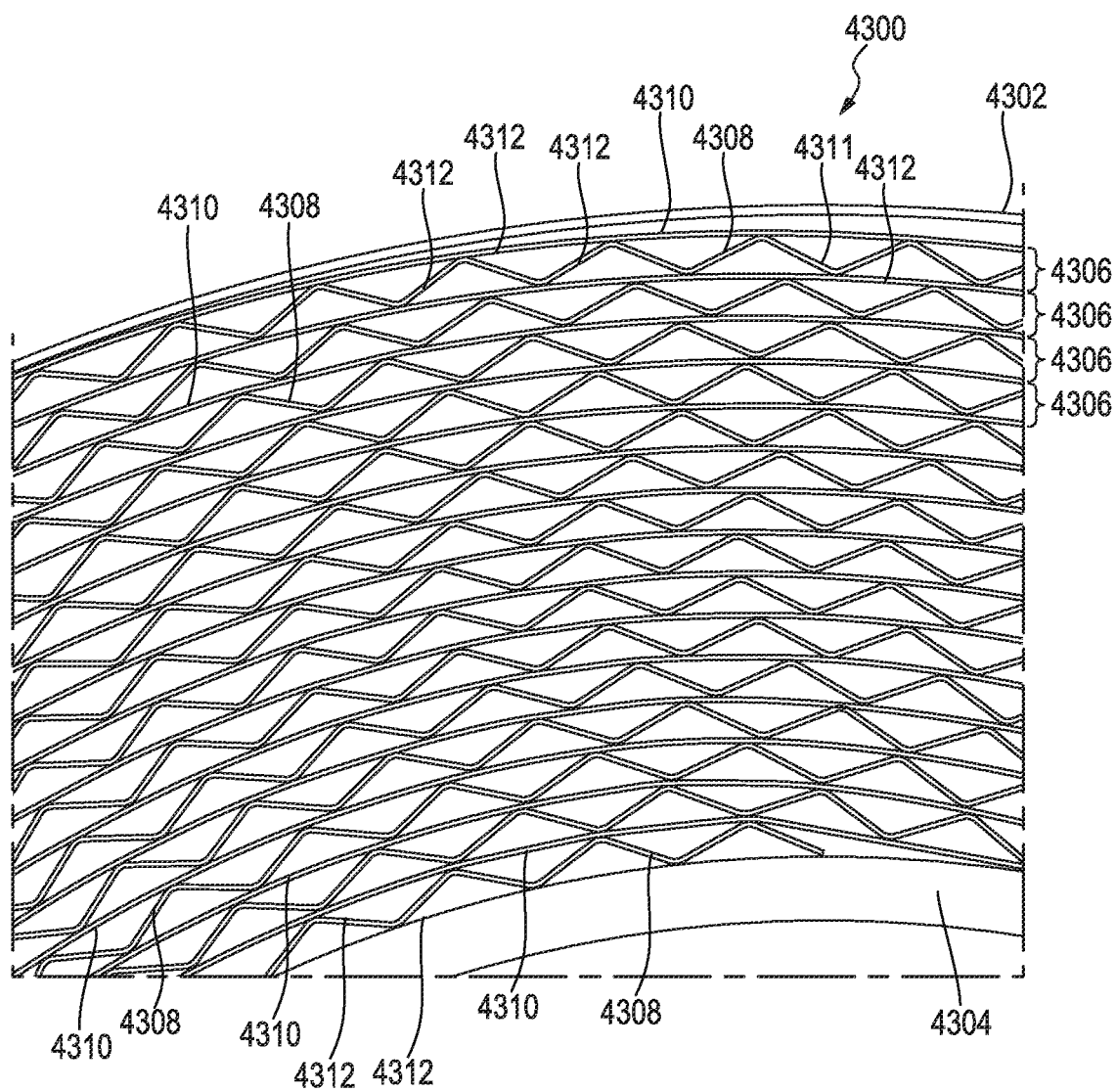
FIG. 43 shows a top view of a portion of another filter media for a coalescer element for a crankcase coalescer system according to another example embodiment.

FIG. 43 is a top view of a filter media 4300 for a rotating coalescer element, such as the rotating coalescer element 1906, for use within a coalescer system, such as the crankcase coalescer system 1900. The filter media 4300 is positioned between an outer circumferential wall 4302, such as the outer circumferential wall 1918, and an inner circumferential wall 4304. The inner circumferential wall 4304 may be a part of a support tube, such as the support tube 316, or a part of a hub, such as the hub 2002.

The filter media 4300 includes a plurality of layers 4306. The filter media 4300 is configured such that the layers 4306 extend almost entirely between the outer circumferential wall 4302 and the inner circumferential wall 4304. The number of layers 4306 included in the filter media 4300 may be related to a size of the rotating coalescer element or a desired separation performance of the rotating coalescer element. For example, a larger rotating coalescer element may include more layers 4306 than a smaller rotating coalescer element.

Each of the layers 4306 is defined by a diameter. The diameter of a layer 4306 is measured along a center of the layers 4306 and may be approximated if the layer 4306 is not perfectly circular (e.g., is elliptical, etc.). The layers 4306 are substantively identical with the only difference being the varying diameters of each of the layers 4306. The diameter of the layers 4306 gradually increases from the inner circumferential wall 4304 to the outer circumferential wall 4302.

Each of the layers 4306 includes a shaped sheet 4308 and a flat sheet 4310. The shaped sheet 4308 includes a plurality of shaped features 4311 disposed along the length of the shaped sheet 4308. Adjacent shaped features 4311 of the same shaped sheet 4308 may be separated by flat sections of the shaped sheet 4308. In FIG. 43, the shaped features 4311 are not separated by flat sections of the shaped sheet 4308. FIG. 43 illustrates an embodiment where the shaped features 4311 are V-shaped and have a relatively wide included angle.

The shaped sheet 4308 and the flat sheet 4310 for each of the layers 4306 cooperate to form a plurality of axial channels 4312. Axial channels 4312 are also formed between the shaped sheet 4308 and an adjacent flat sheet 4310, the outer circumferential wall 4302, or the inner circumferential wall 4304. For example, axial channels 4312 are formed between the shaped sheet 4308 of the innermost layer 4306 and the inner circumferential wall 4304. Blowby gases flow through the filter media 4300 from a bottom end of the filter media 4300 to a top end of the filter media 4300 through the plurality of axial channels 4312.

The shaped sheet 4308 and the flat sheet 4310 are sufficiently rigid such that compression of subsequent layers 4306 does not cause the shaped sheet 4308 to flatten and does not cause the flat sheet 4310 to become shaped. For shaped sheet 4308 and the flat sheet 4310 may be constructed from, for example, stainless steel, aluminum, and other metals and composite materials.

The shaped sheet 4308 of an innermost layer 4306 may be formed through an interaction with ridges, protuberances, recesses, and other features on an external surface of the inner circumferential wall 4304. The innermost layer 4306 may be coupled to the inner circumferential wall 4304 through an interaction between the shaped sheet 4308 or the flat sheet 4310 of the innermost layer and ridges, protuberances, recess, or other features on an external surface of the inner circumferential wall 4304.

Figure 44:
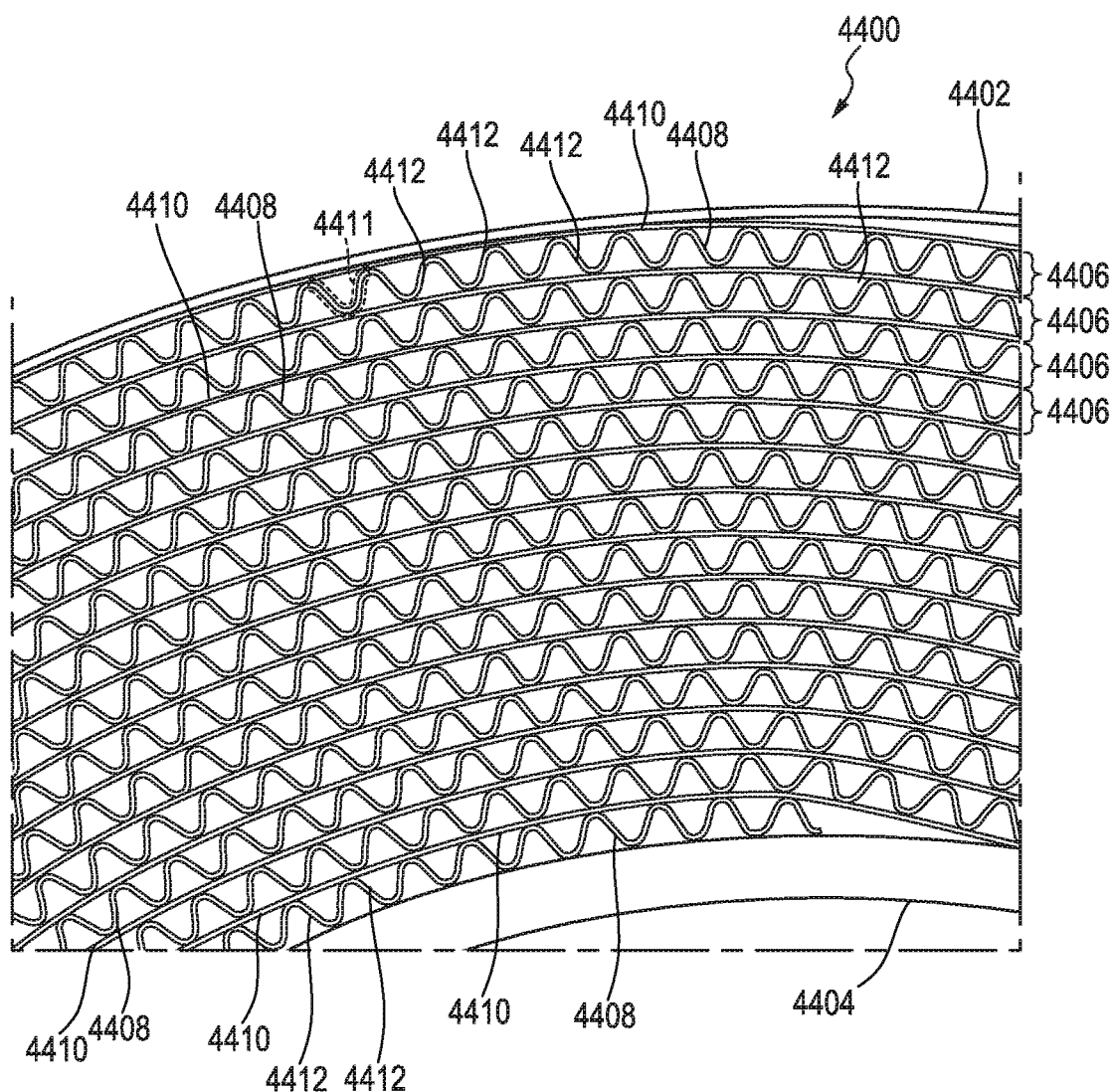
FIG. 44 shows a top view of a portion of another filter media for a coalescer element for a crankcase coalescer system according to another example embodiment.

FIG. 44 is a top view of a filter media 4400 for a rotating coalescer element, such as the rotating coalescer element 1906, for use within a coalescer system, such as the crankcase coalescer system 1900. The filter media 4400 is positioned between an outer circumferential wall 4402, such as the outer circumferential wall 1918, and an inner circumferential wall 4404. The inner circumferential wall 4404 may be a part of a support tube, such as the support tube 316, or a part of a hub, such as the hub 2002.

The filter media 4400 includes a plurality of layers 4406. The filter media 4400 is configured such that the layers 4406 extend almost entirely between the outer circumferential wall 4402 and the inner circumferential wall 4404. The number of layers 4406 included in the filter media 4400 may be related to a size of the rotating coalescer element or a desired separation performance of the rotating coalescer element. For example, a larger rotating coalescer element may include more layers 4406 than a smaller rotating coalescer element.

Each of the layers 4406 is defined by a diameter. The diameter of a layer 4406 is measured along a center of the layers 4406 and may be approximated if the layer 4406 is not perfectly circular (e.g., is elliptical, etc.). The layers 4406 are substantively identical with the only difference being the varying diameters of each of the layers 4406. The diameter of the layers 4406 gradually increases from the inner circumferential wall 4404 to the outer circumferential wall 4402.

Each of the layers 4406 includes a shaped sheet 4408 and a flat sheet 4410. The shaped sheet 4408 includes a plurality of shaped features 4411 disposed along the length of the shaped sheet 4408. Adjacent shaped features 4411 of the same shaped sheet 4408 may be separated by flat sections of the shaped sheet 4408. In FIG. 44, the shaped features 4411 are not separated by flat sections of the shaped sheet 4408. FIG. 44 illustrates an embodiment where shaped features 4411 are V-shaped and have a relatively narrow included angle and a relatively moderate bend radius.

The shaped sheet 4408 and the flat sheet 4410 for each of the layers 4406 cooperate to form a plurality of axial channels 4412. Axial channels 4412 are also formed between the shaped sheet 4408 and an adjacent flat sheet 4410, the outer circumferential wall 4402, or the inner circumferential wall 4404. For example, axial channels 4412 are formed between the shaped sheet 4408 of the innermost layer 4406 and the inner circumferential wall 4404. Blowby gases flow through the filter media 4400 from a bottom end of the filter media 4400 to a top end of the filter media 4400 through the plurality of axial channels 4412.

The shaped sheet 4408 and the flat sheet 4410 are sufficiently rigid such that compression of subsequent layers 4406 does not cause the shaped sheet 4408 to flatten and does not cause the flat sheet 4410 to become shaped. For shaped sheet 4408 and the flat sheet 4410 may be constructed from, for example, stainless steel, aluminum, and other metals and composite materials.

The shaped sheet 4408 of an innermost layer 4406 may be formed through an interaction with ridges, protuberances, recesses, and other features on an external surface of the inner circumferential wall 4404. The innermost layer 4406 may be coupled to the inner circumferential wall 4404 through an interaction between the shaped sheet 4408 or the flat sheet 4410 of the innermost layer and ridges, protuberances, recess, or other features on an external surface of the inner circumferential wall 4404.

Figure 45:
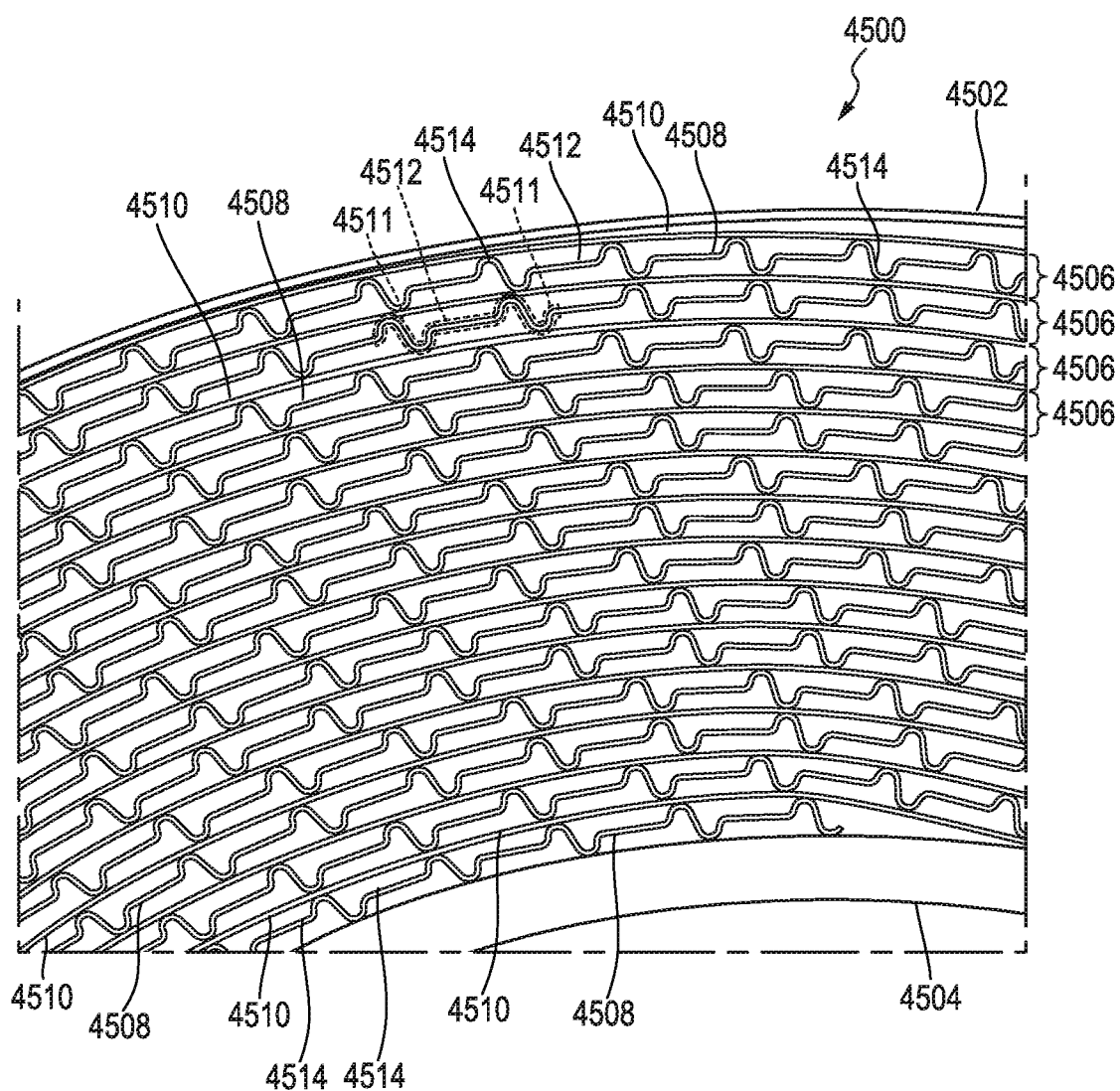
FIG. 45 shows a top view of a portion of another filter media for a coalescer element for a crankcase coalescer system according to another example embodiment.

FIG. 45 is a top view of a filter media 4500 for a rotating coalescer element, such as the rotating coalescer element 1906, for use within a coalescer system, such as the crankcase coalescer system 1900. The filter media 4500 is positioned between an outer circumferential wall 4502, such as the outer circumferential wall 1918, and an inner circumferential wall 4504. The inner circumferential wall 4504 may be a part of a support tube, such as the support tube 316, or a part of a hub, such as the hub 2002.

The filter media 4500 includes a plurality of layers 4506. The filter media 4500 is configured such that the layers 4506 extend almost entirely between the outer circumferential wall 4502 and the inner circumferential wall 4504. The number of layers 4506 included in the filter media 4500 may be related to a size of the rotating coalescer element or a desired separation performance of the rotating coalescer element. For example, a larger rotating coalescer element may include more layers 4506 than a smaller rotating coalescer element.

Each of the layers 4506 is defined by a diameter. The diameter of a layer 4506 is measured along a center of the layers 4506 and may be approximated if the layer 4506 is not perfectly circular (e.g., is elliptical, etc.). The layers 4506 are substantively identical with the only difference being the varying diameters of each of the layers 4506. The diameter of the layers 4506 gradually increases from the inner circumferential wall 4504 to the outer circumferential wall 4502.

Each of the layers 4506 includes a shaped sheet 4508 and a flat sheet 4510. The shaped sheet 4508 includes a plurality of shaped features 4511 disposed along the length of the shaped sheet 4508. Adjacent shaped features 4511 of the same shaped sheet 4508 are separated by flat sections 4512 of the shaped sheet 4508. FIG. 45 illustrates an embodiment where the shaped features 4511 are Z-shaped and have a relatively moderate included angle and a relatively moderate bend radius.

The shaped sheet 4508 and the flat sheet 4510 for each of the layers 4506 cooperate to form a plurality of axial channels 4514. Axial channels 4514 are also formed between the shaped sheet 4508 and an adjacent flat sheet 4510, the outer circumferential wall 4502, or the inner circumferential wall 4504. For example, axial channels 4514 are formed between the shaped sheet 4508 of the innermost layer 4506 and the inner circumferential wall 4504. Blowby gases flow through the filter media 4500 from a bottom end of the filter media 4500 to a top end of the filter media 4500 through the plurality of axial channels 4514.

The shaped sheet 4508 and the flat sheet 4510 are sufficiently rigid such that compression of subsequent layers 4506 does not cause the shaped sheet 4508 to flatten and does not cause the flat sheet 4510 to become shaped. For shaped sheet 4508 and the flat sheet 4510 may be constructed from, for example, stainless steel, aluminum, and other metals and composite materials.

The shaped sheet 4508 of an innermost layer 4506 may be formed through an interaction with ridges, protuberances, recesses, and other features on an external surface of the inner circumferential wall 4504. The innermost layer 4506 may be coupled to the inner circumferential wall 4504 through an interaction between the shaped sheet 4508 or the flat sheet 4510 of the innermost layer and ridges, protuberances, recess, or other features on an external surface of the inner circumferential wall 4504.

Figure 46:
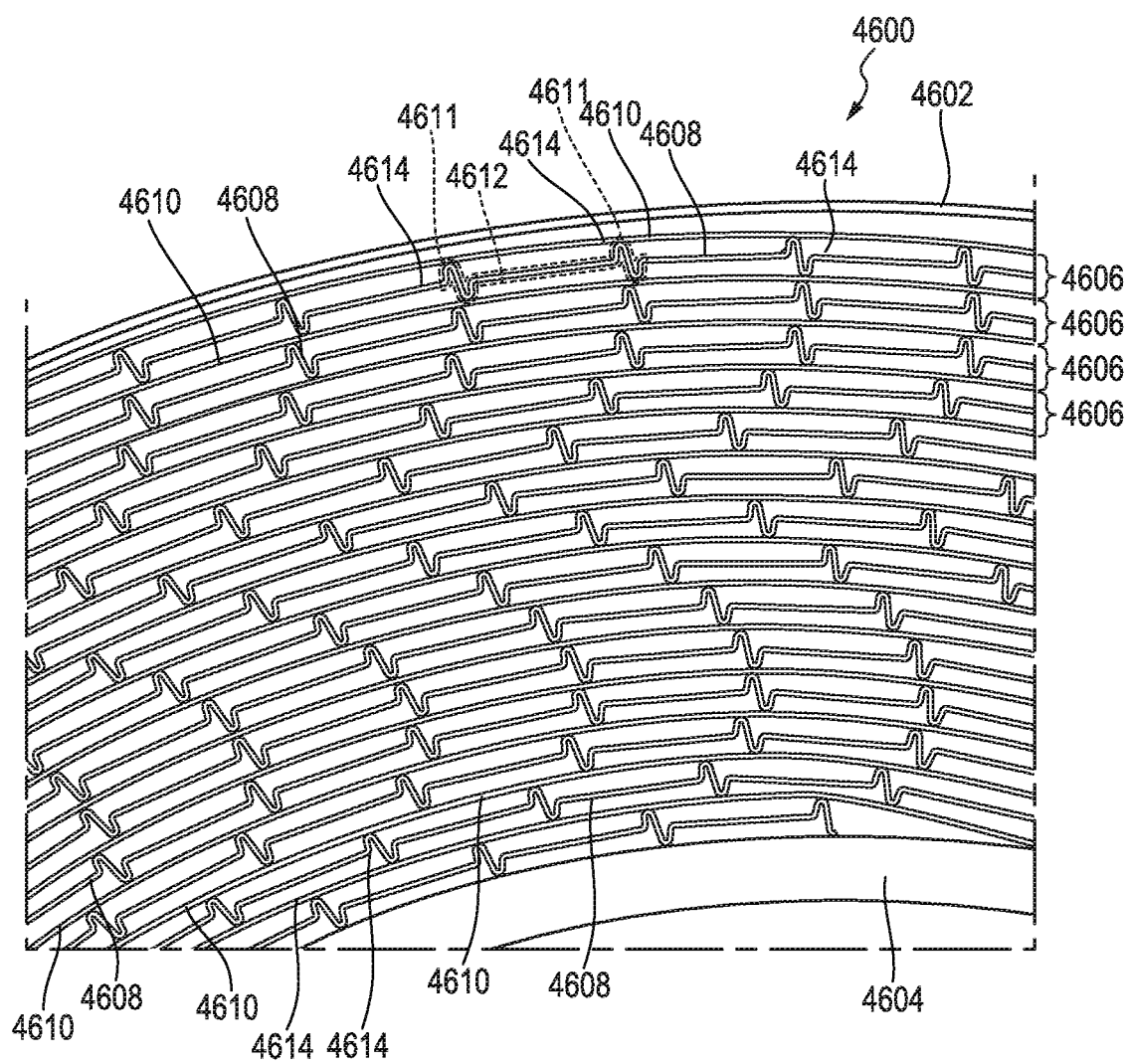
FIG. 46 shows a top view of a portion of another filter media for a coalescer element for a crankcase coalescer system according to another example embodiment.

FIG. 46 is a top view of a filter media 4600 for a rotating coalescer element, such as the rotating coalescer element 1906, for use within a coalescer system, such as the crankcase coalescer system 1900. The filter media 4600 is positioned between an outer circumferential wall 4602, such as the outer circumferential wall 1918, and an inner circumferential wall 4604. The inner circumferential wall 4604 may be a part of a support tube, such as the support tube 316, or a part of a hub, such as the hub 2002.

The filter media 4600 includes a plurality of layers 4606. The filter media 4600 is configured such that the layers 4606 extend almost entirely between the outer circumferential wall 4602 and the inner circumferential wall 4604. The number of layers 4606 included in the filter media 4600 may be related to a size of the rotating coalescer element or a desired separation performance of the rotating coalescer element. For example, a larger rotating coalescer element may include more layers 4606 than a smaller rotating coalescer element.

Each of the layers 4606 is defined by a diameter. The diameter of a layer 4606 is measured along a center of the layers 4606 and may be approximated if the layer 4606 is not perfectly circular (e.g., is elliptical, etc.). The layers 4606 are substantively identical with the only difference being the varying diameters of each of the layers 4606. The diameter of the layers 4606 gradually increases from the inner circumferential wall 4604 to the outer circumferential wall 4602.

Each of the layers 4606 includes a shaped sheet 4608 and a flat sheet 4610. The shaped sheet 4608 includes a plurality of shaped features 4611 disposed along the length of the shaped sheet 4608. Adjacent shaped features 4611 of the same shaped sheet 4608 are separated by flat sections 4612 of the shaped sheet 4608. FIG. 46 illustrates an embodiment where the shaped features 4611 are Z-shaped and have a relatively small included angle and a relatively small bend radius and the flat sections 4612 are relatively long such that a relatively large spacing (e.g., span, etc.) exists between adjacent shaped features 4611 in each of the shaped sheets 4608.

The shaped sheet 4608 and the flat sheet 4610 for each of the layers 4606 cooperate to form a plurality of axial channels 4614. Axial channels 4614 are also formed between the shaped sheet 4608 and an adjacent flat sheet 4610, the outer circumferential wall 4602, or the inner circumferential wall 4604. For example, axial channels 4614 are formed between the shaped sheet 4608 of the innermost layer 4606 and the inner circumferential wall 4604. Blowby gases flow through the filter media 4600 from a bottom end of the filter media 4600 to a top end of the filter media 4600 through the plurality of axial channels 4614.

The shaped sheet 4608 and the flat sheet 4610 are sufficiently rigid such that compression of subsequent layers 4606 does not cause the shaped sheet 4608 to flatten and does not cause the flat sheet 4610 to become shaped. For shaped sheet 4608 and the flat sheet 4610 may be constructed from, for example, stainless steel, aluminum, and other metals and composite materials.

The shaped sheet 4608 of an innermost layer 4606 may be formed through an interaction with ridges, protuberances, recesses, and other features on an external surface of the inner circumferential wall 4604. The innermost layer 4606 may be coupled to the inner circumferential wall 4604 through an interaction between the shaped sheet 4608 or the flat sheet 4610 of the innermost layer and ridges, protuberances, recess, or other features on an external surface of the inner circumferential wall 4604.

Figure 47:
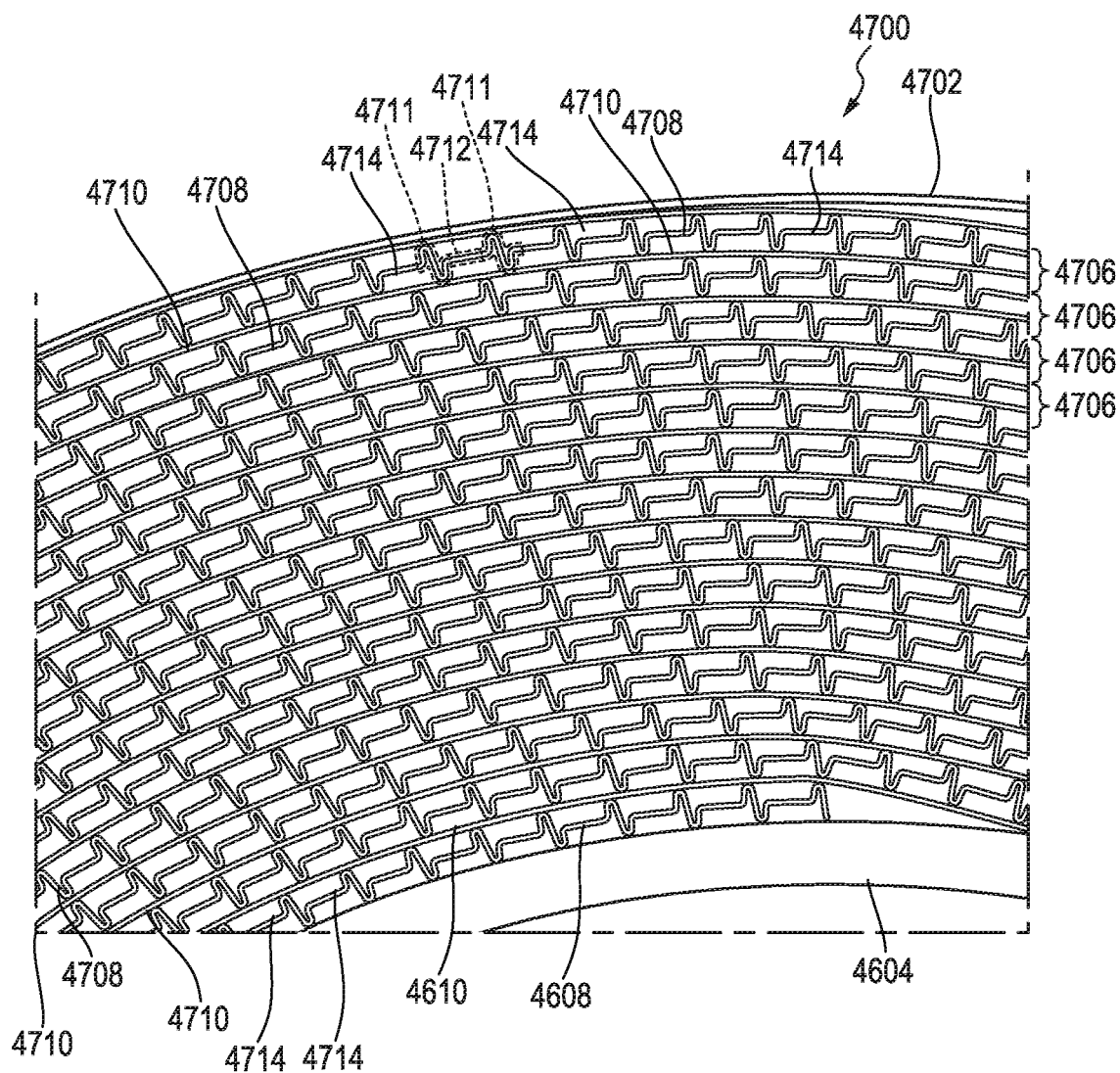
FIG. 47 shows a top view of a portion of another filter media for a coalescer element for a crankcase coalescer system according to another example embodiment.

FIG. 47 is a top view of a filter media 4700 for a rotating coalescer element, such as the rotating coalescer element 1906, for use within a coalescer system, such as the crankcase coalescer system 1900. The filter media 4700 is positioned between an outer circumferential wall 4702, such as the outer circumferential wall 1918, and an inner circumferential wall 4704. The inner circumferential wall 4704 may be a part of a support tube, such as the support tube 316, or a part of a hub, such as the hub 2002.

The filter media 4700 includes a plurality of layers 4706. The filter media 4700 is configured such that the layers 4706 extend almost entirely between the outer circumferential wall 4702 and the inner circumferential wall 4704. The number of layers 4706 included in the filter media 4700 may be related to a size of the rotating coalescer element or a desired separation performance of the rotating coalescer element. For example, a larger rotating coalescer element may include more layers 4706 than a smaller rotating coalescer element.

Each of the layers 4706 is defined by a diameter. The diameter of a layer 4706 is measured along a center of the layers 4706 and may be approximated if the layer 4706 is not perfectly circular (e.g., is elliptical, etc.). The layers 4706 are substantively identical with the only difference being the varying diameters of each of the layers 4706. The diameter of the layers 4706 gradually increases from the inner circumferential wall 4704 to the outer circumferential wall 4702.

Each of the layers 4706 includes a shaped sheet 4708 and a flat sheet 4710. The shaped sheet 4708 includes a plurality of shaped features 4711 disposed along the length of the shaped sheet 4708. Adjacent shaped features 4711 of the same shaped sheet 4708 are separated by flat sections 4712 of the shaped sheet 4708. FIG. 47 illustrates an embodiment where the shaped features 4711 are Z-shaped and have a relatively small included angle and a relatively small bend radius and the flat sections 4712 are relatively short such that a relatively small spacing (e.g., span, etc.) exists between adjacent shaped features 4711 in each of the shaped sheets 4708.

The shaped sheet 4708 and the flat sheet 4710 for each of the layers 4706 cooperate to form a plurality of axial channels 4714. Axial channels 4714 are also formed between the shaped sheet 4708 and an adjacent flat sheet 4710, the outer circumferential wall 4702, or the inner circumferential wall 4704. For example, axial channels 4714 are formed between the shaped sheet 4708 of the innermost layer 4706 and the inner circumferential wall 4704. Blowby gases flow through the filter media 4700 from a bottom end of the filter media 4700 to a top end of the filter media 4700 through the plurality of axial channels 4714.

The shaped sheet 4708 and the flat sheet 4710 are sufficiently rigid such that compression of subsequent layers 4706 does not cause the shaped sheet 4708 to flatten and does not cause the flat sheet 4710 to become shaped. For shaped sheet 4708 and the flat sheet 4710 may be constructed from, for example, stainless steel, aluminum, and other metals and composite materials.

The shaped sheet 4708 of an innermost layer 4706 may be formed through an interaction with ridges, protuberances, recesses, and other features on an external surface of the inner circumferential wall 4704. The innermost layer 4706 may be coupled to the inner circumferential wall 4704 through an interaction between the shaped sheet 4708 or the flat sheet 4710 of the innermost layer and ridges, protuberances, recess, or other features on an external surface of the inner circumferential wall 4704.

Figure 48:
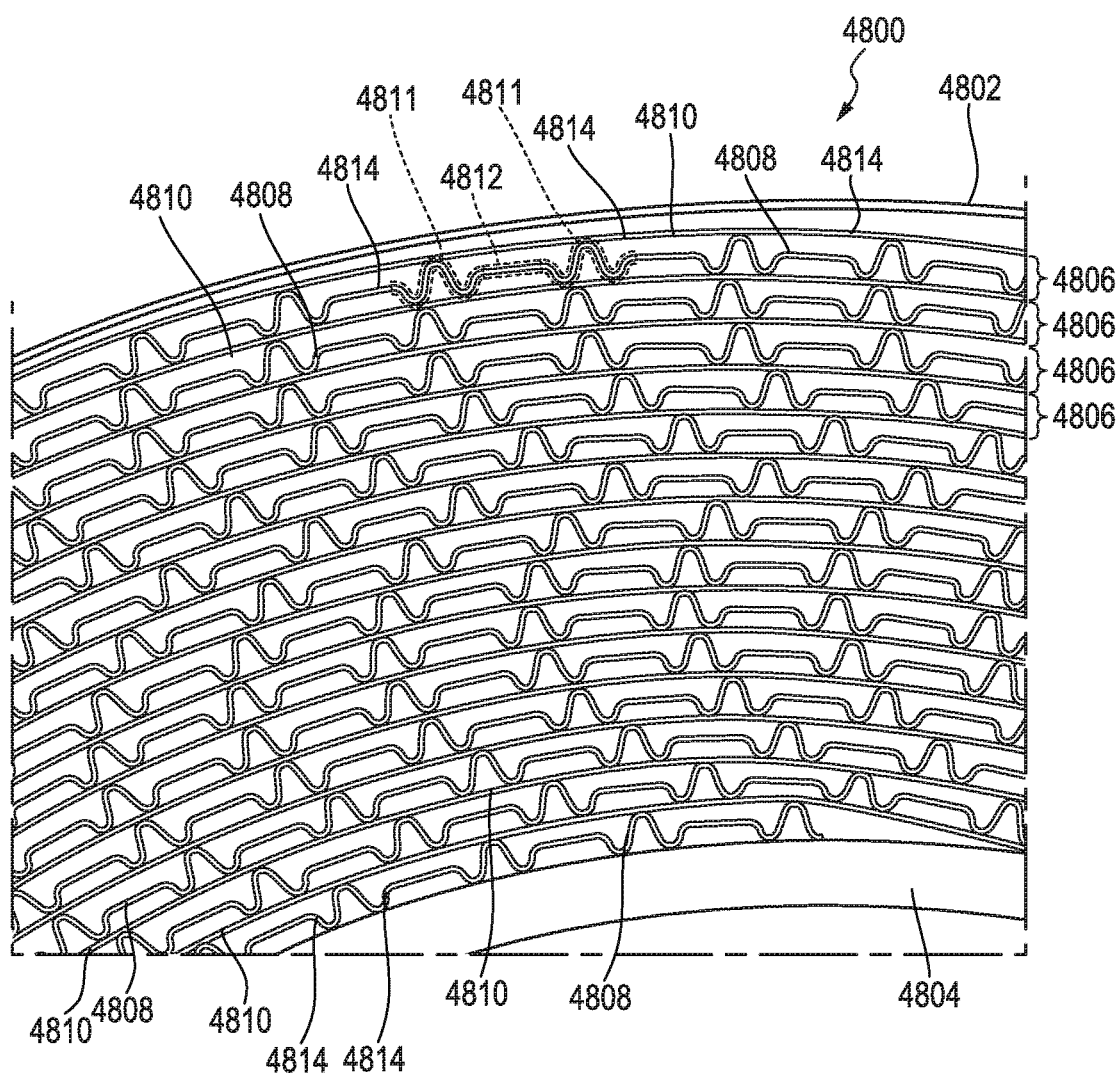
FIG. 48 shows a top view of a portion of another filter media for a coalescer element for a crankcase coalescer system according to another example embodiment.

FIG. 48 is a top view of a filter media 4800 for a rotating coalescer element, such as the rotating coalescer element 1906, for use within a coalescer system, such as the crankcase coalescer system 1900. The filter media 4800 is positioned between an outer circumferential wall 4802, such as the outer circumferential wall 1918, and an inner circumferential wall 4804. The inner circumferential wall 4804 may be a part of a support tube, such as the support tube 316, or a part of a hub, such as the hub 2002.

The filter media 4800 includes a plurality of layers 4806. The filter media 4800 is configured such that the layers 4806 extend almost entirely between the outer circumferential wall 4802 and the inner circumferential wall 4804. The number of layers 4806 included in the filter media 4800 may be related to a size of the rotating coalescer element or a desired separation performance of the rotating coalescer element. For example, a larger rotating coalescer element may include more layers 4806 than a smaller rotating coalescer element.

Each of the layers 4806 is defined by a diameter. The diameter of a layer 4806 is measured along a center of the layers 4806 and may be approximated if the layer 4806 is not perfectly circular (e.g., is elliptical, etc.). The layers 4806 are substantively identical with the only difference being the varying diameters of each of the layers 4806. The diameter of the layers 4806 gradually increases from the inner circumferential wall 4804 to the outer circumferential wall 4802.

Each of the layers 4806 includes a shaped sheet 4808 and a flat sheet 4810. The shaped sheet 4808 includes a plurality of shaped features 4811 disposed along the length of the shaped sheet 4808. Adjacent shaped features 4811 of the same shaped sheet 4808 are separated by flat sections 4812 of the shaped sheet 4808. FIG. 48 illustrates an embodiment where the shaped features 4811 are W-shaped and the flat sections 4812 are relatively short such that a relatively small spacing (e.g., span, etc.) exists between adjacent shaped features 4811 in each of the shaped sheets 4808.

The shaped sheet 4808 and the flat sheet 4810 for each of the layers 4806 cooperate to form a plurality of axial channels 4814. Axial channels 4814 are also formed between the shaped sheet 4808 and an adjacent flat sheet 4810, the outer circumferential wall 4802, or the inner circumferential wall 4804. For example, axial channels 4814 are formed between the shaped sheet 4808 of the innermost layer 4806 and the inner circumferential wall 4804. Blowby gases flow through the filter media 4800 from a bottom end of the filter media 4800 to a top end of the filter media 4800 through the plurality of axial channels 4814.

The shaped sheet 4808 and the flat sheet 4810 are sufficiently rigid such that compression of subsequent layers 4806 does not cause the shaped sheet 4808 to flatten and does not cause the flat sheet 4810 to become shaped. For shaped sheet 4808 and the flat sheet 4810 may be constructed from, for example, stainless steel, aluminum, and other metals and composite materials.

The shaped sheet 4808 of an innermost layer 4806 may be formed through an interaction with ridges, protuberances, recesses, and other features on an external surface of the inner circumferential wall 4804. The innermost layer 4806 may be coupled to the inner circumferential wall 4804 through an interaction between the shaped sheet 4808 or the flat sheet 4810 of the innermost layer and ridges, protuberances, recess, or other features on an external surface of the inner circumferential wall 4804.

Figure 49:
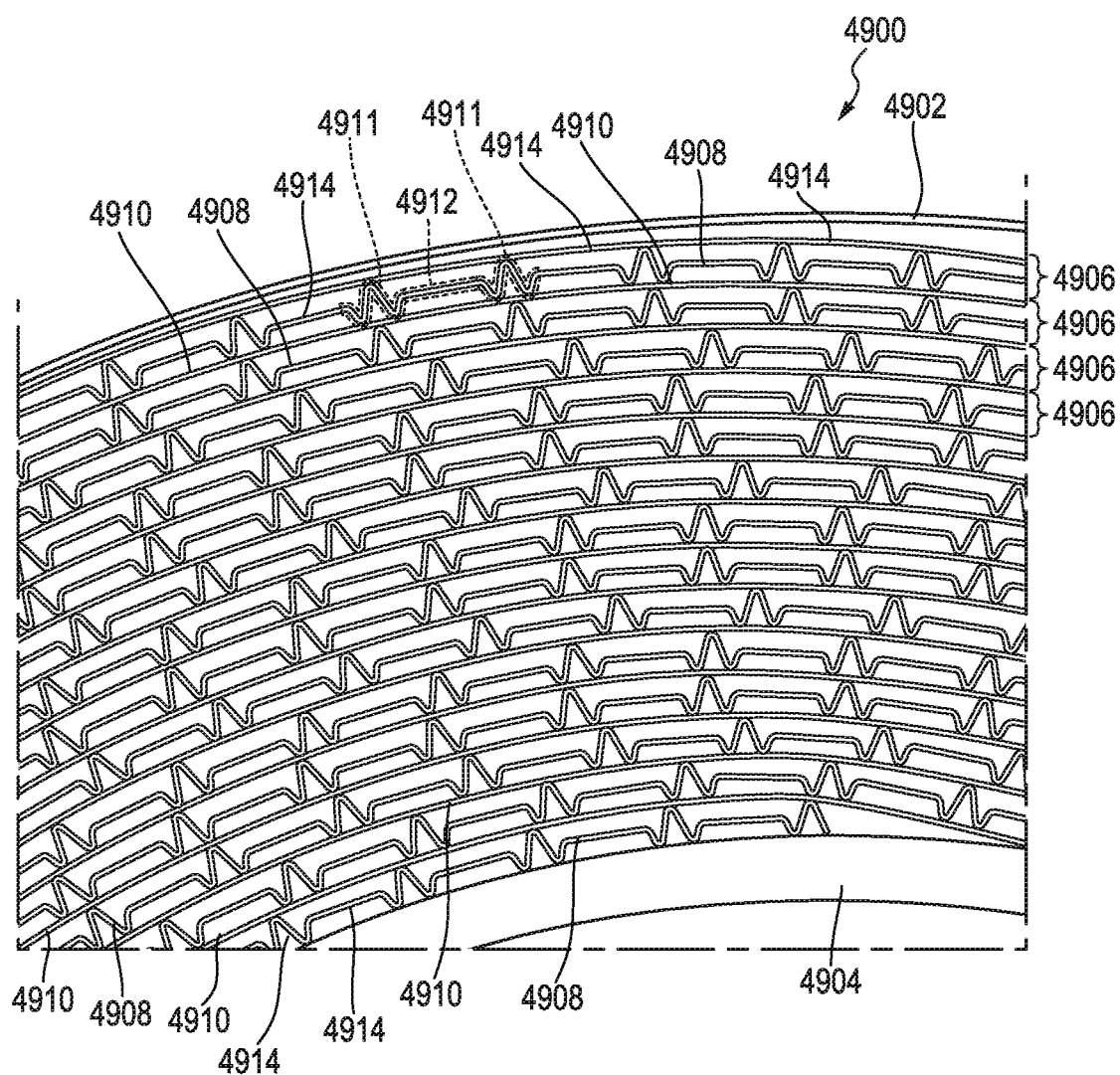
FIG. 49 shows a top view of a portion of another filter media for a coalescer element for a crankcase coalescer system according to another example embodiment.

FIG. 49 is a top view of a filter media 4900 for a rotating coalescer element, such as the rotating coalescer element 1906, for use within a coalescer system, such as the crankcase coalescer system 1900. The filter media 4900 is positioned between an outer circumferential wall 4902, such as the outer circumferential wall 1918, and an inner circumferential wall 4904. The inner circumferential wall 4904 may be a part of a support tube, such as the support tube 316, or a part of a hub, such as the hub 2002.

The filter media 4900 includes a plurality of layers 4906. The filter media 4900 is configured such that the layers 4906 extend almost entirely between the outer circumferential wall 4902 and the inner circumferential wall 4904. The number of layers 4906 included in the filter media 4900 may be related to a size of the rotating coalescer element or a desired separation performance of the rotating coalescer element. For example, a larger rotating coalescer element may include more layers 4906 than a smaller rotating coalescer element.

Each of the layers 4906 is defined by a diameter. The diameter of a layer 4906 is measured along a center of the layers 4906 and may be approximated if the layer 4906 is not perfectly circular (e.g., is elliptical, etc.). The layers 4906 are substantively identical with the only difference being the varying diameters of each of the layers 4906. The diameter of the layers 4906 gradually increases from the inner circumferential wall 4904 to the outer circumferential wall 4902.

Each of the layers 4906 includes a shaped sheet 4908 and a flat sheet 4910. The shaped sheet 4908 includes a plurality of shaped features 4911 disposed along the length of the shaped sheet 4908. Adjacent shaped features 4911 of the same shaped sheet 4908 are separated by flat sections 4912 of the shaped sheet 4908. FIG. 49 illustrates an embodiment where the shaped features 4911 are W-shaped and have a relatively small inside radius and the flat sections 4912 are relatively short such that a relatively small spacing (e.g., span, etc.) exists between adjacent shaped features 4911 in each of the shaped sheets 4908.

The shaped sheet 4908 and the flat sheet 4910 for each of the layers 4906 cooperate to form a plurality of axial channels 4914. Axial channels 4914 are also formed between the shaped sheet 4908 and an adjacent flat sheet 4910, the outer circumferential wall 4902, or the inner circumferential wall 4904. For example, axial channels 4914 are formed between the shaped sheet 4908 of the innermost layer 4906 and the inner circumferential wall 4904. Blowby gases flow through the filter media 4900 from a bottom end of the filter media 4900 to a top end of the filter media 4900 through the plurality of axial channels 4914.

The shaped sheet 4908 and the flat sheet 4910 are sufficiently rigid such that compression of subsequent layers 4906 does not cause the shaped sheet 4908 to flatten and does not cause the flat sheet 4910 to become shaped. For shaped sheet 4908 and the flat sheet 4910 may be constructed from, for example, stainless steel, aluminum, and other metals and composite materials.

The shaped sheet 4908 of an innermost layer 4906 may be formed through an interaction with ridges, protuberances, recesses, and other features on an external surface of the inner circumferential wall 4904. The innermost layer 4906 may be coupled to the inner circumferential wall 4904 through an interaction between the shaped sheet 4908 or the flat sheet 4910 of the innermost layer and ridges, protuberances, recess, or other features on an external surface of the inner circumferential wall 4904.

Figure 50:
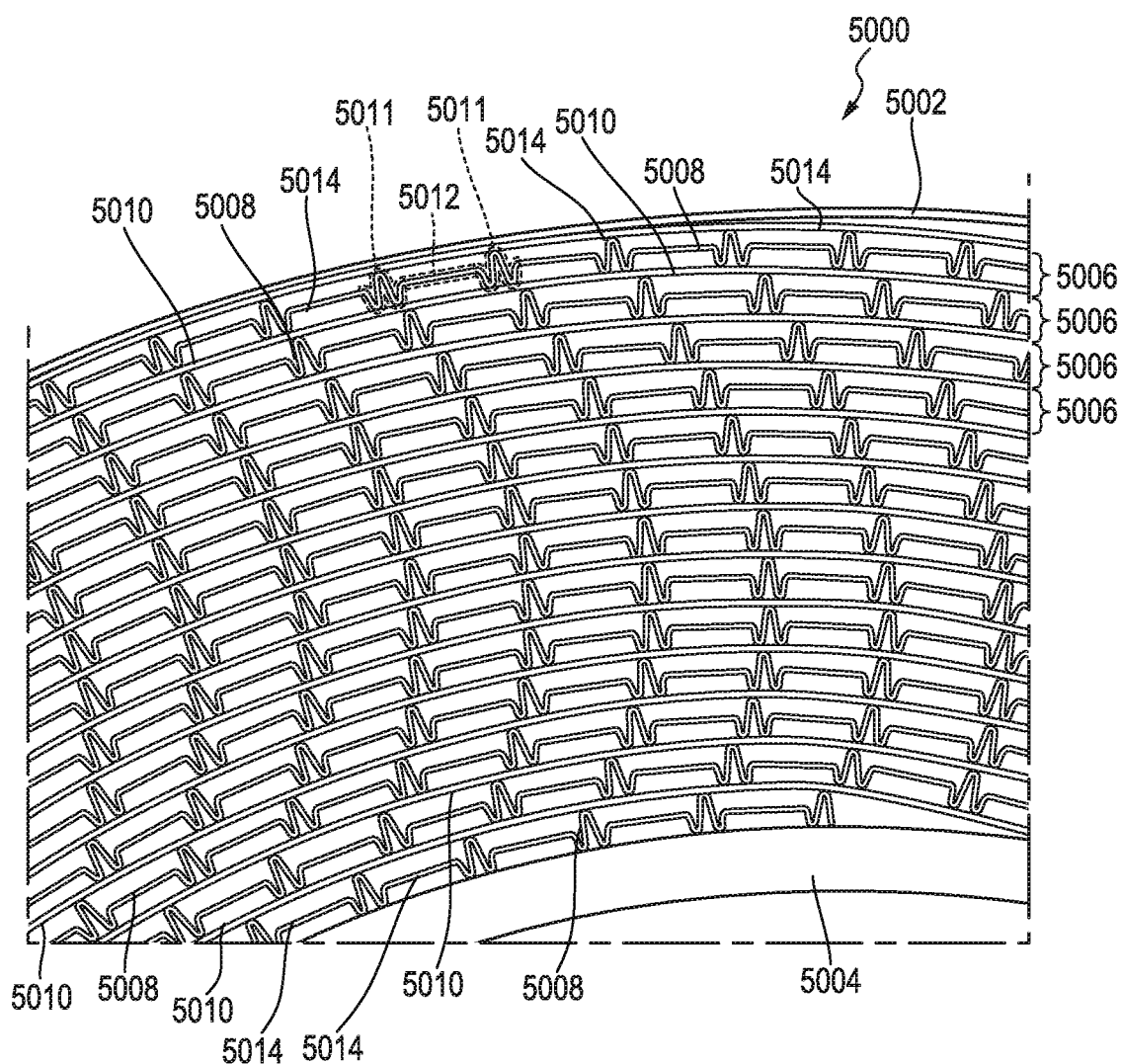
FIG. 50 shows a top view of a portion of another filter media for a coalescer element for a crankcase coalescer system according to another example embodiment.

FIG. 50 is a top view of a filter media 5000 for a rotating coalescer element, such as the rotating coalescer element 1906, for use within a coalescer system, such as the crankcase coalescer system 1900. The filter media 5000 is positioned between an outer circumferential wall 5002, such as the outer circumferential wall 1918, and an inner circumferential wall 5004. The inner circumferential wall 5004 may be a part of a support tube, such as the support tube 316, or a part of a hub, such as the hub 2002.

The filter media 5000 includes a plurality of layers 5006. The filter media 5000 is configured such that the layers 5006 extend almost entirely between the outer circumferential wall 5002 and the inner circumferential wall 5004. The number of layers 5006 included in the filter media 5000 may be related to a size of the rotating coalescer element or a desired separation performance of the rotating coalescer element. For example, a larger rotating coalescer element may include more layers 5006 than a smaller rotating coalescer element.

Each of the layers 5006 is defined by a diameter. The diameter of a layer 5006 is measured along a center of the layers 5006 and may be approximated if the layer 5006 is not perfectly circular (e.g., is elliptical, etc.). The layers 5006 are substantively identical with the only difference being the varying diameters of each of the layers 5006. The diameter of the layers 5006 gradually increases from the inner circumferential wall 5004 to the outer circumferential wall 5002.

Each of the layers 5006 includes a shaped sheet 5008 and a flat sheet 5010. The shaped sheet 5008 includes a plurality of shaped features 5011 disposed along the length of the shaped sheet 5008. Adjacent shaped features 5011 of the same shaped sheet 5008 are separated by flat sections 5012 of the shaped sheet 5008. FIG. 50 illustrates an embodiment where the shaped features 5011 are W-shaped and have a relatively small inside radius and a relatively small included angle and the flat sections 5012 are relatively short such that a relatively small spacing (e.g., span, etc.) exists between adjacent shaped features 5011 in each of the shaped sheets 5008. Additionally, FIG. 50 illustrates an embodiment where the flat sheets 5010 are relatively thick.

The shaped sheet 5008 and the flat sheet 5010 for each of the layers 5006 cooperate to form a plurality of axial channels 5014. Axial channels 5014 are also formed between the shaped sheet 5008 and an adjacent flat sheet 5010, the outer circumferential wall 5002, or the inner circumferential wall 5004. For example, axial channels 5014 are formed between the shaped sheet 5008 of the innermost layer 5006 and the inner circumferential wall 5004. Blowby gases flow through the filter media 5000 from a bottom end of the filter media 5000 to a top end of the filter media 5000 through the plurality of axial channels 5014.

The shaped sheet 5008 and the flat sheet 5010 are sufficiently rigid such that compression of subsequent layers 5006 does not cause the shaped sheet 5008 to flatten and does not cause the flat sheet 5010 to become shaped. For shaped sheet 5008 and the flat sheet 5010 may be constructed from, for example, stainless steel, aluminum, and other metals and composite materials.

The shaped sheet 5008 of an innermost layer 5006 may be formed through an interaction with ridges, protuberances, recesses, and other features on an external surface of the inner circumferential wall 5004. The innermost layer 5006 may be coupled to the inner circumferential wall 5004 through an interaction between the shaped sheet 5008 or the flat sheet 5010 of the innermost layer and ridges, protuberances, recess, or other features on an external surface of the inner circumferential wall 5004.

Figure 51:
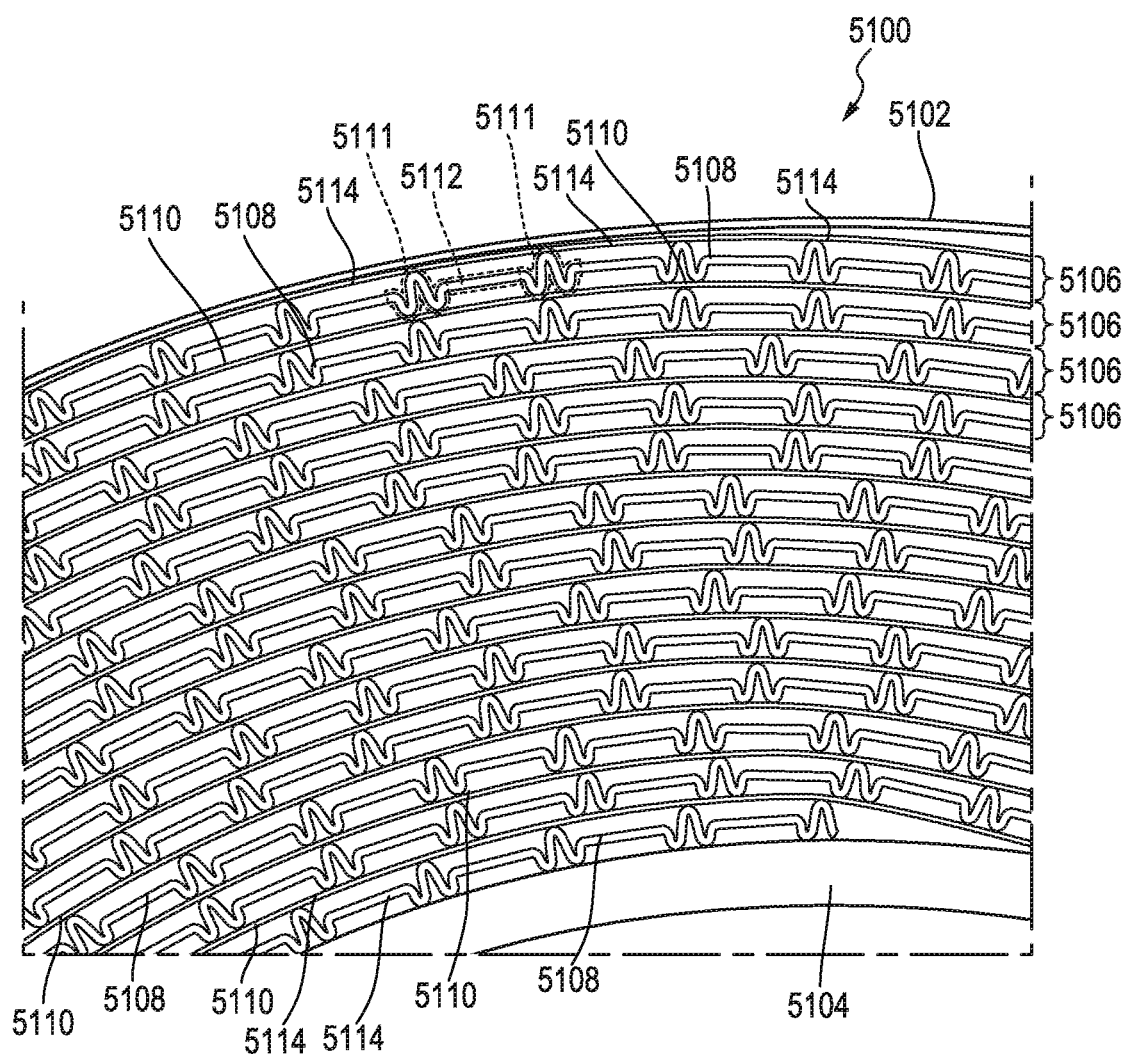
FIG. 51 shows a top view of a portion of another filter media for a coalescer element for a crankcase coalescer system according to another example embodiment.

FIG. 51 is a top view of a filter media 5100 for a rotating coalescer element, such as the rotating coalescer element 1906, for use within a coalescer system, such as the crankcase coalescer system 1900. The filter media 5100 is positioned between an outer circumferential wall 5102, such as the outer circumferential wall 1918, and an inner circumferential wall 5104. The inner circumferential wall 5104 may be a part of a support tube, such as the support tube 316, or a part of a hub, such as the hub 2002.

The filter media 5100 includes a plurality of layers 5106. The filter media 5100 is configured such that the layers 5106 extend almost entirely between the outer circumferential wall 5102 and the inner circumferential wall 5104. The number of layers 5106 included in the filter media 5100 may be related to a size of the rotating coalescer element or a desired separation performance of the rotating coalescer element. For example, a larger rotating coalescer element may include more layers 5106 than a smaller rotating coalescer element.

Each of the layers 5106 is defined by a diameter. The diameter of a layer 5106 is measured along a center of the layers 5106 and may be approximated if the layer 5106 is not perfectly circular (e.g., is elliptical, etc.). The layers 5106 are substantively identical with the only difference being the varying diameters of each of the layers 5106. The diameter of the layers 5106 gradually increases from the inner circumferential wall 5104 to the outer circumferential wall 5102.

Each of the layers 5106 includes a shaped sheet 5108 and a flat sheet 5110. The shaped sheet 5108 includes a plurality of shaped features 5111 disposed along the length of the shaped sheet 5108. Adjacent shaped features 5111 of the same shaped sheet 5108 are separated by flat sections 5112 of the shaped sheet 5108. FIG. 51 illustrates an embodiment where the shaped features 5111 are W-shaped and have a relatively small inside radius and relatively small included angle and the flat sections 5112 are relatively short such that a relatively small spacing (e.g., span, etc.) exists between adjacent shaped features 5111 in each of the shaped sheets 5108. Additionally, FIG. 51 illustrates an embodiment where the flat sheets 5110 are relatively thin.

The shaped sheet 5108 and the flat sheet 5110 for each of the layers 5106 cooperate to form a plurality of axial channels 5114. Axial channels 5114 are also formed between the shaped sheet 5108 and an adjacent flat sheet 5110, the outer circumferential wall 5102, or the inner circumferential wall 5104. For example, axial channels 5114 are formed between the shaped sheet 5108 of the innermost layer 5106 and the inner circumferential wall 5104. Blowby gases flow through the filter media 5100 from a bottom end of the filter media 5100 to a top end of the filter media 5100 through the plurality of axial channels 5114.

The shaped sheet 5108 and the flat sheet 5110 are sufficiently rigid such that compression of subsequent layers 5106 does not cause the shaped sheet 5108 to flatten and does not cause the flat sheet 5110 to become shaped. For shaped sheet 5108 and the flat sheet 5110 may be constructed from, for example, stainless steel, aluminum, and other metals and composite materials.

The shaped sheet 5108 of an innermost layer 5106 may be formed through an interaction with ridges, protuberances, recesses, and other features on an external surface of the inner circumferential wall 5104. The innermost layer 5106 may be coupled to the inner circumferential wall 5104 through an interaction between the shaped sheet 5108 or the flat sheet 5110 of the innermost layer and ridges, protuberances, recess, or other features on an external surface of the inner circumferential wall 5104.

Figure 52:
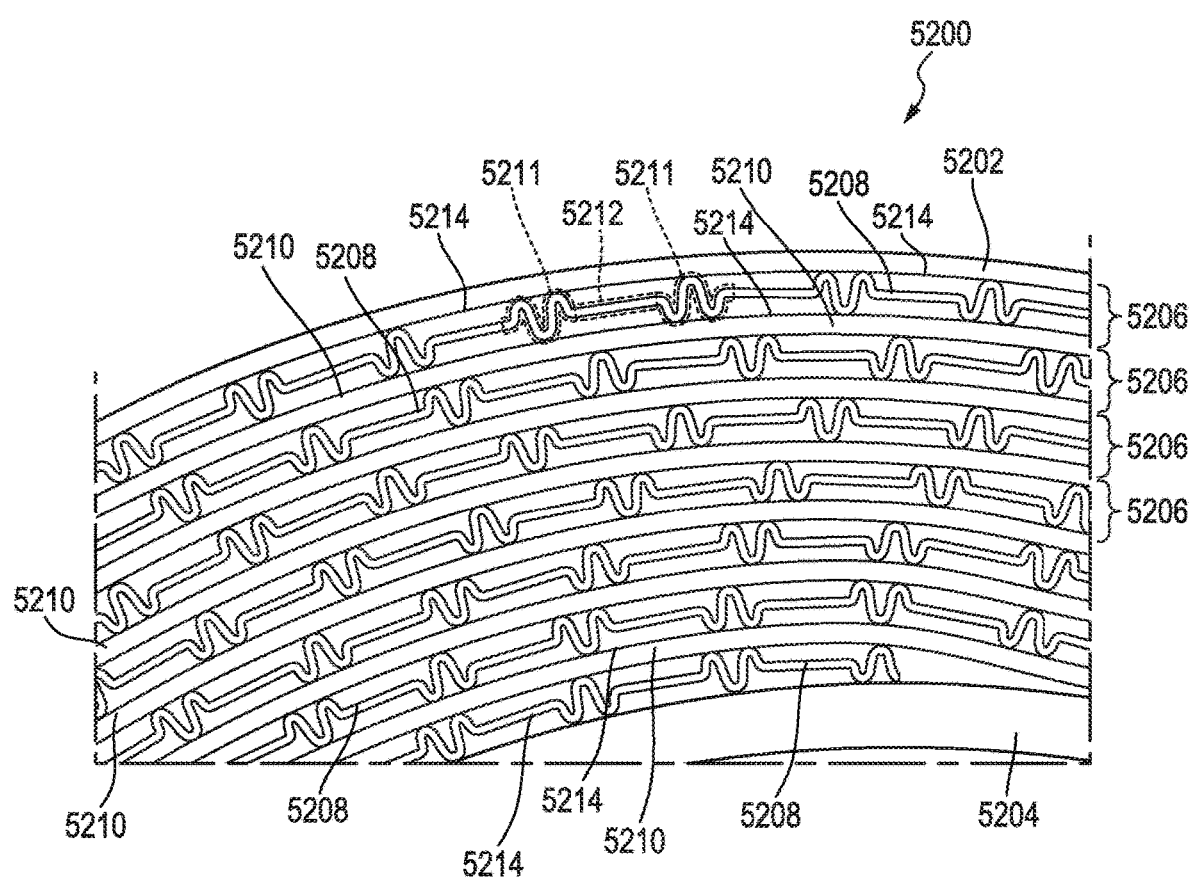
FIG. 52 shows a top view of a portion of another filter media for a coalescer element for a crankcase coalescer system according to another example embodiment.

FIG. 52 is a top view of a filter media 5200 for a rotating coalescer element, such as the rotating coalescer element 1906, for use within a coalescer system, such as the crankcase coalescer system 1900. The filter media 5200 is positioned between an outer circumferential wall 5202, such as the outer circumferential wall 1918, and an inner circumferential wall 5204. The inner circumferential wall 5204 may be a part of a support tube, such as the support tube 316, or a part of a hub, such as the hub 2002.

The filter media 5200 includes a plurality of layers 5206. The filter media 5200 is configured such that the layers 5206 extend almost entirely between the outer circumferential wall 5202 and the inner circumferential wall 5204. The number of layers 5206 included in the filter media 5200 may be related to a size of the rotating coalescer element or a desired separation performance of the rotating coalescer element. For example, a larger rotating coalescer element may include more layers 5206 than a smaller rotating coalescer element.

Each of the layers 5206 is defined by a diameter. The diameter of a layer 5206 is measured along a center of the layers 5206 and may be approximated if the layer 5206 is not perfectly circular (e.g., is elliptical, etc.). The layers 5206 are substantively identical with the only difference being the varying diameters of each of the layers 5206. The diameter of the layers 5206 gradually increases from the inner circumferential wall 5204 to the outer circumferential wall 5202.

Each of the layers 5206 includes a shaped sheet 5208 and a flat sheet 5210. The shaped sheet 5208 includes a plurality of shaped features 5211 disposed along the length of the shaped sheet 5208. Adjacent shaped features 5211 of the same shaped sheet 5208 are separated by flat sections 5212 of the shaped sheet 5208. FIG. 52 illustrates an embodiment where the shaped features 5211 alternate between W-shaped and M-shaped within each of the shaped sheets 5208. Each of the shaped features 5211 has a relatively small inside radius and a small included angle and the flat sections 5212 are relatively short such that a relatively small spacing (e.g., span, etc.) exists between adjacent shaped features 5211 in each of the shaped sheets 5208. Additionally, FIG. 52 illustrates an embodiment where the flat sheets 5210 are relatively thick.

The shaped sheet 5208 and the flat sheet 5210 for each of the layers 5206 cooperate to form a plurality of axial channels 5214. Axial channels 5214 are also formed between the shaped sheet 5208 and an adjacent flat sheet 5210, the outer circumferential wall 5202, or the inner circumferential wall 5204. For example, axial channels 5214 are formed between the shaped sheet 5208 of the innermost layer 5206 and the inner circumferential wall 5204. Blowby gases flow through the filter media 5200 from a bottom end of the filter media 5200 to a top end of the filter media 5200 through the plurality of axial channels 5214.

The shaped sheet 5208 and the flat sheet 5210 are sufficiently rigid such that compression of subsequent layers 5206 does not cause the shaped sheet 5208 to flatten and does not cause the flat sheet 5210 to become shaped. For shaped sheet 5208 and the flat sheet 5210 may be constructed from, for example, stainless steel, aluminum, and other metals and composite materials.

The shaped sheet 5208 of an innermost layer 5206 may be formed through an interaction with ridges, protuberances, recesses, and other features on an external surface of the inner circumferential wall 5204. The innermost layer 5206 may be coupled to the inner circumferential wall 5204 through an interaction between the shaped sheet 5208 or the flat sheet 5210 of the innermost layer and ridges, protuberances, recess, or other features on an external surface of the inner circumferential wall 5204.

Figure 53:
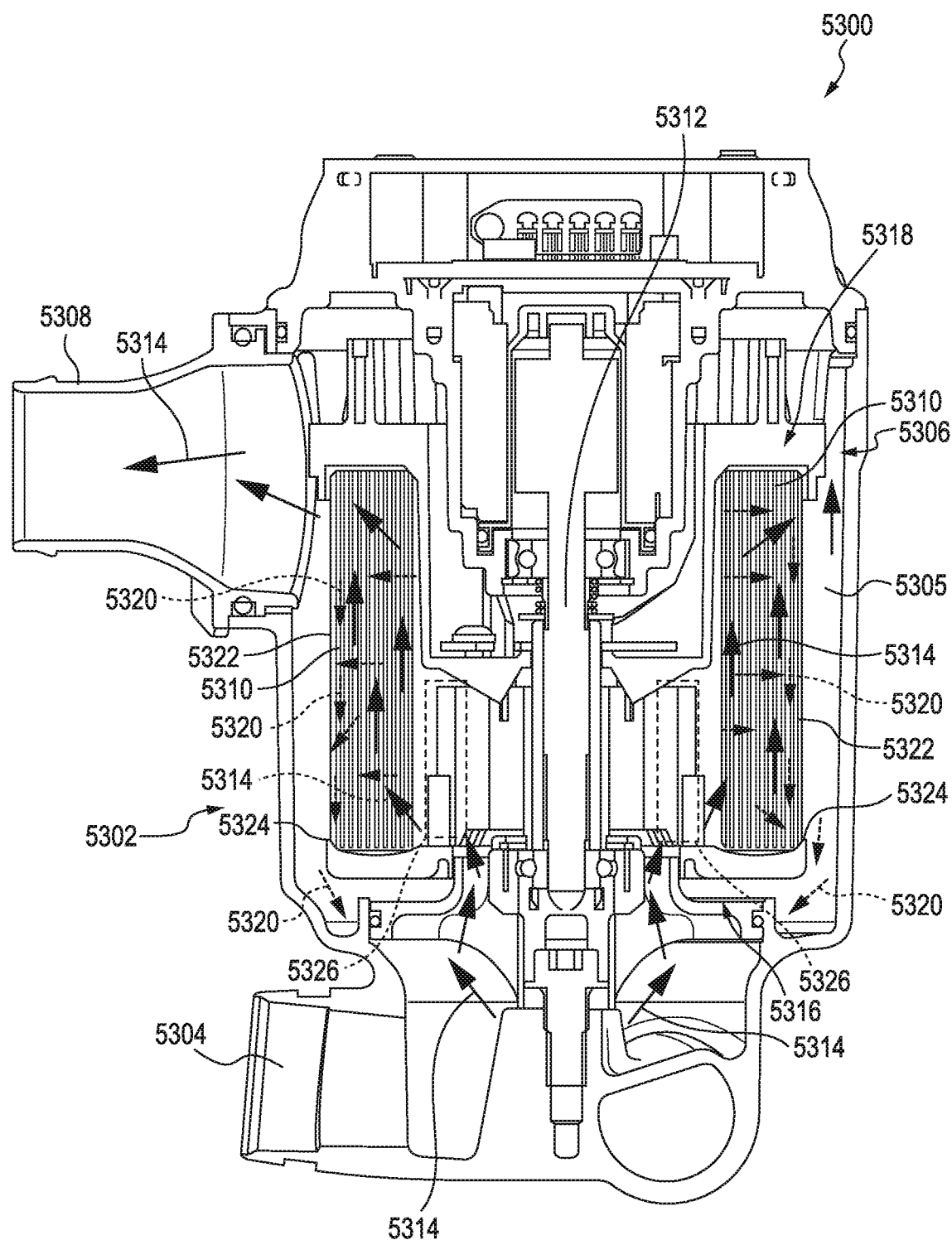
FIG. 53 shows a cross-sectional view of a coalescer element for a crankcase coalescer system according to another example embodiment.

Referring to FIG. 53, a cross-sectional view of a crankcase coalescer system 5300 is shown according to an example embodiment. The crankcase coalescer system 5300 is similar to the crankcase coalescer system 200. The crankcase coalescer system 5300 generally processes blowby gases received from an internal combustion engine crankcase to remove aerosols, oils, and other particulate contained in the crankcase blowby gases. The crankcase coalescer system 5300 generally includes a housing 5302 having an inlet 5304 that receives crankcase blowby gases to be filtered, a central compartment 5305 having a rotating coalescer element 5306 installed therein, and an outlet 5308 that provides filtered blowby gases to the internal combustion engine (in a closed crankcase ventilation system) or to the ambient (in an open crankcase ventilation system).

The rotating coalescer element 5306 includes filter media 5310 having axial flow channels arranged in a direction generally parallel to an axis defined by a drive shaft 5312 of the crankcase coalescer system 5300. Accordingly, the rotating coalescer element 5306 is an axial flow coalescing element. In an example embodiment, the filter media 5310 includes 1,200 channels, each having a diameter of 0.9 mm.

The filter media 5310 is extended filter media which is formed via an extrusion process (e.g., a simple extrusion, a rotating extrusion, etc.). The filter media 5310 may be constructed from ceramic materials such as aluminum oxide, Mullite, Cordierite, silicon carbide, and other similar materials. Such materials enable to filter media 5310 to provide the same amount of flow channels per square inch as a steel filter while at a lower weight than the steel filter. One reason that the filter media 5310 provides this weight reduction is that the filter media 5310 is capable of having wall thicknesses of 0.1 mm while other filters require wall thicknesses of at least 0.15 mm to 0.3 mm. Additionally, the filter media is capable of providing for up to 1,000 flow channels per square inch whereas other filters are only able to provide for approximately 400 flow channels per square inch. The filter media 5310 is not sheets of coiled or wound filter media. Instead, the filter media 5310 is a single body. As a result, the filter media 5310 may have a balanced or symmetrical construction. This mitigates wobble of the filter media 5310 upon rotation, such as by a drive shaft. This also facilitates easier center of the filter media 5310 in a coalescer element and easier sealing of endcaps to the filter media 5310. Due to the single piece construction of the filter media 5310, it is possible to chamber or otherwise shape the filter media 5310. Other filters cannot be shaped in this way. The filter media 5310 is constructed from the same material throughout. In various embodiments, the filter media 5310 is porous. The filter media 5310 may be assembled from various components which are each formed via an extrusion process and are subsequently assembled into the filter media 5310 (e.g., using an adhesive, etc.).

Movement of example blowby gases through the crankcase coalescer system 5300 is shown in solid flow arrows 5314. Crankcase gas flows from the inlet 5304, through a bottom endcap 5316 of the rotating coalescer element 5306, entering the filter media 5310 from a first, bottom end of the filter media 5310, through the filter media 5310 in an axial direction, out a second, top end of the filter media 5310, through a top endcap 5318 of the rotating coalescer element 5306, and out the outlet 1908. Flow through the filter media 5310 is uniformly distributed on an axial plane adjacent to the inlet side of the filter media 5310.

In various embodiments, coalesced liquid (e.g., oil and aerosols separated from the crankcase blowby gas)—designated by the small dashed flow arrows 5320—passes through the axial flow channels of the filter media 5310 in a radially outward direction (e.g., due to the centrifugal force impacted on the coalesced liquid by rotation of the rotating coalescer element 5306, etc.) and drains to a bottom region of the rotating coalescer element 5306 along an outer filter wall 5322 of the filter media 5310, exiting through openings 5324 in the bottom endcap 5316 at the largest local radius from a center axis of the rotating coalescer element 5306 (e.g., the axis defined by the drive shaft 5312). The openings 5324 may be crescent-shaped openings in cross-section. In some arrangements, the rotating coalescer element 5306 is positioned in a manner such that gravity assists the draining of the separated liquid from the housing 5302.

In other embodiments, the coalesced liquid exits through outer filter wall 5322 (e.g., the coalesced liquid is sprayed outwardly from the outer filter wall 5322, etc.) and the openings 5324 are not included or at not the exclusive provider or coalesced liquid from the rotating coalescer element 5306.

The top side of the rotating coalescer element 5306, opposite the bottom side of the rotating coalescer element 5306 where the openings 5324 are positioned, may be referred to as a 'clean side.' After the coalesced liquid has drained from the rotating coalescer element 5306 (e.g., via the openings 5324, etc.), the coalesced liquid may be recirculated to a fluid system. For example, if the coalesced liquid is oil, the oil may be drained from the rotating coalescer element 5306 and recirculated to an oil system of an internal combustion engine system producing the blowby gas which is processed by the crankcase coalescer system 5300.

As will be explained in more detail herein, the top endcap 5318 cooperates with the bottom endcap 5316 to maintain the filter media 5310 therebetween such that rotation of the drive shaft 5312 is transferred to the filter media 5310 via the top endcap 5318 and the bottom endcap 5316.

In some embodiments, the rotating coalescer element 5306 also includes a plurality of cartridge filters 5326. Each of the cartridge filters 5326 is positioned between the bottom endcap 5316 and the filter media 5310 such that the blowby gases entering from the inlet 5304 are passed through the cartridge filters 5326 prior to entering the filter media 5310. The cartridge filters 5326 may further increase the separation efficiency of the rotating coalescer element 5306 by acting as a pre-filter in an area where centrifugal forces are lower (e.g., closer to the drive shaft 5312, etc.). In these embodiments, the axial flow channels in the filter media 5310 may be larger and/or may be fully open. Additionally or alternatively, the cartridge filters 5326 may act as a diesel particulate filter (DPF), thereby supplementing the capabilities of the rotating coalescer element 5306 and making the rotating coalescer element 5306 more desirable.

Figure 54:
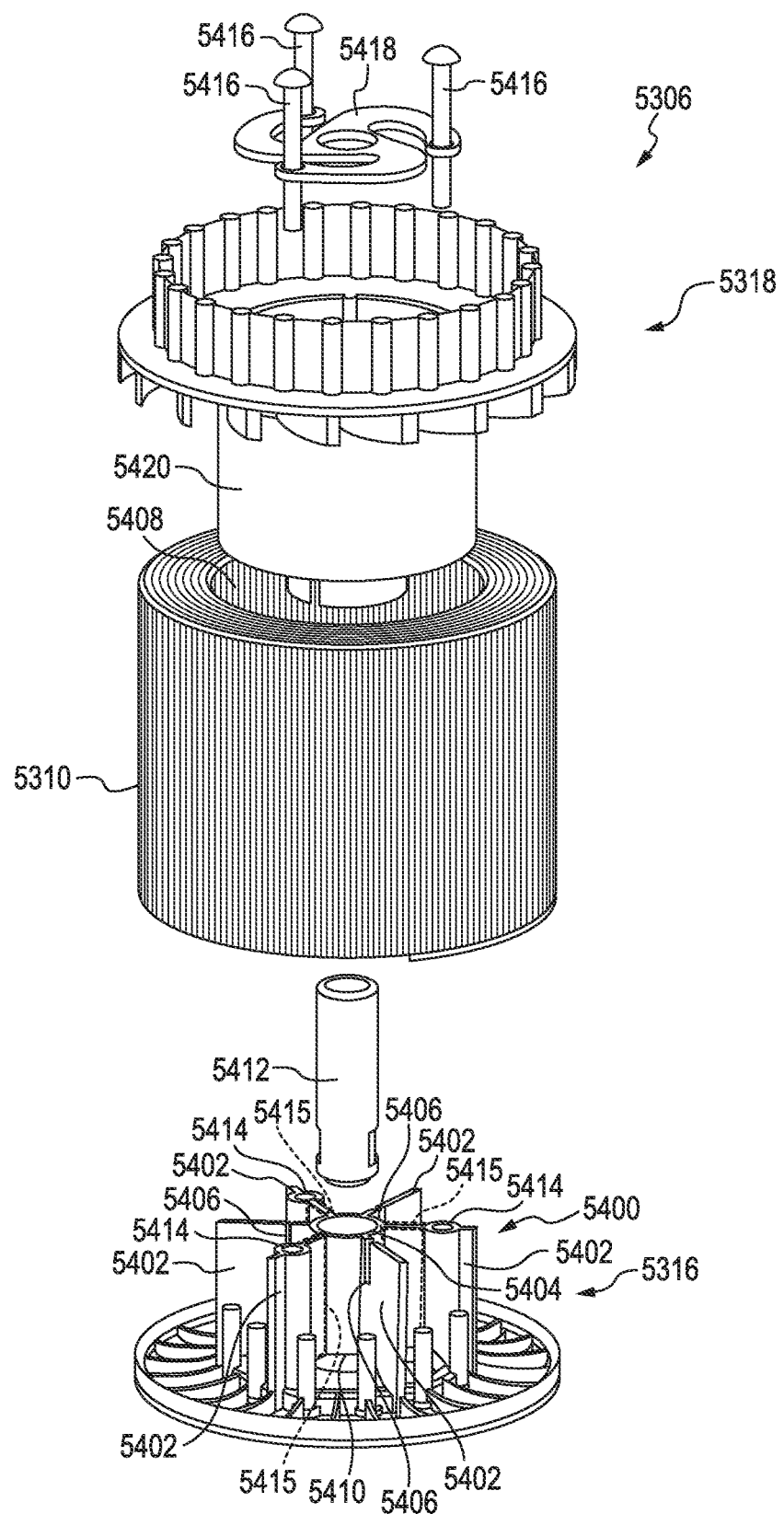
FIG. 54 shows an exploded view of a coalescer element for the crankcase coalescer system of FIG. 53.

FIG. 54 illustrates the rotating coalescer element 5306 in greater detail. The bottom endcap 5316 includes a bottom endcap hub 5400. The bottom endcap hub 5400 includes a plurality of bottom endcap ribs 5402 and a bottom endcap sleeve 5404. The bottom endcap sleeve 5404 is configured to be centered on a center axis of the rotating coalescer element 5306. Each of the bottom endcap ribs 5402 extends from the bottom endcap sleeve 5404 radially outward. The bottom endcap 5316 is configured such that adjacent bottom endcap ribs 5402 are separated by the same angular distance. The bottom endcap ribs 5402 are also configured such that alternating ones of the bottom endcap ribs 5402 include a bottom endcap slot 5406. As will be explained herein, the bottom endcap slot 5406 is configured to receive a portion of the top endcap 5318 to facilitate consistently proper assembly of the rotating coalescer element 5306. (e.g., in a poke-yoke fashion, etc.).

The bottom endcap ribs 5402 are configured to receive the filter media 5310 such that the bottom endcap ribs 5402 are located within an inner filter wall 5408 of the filter media 5310. An aperture 5410 is defined between each adjacent pair the bottom endcap ribs 5402. The blowby gases flow from the inlet 5304 through the apertures 5410 and into the filter media 5310. Each of the bottom endcap ribs 5402 functions as a fan blade (e.g., turbine blade, etc.) during rotation of the rotating coalescer element 5306. In this way, the bottom endcap ribs 5402 cause blowby gases to enter the inlet 5304 (e.g., by creating suction, etc.). Furthermore, an interaction between the bottom endcap ribs 5402 and the inner filter wall 5408 may function to transfer rotation of the drive shaft 5312 to the filter media 5310 and/or maintain the position of the filter media 5310 within the rotating coalescer element 5306.

The rotating coalescer element 5306 includes an interfacing sleeve 5412. The interfacing sleeve 5412 is configured to receive and be coupled to the drive shaft 5312. The interfacing sleeve 5412 is configured to be received within and be coupled to the bottom endcap sleeve 5404. The interaction between the bottom endcap sleeve 5404 and the interfacing sleeve 5412 is configured to transfer rotation of the drive shaft 5312 to the bottom endcap 5316. In some embodiments, the drive shaft 5312 is press fit into the interfacing sleeve 5412. In other embodiments, the drive shaft 5312 is adhesively bonded to the interfacing sleeve 5412. The interfacing sleeve 5412 may have a textured portion configured to bite into the drive shaft 5312 upon a sufficiently forceful insertion of the drive shaft 5312 into the interfacing sleeve 5412. The interfacing sleeve 5412 defines a center axis of the rotating coalescer element 5306. In various embodiments, the rotating coalescer element 5306 is rotationally symmetric about the center axis of the interfacing sleeve 5412 at regular intervals (e.g., every 30.41°, etc.).

The bottom endcap ribs 5402 which do not include the bottom endcap slot 5406 include a bottom endcap axial conduit 5414 such that each bottom endcap rib 5402 includes either a bottom endcap slot 5406 or a bottom endcap axial conduit 5414. The bottom endcap axial conduits 5414 are configured to each receive a fastener 5416 for coupling the top endcap 5318 to the bottom endcap 5316 such that the filter media 5310 is captured therebetween.

The bottom endcap ribs 5402 which do not include the bottom endcap slot 5406 also include a plurality of bottom endcap flanges 5415. The bottom endcap flanges 5415 extend along a bottom endcap rib 5402 from a bottom endcap axial conduit 5414 to the bottom endcap slot 5406. The bottom endcap flanges 5415 do not include the bottom endcap slots 5406 As a result, the bottom endcap hub 5400 is configured such that (i) each bottom endcap rib 5402 which only includes a bottom endcap slot 5406 is adjacent only a bottom endcap rib 5402 which only includes a bottom endcap axial conduit 5414 and a bottom endcap flange 5415 and (ii) each bottom endcap rib 5402 which only includes a bottom endcap slot 5406 is adjacent only a bottom endcap rib 5402 which only includes a bottom endcap axial conduit 5414 and a bottom endcap flange 5415.

In addition to the top endcap 5318 and the bottom endcap 5316, each of the fasteners 5416 extends through a triskell stress disk 5418. The triskell stress disk 5418 utilizes a triskell shape to mitigate the accumulation of stresses in the rotating coalescer element 5306 due to the fasteners 5418. Specifically, the triskell stress disk 5418 facilitates expansion and contraction which may occur when the rotating coalescer element 5306 is heated. For example, the triskell stress disk 5418 may disperse stresses accumulating at the top endcap 5318 near one of the fasteners 5418 to other portions of the top endcap 5318. These stresses may accumulate due to different thermal expansion of the filter media 5310, which may be ceramic and have a coefficient of thermal expansion of one value, and the top endcap 5318 and/or bottom endcap 5316 which may be plastic, and have a coefficient of thermal expansion of a different value. In this way, the triskell stress disk 5418 may increase the desirability of the rotating coalescer element 5306. A triskell shape is a specific shape having three curved legs extending from a center portion.

The top endcap 5318 includes a top endcap insert 5420. The top endcap insert 5420 is configured to be received within the filter media 5310. In various embodiments, the top endcap insert 5420 is configured to interface with the inner filter wall 5408. An interaction between the top endcap insert 5420 and the inner filter wall 5408 may function to transfer rotation of the drive shaft 5312 to the filter media 5310 and/or maintain the position of the filter media 5310 within the rotating coalescer element 5306.

Figure 55:
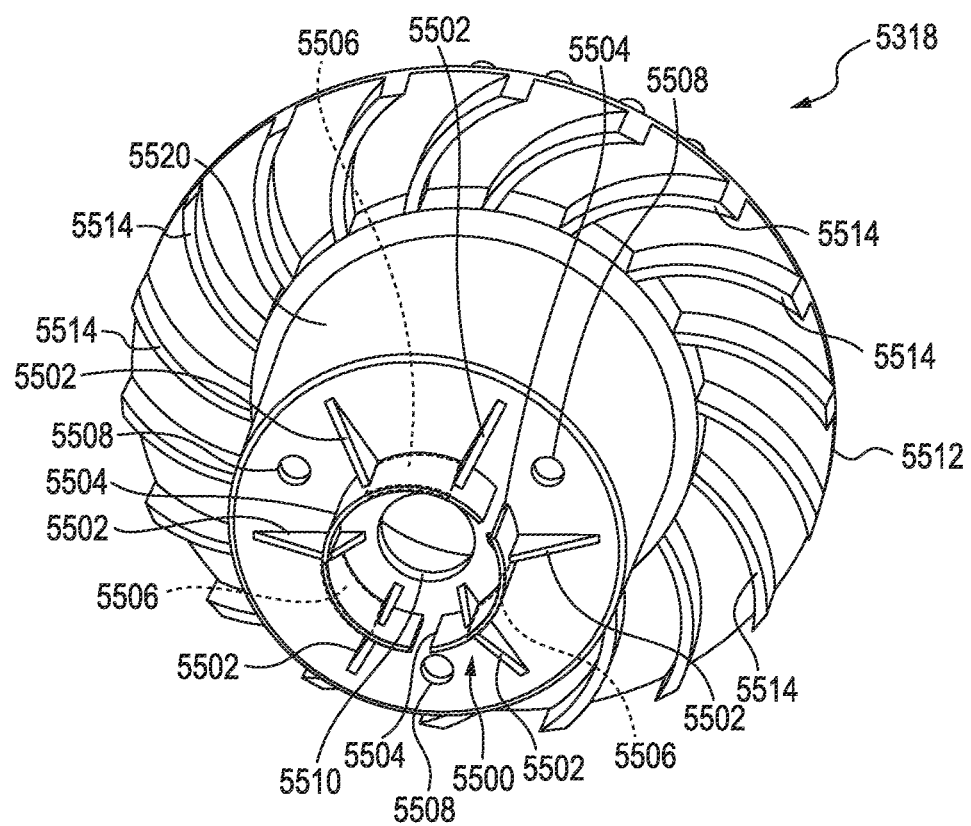
FIG. 55 shows a bottom perspective view of a portion of the coalescer element of FIG. 54.

FIG. 55 illustrates the top endcap 5318 in greater detail according to one example embodiment. The top endcap 5318 includes a top endcap hub 5500. The top endcap hub 5500 includes a plurality of top endcap ribs 5502. Each of the top endcap ribs 5502 extends from the top endcap hub 5500 radially outward. The top endcap 5318 is configured such that adjacent top endcap ribs 5502 are separated by the same angular distance. The angular distance separating an adjacent pair of the top endcap ribs 5502 is the same as an angular distance separating an adjacent pair of the bottom endcap ribs 5402. Each of the top endcap ribs 5502 is identical to the others of the top endcap ribs 5502.

The top endcap hub 5500 includes a plurality of top endcap slots 5504. The number of top endcap slots 5504 is the same as the number of bottom endcap slots 5406. Each of the top endcap slots 5504 is positioned between an adjacent pair of the top endcap ribs 5502. The top endcap hub 5500 is configured such that adjacent top endcap slots 5504 are separated by the same angular distance (e.g., 120°, etc.).

The top endcap hub 5500 also includes a plurality of top endcap flanges 5506. The top endcap flanges 5506 extend between adjacent pairs of the top endcap ribs 5502. The top endcap flanges 5506 do not include the top endcap slots 5504. As a result, the top endcap hub 5500 is configured such that alternating pairs of adjacent top endcap ribs 5502 are interspaced with either a top endcap flange 5506 or a top endcap slot 5504.

When the rotating coalescer element 5306 is assembled, each of the top endcap slots 5504 receives one of the bottom endcap flanges 5415 and each of the bottom endcap slots 5406 receives one of the top endcap flange 5506. As a result, the bottom endcap axial conduits 5414 are each aligned with a hole 5508 in the top endcap hub 5500. The top endcap 5318 is then coupled to the bottom endcap 5316 by inserting each of the fasteners 5416 through the triskell disk 5148, through one of the holes 5508, and through one of the bottom endcap axial conduits 5414.

The top endcap hub 5500 also includes a top endcap sleeve 5510. The top endcap sleeve 5510 is configured to receive and be coupled to the interfacing sleeve 5412. The interaction between the top endcap sleeve 5510 and the interfacing sleeve 5412 is configured to transfer rotation of the drive shaft 5312 to the top endcap 5318.

The top endcap 5318 also includes a top lip 5512 and a plurality of vanes 5514 (e.g., ribs, flow guides, etc.). The top lip 5512 extends circumferentially about the top endcap hub 5500. The top lip 5512 is defined by a diameter greater than a diameter of the outer filter wall 5322.

Each of the plurality of vanes 5514 is coupled to or integrated with the top lip 5512 and extends downwards towards the filter media 5310. Each of the plurality of vanes 5514 cooperates with the top lip 5512 and the filter media 5310 (e.g., a top surface of the filter media 5310, etc.) to form a plurality of channels in the top endcap 5318. Each of the plurality of channels is configured to facilitate the flow of blowby gas from a top end of the filter media 5310 through the top endcap 5318. According to an example embodiment, each of the plurality of vanes 5514 is shaped (e.g., curved, rounded, slanted, angled, etc.) to facilitate swirling of the blowby gas flowing from the plurality of channels.

Figure 56:
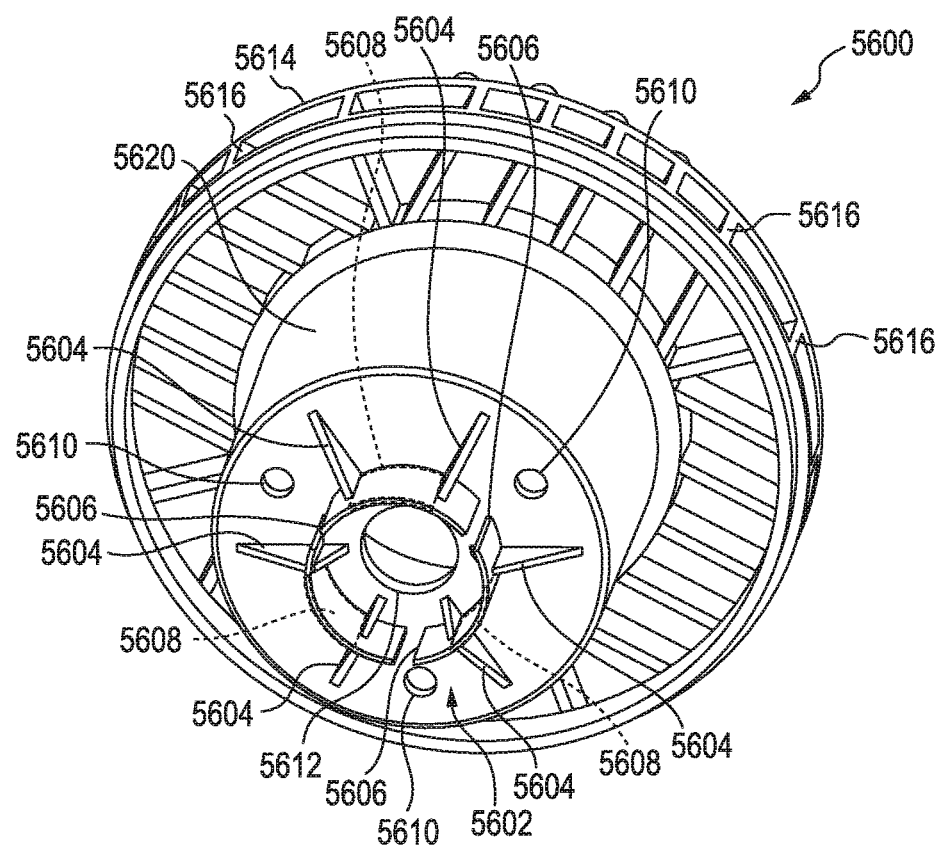
FIG. 56 shows a bottom perspective view of a portion of a coalescer element for the crankcase coalescer system of FIG. 53.

FIG. 56 illustrates a top endcap 5600 in greater detail according to another example embodiment. It is understood that the top endcap 5600 may be utilized in the rotating coalescer element 5306 in place of the top endcap 5318 previously described. Accordingly, the top endcap 5600 is described with reference to the rotating coalescer element 5306.

The top endcap 5600 includes a top endcap hub 5602. The top endcap hub 5602 includes a plurality of top endcap ribs 5604. Each of the top endcap ribs 5604 extends from the top endcap hub 5602 radially outward. The top endcap 5600 is configured such that adjacent top endcap ribs 5604 are separated by the same angular distance. The angular distance separating an adjacent pair of the top endcap ribs 5604 is the same as an angular distance separating an adjacent pair of the bottom endcap ribs 5402. Each of the top endcap ribs 5604 is identical to the others of the top endcap ribs 5604.

The top endcap hub 5602 includes a plurality of top endcap slots 5606. The number of top endcap slots 5606 is the same as the number of bottom endcap slots 5406. Each of the top endcap slots 5606 is positioned between an adjacent pair of the top endcap ribs 5604. The top endcap hub 5602 is configured such that adjacent top endcap slots 5606 are separated by the same angular distance (e.g., 120°, etc.).

The top endcap hub 5602 also includes a plurality of top endcap flanges 5608. The top endcap flanges 5608 extend between adjacent pairs of the top endcap ribs 5604. The top endcap flanges 5608 do not include the top endcap slots 5606. As a result, the top endcap hub 5602 is configured such that alternating pairs of adjacent top endcap ribs 5604 are interspaced with either a top endcap flange 5608 or a top endcap slot 5606.

When the rotating coalescer element 5306 is assembled, each of the top endcap slots 5606 receives one of the bottom endcap flanges 5415 and each of the bottom endcap slots 5406 receives one of the top endcap flange 5608. As a result, the bottom endcap axial conduits 5414 are each aligned with a hole 5610 in the top endcap hub 5602. The top endcap 5600 is then coupled to the bottom endcap 5316 by inserting each of the fasteners 5416 through the triskell disk 5148, through one of the holes 5610, and through one of the bottom endcap axial conduits 5414.

The top endcap hub 5602 also includes a top endcap sleeve 5612. The top endcap sleeve 5612 is configured to receive and be coupled to the interfacing sleeve 5412. The interaction between the top endcap sleeve 5612 and the interfacing sleeve 5412 is configured to transfer rotation of the drive shaft 5312 to the top endcap 5600.

The top endcap 5600 also includes a top lip 5614 and a plurality of vanes 5616 (e.g., ribs, flow guides, etc.). The top lip 5614 extends circumferentially about the top endcap hub 5602. The top lip 5614 is defined by a diameter greater than a diameter of the outer filter wall 5322.

Each of the plurality of vanes 5616 is coupled to or integrated with the top lip 5614 and extends downwards towards the filter media 5310. Each of the plurality of vanes 5616 cooperates with the top lip 5614 and the filter media 5310 (e.g., a top surface of the filter media 5310, etc.) to form a plurality of channels in the top endcap 5600. Each of the plurality of channels is configured to facilitate the flow of blowby gas from a top end of the filter media 5310 through the top endcap 5600. According to an example embodiment, each of the plurality of vanes 5616 is straight and not curved. As a result, the vanes 5616 may be product a plurality of relatively straight and uniform flows.

Figure 57:
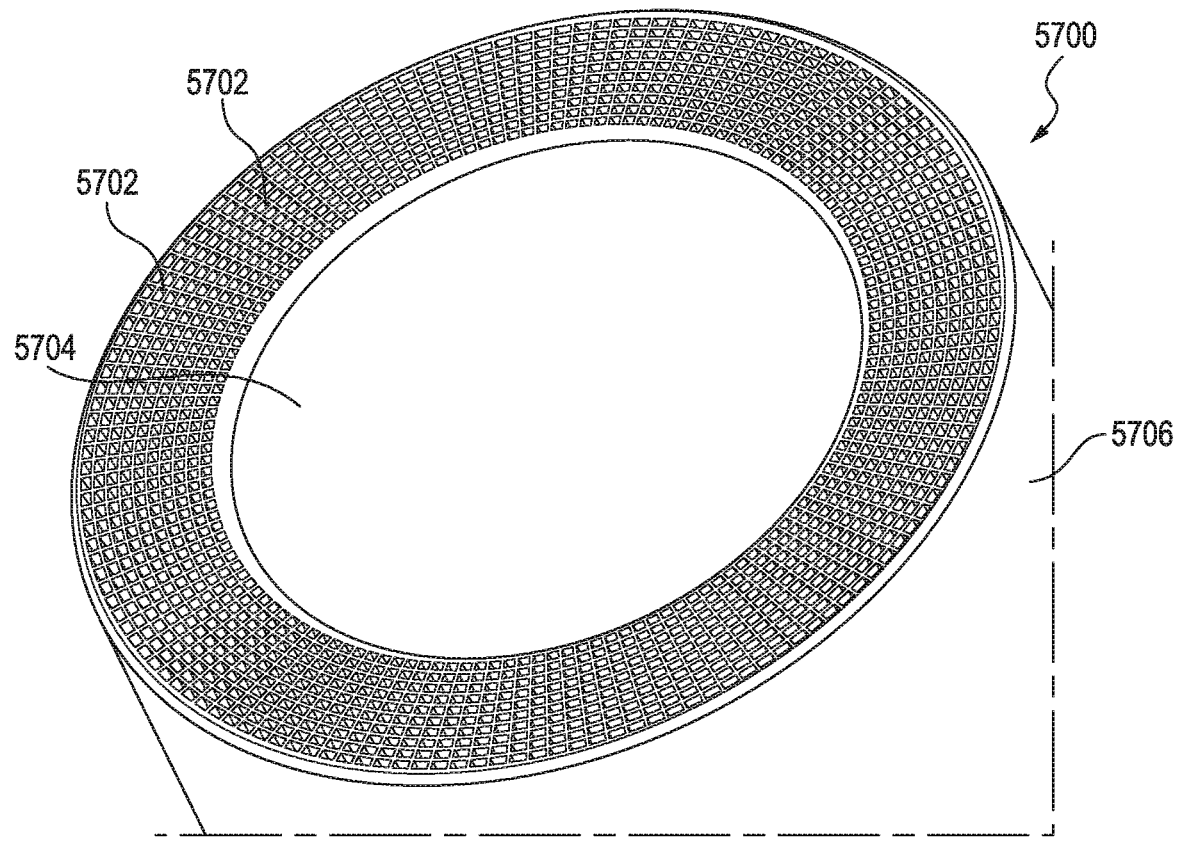
FIG. 57 shows a top perspective view of a portion of another filter media for a coalescer element for a crankcase coalescer system according to another example embodiment.

FIG. 57 illustrates a filter media 5700 to one example embodiment. It is understood that the filter media 5700 may be utilized in the rotating coalescer element 5306 in place of the filter media 5310 previously described.

The filter media 5700 includes a plurality of square axial flow channels 5702. The square axial flow channels 5702 are arranged in a plurality of uniform rows and uniform columns. Additionally, the cross-sectional area of the square axial flow channels 5702 gradually decreases from an inner filter wall 5704 to an outer filter wall 5706. Specifically, the square axial flow channels 5702 nearest the inner filter wall 5704 have the lowest cross-sectional area while the square axial flow channels 5702 nearest the outer filter wall 5706 have the greater cross-sectional area.

Figure 58:
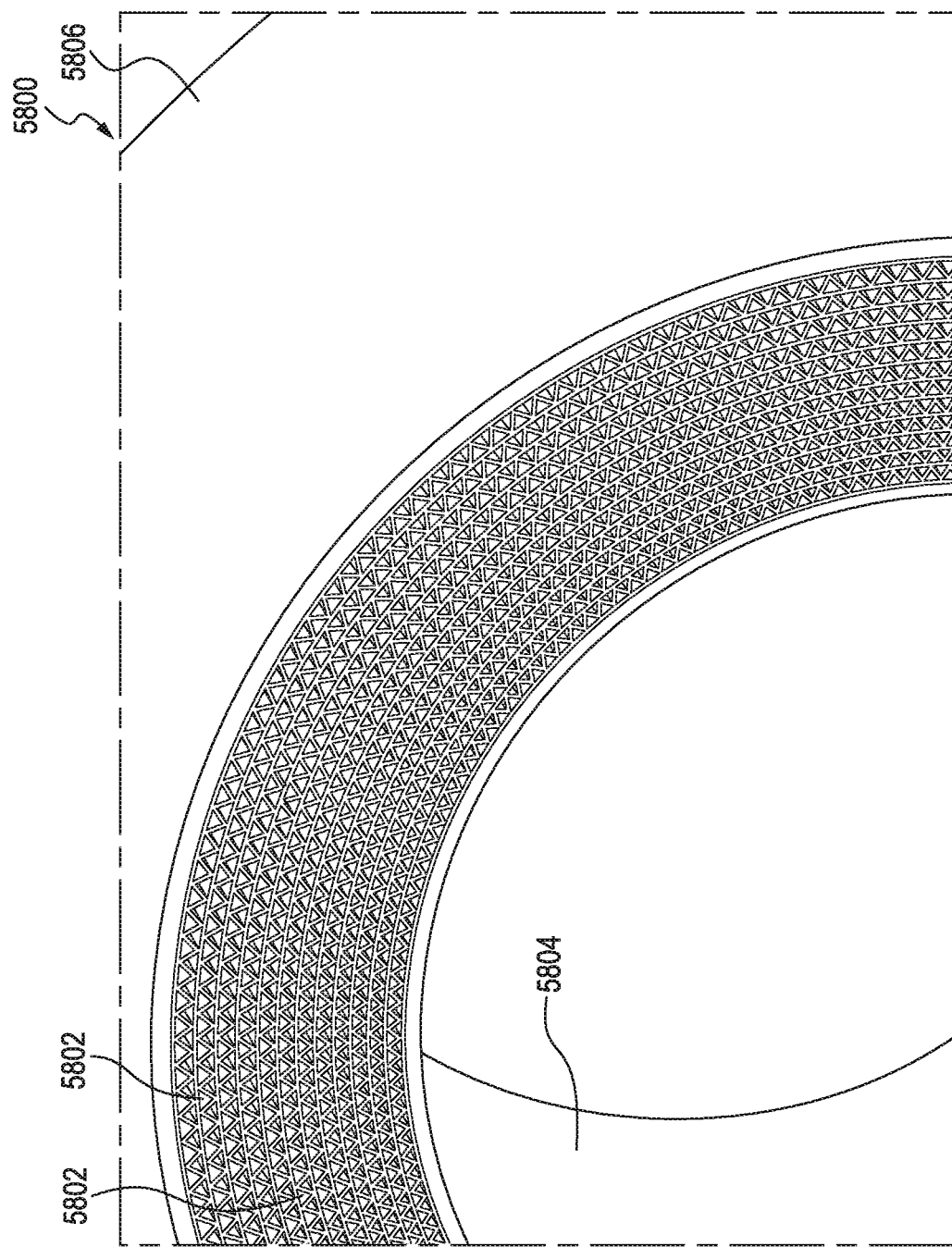
FIG. 58 shows a top perspective view of a portion of another filter media for a coalescer element for a crankcase coalescer system according to another example embodiment.

FIG. 58 illustrates a filter media 5800 to one example embodiment. It is understood that the filter media 5800 may be utilized in the rotating coalescer element 5306 in place of the filter media 5310 previously described.

The filter media 5800 includes a plurality of triangular axial flow channels 5802. The triangular axial flow channels 5802 are arranged in a plurality of uniform rows and uniform columns. Additionally, the cross-sectional area of the triangular axial flow channels 5802 gradually decreases from an inner filter wall 5804 to an outer filter wall 5806. Specifically, the triangular axial flow channels 5802 nearest the inner filter wall 5804 have the lowest cross-sectional area while the triangular axial flow channels 5802 nearest the outer filter wall 5806 have the greater cross-sectional area. In each row, the triangular axial flow channels 5802 are arranged in alternating orientations such that the shape of one triangular axial flow channel 5802 is selected to compliment the shape of an adjacent triangular axial flow channels 5802 such that each row of triangular axial flow channels 5802 has the same width, as measured in the radial direction, across all of the triangular axial flow channels 5802 in that row.

Figure 59:
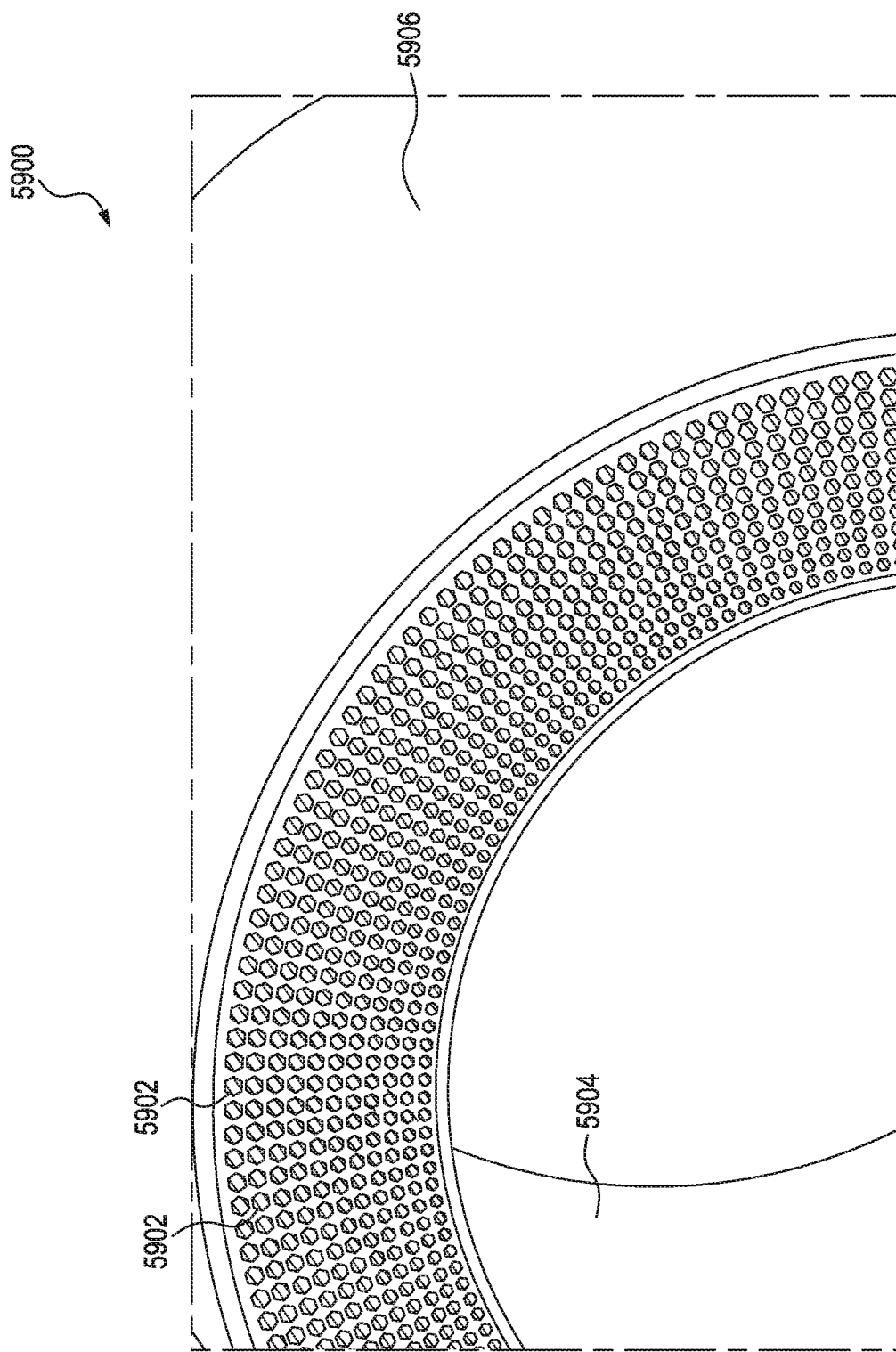
FIG. 59 shows a top perspective view of a portion of another filter media for a coalescer element for a crankcase coalescer system according to another example embodiment.

FIG. 59 illustrates a filter media 5900 to one example embodiment. It is understood that the filter media 5900 may be utilized in the rotating coalescer element 5306 in place of the filter media 5310 previously described.

The filter media 5900 includes a plurality of hexagonal axial flow channels 5902. The hexagonal axial flow channels 5902 are arranged in a plurality of uniform rows and uniform columns. Additionally, the cross-sectional area of the hexagonal axial flow channels 5902 gradually decreases from an inner filter wall 5904 to an outer filter wall 5906. Specifically, the hexagonal axial flow channels 5902 nearest the inner filter wall 5904 have the lowest cross-sectional area while the hexagonal axial flow channels 5902 nearest the outer filter wall 5906 have the greater cross-sectional area.

Figure 60:
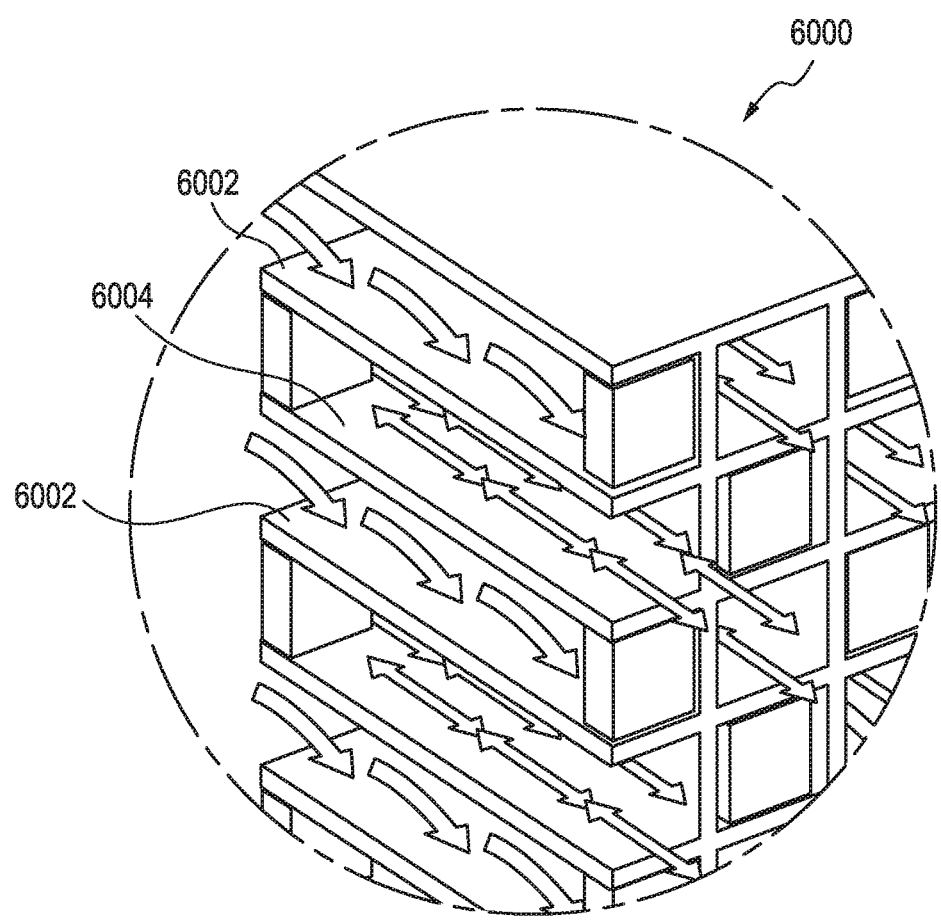
FIG. 60 shows a perspective cross-sectional view of a portion of another filter media for a coalescer element for a crankcase coalescer system according to another example embodiment.

FIG. 60 illustrates a filter media 6000 to one example embodiment. It is understood that the filter media 6000 may be utilized in the rotating coalescer element 5306 in place of the filter media 5310 previously described.

The filter media 6000 includes a plurality of inlet-open axial flow channels 6002 and a plurality of inlet-closed axial flow channels 6004. The inlet-open axial flow channels 6002 are aligned with the inlet-closed axial flow channels 6004 in a plurality of rows and columns such that each row interspaces each inlet-open axial flow channel 6002 with an inlet-closed axial flow channel 6004 and such that each column interspaces each inlet-open axial flow channel 6002 with an inlet-closed axial flow channel 6004.

Each inlet-open axial flow channel 6002 is configured to receive a flow of gas from an inlet face of the filter media 6000 (e.g., proximate the inlet 5304, etc.) and is configured to not provide the flow of gas to an outlet face of the filter media 6000 (e.g., proximate the outlet 5308, etc.). Similarly, each inlet-closed axial flow channel 6004 is configured to not receive a flow of gas from the inlet face of the filter media 6000 and is configured to not provide the flow of gas to the outlet face of the filter media 6000. To travel through the filter media 6000, the gases must enter via the inlet-open axial flow channels 6002 and exit via the inlet-closed axial flow channels 6004. In addition to the aforementioned benefits of the rotating coalescer element 5306, the filter media 6000 may also filter soot.

In some arrangements, a ribbed or contoured wall is included at the cleaned flow end of rotating axial flow media pack, such that radially detached droplets from the extended central end of a telescoping media pack have no radial "line of sight" access to flow through holes in the wall. Using an injection molded polymer shell to contain the coiled media pack and having the ribbed or contoured wall with flow-through holes integrated into the shell.

The above-described rotating separator elements may include a rotating substantially axial flow separator with a coiled pack in the form of frustum or annular frustum (e.g., frustoconical, etc.), (whether telescoping on non-telescoping) to facilitate strong liquid drainage forces toward the desired end of the pack or to facilitate desired design packaging of separator components. The rotating separator elements may include rotating axial flow element with uniform ply spacing (technically, an involute spiral, or alternatively, concentric cylinders), with inside diameter of media pack approximately equal to OD/SQRT(3) in order to minimize the size of dim (the smallest particle captured with 100% efficiency). In some arrangements, the ratio of D/d ranges from 1.2 to 4. In some arrangements, the coil spacing increases with increasing radial distance from the center axis such that $d_{lim}$ for the flow channels near the ID of coil pack is similar to $d_{lim}$ for the channels near the OD of the pack. Such an arrangement has the effect of minimizing $d_{lim}$ for a fixed dimensional envelope of a separator pack, at a given flow rate and pressure drop.

In some arrangements, the filter media used in creating the coiled filter media pack includes microfiber or nanofiber coated material, which increases the total surface area of particle collecting locations thereby boosting the efficiency for the smallest particles of interest, especially those having relatively higher Brownian diffusion mobility.

As discussed above, the spacing between successive layers of filter media in the coiled filter media packs may be provided by a monofilament. The monofilament material provides sure spacing between successive coils while minimizing projected area of spacing material in the direction of flow, for minimum pressure drop. Securing monofilament material to the flat sheets may be done in parallel arrangement. In some arrangements, parallel monofilament spacing material is secured onto both front and back sides of a thin material at an angle with respect to the material winding direction. In such arrangements, the coiled media pack may be formed by radially alternating layers of material with and without monofilament spacers during coiling. In other arrangements, parallel monofilament spacing material is secured onto one side of a scrim material at an angle with respect to the material winding direction and constructing the coil pack from two sheets such that successive layers of monofilament cross each other at many discreet points with a ply of scrim material between monofilaments. Such arrangements have the effect of creating a repeating structural support points, through the coil pack radially when wound under tension, and/or when rotated at high speed. The monofilament (or other types of spacing material) on opposite sides of a filter media sheet maintain the separation distance between adjacent layers after winding together with a flat sheet. In alternate arrangements, upset features, such as piercings, can be created in a flat sheet of material, which serve as spacing offsets and in some designs also serve as conduits for coalesced liquid to flow toward the OD of the pack during element rotation. Further, elements could be constructed from alternating layers of flat permeable sheet with no upset features or spacers and a sheet with many upset features, piercings, and or spacers.

Any of the above-described rotating separator elements can be arranged in parallel-flow configurations to optimize space utilization in common separator configurations, such as those with motor components extending into the convex envelope of the media pack.

In some arrangements, the above-described rotating separator elements can use radially alternating material layers to achieve strong structural support while providing high surface area of collection surfaces and short settling distances for particles flowing through the media pack. For example, metal foil and polymer film layers, or fiberglass composite and nonwoven polymer fiber layers. Additionally, the use of a random fibrous element pack with sufficient permeability in the axial direction so that dynamic seal recirculation is achieved under an intended range of operating conditions, and efficiency is maximized while media plugging is significantly reduced as a result of large pore sizes may be used.

In some arrangements, the above-described rotating separator elements can be arranged such that coalesced liquid is discharged from the rotor near the gas flow entrance to the separator pack or such that coalesced liquid is discharged from the rotor near the cleaned gas exit from the separator pack.

The above-described coiled filter media packs and rotating separator elements may be used in a separator assembly arrangement in which stationary housing OD walls are located significantly closer to the rotating separator element than is typical or practical for devices that flow gas radially from inside to outside, made possible by guiding substantially all of the cleaned gas flow out of the spinning media pack at one end of the element.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

References to the phrases "filter element," "coalescer element," and "separator element," may be used interchangeably to refer to the same element and/or the same type of element.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A crankcase ventilation system comprising:
    a housing defining a central compartment and having a housing inlet configured to provide blowby gases from a crankcase of an internal combustion engine into the central compartment; and
    a rotating coalescer element installed in the central compartment, the rotating coalescer element comprising:
        an outer circumferential wall;
        filter media contained within a space defined by the outer circumferential wall and interfacing with the outer circumferential wall, the filter media comprising a plurality of axial flow channels configured to receive blowby gas at a lower end of the filter media; and
        a rotating coalescer outlet contiguous with and extending from the outer circumferential wall, the rotating coalescer outlet positioned above the filter media and configured to receive filtered blowby gas from an upper end of the filter media and provide the filtered blowby gas to a housing outlet of the housing, the rotating coalescer outlet including a lateral surface extending radially outside of an outer perimeter of the filter media.

2. The crankcase ventilation system of claim 1, wherein the rotating coalescer element further comprises a drain lip contiguous with and extending from the outer circumferential wall, the drain lip extending radially towards the center axis and over the filter media.

3. The crankcase ventilation system of claim 1, wherein the filter media comprises a plurality of layers each including a shaped sheet and a flat sheet, the shaped sheet possessing a plurality of shaped features each having a V-shape.

4. The crankcase ventilation system of claim 1, wherein the filter media comprises a plurality of layers each including a shaped sheet and a flat sheet, the shaped sheet possessing a plurality of shaped features each having a Z-shape.

5. The crankcase ventilation system of claim 1, wherein the filter media comprises a plurality of layers each including a shaped sheet and a flat sheet, the shaped sheet possessing a plurality of shaped features each having a W-shape.

6. The crankcase ventilation system of claim 1, wherein the filter media comprises a plurality of layers each including a shaped sheet and a flat sheet, the shaped sheet possessing a plurality of shaped features alternating between a W-shape and an M-shape.

7. The crankcase ventilation system of claim 1, wherein the rotating coalescer element further comprises a top endcap positioned at a first axial end of the filter media.

8. The crankcase ventilation system of claim 7, wherein the filter media is part of a core coupled to the top endcap.

9. The crankcase ventilation system of claim 8, wherein the rotating coalescer element further comprises a bottom endcap positioned at a second axial end of the filter media, the bottom endcap coupled to the core.

10. The crankcase ventilation system of claim 8, further comprising a driveshaft, wherein the core includes a sleeve coupled to the drive shaft.

11. The crankcase ventilation system of claim 1, wherein the filter media includes a plurality of perforations.

12. The crankcase ventilation system of claim 1, wherein the filter media comprises a plurality of layers each including a shaped sheet and a flat sheet, at least one of the shaped and flat sheet constructed from a metal.

13. The crankcase ventilation system of claim 12, wherein the metal is stainless steel.

14. The crankcase ventilation system of claim 12, wherein the metal is aluminum.

15. The crankcase ventilation system of claim 1, wherein the filter media comprises a plurality of layers each including a shaped sheet and a flat sheet, at least one of the shaped and flat sheet constructed from a composite material.

\* \* \* \* \*